US006657577B1

(12) United States Patent
Gregersen et al.

(10) Patent No.: US 6,657,577 B1
(45) Date of Patent: Dec. 2, 2003

(54) RADAR PLANT AND MEASUREMENT TECHNIQUE FOR DETERMINATION OF THE ORIENTATION AND THE DEPTH OF BURIED OBJECTS

(75) Inventors: Ole Gregersen, Hjallerup (DK); Ole Kiel Jensen, Gistrup (DK)

(73) Assignee: Malaa Geoscience Forvaltning AB, Malaa (SE)

( * ) Notice: Subject to any disclaimer, the term of this patent is extended or adjusted under 35 U.S.C. 154(b) by 0 days.

(21) Appl. No.: 09/474,567

(22) Filed: Dec. 29, 1999

Related U.S. Application Data

(63) Continuation of application No. PCT/DK98/00296, filed on Jul. 1, 1998.

(30) Foreign Application Priority Data

Jul. 2, 1997 (DK) .............................................. 0780/97

(51) Int. Cl.[7] .......................... G01V 3/12; G01S 13/88; G01S 13/04
(52) U.S. Cl. .......................... 342/22; 342/27; 324/332; 343/793
(58) Field of Search ............................. 342/21, 22, 27, 342/28, 175, 188–197; 175/40, 41, 44, 45, 46, 50, 26; 299/1.05, 1.1, 1.2; 324/332–343; 343/711–717, 719, 793, 794–823

(56) References Cited

U.S. PATENT DOCUMENTS

| | | | |
|---|---|---|---|
| 3,775,765 A | * 11/1973 | DiPiazza et al. | ............... 342/22 |
| 4,062,010 A | 12/1977 | Young et al. | |
| 4,430,653 A | 2/1984 | Coon et al. | |
| 4,504,033 A | 3/1985 | Engelking | |
| 4,698,634 A | 10/1987 | Alongi et al. | .................. 342/22 |
| 4,728,897 A | 3/1988 | Gunton | |
| 4,839,654 A | 6/1989 | Ito et al. | ......................... 342/22 |
| 5,130,711 A | 7/1992 | Kimura et al. | ................. 342/22 |
| 5,192,952 A | 3/1993 | Johler | ........................... 342/22 |
| 5,325,095 A | 6/1994 | Vadnais et al. | ................ 342/22 |
| 5,339,080 A | 8/1994 | Steinway et al. | ............. 342/22 |
| 5,499,029 A | 3/1996 | Bashforth et al. | ............. 342/22 |
| 5,769,503 A | * 6/1998 | Stolarczyk et al. | .......... 299/1.2 |
| 5,819,859 A | * 10/1998 | Stump et al. | .................. 175/26 |
| 5,904,210 A | * 5/1999 | Stump et al. | .................. 175/45 |

FOREIGN PATENT DOCUMENTS

JP            59-79871         5/1984         ............ G01S/13/04

\* cited by examiner

*Primary Examiner*—Bernarr E. Gregory
(74) *Attorney, Agent, or Firm*—Klein, O'Neill & Singh, LLP

(57) ABSTRACT

A plant for generation of information indicative of the depth and the orientation of an object positioned below the surface of the ground is adapted to use electromagnetic radiation emitted from and received by an antenna system associated with the plant. The plant has a transmitter and a receiver for generation of the electromagnetic radiation in cooperation with the antenna system mentioned and for reception of the electromagnetic radiation reflected by the object in cooperation with the antenna system, respectively. The antenna system includes a plurality of individual antenna elements such as dipole antennas, having substantially linear polarization. The antenna elements are positioned in relation to the geometric center of the antenna system, with the various centers of the antenna element displaced in relation to the geometric center of the antenna system. The plant has a mechanism for rotating the antenna system and thus polarizing the electromagnetic field around or in relation to the geometric center of the antenna system.

42 Claims, 57 Drawing Sheets

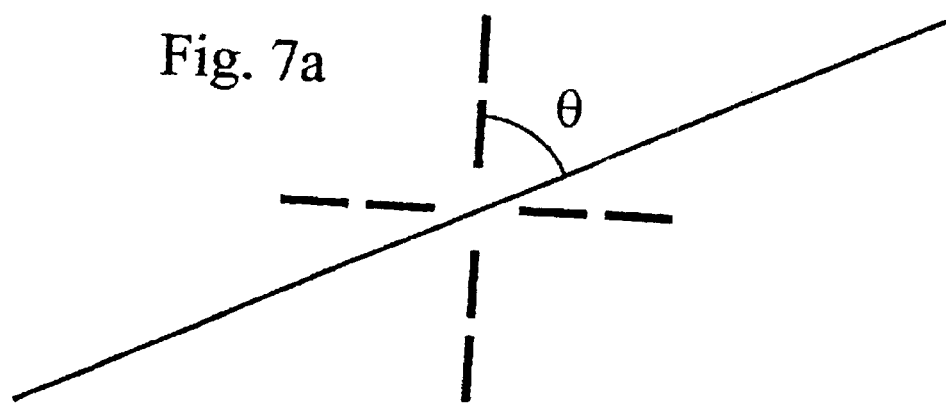
Fig. 7a
Fig. 7b
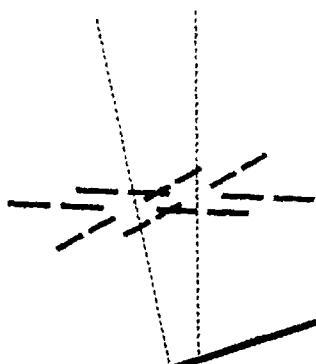
Fig. 8a
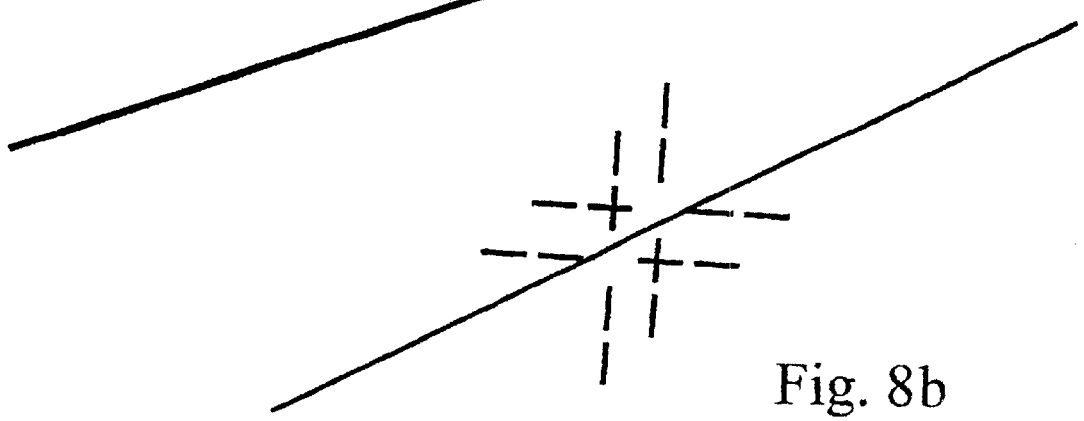
Fig. 8b

RADAR PLANT AND MEASUREMENT TECHNIQUE FOR DETERMINATION OF THE ORIENTATION AND THE DEPTH OF BURIED OBJECTS

This application is a Continuation of co-pending International Application No. PCT/DK98/00296; filed Jul. 1, 1998.

REFERENCE TO COMPUTER PROGRAM LISTING APPENDIX

This disclosure includes a computer program listing appendix, incorporated hereinby reference, that is submitted on a compact disc (Copies 1 and 2, in duplicate). Each of the compact discs includes the following files:

a_svd4.c Created Mar. 25, 2003 (46 kb)
bsvd4.asm Created Jue. 24, 1998 (57 kb)
def._4. h Created Mar. 26, 2003 (2 kb)
go4.c Created Jun. 24, 1998 (35 kb)
ROT5L.DSP Created Jun. 9, 1998 (24 kb).

The present invention generally relates to a technique for detection of objects in the ground by means of ground radars. More specifically, the invention relates to a plant for generation of information indicative of the depth and the orientation of an object positioned below the surface of the ground which plant is adapted to use electromagnetic radiation emitted from and received by an antenna system associated with the plant and which plant has a transmitter and a receiver for generation of the electromagnetic radiation in cooperation with the antenna system mentioned and for reception of an electromagnetic radiation reflected from the object in cooperation with the antenna system, respectively. Various technical solutions and embodiments of such ground radar plants and various embodiments of methods for generation of information about the depth and position of the object in question from a detection by means of ground radars are known. Examples of such technical solutions are described in the following publications: U.S. Pat. Nos. 5,339,080, 5,192,952, 5,499,029, 4,504,033, 5,325,095, 4,430,653, 4,698,634, 4,062,010, 4,839,654 and 5,130,711. These U.S. patents are referred to and they are hereby incorporated in the present specification by reference. Especially U.S. Pat. No. 4,728,897 describes a technique which is relevant in the present context as this US patent discloses an antenna construction in *J which a number of dipoles are positioned symmectically around a common centre and are brought to pivot either mechanically or electrically for generation of and reception of electromagnetic radiation. This technology enables to a large extent achievement of relevant information about the position and orientation of the object in question, but the technique is still open to improvements and modifications rendering it possible to obtain an even substantially improved generation of information and thus a safer and more reliable identification of the depth and orientation of the object to be identified.

It is an object of the present invention to provide an ground radar plant, i.e. a plant of the type described in the introduction, which plant provides an improved functionality regarding identification of the object in question, compared to technical solutions of the prior art, and consequently provides an improved measuring technique, compared to technical solutions of the prior art.

This object together with numerous other objects, advantages and special features of the present invention which will be evident from the following detailed description is obtained by means of a plant of the type mentioned in the introduction, which plant is characterized by being adapted to use electromagnetic radiation emitted from and received by an antenna system associated with the plant and having a transmitter and a receiver for generation of the electromagnetic radiation in cooperation with the antenna system mentioned, and for reception of an electromagnetic radiation reflected from the object in cooperation with the antenna system, respectively, characterized in that the antenna system comprises a plurality of individual dipole antennas, which are positioned in relation to the geometrical centres of the antenna system with the centres of the various dipole antennas displaced in relation to the geometrical centre of the antenna system and that the plant has means for rotation, either mechanically or electrically, of the antenna system around or in relation to the geometric centre of the antenna system. The embodiment of the antenna system characteristic of the present invention with the various dipole antenna displaced in relation to the geometric centre of the antenna system enables a substantially more complex radiation of electromagnetic radiation and at the same time a more precise and subtle reception of electromagnetic radiation which makes the obtaining of a substantial improvement of the measuring technique possible.

The antenna system characteristic of the present invention may in accordance with two alternative embodiments be produced in a manner so that the individual dipole antenna are positioned radially from the geometric centre of the antenna system, still with the centres of the various dipole antenna positioned displaced in relation to the geometric centre of the antenna system and especially with the centres of the various dipole antennas positioned on a circle or on several circles with different radii and with the geometric centre of the antenna system coincident with the centres of the circles in question, or the various dipole antenna may alternatively form a triangle structure positioned symmetrically around the geometric centre of the antenna system, i.e. with dipoles positioned in a triangle and with the vertex of a triangle positioned in the geometric centre of the antenna system or with composite triangle structures forming a configuration positioned symmetrically around the geometric centre of the antenna system. Alternatively, these two dipole antenna embodiments may be combined, similarly provision of another radiation pattern, other geometric configurations than triangle structures may also be used, e.g. quadrangle or polygonal structures or combinations of several different multiangle structures.

The individual antenna elements of the antenna system of the plant according to the present invention, being characteristic of the present invention, forming parallel orientered sets of transmitter and receiver, or alternatively the individual antenna elements forming orthogonally oriented transmitter and receiver pairs. Furthermore, the individual antenna elements of the antenna system may be co-polar or alternatively cross-polar. These special features enable the use of a broad variety of embodiments.

The plant according to the present invention may comprise means for production of rotation of the antenna system and thus produce a rotation, either mechanically or electrically of the antenna system. Preferably, in the present invention electronic rotation is applied in order to obtain a thorough control of the roation and a substantial reduction of the total weight of the plant. The electronic rotation may be produced by shifting between the individual antenna elements of the antenna system and thus providing polarization of the electromagnetic field around the geometric centre in angular increments which typically may be in the order of 22.5°, 30°, 36° or divisions or multiples of such angles.

The antenna system of the plant according to the present invention may in accordance with one embodiment generate electromagnetic radiation and receive electromagnetic radiation at several individual frequences, preferably in the range of 100 MHz to 1 GHz in steps of 5 MHZ. The obtained advantage is the provision of a broad spectrum of reflections.

The plant according to the invention may comprise signal processing means for measurement of a transferring function, e.g. a voltage transfer function, current transfer function or combinations thereof or power transfer functions between signals between the radiation emitted by the antenna system and the radiation received by the antenna system. In the present invention a voltage transfer function for connected values of the angular change of the antenna system and the frequency of the signal emitted by the antenna system and the signal received by the antenna system is preferably measured.

The signal processing means of the plant according to the present invention may perform the transformation from frequency to time by Fourier transformation or by application of a mathematic exponential model with corresponding rational transfer function on the transfer function associated with a specific angle, for generation of a continuous-in-time function for each angle which is calculated at a predetermined number of discrete times with identical calculation moments for each angle. Furthermore, the signal processing means may perform a transformation from frequency to time by Fourier transformation or by use of a mathematic exponential model with corresponding rational transfer function for each angular harmonic a time dependent, in-time-continuous function at a predetermined number of discrete times, with identical calculation moments for every angular harmonic, generating a set of numbers corresponding to a mathematic function having the angular harmonic discreted and the time discreted as independent variables. This enables a reliable determination of the strength and time delays of substantial reflectors even though ideal circumstances are not present.

The signal processing means of the plant according to the present invention may perform signal analysis by Fourier transformation on the for each of the employed moments associated with each angle, continuous in time, function having the time as a constant and the angle as independent variable for generation of a representation in the angle domain. Furthermore, the signal processing means may perform a signal analysis by Fourier transformation for each frequency having the frequency as a constant and the angle as independent variable for generation of a set of numbers having the angular harmonic and the measuring frequency as independent variables. The purpose of applying Fourier transformation is to emphasize the angular harmonic content of the signal at various time delays (and depths).

In the plant according to the present invention, the signal processing means may perform various operations on the processed signals. The signal processing means may preferably perform a scanning of local and global maxima indicating angular periodic reflections of objects, in representation in the angular domain, and where the peak value indicates the time delay of associated reflections from an object. Moreover, the signal processing means may perform calculations of angular position in relation to the antenna system for the angular periodic reflections and the signal processing means may furthermore perform a utilization of collated measurements, made during horizontal movement, for damping of clutter.

The present invention furthermore relates to a method for generation of information indicative of the depth and the orientation of an object positioned below the surface of the ground which method is characterized by comprising the application of electromagnetic radiation emitted from and received by an antenna system by means of a transmitter and a receiver for the generation of the electromagnetic radiation in cooperation with the antenna system, and for the reception of an electromagnetic radiation reflected from the object in cooperation with the antenna system, respectively, characterized in that for transmission and reception of the electromagnetic radiation a plurality of individual dipole antennas are employed which are positioned in relation to the geometrical centre of the antenna system with each of the centres of the antenna elements displaced in relation to the geometrical centre of the antenna system and that the antenna system is rotated, either mechanically or electrically, around or in relation to the geometric centre of the antenna system. The method characteristic of the present invention has an embodiment of the antenna system with the various dipole antennas displaced in relation to the geometric centre of the antenna system, enabling a substantially more complex generation of electromagnetic radiation and at the same time a more precise and subtle reception of electromagnetic radiation which makes the obtaining of a substantial improvement of the measuring technique possible.

In the method according to the present invention, in accordance with two alternative embodiments of the antenna system, embodiments of the antenna system may be applied so that the individual dipole antennas are positioned radially from the geometric centre of the antenna system, still with the centres of the various dipole antennas in a displaced position in relation to the geometric centre of the antenna system and especially with the centres of the various dipole antennas positioned on a circle or on serveral circles having different radii and with the geometric centre of the antenna system coincident with the centres of the circles in question, or the various dipole antennas may alternatively form triangle structure positioned symmetrically around the geometric centre of the antenna system, i.e. with dipoles positioned in triangle configuration and with the vertex of a triangular positioned in the geometric centre of the antenna system or with composite triangle structures forming a configuration symmetrically positioned around the geometric centre of the antenna system. Alternatively, these two dipole antenna embodiments may be combined. Similarly, for provision of another radiation pattern other geometrical configurations than triangle structures may also be used, e g quadrangle or polygonal structures or combinations of several different multiangle structures.

In the method according to the present invention, the individual antenna elements of the antenna system, especially the dipole antennas forming orthogonally sets of transmitter and receiver, alternatively oriented in parallel, may be used for transmission and reception of the electromagnetic radiation. Furthermore, transmitter and receiver antennas which are co-polar or alternatively cross-polar may be used for transmisstion and reception of the electromagnetic radiation. These special features enable the use of a broad variety of embodiments.

In the method according to the present invention, means for provision of rotation of the antenna system may be used, thus providing a turning either mechanically or electrically of the antenna system. Preferably, in the present invention electronic rotation is applied, in order to obtain a thorough control of the rotation and a substantial reduction of the total weight of the plant. The electronic rotation may be provided by shifting between the individual antenna elements of the antenna system and thus providing polarization of the electromagnetic field around the geometric centre in angular increments which typically may be in the order of 22.5°, 30°, 36° or divisions or multiples of such angles.

In the method according to the present invention, an antenna system in accordance with the above mentioned embodiment may be used for generation of electromagnetic radiation and reception of electromagnetic radiation at several individual frequences, the typical order of which may be within the area 100 MHz to 1 GHz in steps of 5 MHZ. The advantage obtained is a broad specter of reflections.

In the method according to the present invention, signal processing means may be used for measuring a transfer function, e.g. a voltage transfer function, current transfer function or combinations thereof or power transfer function between signals between the radiation emitted by the antenna system and the radiation received by the antenna system. In the present invention a voltage transfer function for connected values of the angular change of the antenna system and the frequency of the signal emitted by the antenna system and the signal received by the antenna system is preferably measured.

In the method according to the present invention the signal processing means may be used for transformation from frequency to time by Fourier transformation or by application of a mathematic exponential model with corresponding rational transfer function on the transfer function associated with the specific angle, for generation of a function continuous in time and time dependent for each angle which is calculated at a predetermined number of discrete times with identical calculation moments for all the angles. Furthermore, the signal processing means may be used for transformation from frequency to time by Fourier transformation or by use of a mathemathical exponential model with corresponding rational transfer function for each angular harmonic a time dependent function, continuous in time, at a predetermined number of discrete times, with identical calculation moments for all angular harmonic, generating a set of numbers corresponding to a mathematical function having the angular harmonic in discrete form and the time in discrete form as independent variables. This enables a reliable determination of the strength and time delays of important reflectors even though ideal circumstances are not present.

In the method according to the present invention, the signal processing means may be used for signal analysis by Fourier transformation for each of the used employed moments associated with each angle, continuous in time function having the time as a constant and the angle as independent variable for generation of a representation in the angle domain. Furthermore, the signal processing means may perform a signal analysis by Fourier transformation for each frequency having the frequency as a constant and the angle as independent variable for generation of a set of numbers having the angular harmonic and the measuring frequency as independent variables. The purpose of applying Fourier transformation is to emphasize the angular harmonic content of the signal at various time delays (and thus depths).

In the method according to the invention the signal processing means may be used for several operations on the processed signals. The signal processing means may be used for search of local and global maxima indicating angular periodic reflections of objects, in representation in the angular domain, and where the peak value indicates the time delay of associated reflections from an object. Moreover, the signal processing means may be used for calculations of the angular position in relation to the antenna system, for the angular periodic reflections, and the signal processing means may furthermore be used for a utilization of collocated measurements made during horizontal movement, for damping of clutter.

BRIEF DESCRIPTION OF THE DRAWINGS

In the following, the invention will be described in further detail with reference to the figures.

The FIGS. 1 to 12 refer to the above description of prior art.

FIG. 3.

FIG. 4. FIG. 4b illustrates 8 such pairs. By electric shifting between the antennas in 4b, a polarization may be provided rotating in increments of 45° during measuring having pairs as in FIG. 4a.

FIG. 5. FIG. 5a illustrates a single dipole that may be used as a transmitter as well as a receiver antenna corresponding to the measuring of the s-parameter $S_{11}$, representing a measurement of reflection (contrary to a transmission measurement which is used in all cases where transmitter and receiver antenna are separated). FIG. 5b illustrates 8 such dipoles. By electric shifting between the antennas in FIG. 5b, a polarization may be provided rotating in increments of 45° during measuring having pairs in FIG. 5a.

FIG. 6.

FIG. 7. FIG. 7a illustrates the angle of elongated objects in relation to a set of type-2 antennas. FIG. 7b illustrates the angle of elongated objects in relation to a set of type-1 antennas.

FIG. 8 illustrates a set of antennas in two positions in relation to an object. For clarity purposes only 4 dipoles are included in the set. FIG. 8a illustrates a side-view of the set in the two positions, FIG. 8b is a corresponding top view.

FIG. 10 is a schematic view of a possible construction of dipoles in which splitted metal sheets 1 are applied being electrically connected by means of resistive coupling elements a.

FIG. 11 is a schematic view of a possible construction of dipoles in which splitted metal sheets 1 . . . 5 are applied being electrically connected by means of resistive coupling elements a. The sides are not parallel and the width of the dipole increases at increasing distance from the centre.

Figure 1:
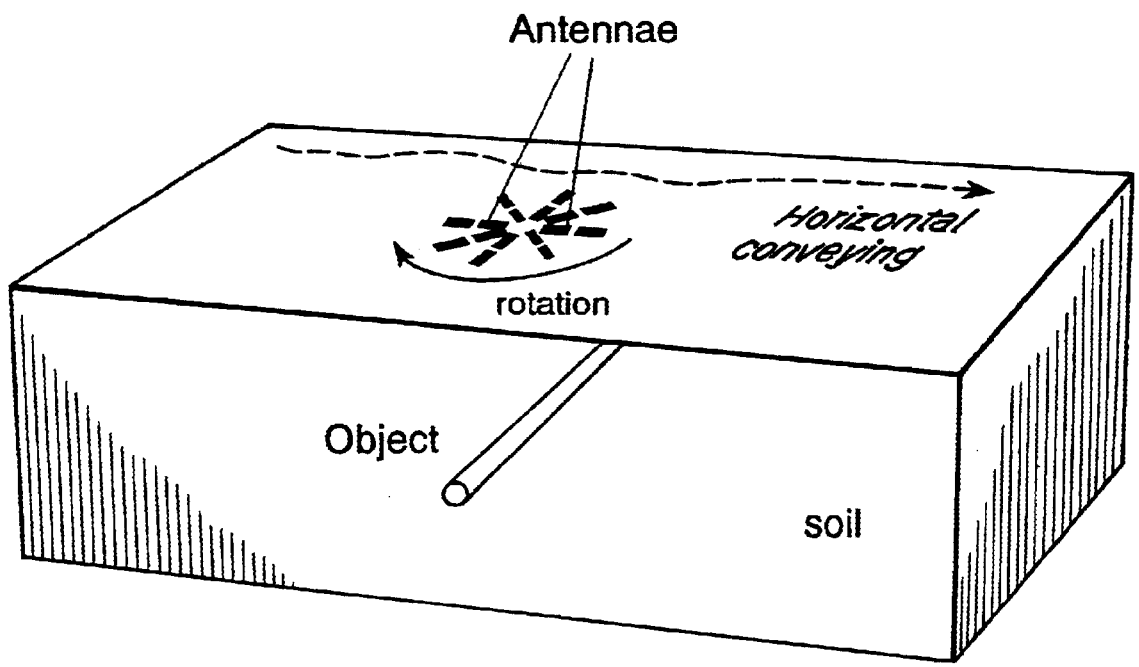
FIG. 1 illustrates how the antennas are moved along an arbitrary path along the surface of the ground during rotation of the antennas or by rotation of the polarization by means of constant electric shifting between the antenna elements.

The FIGS. 13 to 19 relate to measurements made by the preferred embodiment.

FIG. 13 illustrates the result of procedure No. 1 up to and including step 1.6. FIG. 13a illustrates signal strength as a function of angle index n and time ns in the form of a 3D-plot. FIG. 13b illustrates signal strength as a function of angle index n and time in ns as contour plot. FIGS. 13c and 13d illustrate the result of the described procedure No. 1 up to step 1.5 inclusive. FIG. 13c illustrates measured signal strength as function of angle index n and frequency in GHz in a 3D-plot. FIG. 13d illustrates measured signal strength as function of angle index n and frequency in GHz in a contour plot. FIGS. 13e and 13f illustrate the result of the described procedure No. 2 up to step 2.2 inclusive. FIG. 13e illustrates calculated signal strength as function of angular harmonic index k and time in ns in a contour plot. FIGS. 13g and 13h illustrate detection curves as the result of procedure No. 6 up to step 6.3 inclusive. FIG. 13g illustrates D in absolute values, 13h illustrates D in dB. FIGS. 13i and 13j illustrate detection curves as the result of procedure No. 2 up to step 2.3 inclusive. FIG. 13i illustrates D in absolute values, FIG. 13j illustrates D in db.

FIG. 14 illustrates the result of the described procedure No. 1 up to step 1.6 inclusive. FIG. 14a illustrates a signal strength as function of angle index n and time ns in the form of a 3D-plot. FIG. 14b illustrates signal strength as function of angle index n and time in ns as a contour plot. FIGS. 14c and 14d illustrate the result of described procedure No. 1 up to step 1.5 inclusive. FIG. 14c illustrates measured signal strength as function of angle index n and frequency in GHz in a 3D-plot. FIG. 14d illustrates measured signal strength as a function of the angle index n and frequency in GHz in a contour plot. FIGS. 14e and 14f illustrate the result of the described procedure No. 2 up to step 2.2, inclusive. FIG. 14e illustrates calculated signal strength as a function of angular harmonic index k and time in ns in a 3d-plot. FIG. 14f illustrates calculated signal strength as a function of angular harmonic index k and time in ns in a contour plot. FIG. 14g and 14h illustrate detection curves as the result of procedure No. 6 up to step 6.3 inclusive. FIG. 14g illustrate D in absoute values, 14h illustrates D in dB. FIGS. 14i and 14j illustrate detection curves as the result of procedure No. 2 up to step 2.3 inclusive. FIG. 14i illustrate D in absolute values, 14j illustrates D in dB.

FIG. 15 illustrates the result of the described procedure No. 1 up to step 1.6 inclusive. FIG. 15a illustrates signal strength as a function of angle index n and time ns i the form of 3D plot. FIG. 15b illustrates signal strength as a function of angle index n and time in ns as a contour plot. FIGS. 15c and 15d illustrate the result of described procedure No. 1 up to step 1.5 inclusive. FIG. 15c illustrates signal strength as a function of angle index n and frequency in GHz in a 3D plot. FIG. 15d illustrates measured signal strength as a function of angle index n and frequency in GHz in a contour plot. FIGS. 15e and 15f illustrate the result of described procedure No. 2 up to step 2.2 inclusive. FIG. 15e illustrates calculated signal strength as function of angular harmonic index k and time ns in a 3D plot. FIG. 15f illustrates calculated signal strength as a function of angular harmonic index k and time in ns in 3D plot. FIG. 15g and 15h illustrate detection curves as the result of procedure No. 6 up to step 6.3 inclusive. FIG. 15g illustrates D in absolute values, FIG. 15h illustrates D in dB. FIG. 15i through 15o illustrate detection curves as a result of procedure No. 2 up to step 2.3, inclusive. FIG. 15i illustrates D in absolute values, FIG. 15j illustrates D in dB, FIG. 15k and 15l illustrate calculation results comprised by the described procedure 3.

FIG. 16 illustrates the result of the described procedure No. 1 up to step 1.6 inclusive. FIG. 16a illustrates signal strength as a function of angle index n and time ns in the form of a 3D lot. FIG. 16b illustrates signal strength as a function of angle index n and time in ns in a contour plot. FIGS. 16c and 16d illustrate the result of the described procedure No. 1 up to step 1. inclusive. FIG. 16c illustrates measured signal strength as a function of angle index n and frequency in GHz in a 3D plot. FIG. 16d illustrates measured signal strength as a function of angle index n and frequency GHz in a contour plot. FIGS. 16e and 16f illustrate the result of the described procedure No. 2 up to step 2.2 inclusive. FIG. 16e illustrates calculated signal strength as a function of angular harmonic index k and time ns in a 3D-plot. FIG. 16f illustrates calculated signal strength as function of angular harmonic index k and time in ns in a contour plot. FIGS. 16g and 16h illustrate detection curves as the result of procedure No. 6 up to step 6.3 inclusive. FIG. 16g illustrate D in absolute values, FIG. 16h illustrates D in dB. FIGS. 16i and 16j illustrate detection curves as the result of procedure No. 2 up to step 2.3 inclusive. FIG. 16i illustrates D in absolute values, FIG. 16j illustrates D in dB.

Figure 17A:
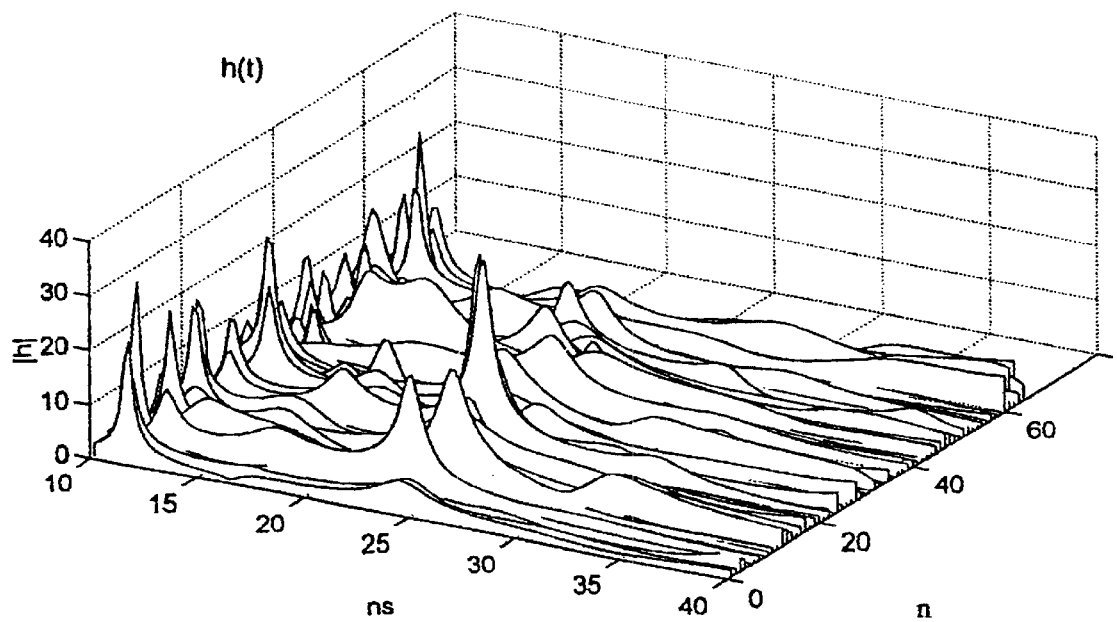
Figure 17B:
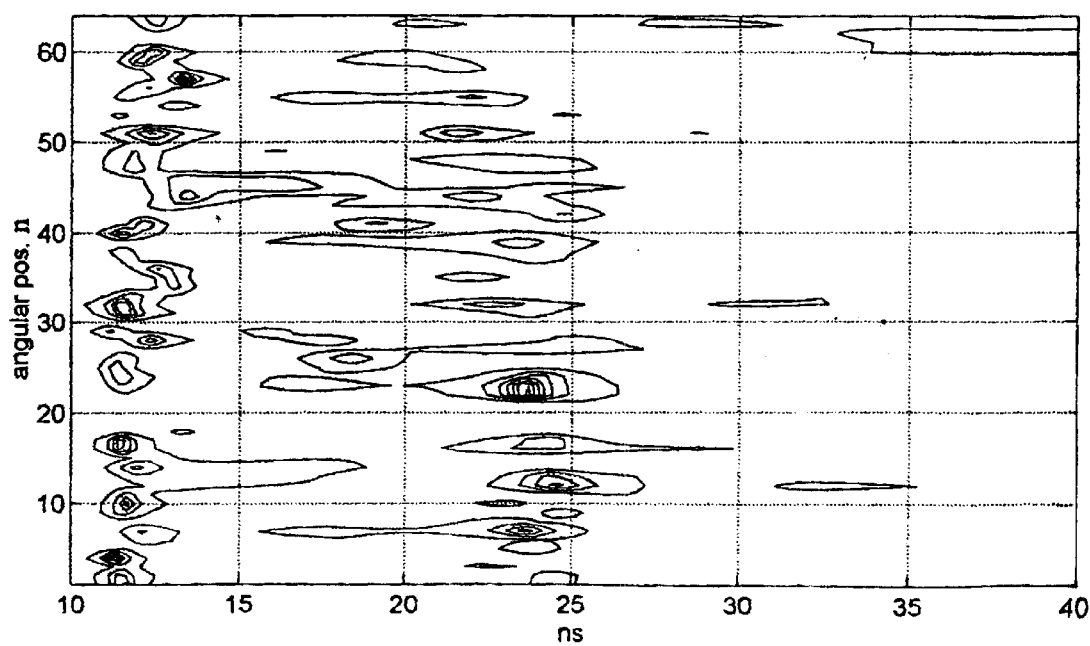
Figure 17C:
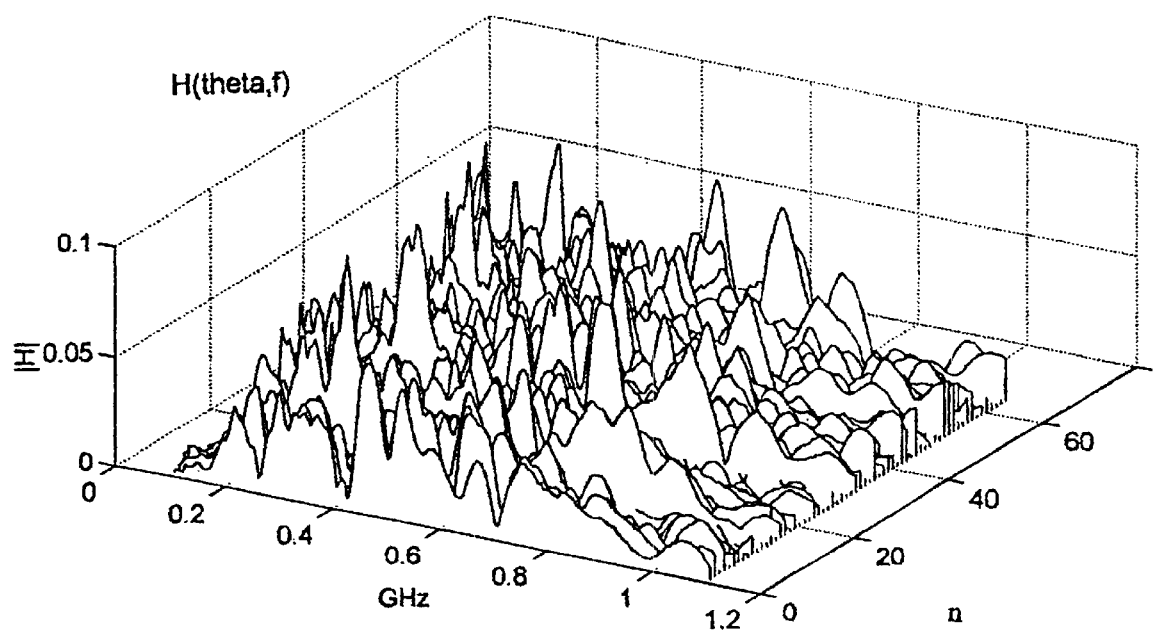
Figure 17D:
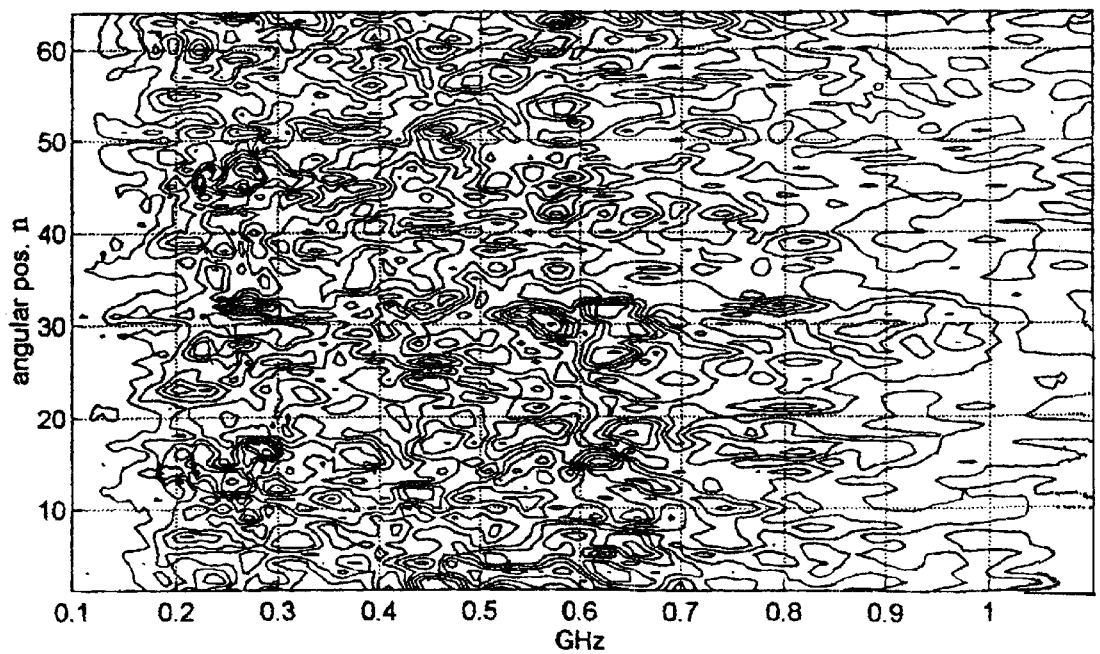
Figure 17E:
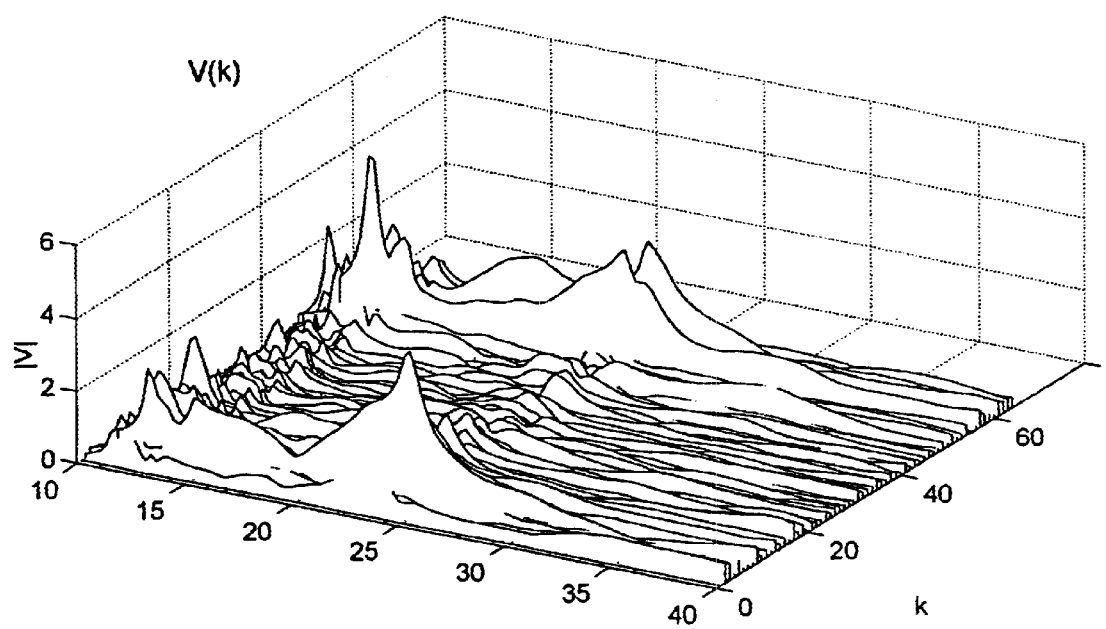
Figure 17F:
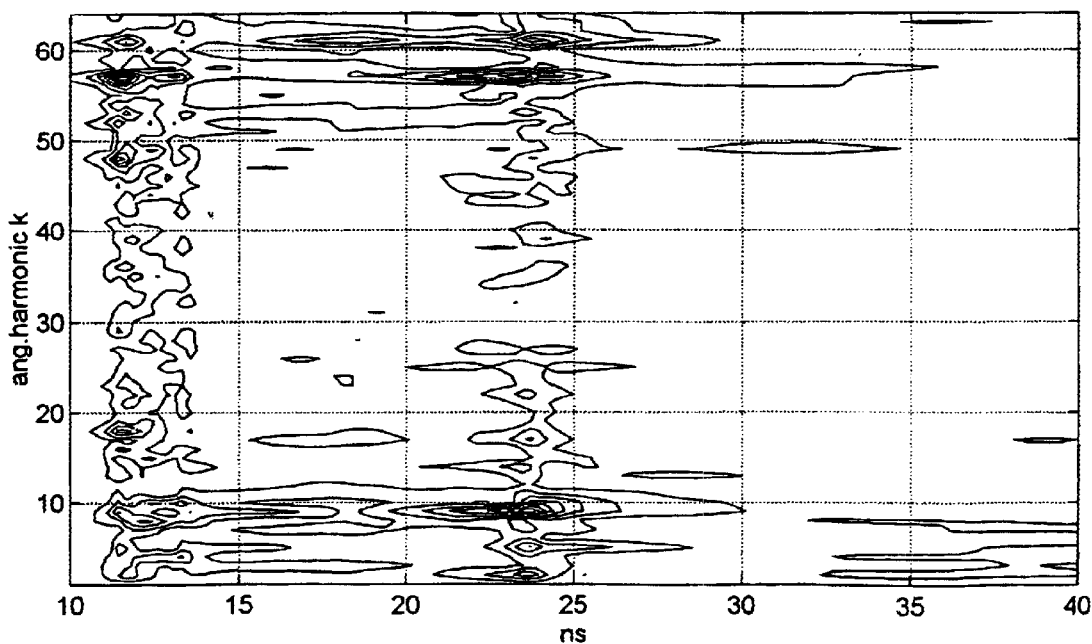

FIGS. 17, 17a and 17b illustrate the result of the described procedure No. 1 up to step 1.6 inclusive. FIG. 17a illustrates signal strength as a function of angle index n and time in ns as a contour plot. FIGS. 17c and 17d illustrate the result of described procedure No. 1 up to step 1.5 inclusive. FIG. 17c illustrates measured signal strength as a function of angle index n and frequency in GHz in a 3D-plot. FIG. 17d illustrates measured signal strength as a function of angle index n and frequency in GHz in a 3D plot. FIG. 17d illustrates measured signal strength as a function of angle index n and frequency in GHz in a contour plot. FIG. 17e og 17f illustrate the result of described procedure No. 2 up to step 2.2 inclusive. FIG. 17e illustrates calculated signal strength as a function of angular harmonic index k and time in ns in a 3D plot. FIG. 17f illustrates calculated signal strength as a function of angular harmonic index k and time in ns in a contour plot. FIGS. 17g and 17h illustrate detection curves as the result of procedure No. 6 to step 6.3 inclusive. FIG. 17g illustrates D in absolute values, FIG. 17h illustrates D in dB. FIGS. 17i og 17j illustrate detection curves as the result of procedure No. 2 up to step 2.3 inclusive. FIG. 17i illustrates D in absolute values, FIG. 17j illustrates D in dB.

Figure 18:
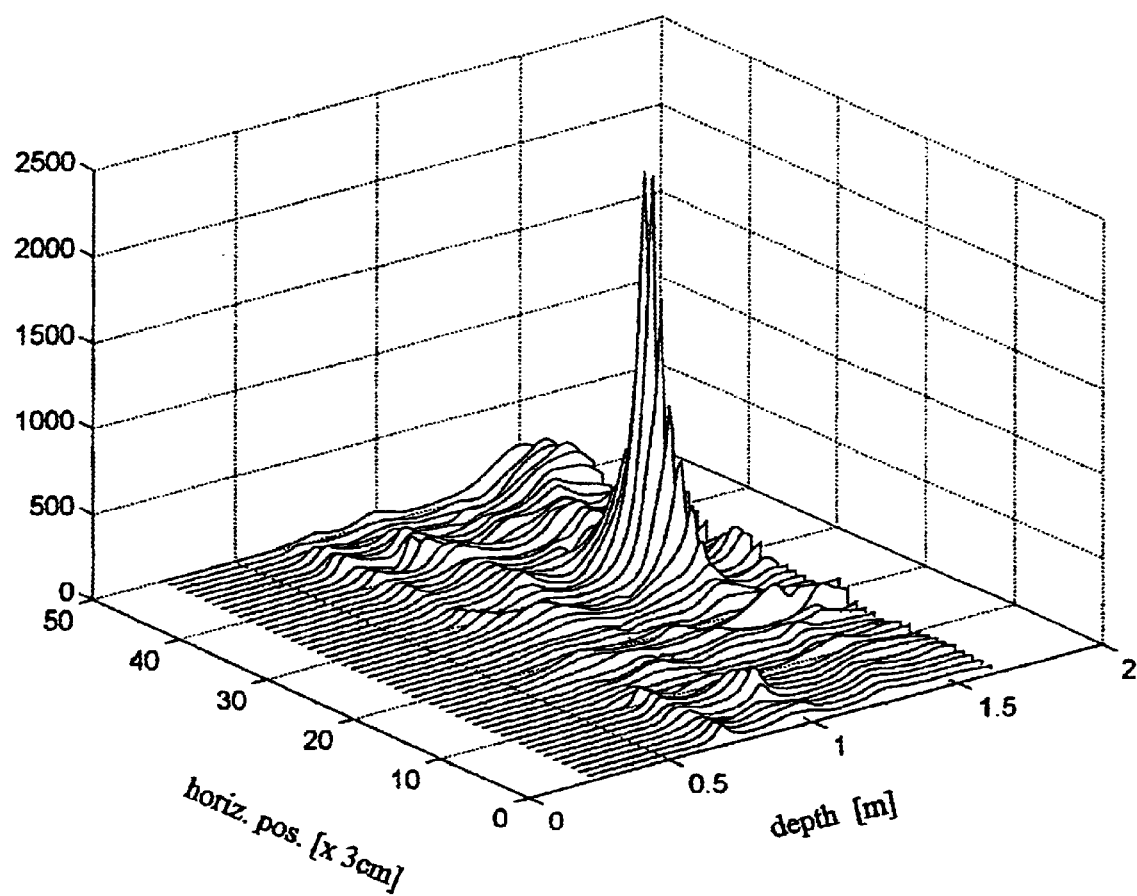

FIG. 18 illustrates a collection of detection curves each being taken from the prototype and thereafter positioned in the figure—it is seen how the detection curve alters when passing above an object. The object indicated in the FIGS. 18, 19a and 19b is known and is a tube made of a plastics PVC material and being filled with water and having a diamter of 110 nm and being burried in a depth of approx. 140 cm.

In FIG. 18, time delay is converted to estimated depth under the assumption of an estimated average value for the propagation velocity of the radio waves in the earth.

Figure 19A:
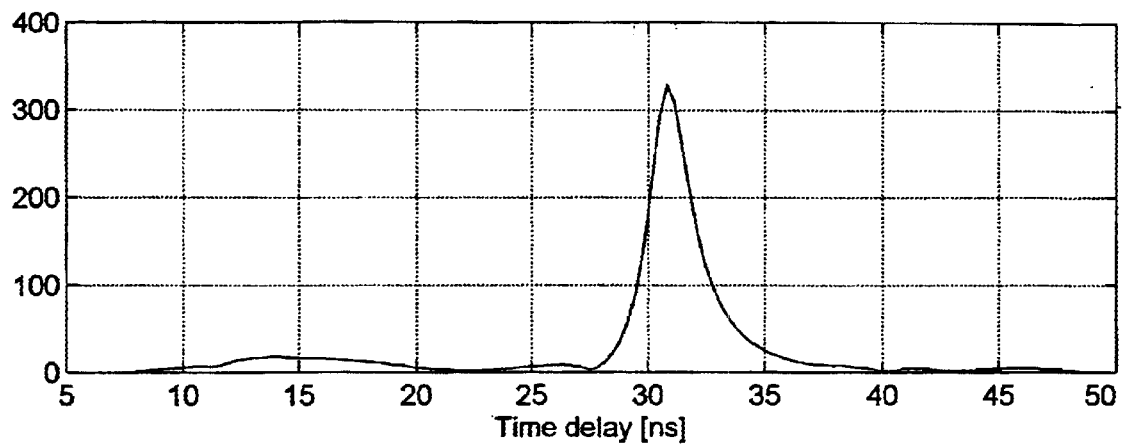

FIG. 19a illustrates a typical detection curve from the display of the proto type. A clear indication is seen in a depth corresponding to the time delay approx. 31 ns.

Figure 19B:
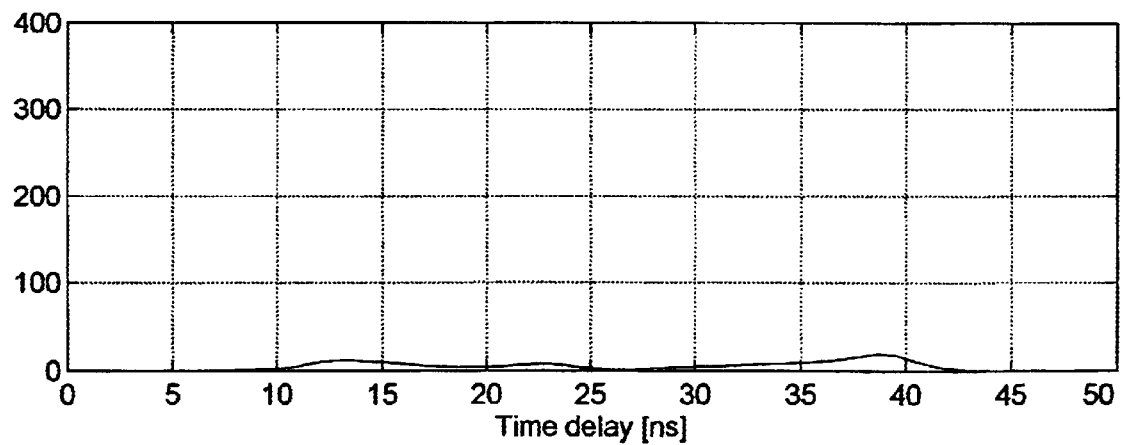

FIG. 19b illustrates a detection curve indicating no cable or tube.

The FIGS. 20–42 illustrate the present embodiment of the invention.

Figure 20:
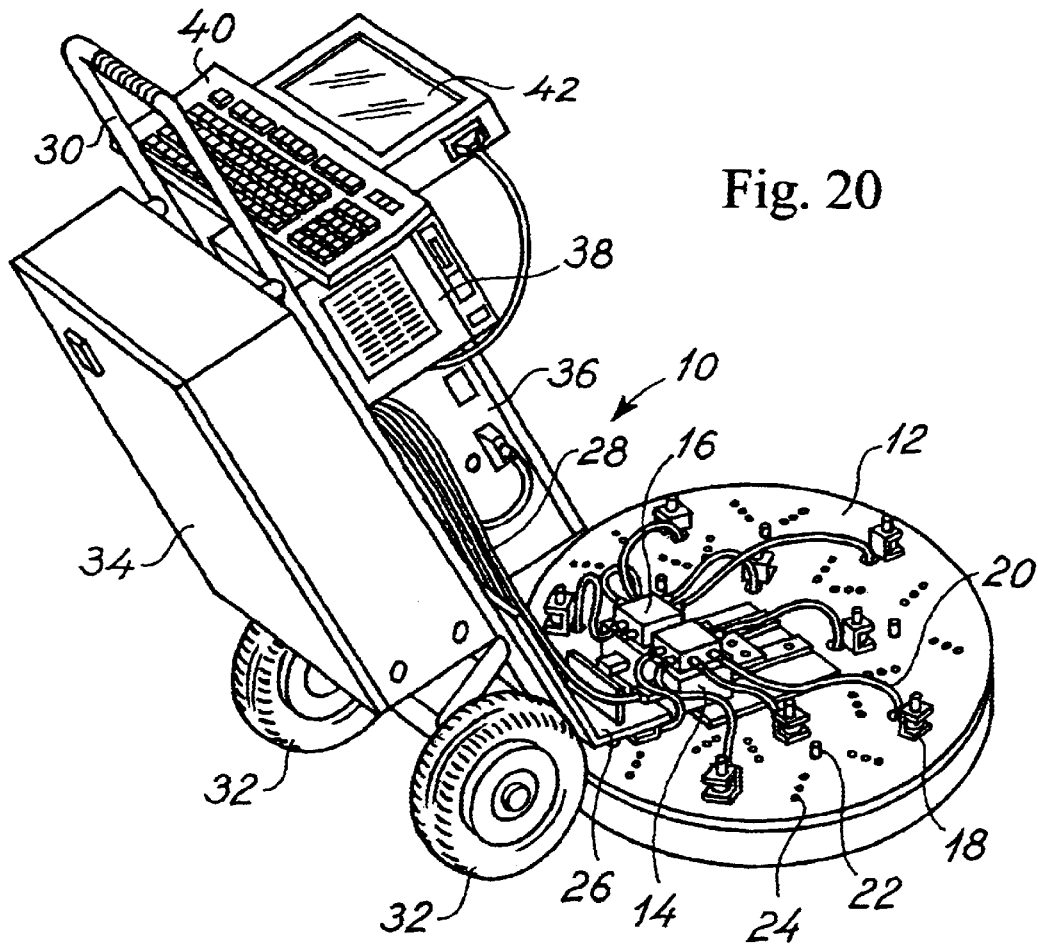

FIG. 20 illustrates the entire plant comprising transmitter and receiver antennas mounted on a circular disc, battery case, transmitter and receiver electronics and data processing plant, including monitor.

Figure 21:
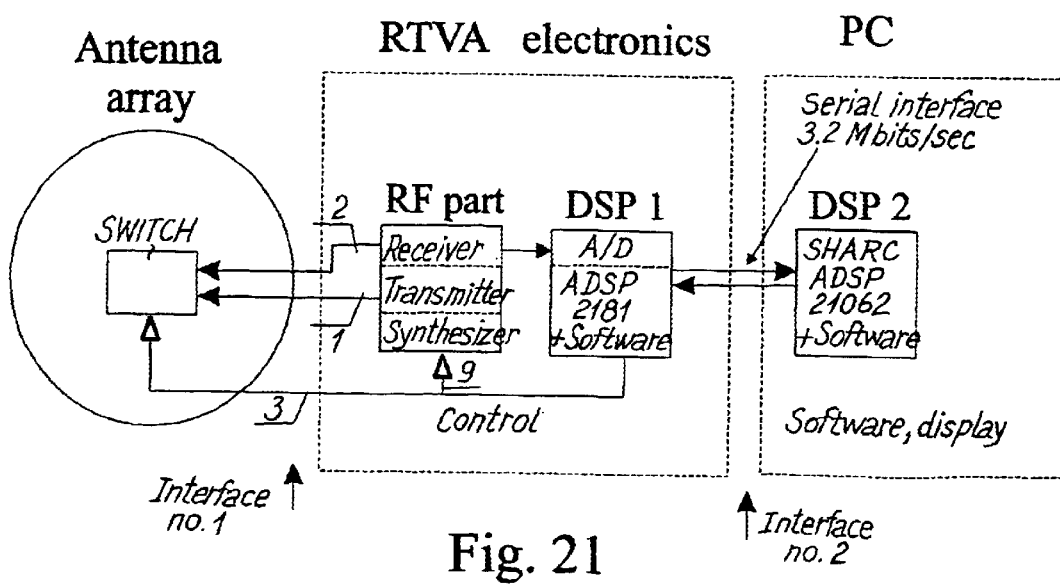

FIG. 21 illustrates a system diagram for the hardware of the prototype. The system consists of three main parts: Antenna array, RTVA (Real Time Vector Analyzer) electronics and a PC provided with a signal processing module.

Figure 22:
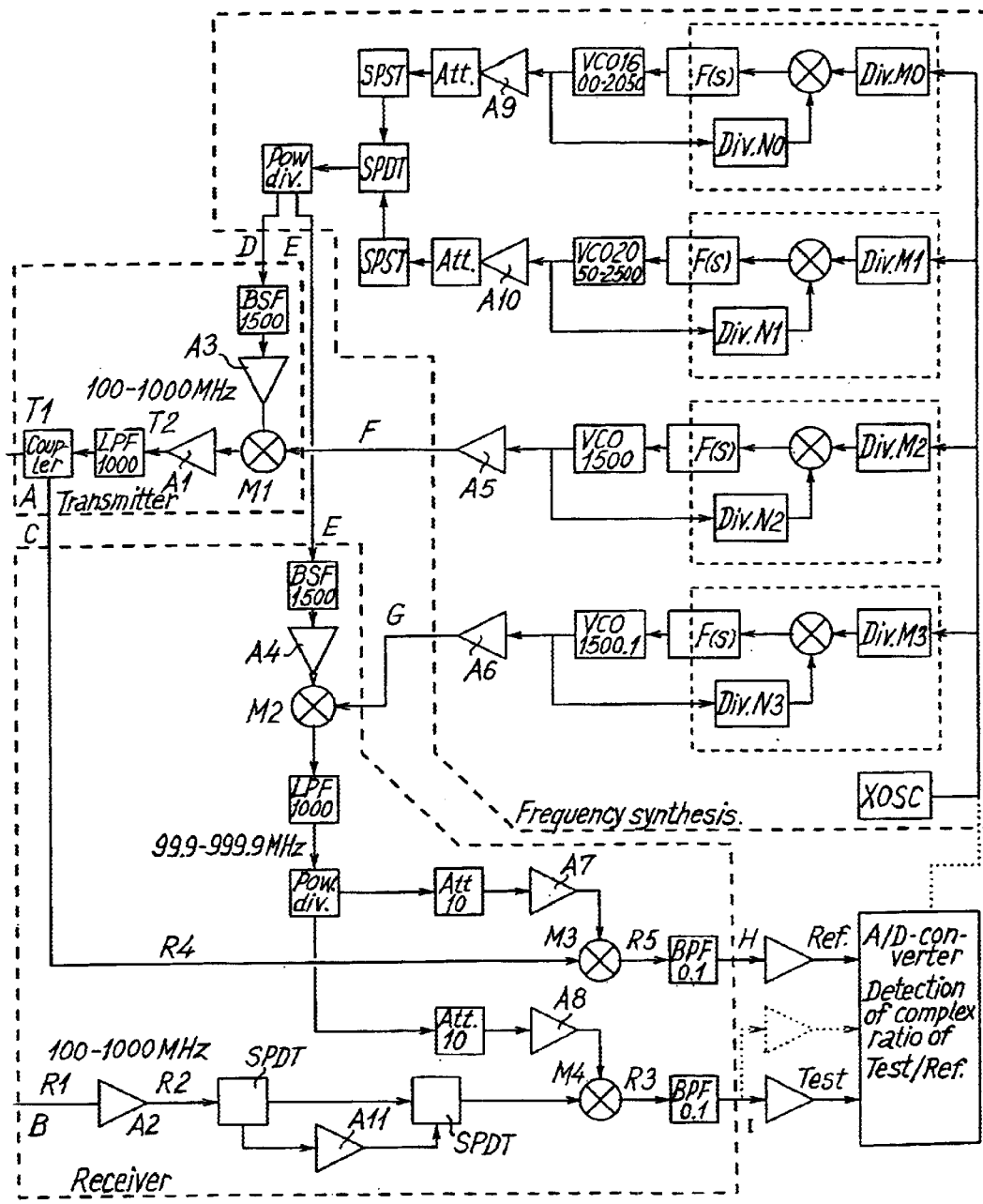

FIG. 22 illustrates an action chart of the RTVA electronic part.

Figure 23:
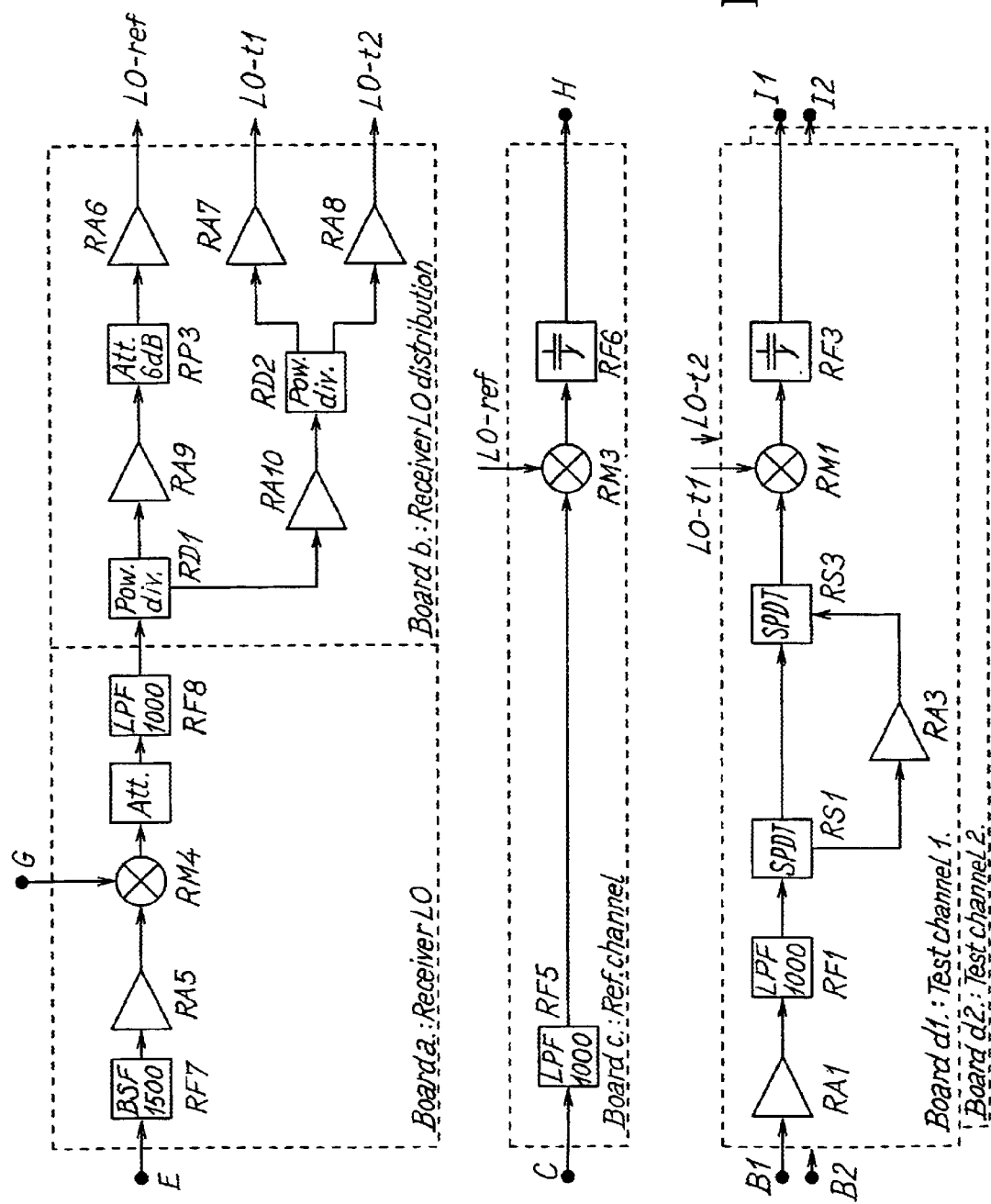

FIG. 23 illustrates an action chart of the receiver electronic part (Receiver).

Figure 24:
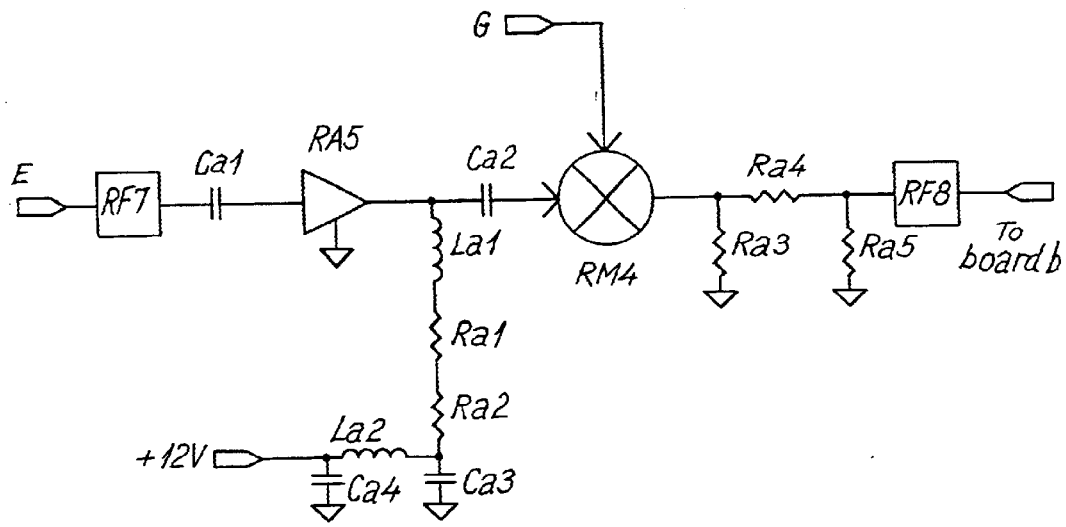

FIG. 24 illustrates a circuit diagram of receiver 2 (Receiver: Board 'a').

Figure 25:
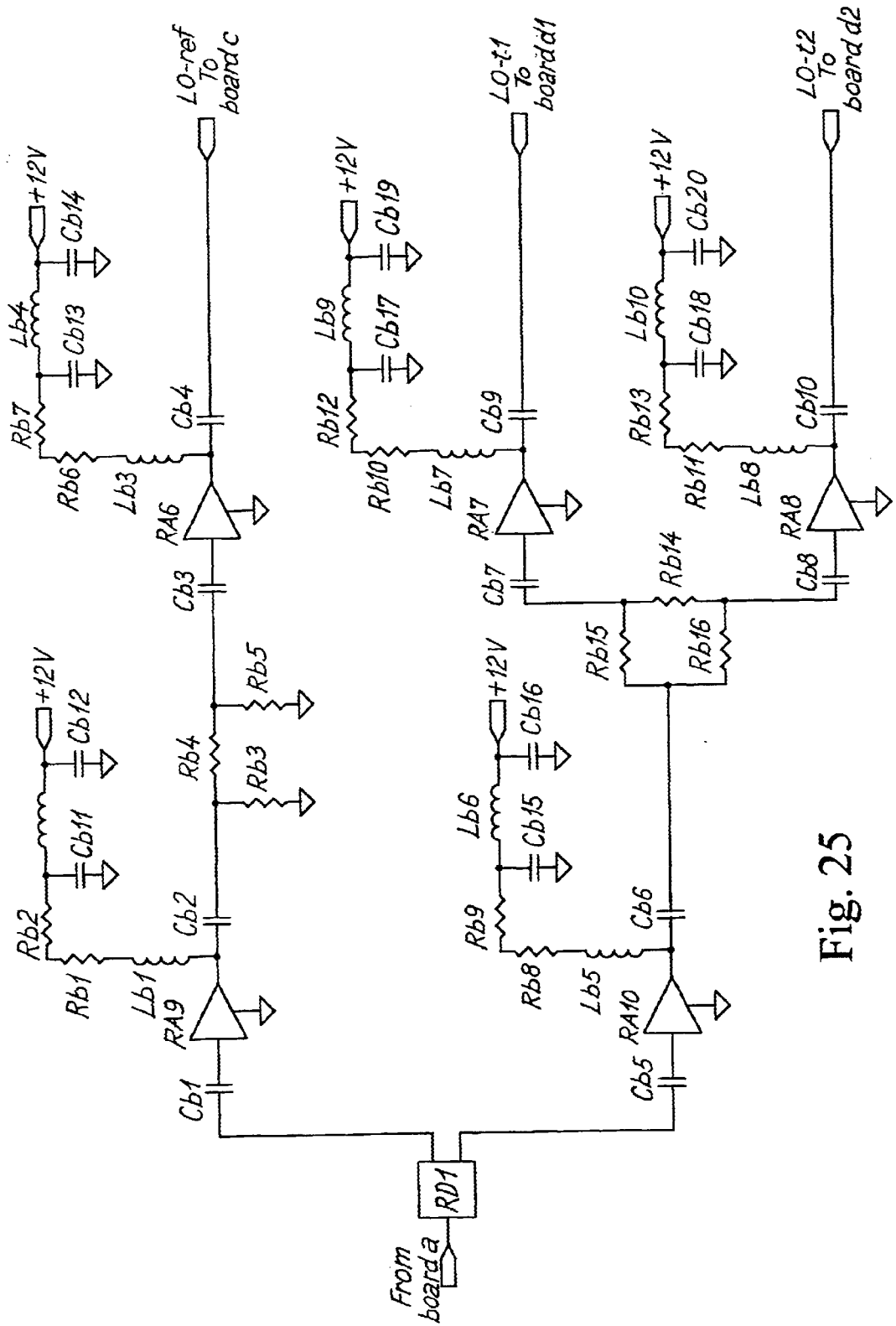

FIG. 25 illustrates a circuit diagram of receiver 3 (Receiver: Board 'b').

Figure 26:
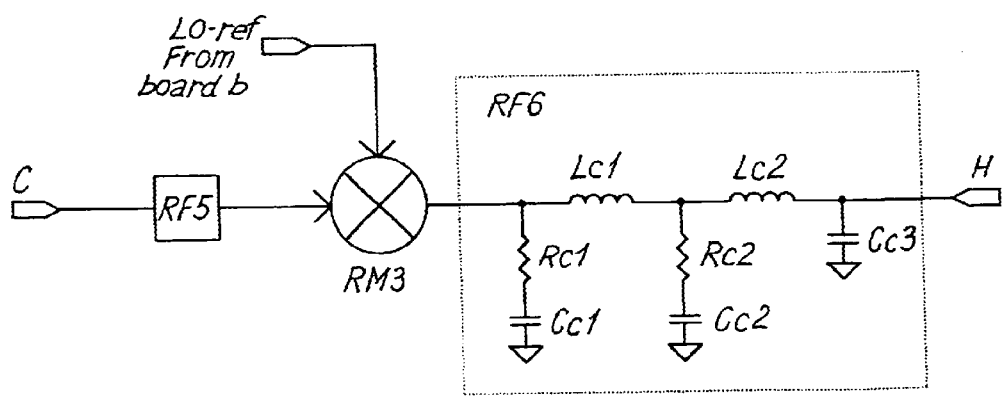

FIG. 26 illustrates a circuit diagram of receiver 4 (Receiver: Board 'c').

Figure 27:
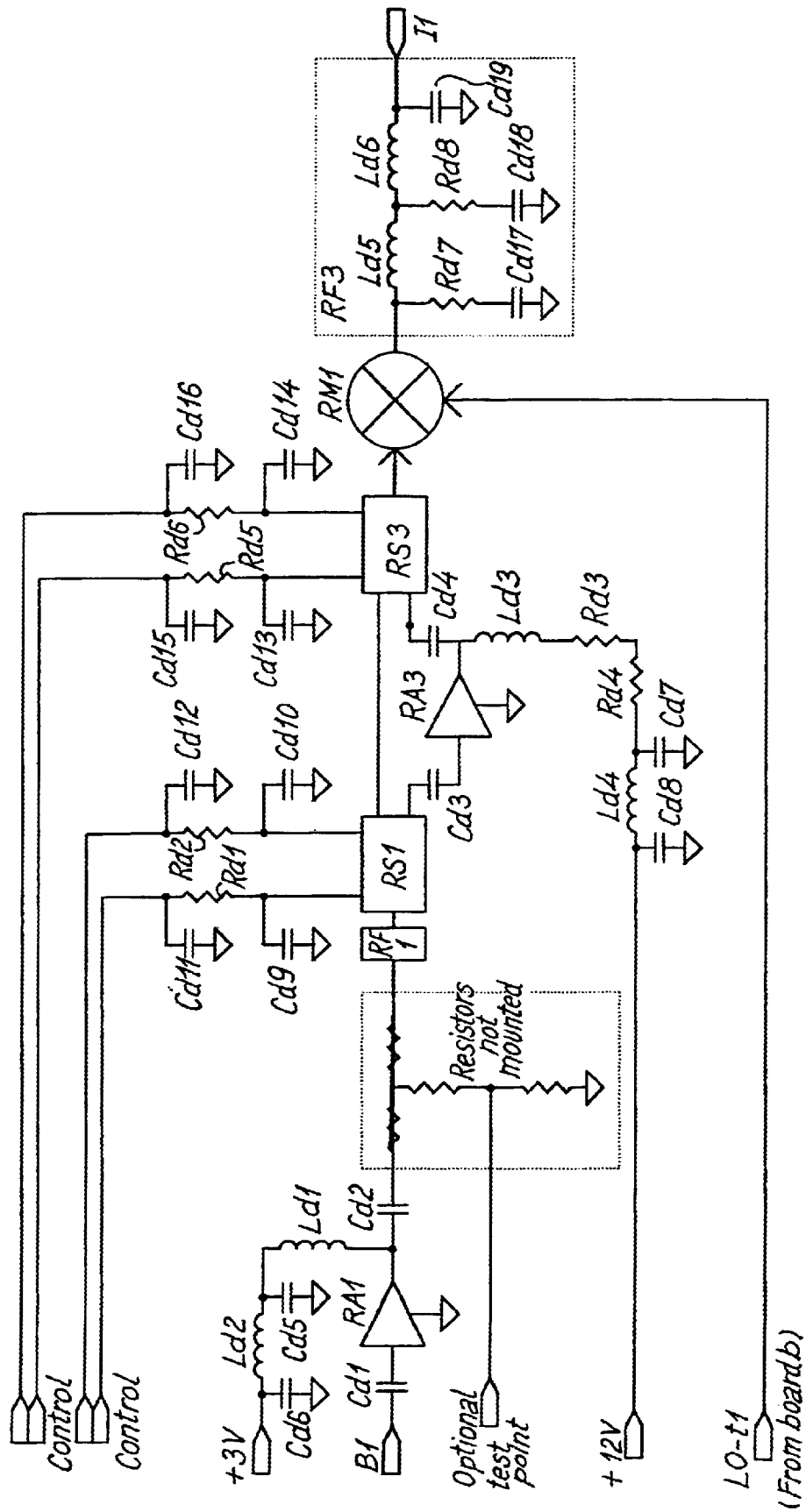

FIG. 27 illustrates a circuit diagram of receiver 5 (Receiver: Board 'd').

Figure 28:
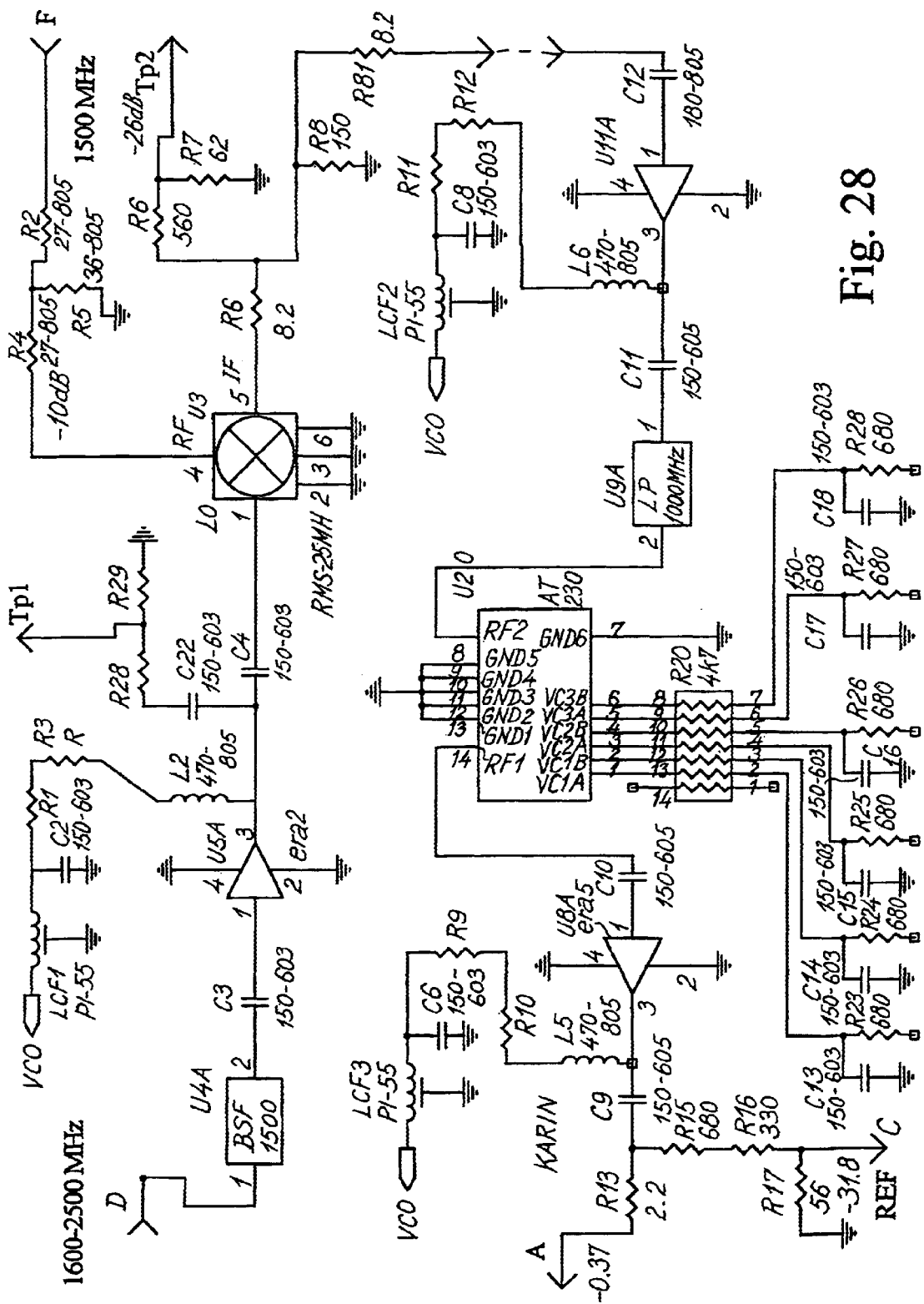

FIG. 28 illustrates a circuit diagram of a transmitter.

Figure 29:
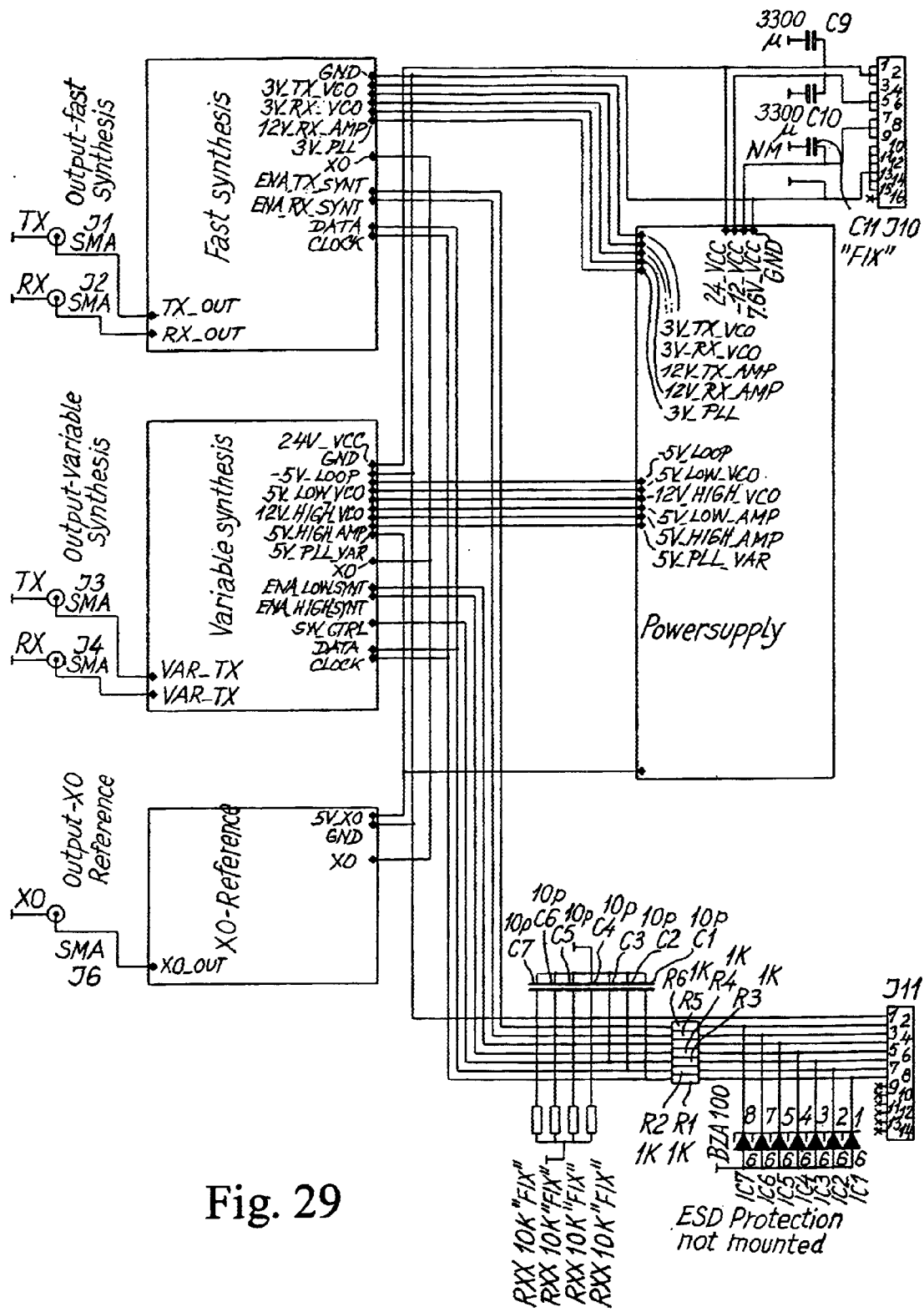

FIG. 29 illustrates a circuit diagram of a synthesis unit.

Figure 30:
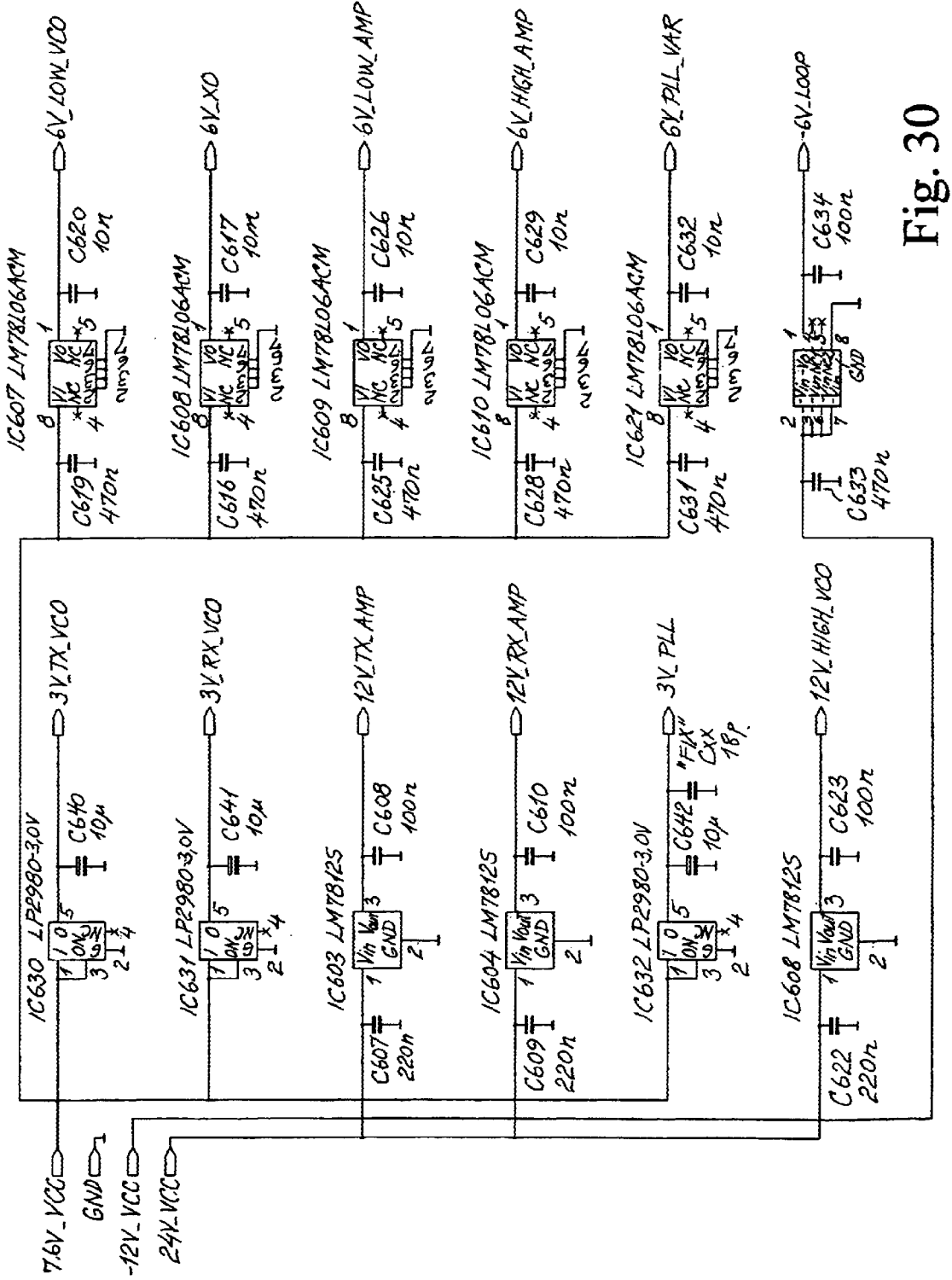

FIG. 30 illustrates a circuit diagram of the supply unit of the synthesis unit.

Figure 31:
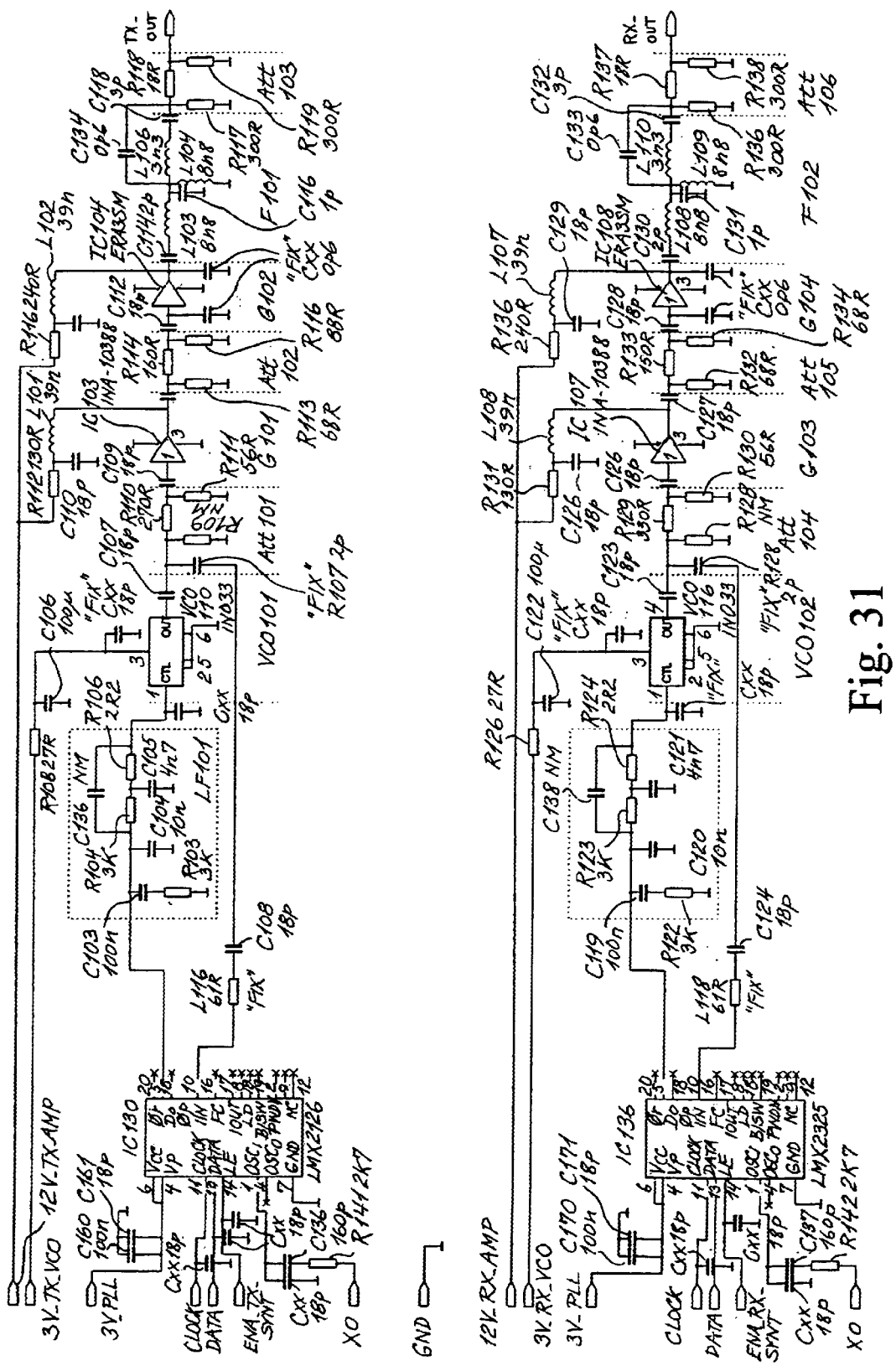

FIG. 31 illustrates a circuit diagram of a permanent (quick) synthesis unit.

Figure 32:
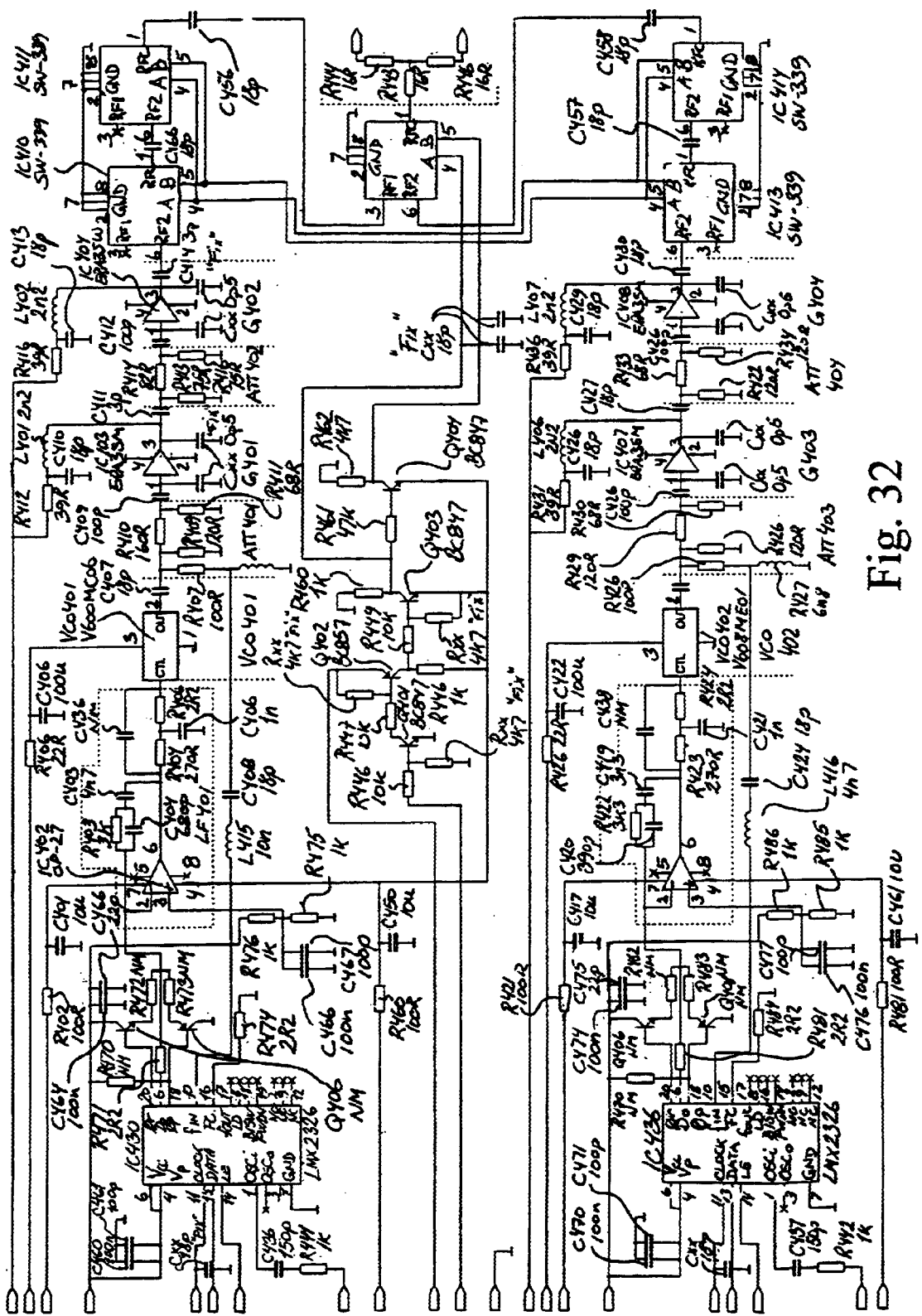

FIG. 32 illustrates a circuit diagram of a variable synthesis unit.

Figure 33:
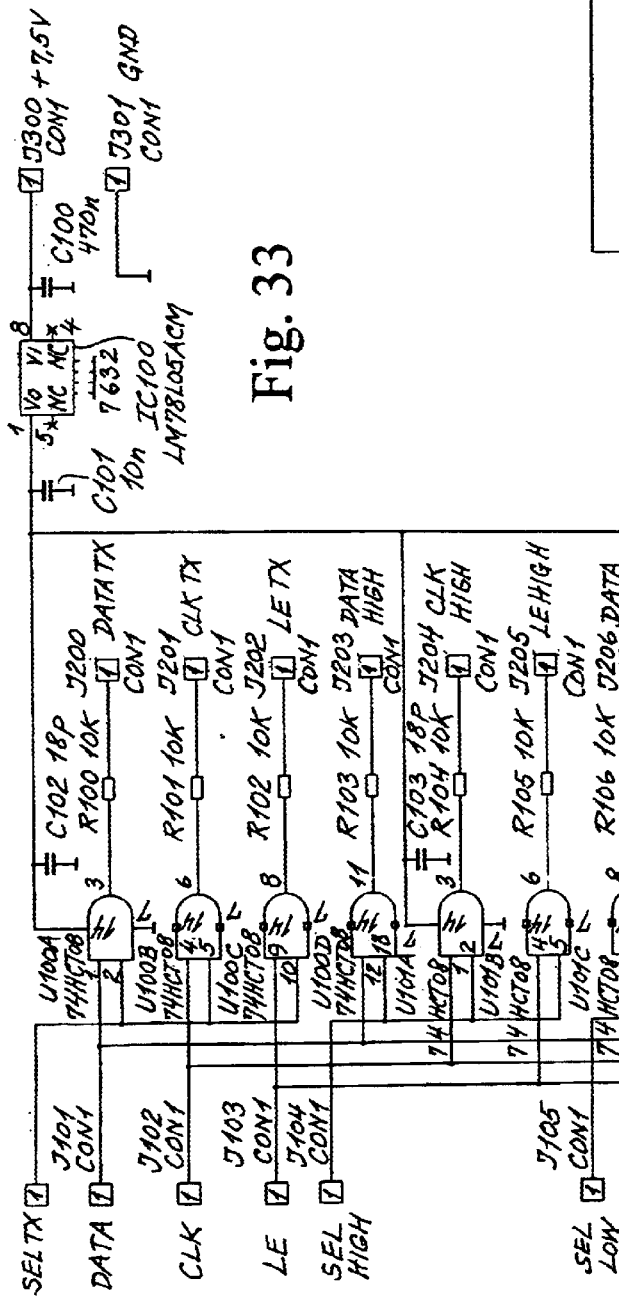

FIG. 33 illustrates a circuit diagram of a reference unit for the synthesis unit.

Figure 34:
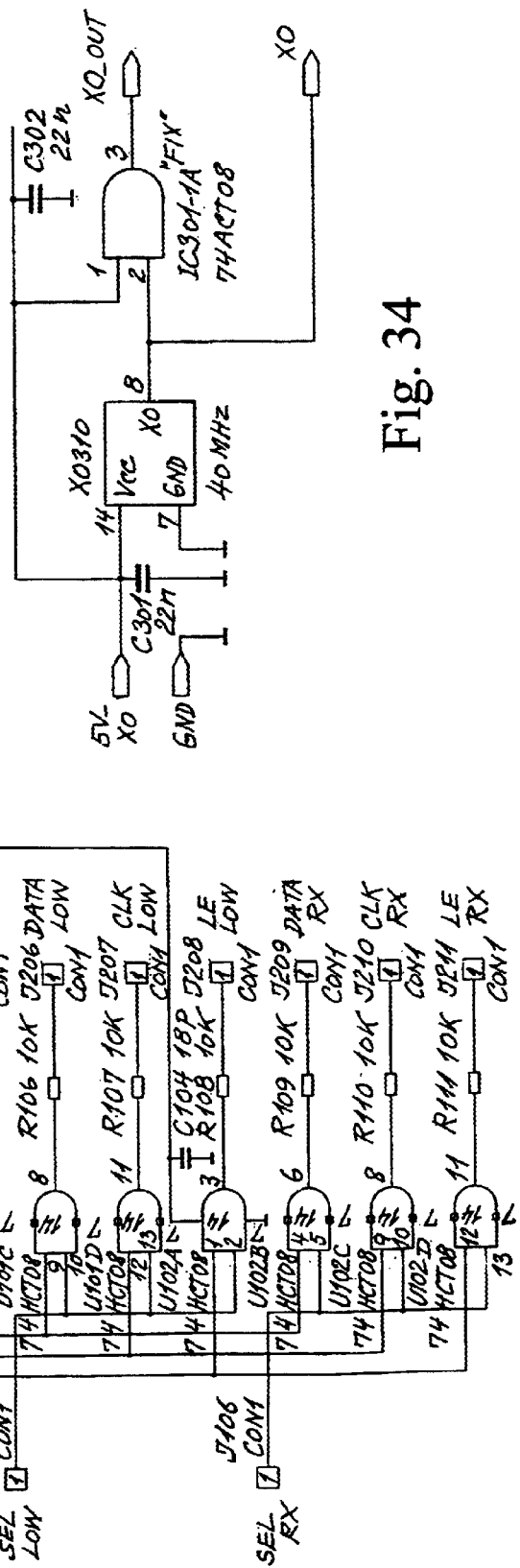

FIG. 34 illustrate a circuit diagram of a switch unit for the synthesis unit.

Figure 35A:
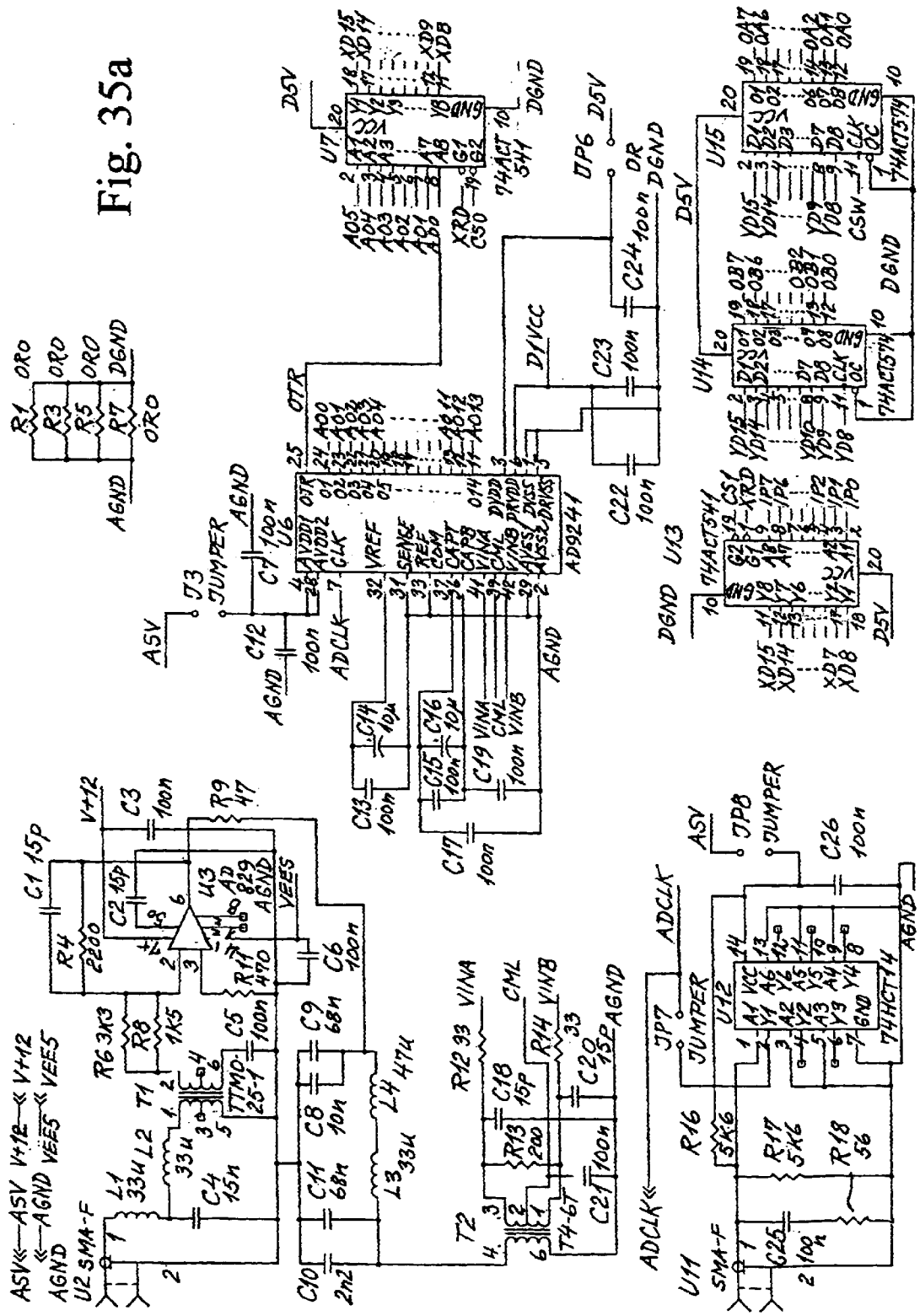
Figure 35B:
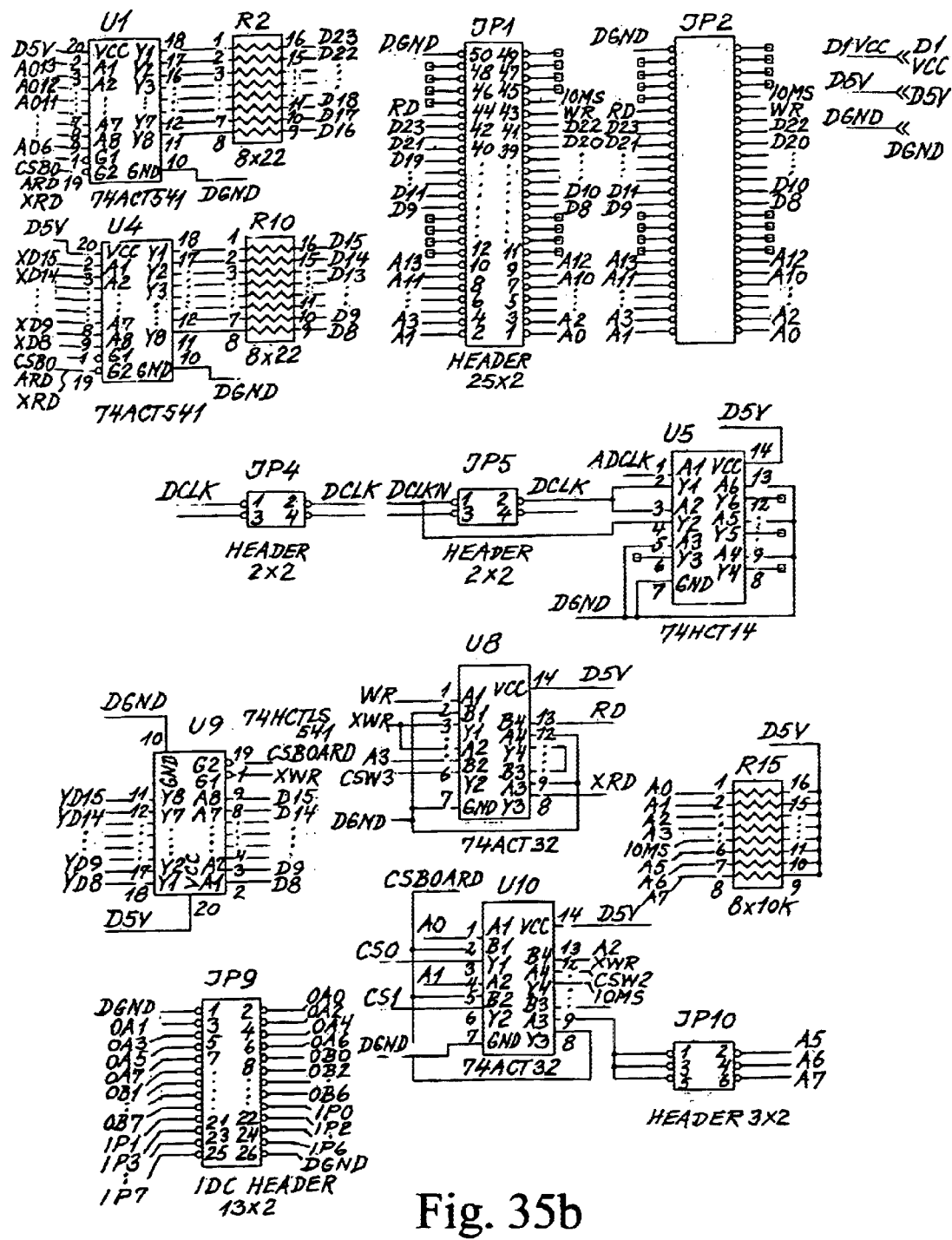

FIG. 35 illustrates a circuit diagram of a detection circuit consisting of logic digital inlet/outlet lines for control of the synthesis unit, antenna unit and supporting units.

Figure 36:
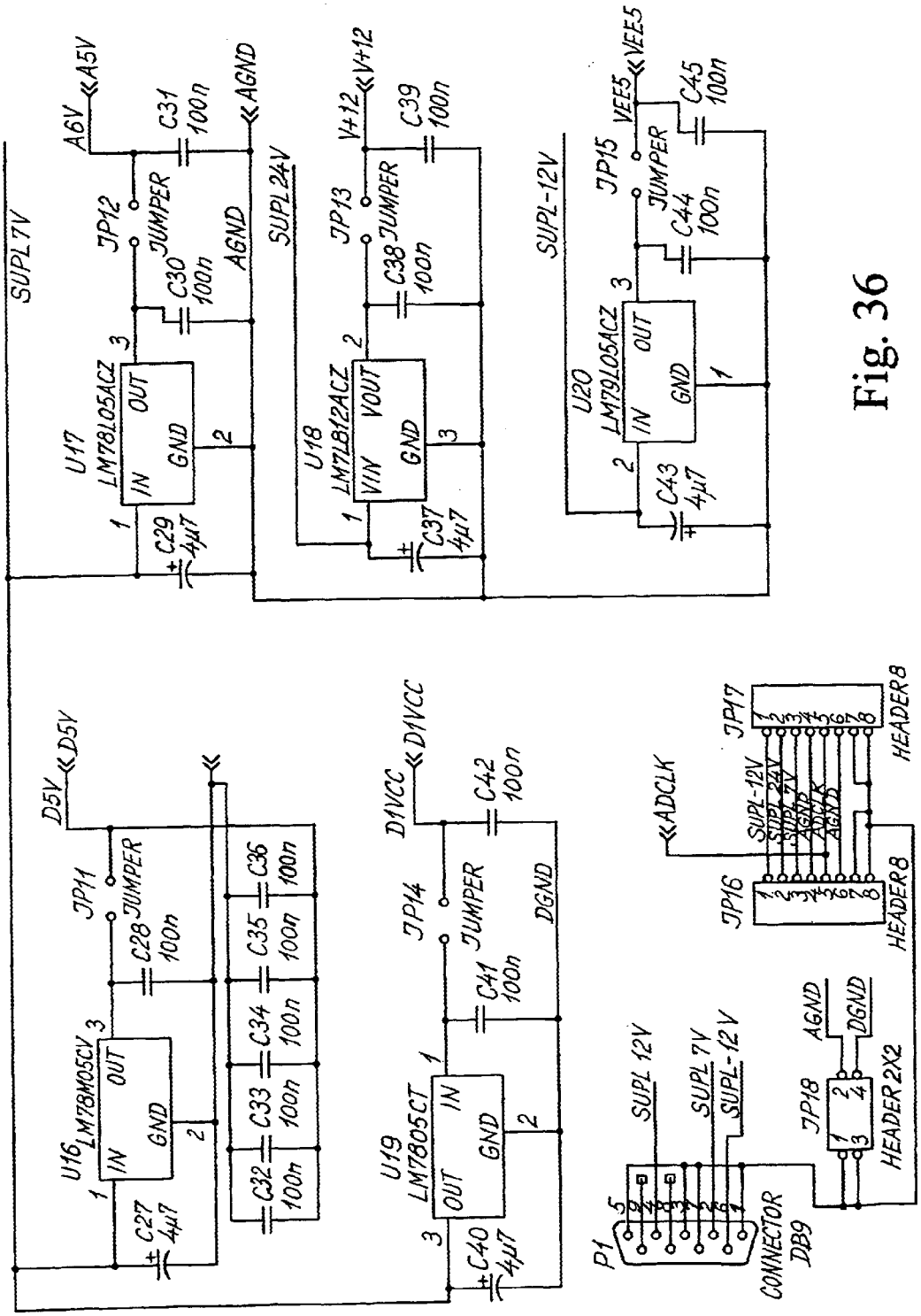

FIG. 36 illustrates a circuit diagram of a detection circuit consisting of analog-to-digital converters.

Figure 37:
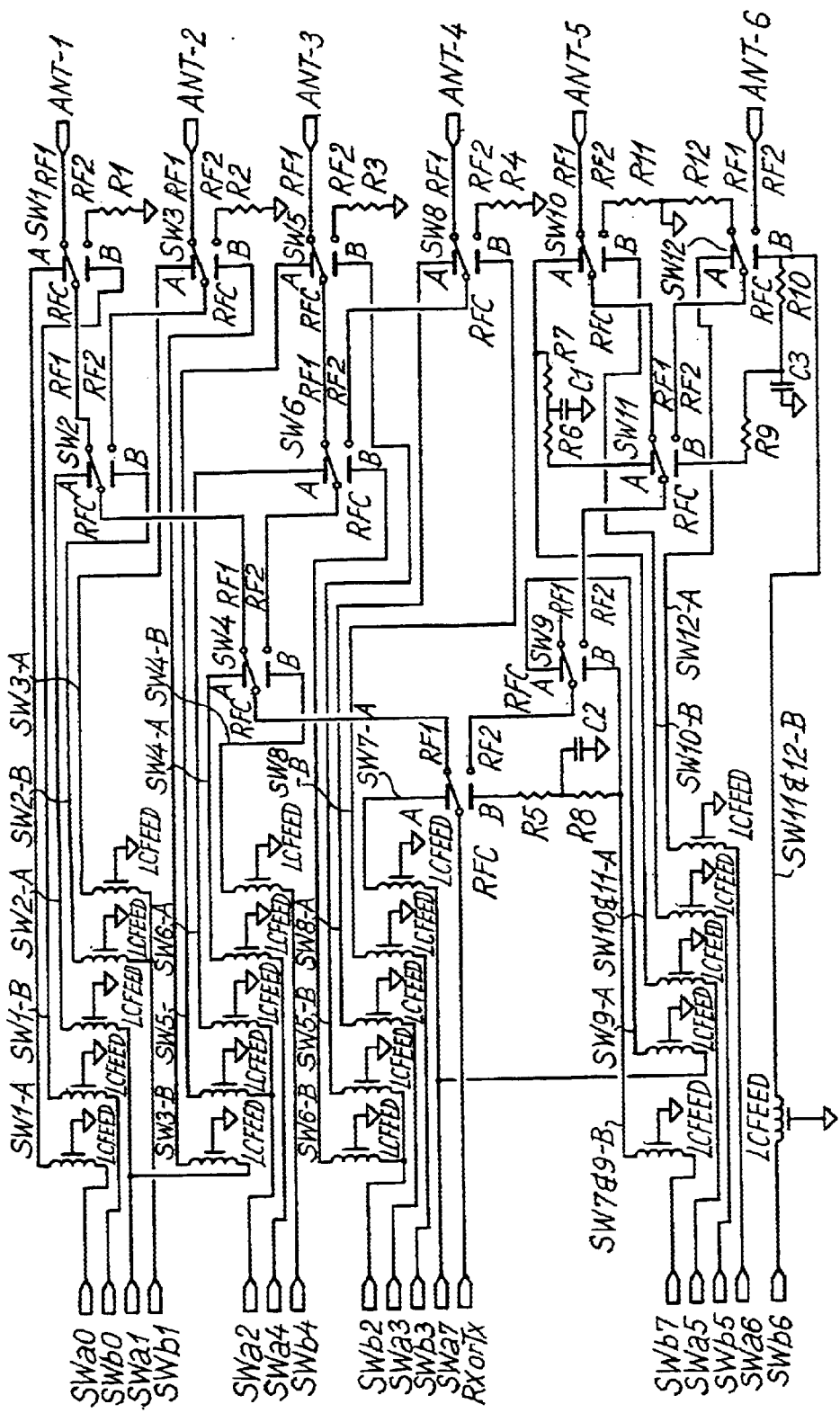

FIG. 37 illustrates a circuit diagram of an antenna switch board.

Figure 38:
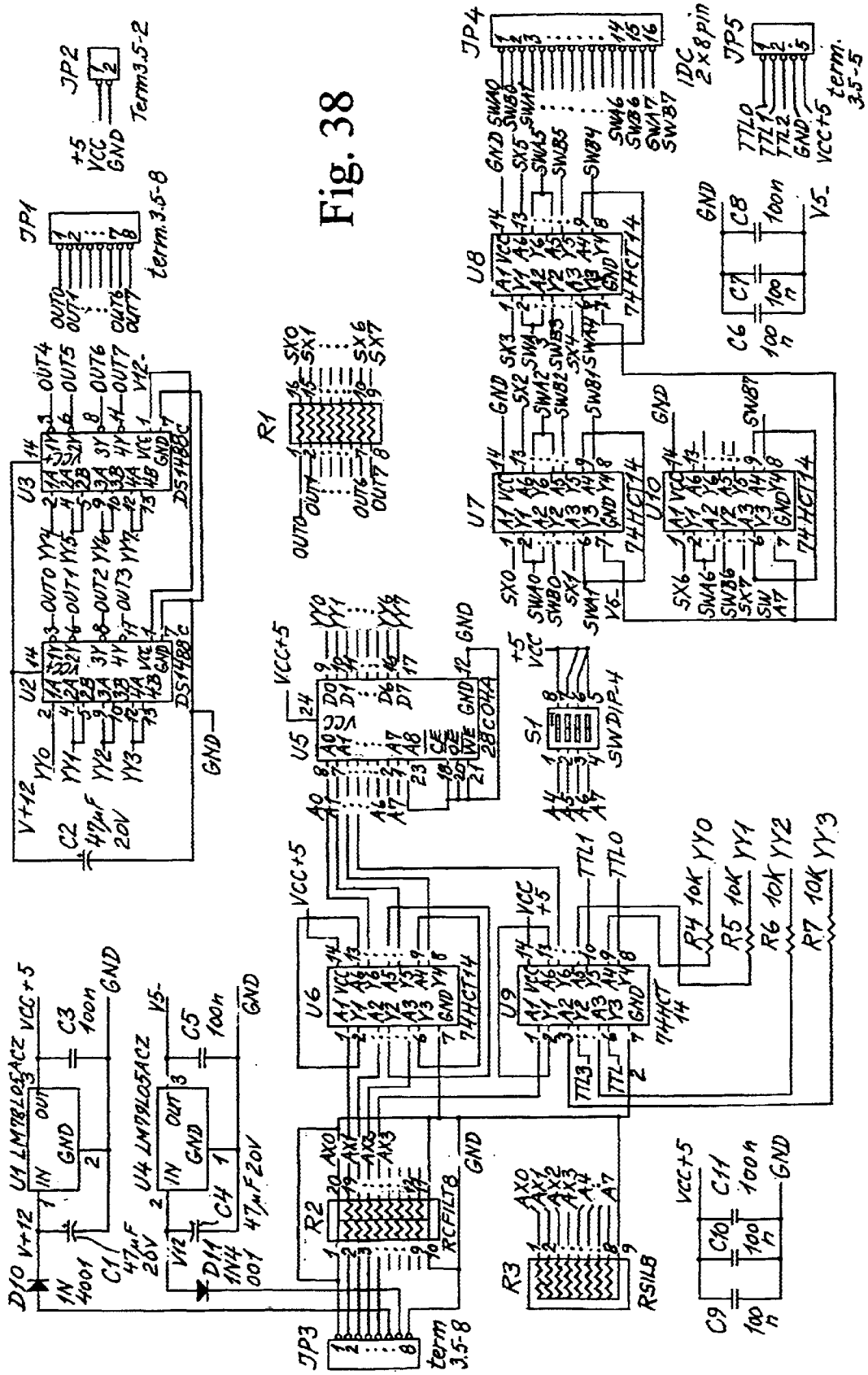

FIG. 38 illustrates a circuit diagram of an antenna switch decode/level switch.

Figure 39:
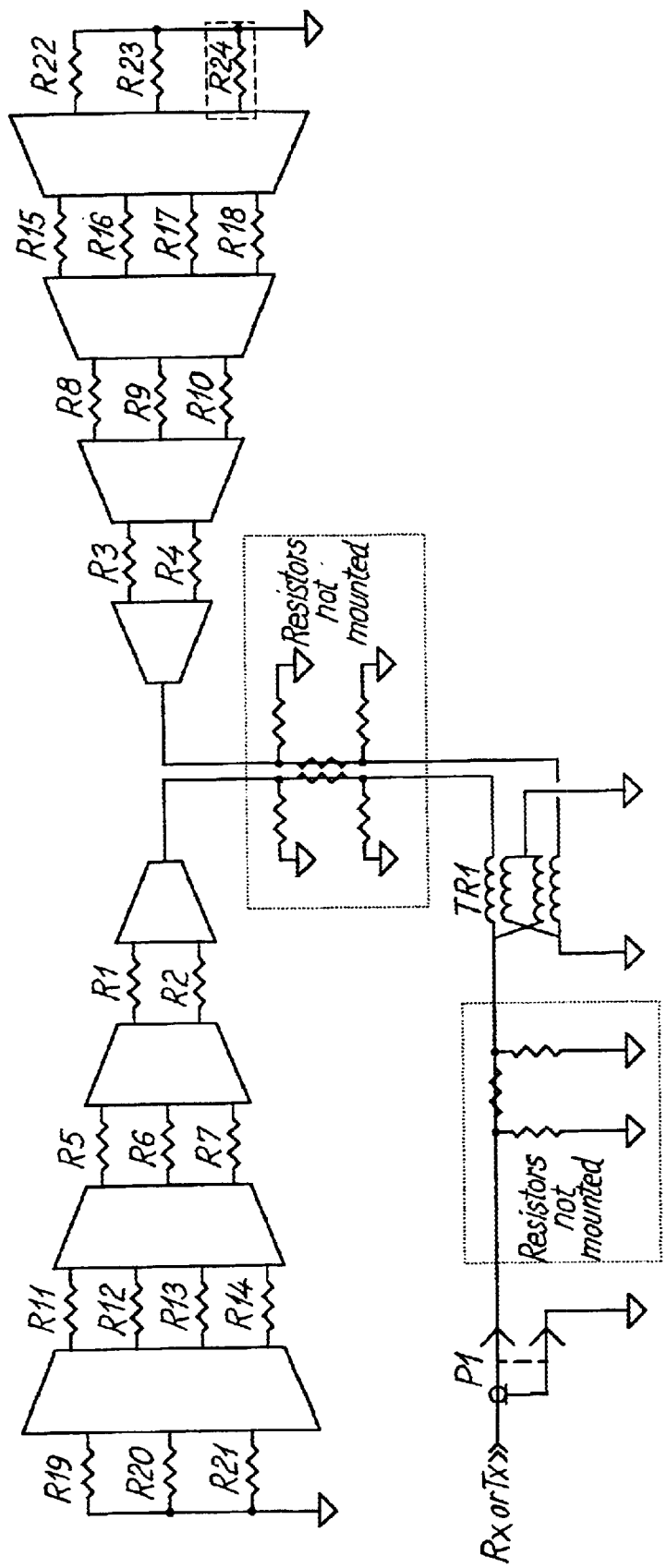

FIG. 39 illustrates a circuit diagram of a dipol antenna.

Figure 40:
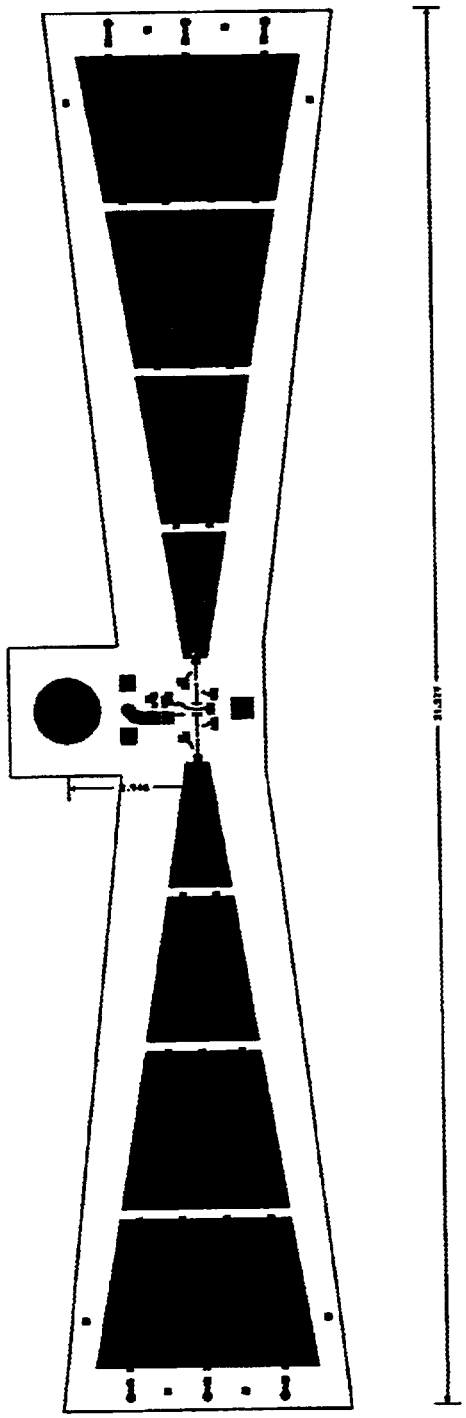

FIG. 40 is an illustration of the top part of a two-sided printed circuit board layout of a dipole antenna circuit.

Figure 41:
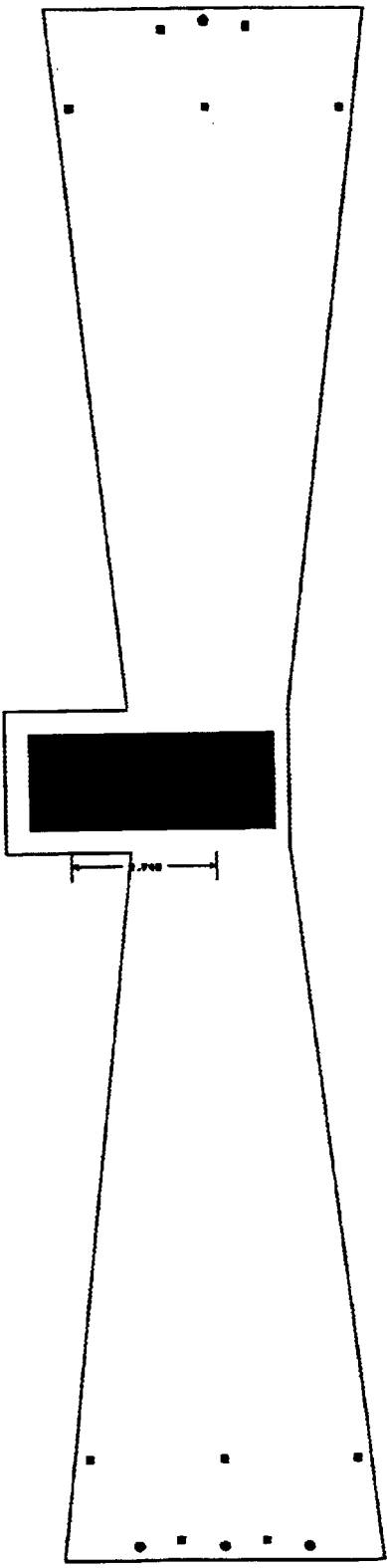

FIG. 41 is an illustration of the lower part of a two-sided printed circuit board layout of a dipole antenna circuit.

Figure 42:
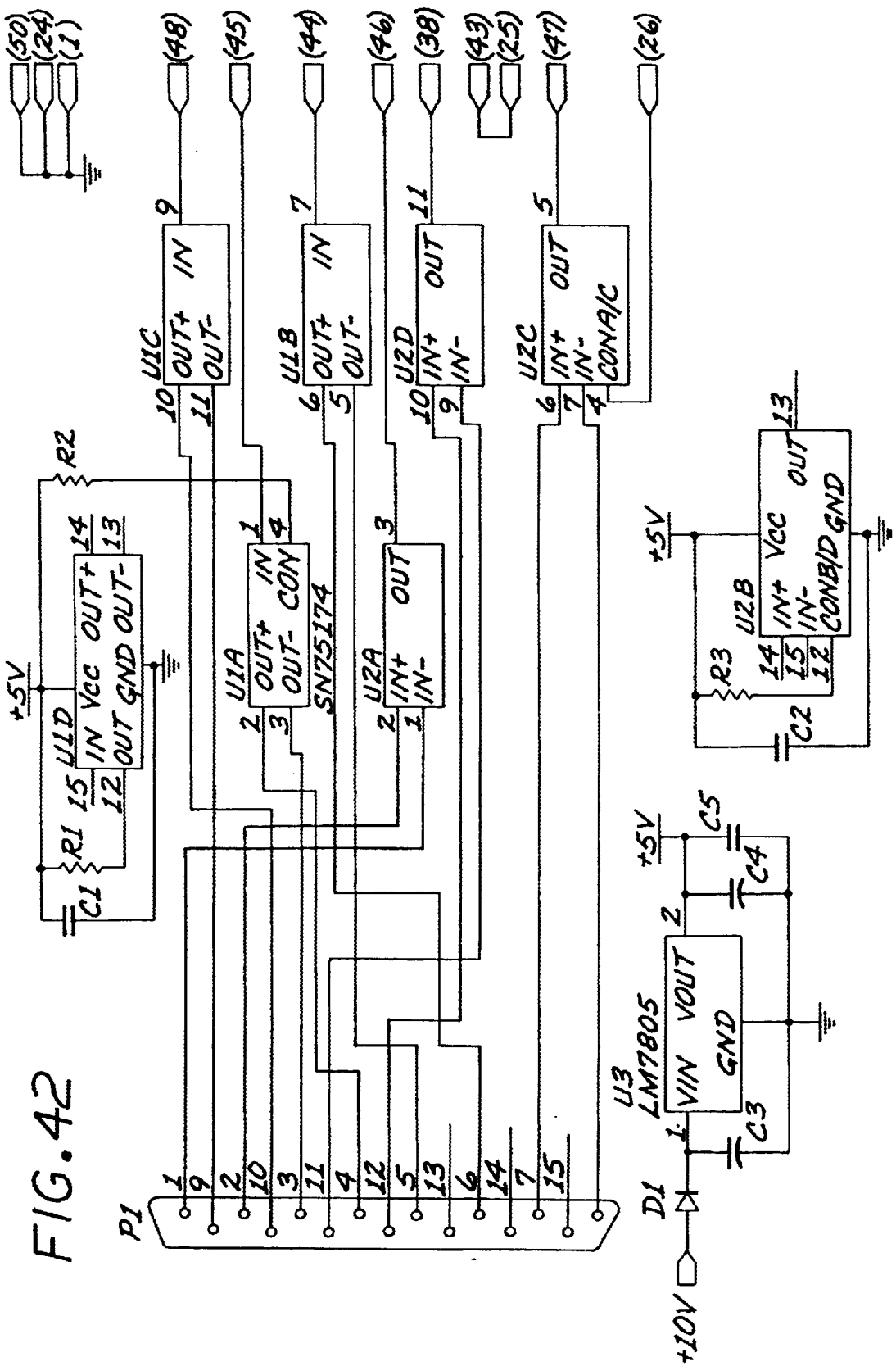

FIG. 42 illustrates a serial interface (EZLITE).

Figure 43:
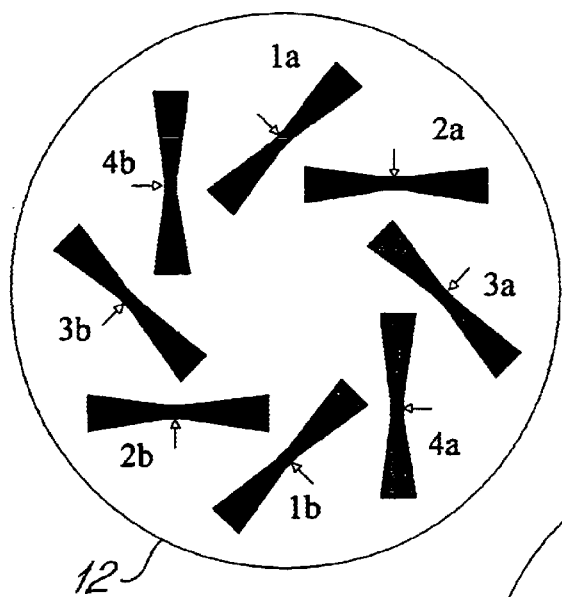
Figure 44:
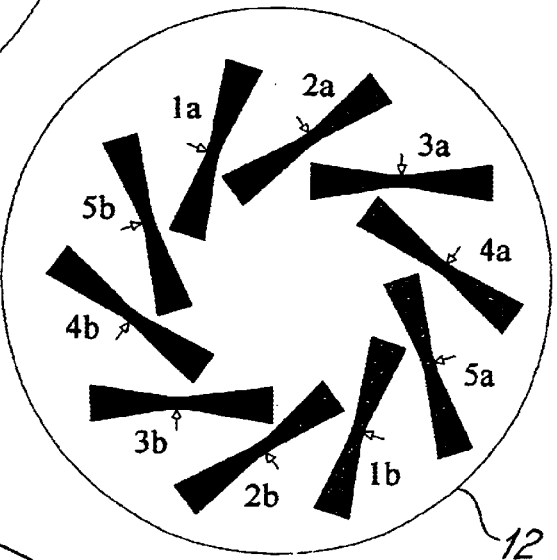
Figure 45:
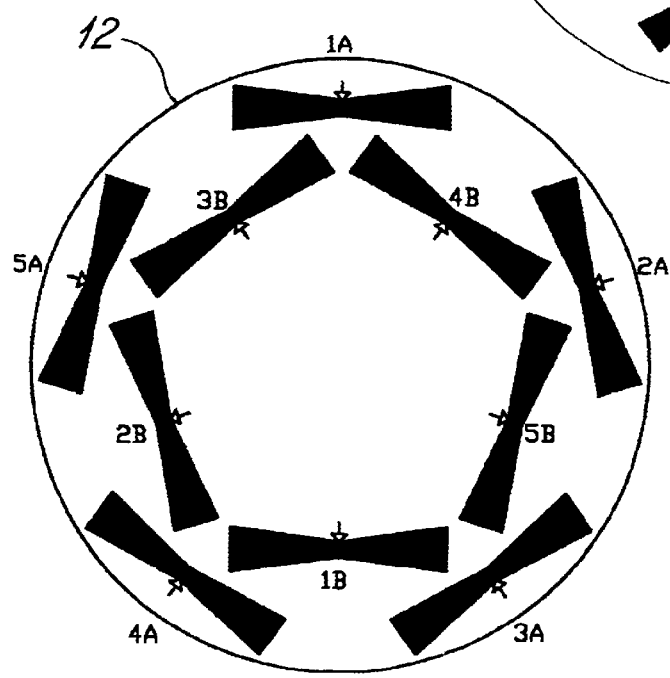

FIGS. 43–45 illustrate alternative configurations of the antenna elements.

FIG. 43 illustrates an arrangement comprising four pairs of antennas, wherein all the dipole centers are displaced from the geometric center. The elements are of the butterfly type, which construction almost corresponds to the one shown in FIG. 11, and the total arrangement corresponds to the configuration shown in FIG. 12.

FIG. 44 illustrates an arrangement including five pairs of antennas, wherein all the dipole centers are displaced from the geometric center. The elements are of the butterfly type, which construction almost corresponds to the one shown in FIG. 11, and the total arrangement corresponds to the configuration shown in FIG. 12.

FIG. 45 illustrates an arrangement including five pairs of antennas, wherein all the dipole centers are displaced from the geometric center. The elements are of the butterfly type, the construction of which almost corresponds to the one shown in FIG. 11, and the total arrangement corresponds to the configuration shown in FIG. 12.

For a more detailed explanation of the invention, the following tables are presented.

The tables 1–8 contain information about the present embodiment of the invention.

Table 1 contains terminal indications and list of components for the receiver electronics.

Table 2 contains terminal indications and list of components for the transmitter electronics.

Table 3 contains terminal indications and list of components for the synthesis unit.

Table 4 contains terminal indications and list of components for the detection unit.

Table 5 contains terminal indications and list of components for the antenna switch unit.

Table 6 contains terminal indications and list of components for the antenna switch decode/level switch.

Table 7 contains list of components for serial interfaces for FIGS. 42–44.

Table 8 contains list of components for dipole antenna element.

The tables 9–11 contain information about possible embodiments of the invention.

Table 9 contains a summary of a number of possible antenna configurations.

Table 10 contains examples of number of rotations of the antenna system.

$\Delta\theta$ is the angle of rotation between each measurement, N is number of measurements.

Table 11 contains examples of k-indexes corresponding to two periods per rotation. K-values indicated in pairs ($k_2, k_{-2}$), $\Delta\theta$ is the angle of rotation between each measurement, N is number of measurements.

Table 12 contains measuring information from a present embodiment of the invention.

Table 12 contains a summary of objects illustrated in the examples 1 to 5.

Referring to FIG. 20 a preferred embodiment 10 of the invention is illustrated. The embodiment 10 consists of a body for mobilization comprising a set of wheels 32, a support 26 and a U-shaped handle 30 to which the support 26 is fixed to the open end of the U, and the wheels 32 are fixed to a shaft carried by a number of projections from the handle 30 in the open end of the U. A house 12 is mounted on the platform 26 containing the individual antenna elements designed as described in the following. The individual antenna elements are fixed to the top side of the house 12 by retainers 18 comprising a frame connection. Metal screws 24 provide further fixation of the individual antenna elements. Bolts 22 of a plastics material keep the topplate and the bottom plate of the house 12 together. Transmitted signals are applied and received signals are received as described in the following, to and from the individual antenna elements through conduits 20 to switch cases 16 comprising, in combination with an electronic logic unit 14, the control of the switching between the transmitting and receiving function of the individual antenna elements. The electronic logic unit 14 is positioned beneath the switch boxes 16. The communication between the individual antenna elements and the electronics 34 of the plant, comprising synthesis electronics, frequency measuring electronics and transmitter-receiver electronics as described in the following is maintained through a set of conduits 28. The signal processing means comprises a computer 38 coupled to a monitor 42 and a keyboard 40. For current supply of the computer 38, the monitor 42, the keyboard 40 and to the electronics 34 of the plant a power supply 36 is positioned on the opposite side of the handle 30 in relation to the computer 38.

A further description of the invention will follow.

DETAILED DESCRIPTION OF THE INVENTION

1. BACKGROUND OF THE INVENTION

The present invention relates to methods and apparatuses for detection of objects in the ground by means of a ground radar. Ground radars or raders "looking" into the ground or into other materials have been known and used for centuries and are also known as georadars, ground penetrating radars and subsurface radars. For a long time it has been attempted to use ground radars to find buried objects in the ground, such as cables, tubes and optical fibres. However, prior art embodiments of ground radars are not especially useful for this purpose which may be considered the reason why no commercial break-through for radar based cable and pile detectors has taken place—in spite of a recognized requirement and many experiments. Under favorable conditions, commercially available ground radar systems enables detection of cables and pipes, but only in case the radar antenna is carried forward in one or more straight lines transversely to the objects to be found—and only by interpretation of the registered measurements which require a high level of qualification of the interpreter. Radio waves have a polarization connected to the spatial orientation of the associated electromagnetic fields. Utilization of the polarization adds a further dimension to ground radars and thus to the manner in which objects may be distinguished from the surroundings—in addition to the traditional time resolution.

Use of polarization as a means for discriminating objects, especially elongated objects, has not led to easily operated radar equipment for detection of cables and pipes. In fact, previous patents and publications used polarization—not least the early work by Young et al. from Ohio State University, vide example [8]. Others have followed in these footsteps, including the group comprising Gunton et al. In Great Britain, vide example [1], [2] and [10]. Furthermore, at number of tests have.been made to transfer the methods known as synthetic aperture or synthetic array and used as air and satelite borne radar systems to ground radars. The application of polarization is also known from these systems—often designated polarimetry. It is common features of the polarimetry and the synthetic aperture methods that they require a fairly homegeneous medium, that the illuminated objects are positioned in the far field of the antenna and that the mutual phase of the radar signals is not substantially influenced by contingencies in the propagation medium.

When an antenna is positioned close to the ground or by wave propagation in soil altogether, a strong influence of the phase and amplitude of the waves from contingenties in the form of stones, metal objects, uneven surface, moisture and such, will almost always be present. The influence of such contingencies may result in significant variations when moving the antenna just a few centimeters. Methods for utilization of polarization as described in [1] and [2] fail in relation to the inevitable contingencies in the signals mentioned above. The periodicity applying to radar signals from thin, elongated objects in the ground under ideal circumstances as described in [1] og [2] is in practice (most) often hidden behind incidental variations of substantial strength. The noise introduced as a result of the contingencies makes it too unsafe in practice to base detection on simple algebraic combinations of measured radar signals. Rotation of polarization is a useful and powerful means for improving the characteristics of ground radars. In [1] the following mathematic model for the dependency of the polarization angle for long thin objects Gunton et al indicates:

$$F(t)=A(t)+B(t)\sin(X)+C(t)\cos(X)+D(t)\sin(2X)+E(t)\cos(2X)$$

Where X is the angle of rotation of the antenna system. It is not totally clear how the phases of A(t) . . . E(t) are associated in this equation. In any case it may be concluded that mathematical equations as this one which may be considered as a first part in a Fourier series cannot in practice be used to describe the signals measured in an ground radar with any usable approximation. We find that proper Fourier analysis of the angular dependencyr together with other matematical operations is a very useful tool for detection of objects.

Regarding the othogonal two-terminal antennas with coincident electrical centers which are used in the patents [8], [1] og [2] we have observed that these are not the most suitable for detection of objects such as cables and pipes. The argument for using co-located two-terminal antennas which are mutually perpendicular (eg crossed dipoles) is according to the patent specifications mentioned that the mutual electromagnetic coupling between these are theoretically zero—and that thus no direct signal coupling takes place from transmitter to receiver (called "breakthrough"). We find that antennas with displaced centers are preferred in most cases. The reason for this is that the symmetry which is necessary in a construction with crossed dipoles is in practice disturbed by the surroundings, especially by roughness in the surface of the ground. As the near fields of co-located antennas to a great extent are coincident, small deviations from the symmetry are destroying and result in substantial mutual coupling. Therefore separation of the centres of the antennas is better. Our preferred antenna configuration is co-linear or parallel dipoles with displaced centres contrary to the patent speficiations [1] and [8] where antennas as well as detection methods are based on orthogonality. But it has to be emphasized that our detection method, including signal processing, is extremely useful together with orthogonal antennas. Our preferred signal form corresponds to the so-called "stepped-frequency CW radar" in which sinusodial wave signals are emitted having the frequency altered stepwise. CW means "continuous wave" and indicates that the sinusodial wave is emitted for as long as during each measurement transient phenomenons may be considered to have disappeared. In an ground radar presented by the inventors, frequencies in the interval 100 MHz to 1,000 MHz with frequency increments of 5 MHz are emitted (but the methods of the invention may be used in any frequency range). This signal form requires a method for transformation into the time domain.

We have observed that the electromagnetic attenuation in the ground is substantially an exponential function of the frequency in the relevant frequency range. Based thereon we have constructed an exponential signal model to be used as basis for estimating the time delays of the radar signal. The method has certain similarities to the methods called Prony methods, vide e.g. [7]. Methods derived from the original Prony method are already known in analysis of radar signals. A new feature in the present method is that in a mathematically coherent manner it takes the dispersive characteristics of earth materials into account. In principle, it is possible by means of this method to determine the strength of a reflector regardless of the reflector being buried in strongly attenuating material. Furthermore it provides a better time resolution than the Fourier transformation which is often performed by means of FFT algorithms. The classical relation between band width and time resolution saying that the smallest time difference detectable is inversely proportional to the band width of the signal does apply, as known, when Fourier-based method are used. Under certain circumstances a better resolution is obtained by the Prony method.

We have observed that it is a completely necessary condition for satisfactory detection of objects that the polarization determined angular dependencyr is investigated separately at different time delays—or in other words: reflectors appearing in different distances from the antennas with respect to time are investigated for polarization separately. Consequently a two-dimensional signal analysis is necessary in which the two dimensions correspond to the angle and time domain.

Moreover we have observed that a translational movement of the antennas during rotation has the useful effect of destroying the periodicity in the angular dependencyr of the very close object, whereas the periodic dependency of more distant (and possibly larger) objects is maintained. Therefore, Fourier analysis in the angle of rotation of a signal measured under such circumstances will show that signals from objects near the surface will have the energy distributed over a broad spectrum of harmonics whereas for instance cables and pipes will result in a considerably more concentrated spectrum around the harmonics corresponding to 2 periods per rotation. Thus a damping of the undesired reflections from objects and roughness in the surface is obtained. This suits perfectly to the practical use of an ground radar for scanning which is carried forward manually or mounted on a vehicle or a machine during mechanical or electrical rotation of the polarization.

The analysis of the signals and thus the detection method as described in [1] and [2] are based on comparison with reference measurements—in [2] in the form of 'matched filters', which is equivalent to the correlation with known curves. The problem with use of reference measurements is that two objects with associated surroundings and giving the same reflection do not exist. Therefore, a method based on reference measurements is difficult to use in practice.

This invention seeks to solve these problems by means of existing methods and apparatuses.

As it is evident from some attached examples illustrating processed data from measurements made under realistic circumstances, a signaunoise relation of 20 dB or more under general conditions may be obtained by means of the methods as described here. For comparison, an ground radar scan over a cable or pipe transversely hereto by means of a prior art apparatus typically presents an echo of approximately the same strength as those from various objects in the surroundings—i.e. approximately a signal/noise relation of 0 dB under the same circumstances.

Use of the Prony method for transformation from frequency to time together with the angle Fourier analysis and polarization rotation gives a detection reliability which have not been seen previously.

2. INTRODUCTION

The present invention is demonstrated in an embodiment which purpose it is to find and determine the direction of elongated objects in earth which in practice comprise pipes of all materials, cables containing metallic conductors and optical fibres.

However, the method described, including the mathematical parts and the application of electromagnetic waves with rotating polarization may be used for other purposes. For instance detection of anti-personnel mines. The method described for determination of direction is however limited to elongated objects. When in the following earth and detection of objects in earth are mentioned this is for the sake of convenience. The invention is also suitable for detection of objects hidden in other materials, for instance in concrete, other building materials or rocks which may all be considered earth materials with respect to electromagnetism. Also objects in the air may advantageously be detected by means of the methods described.

The invention is based on use of electromagnetic waves (in the following called EM-waves) which are transmitted into the material into which one or more objects are hidden. Thus, the invention is based on a RADAR-like principle. The electromagnetic waves may also according to general language usage be called radio waves. The invention is based on mission of EM-waves by means of an antenna for this purpose and measurement, registration and further processing of the electromagnetic responses or reflections which the objects give rise to.

A radar as known from airports and from many other places is often situated at a rather large distance to the reflecting objects, seen in relation to the wave length of the EM-waves used and/or the duration of the pulses emitted.

In the immediate neighbourhood of the antenna of a radar of the presently relevant type objects will often be present— often the surface of the ground will be present in what according to present language usage is called the near field of the antenna. The electromagnetic influence of objects this close is often not construed as reflections because so-called reactive fields are prevailing. In the following the designation "reflections" is used—without detailed differentiation—about all the registered influences made by objects outside the antenna—close or distant.

The present invention is based on a utilization of a combination of a time resolution of electromagnetic responses and on the polarization dependency thereof. It is of no importance whether time delays and polarization dependency originate from elements designated transmission, reflection, near fields or far fields, inductive coupling, capacitive coupling or "real" radar reflections. A preferred embodiment of the invention is arranged so that the objects to be detectet are present outside the near field of the antenna, but it is a substantial advantage of the invention that it is able to suppress near field phenomenons even though they present a larger strength than "desired" reflections.

In a radar system in connection with the present invention one antenna is used for emitting EM-waves and one antenna is used for receiving the responses on the emissions, or a multiple of such antennas are used. A possible embodiment may very well comprise one or more antennas which are used for transmission and reception—possibly on the same time.

In the following the transfer function between transmitter and receiver is used regardless of the construction of the antenna. The important point is that in the system a distinction is made between emitted and received signal and that these are compared. The comparison is made indirectly by the emitted signal—or just the AC voltage—is determined and known and that the received signal is measured and registered.

In the following a signal means an electromagnetic response or a connection between the emitted and the received signal. In the following objects may—apart from well defined objects such as pipes, cables etc—also mean differences in material characteristics, i.e. inhomogenieties in the medium in which EM-waves are propagating. By rotation of antennas, rotation of polarization derived by physical (mechanical) rotation as well as entirely electrical means, including electrical shifting between a number of antenna elements, is meant. Measurements mean manual as well as automatic determination of physical sizes by means of suitable equipment. Registration and storing may likewise be manual or automatic.

The invention utilizes analysis of electromagnetic response signals for the polarization dependency and time delays (or one of them) of the electromagnetic response signals. Analysis means calculations based on measured sizes. In practice, possible embodiments of this invention are best realized by means of digital equipment and certain physical elements such as the frequency of the emitted EM-waves are often altered at intervals. Therefore, to a great extent set of numbers will in the following be utilized for representation of physical elements which may by nature be considered continuous. In the following are mentioned two-dimensional set of numbers which are concentrations of discrete values. These sets of numbers may also be construed elements in a matrix and each of the rows or colums herein may be construed series of numbers. Synonymously herewith equations such as curves or functions and function values are used. Possible embodiments demonstrated by the inventors are based on discrete frequencies, angles, angular harmonic and times which is motivated by the use of digital store units and calculation units.—Even though the presented examples come forward as continuous images.

The principles of the invention apply for continuous frequencies, angle rotations, angular harmonic and times as well as for discrete corresponding features. The precise embodiment of mathematical formulas given in the following is not the only one possible. For instance, formulas exist for continuous as well as discrete Fourier transformation, but according to well-reputable text-books, Fourier transformations and Fourier sequences may be calculated in various ways. The indicated formulas are used by the inventors to demonstrate possible embodiments of the new principles of the invention in practice. The illustrated examples of curves and calculations based on measured, physical elements are also only possible illustrations of the principles of the invention.

Numbers of references (vide list) are indicated in square brackets: [ ] Numbers of equations in the document are indicated in common parentheses: ( )

3. ROTATING POLARIZATION

If during propagation an electromagnetic wave hits an object the electrical characteristics of which diverge from those of the surroundings some of the energy of the wave is deflected or reflected when hitting the object. It is a well-known fact that under certain circumstances this reflection (scattering) depends on the polarization of the wave in relation to the spatial orientation of the object. By the polarization of the electromagnetic wave, the direction of the electrical field vector is understood. This polarization may be varying, diffuse or it may be approximately linear in a given direction, or it may be circular which means that it turns around an axis.

A possible embodiment of the present invention which is demonstrated by the inventors, utilizes linear polarization. Furthermore, other types of polarization, including circular and elliptical, may be generated physically and may be analysed as linear combinations of linear polarized parts—therefore linear polarization is dealt with separately in the following.

3.1 Linear Polarization

By linear polarized waves, electromagnetic waves are understood which are intendedly made as linearly polarized in a (most often) horizontal direction as practically possible. It is part of the method that the approximately linear, (often) horizontal polarization of the waves is rotated around an (most often) perpendicular axis. A possible embodiment of the method applies waves which are to as great an extent as possibly characterized by:

Linear polarization in several directions which is parallel to a level parallel with the longitudinal axis of the elongated object(s) to be detected and located.

Rotation of the linear polarization direction around an axis perpendicular to the level mentioned (and perpendicular to the longitudinal axis of the object), but not necessarily crossing the longitudinal axis of the object.

Since detection and location of cables, optic fibres or pipes burried in the ground are substantial purposes of this invention, the designed linear polarization directions will often be horizontal and be rotated around a vertical axis. When in this context such electromagnetic waves are not described as circularly polarized waves it is due to the fact that in this method it is not necessary that the linear polarization is in all possible angles or that the rotation is continuous. A further reason for this is that the invention is based on the substantial realization that in practice it is very hard to obtain a well-defined circular or elliptical polarization under propagation in earth due to the often very important inhomogeneous composition of the soil medium.

The EM-waves mentioned here are produced by applying a high frequent electrical voltage to an antenna with an appropriate construction.

Figure 2:
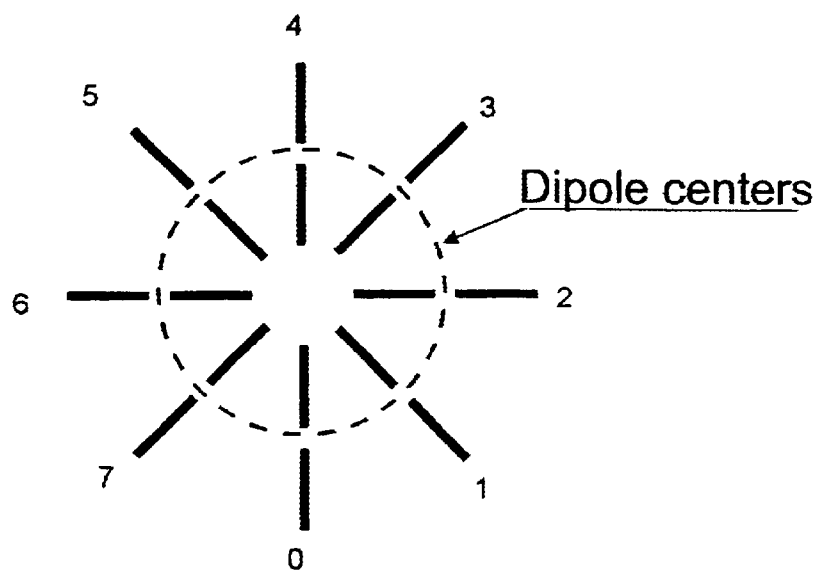
FIG. 2 illustrates a possible configuration of two-terminal antennas symbolized by thin electric dipoles having the centres displaced. By an electric shifting between the 8 antennas a rotating polarization may be provided.
Figure 3A:
FIG. 3a illustrates a single pair of co-linear two-terminal antennas one of which is used as a transmitter and the other as a receiver and FIG. 3b illustrates 4 such pairs.
Figure 3B:
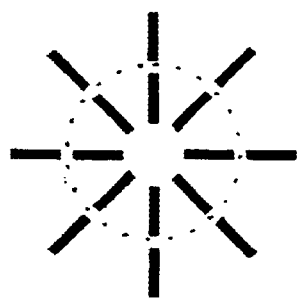
Figure 3C:
FIG. 3c illustrates a single pair of parallel two-terminal antennas and FIG. 3d illustrates 4 such pairs. By electric shifting between the antennas in FIGS. 3b and 3d, a polarization may be provided rotating in increments of 45°.
Figure 3D:
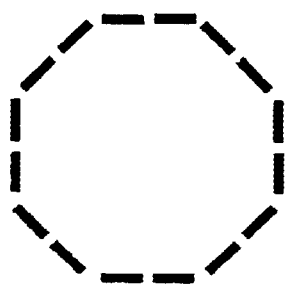
Figure 4A:
FIG. 4a illustrates a single pair of two-terminal antennas having displaced centres and orthogonal polarization one of which is used as a transmitter and the other as a receiver.
Figure 4B:
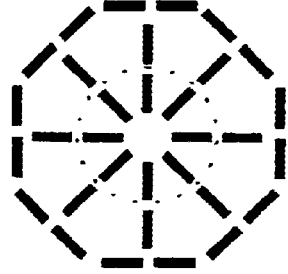
Figure 4C:
FIG. 4c illustrates a single pair of two-terminal antennas having displaced centres and orthogonal polarization and asymmetric mutual coupling one of which is used as a transmitter and the other is used as a receiver.
Figure 4D:
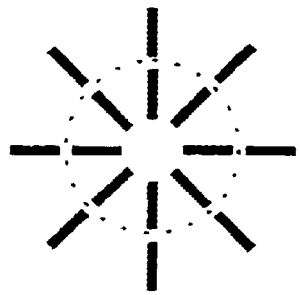
FIG. 4d illustrates 4 such pairs. By electric shifting between the antennas in FIG. 4d, a polarization may be provided rotating in increments of 45° during measuring having pairs as in FIG. 4c.

Often electrical dipoles or two-element antennas are used for obtaining an EM-wave which is almost linearly polarized. Then one or more dipoles are positoned for instance above the surface of the ground with a horizontal orientation of its or their longitudinal axis. Vide FIGS. 2, 3 and 4. In the following description, two-element dipole antennas are dealt with for convenience, but other types of antennas may also be used, for instance so-called slot-antennas.

For the purpose of detection of cables and pipes in the ground, horizontally oriented dipole antennas are often applied because cables and pipes normally lie horizontally in the ground. It is not a condition for the present method that the objects lie precisely horitontally in the ground—and it is not necessary, either, that the antennas applied are kept precisely horizontally above the ground.

It is a well-known fact that if an elongated object such as a cable or a pipe in the ground is hit by an electromagnetic wave the polarization of which is almost horizontal, the strength of the signal reflected from the object will be a periodic function of the angle θ between the polarization direction of the wave and the longitudinal direction of the object. This is described in [3] and in other textbooks and is also described in [1].

Finally, it is also a well-known fact that when a linear polarized antenna such as a dipole is hit by a linear polarized EM-wave, the size of the voltage induced on the terminals of the antenna is proportionate to cosine of the angle between the polarization directions of the antenna and the wave, respectively.

The generally known facts mentioned here are utilized in the present invention to enable detection, location and direction determination of elongated objects in the earth without use of reference measurements of the type described in [1].

An embodiment of the present method applying linear polirization does not require the use entirely linearly polarized EM-waves or require that the antennas used, when used for the emission of EM-waves, only emit such totally polarized waves or that the antennas when they are used for reception of reflections only are sensitive to waves having a certain polarization. Nor is it necessary that the objects to be detected only reflect waves having a certain polarization. It is sufficient for the application of the method that these conditions to some extent are met.

3.2. Other Forms of Polarization

Circular and elliptisk polarization may be produced physically and may as a matter of fact be considered linear combinations of linear polarizations. For instance, circular polarization may be obtained by applying AC voltage to orthogonal, linearly polarized antennas with a mutual phase displacement of 90°.

4.1 Antenna Configurations for Linear Polarization

Linear rotating polarization is applied in an embodiment of the present invention which is demonstrated by the inventors—in the following some possible configurations of antennas for linear polarization will be described schematically. The antennas determine the polarizations to be used. The angle between the polarization of the transmitter and receiver antennas is important—the following is based on two basic configurations for linear polarization:

TYPE 1 measurement: Co-polar: Same polarization of transmitter and receiver antenna TYPE 2 measurement: Cross-polar: The polarization of transmitter and receiver antennas are mutually perpendicular FIG. 3 and FIG. 4 illustrate the fundamental construction of some possible combinations of antennas in the form of outlines of combinations of dipole antennas of type 1 and type 2, respectively.

Reference is made to S-parameters as they are well-defined. $S_{21}$ indicates a measurement of the type transmission measurement between two sets of terminals (even though reflections in the transmission medium are the important factors) and $S_{11}$ indicates a reflection measurement at a single connection. The use of S-parameters is symbolic, other definitions may be used.

Table 9 is an outline of some possible antenna configurations.

Figures 5A, 5B:
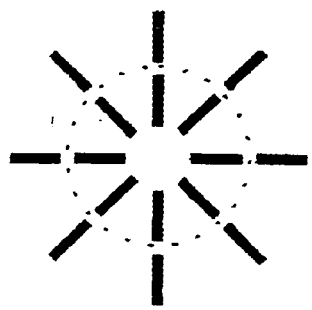

All the combinations in FIGS. 3 and 4 constructed from dipole pairs: one dipole for transmission, one for reception. FIG. 5 illustrates a measurement with one single antenna which means that a circuitry based measurement of a reflection which may be $S_{11}$ as the emitted and received signal exist on the same terminals.

Figure 6A:
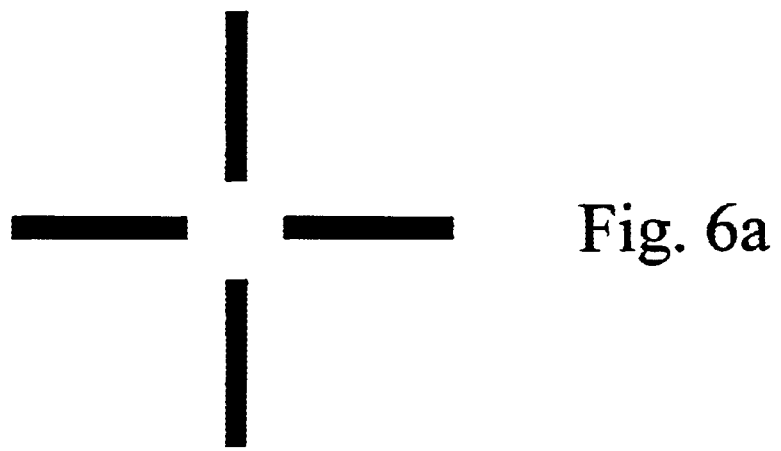
FIG. 6a illustrates two orthogonal dipoles, one of which is used as a transmitter and the other as a receiver.
Figure 6B:
FIG. 6b illustrates two such pairs. A theoretical application of the configuration in FIG. 6b is measurement of reflection ($S_{11}$) during application of only one dipole at a time.

The configuration in FIGS. 6a and 6b corresponds to the one used in [1] and [8] and in practice this configuration has turned out to be less useful for detection of objects in the ground, among other things because the direct electromagnetic coupling between transmitter and receiver antenna will have a large size compared to the EM-waves reflected from objects in the ground. The electrical centres of the antennas are coincident in FIGS. 6a and 6b. In spite of its practical limitations such a configuration is suitable for an approximate theoretical analysis of the relations regarding polarization-based detection of objects in the ground.

If, as illustrated in FIG. 7a, two crossed dipoles are positioned so that their mutual center is on the axis crossing perpendicularly between an elongated and thin object and the dipoles lie in a plane which is parallel to the linear object the following mathematically relations for the amplitude of the electrical AC voltage on the terminals of the receiver antenna apply. The angle between one of the dipoles and the object is θ.

We assume that a high frequent AC voltage is applied to the transmitter antenna with a constant amplitude so that the applied voltage may be represented by the mathematical equation:

$$V_{tx}(t) = A_{tx} \cos(2\pi f t) \quad (1)$$

where $V_{tx}$ is the applied, time dependent voltage, t is the time, $A_{tx}$ and f are the amplitude and the frequency of the applied signal, respectively. Given this electrical signal on the terminals of the transmitter antenna the following approximate equation for the voltage over the terminals of the receiver antenna applies:

$$V_{r1}(t,\theta) = A_1 \sin(2\theta) A_{tx} \cos(2\pi f t + \phi_1) \quad (2)$$

Where $A_1$ is a constant amplitude factor determined by the physical conditions and $\phi_1$ is a starting phase.

If two co-linear dipoles are positioned as in FIG. 7b and the length of the dipoles and the distance between their centres are small enough in relation to the distance between the dipoles and the object, the following relation applies:

$$V_{r2}(t,\theta) = A_2(1 + \cos(2\theta)) A_{tx} \cos(2\pi f t + \phi_2) \quad (3)$$

Where $A_2$ and are $\phi_2$ constants.

It should be noted that the voltage of the receiver antenna is dependent on both the time t and on the angle of rotation θ of the antenna in relation to the object and that the variation as a result of θ will normally happen much slower than the variation in time.

Similar mathematical equations apply to types of antennas other than electrical dipoles, if these only have a linear polarization characteristic.

The two mathematic cohesions (2) and (3) are based on a number of assumptions:

- that there are no reflection from the receiver antenna to the transmitter antenna.
- that the antennas as well as the objects are very thin in relation to the length of the EM-waves applied which is a condition for antennas as well as objects being considered linearly polarized.
- that the thicknesses of antennas and objects are small in relation to the distance between antennas and object.
- that all media surrounding antennas and object are homogenious in all directions which also may be expressed as the medium in which the electromagnetic fields and waves propagate is homogenious.

The present invention enables safe detection of cables and pipes in the ground by means of polarization analysis without the fulfilment of the above ideal preconditions.

4.2. Equations for Angular Dependency at Linear Polarization

In the following we will focus on the voltage transfer function between transmitter and receiver as it contains the important information rather than the voltage of the terminals of the receiver antenna.

If we remove the time dependent parts from the equations (2) and (3) in order to emphasize the importance of the angle rotation θ we get the following equation for the angular dependencyr of the voltage transfer function:

$$H_1(\theta) = A_1 \sin(2\theta) \quad (4)$$

for the angular dependencyr in a cross-polar antenna arrangement (type 2) and for the angular dependencyr in a cross-polar antenna arrangement (type 2) and $$H_2(\theta) = A_2(1 + \cos(2\theta)) \quad (5)$$

for the angular dependencyr in a co-polar arrangement (type 1).

However, the above mathematical equation with the preconditions mentioned never applies precisely. In practice we will—when measuring the relation between the AC voltage applied on the transmitter antenna and the existing voltage on the receiver antenna—get a more complex context.

4.3. Equations for Angular Dependencyr at Circular Polarization

Circularly polarized waves may be obtained by means of a linear combination of two linearly polarized waves. Antenna with circular polarization may be constructed by means of combination of linearly polarized antennas. For example the schematic configurations may be used—each of the combinations shown may be doubled so that one is included in the transmitter antenna and one in the receiver.

If the transmitter antenna and the receiver antenna are both circularly polarized and if, as mentioned, we assume that an object is thin and elongated and thus show linear polarization sensitivity, the result is a voltage transfer function which does not vary in size.

Under ideal circumstances corresponding to the circumstances mentioned above, we get a transfer function of the form:

$$H_c(\theta) = A_c \exp(j2\theta) \quad (5a1)$$

or:

$$H_c(\theta) = A_c \exp(-j2\theta) \quad (5a2)$$

Under certain circumstances the response of two circularly polarized antennas on a linear object will be constant, i.e.: $H_c(\theta) = A_c$ Here j is the imaginary operator in complex numbers, $j^2 = -1$. $A_c$ is an amplitude factor. $H_c(\theta)$ is now complex and expresses (ideally) the rotation-angle dependent phase rotation in the voltage transfer function.

As the polarization of the emitted wave at circular (or elliptical) polarization rotates continuously during the propagation, θ is not, similar to at linear polarization, equation for a polarization condition which is maintained as long as the antenna system is in a given consition or position. Instead θ is in (5a1) and (5a2) equation for a starting rotation of the polarization of the wave. Such a starting rotation may vary with corresponding means like the above mentioned linear polarization.

An angular dependencyr as in (5a1) or (5a2) may be obtained by combinations of orthogonal antennas with 90° mutual phase rotation. It should be noted that it is not necessary for such phase rotation network to exist physically—or that electrical signals are expressed to the orthogonal antennas at the same time. Linear combinations of linear polarizations—including circular—may be formed by activating sets of for instance dipoles in arbitrary order, store the measured signals and thereafter combine them algebraicly. The phase rotation of signals is obtained by multiplication with suitable complex constants before summation.

If circular or elliptical polarization is obtained by means of a combination of linearly polarized antennas the starting rotation of the resulting (approximate) circular polarization follow a mechanical or electrical (electronic) rotation of the applied linearly polarized elements.

If emission of elliptical or circularly polarized waves is utilized then the measured signals may be used for detection of objects during application of the methods stated in the present patent for utilization of linear polarization.

A practical utilization of circular or elliptical polarization may be based on splitting of the measured, complex angular dependencyr in a real part and an imaginary part, corresponding to what is often called quadrature splitting in an I and a Q part (In-phase Quadrature part, respectively).

By way of example the equation in (5a2) may be written as: $H_c(\theta) = A_c \exp(-j2\theta) = A_c \cos(2\theta) - jA_c \sin(2\theta)$, where it will be seen that the imaginary part corresponds to the equation for linear polarization (4).

5. FOURIER ANALYSIS AND ROTATION BASED MEASUREMENTS

The above expression $H_1(\theta)$ and $H_2(\theta)$ for the angular dependencyr of the transfer function (at linear polarization) are both characterized by running through two periods when the antenna system is rotated one turn. If we place any combination of transmitter and receiver antennas above the ground and rotate it around a vertical axis there will often be a substantial variation in the transfer function during rotation, especially if the antenna is positioned close to the ground, due to inhomogeneities in the ground such as stones, varying types of soil and humitity, waste material etc. Also roughness in the surface of the ground often has a substantial influence. Besides variations in the magnitude of the transfer function variations of the phase in a much more complex manner than the shift of polarity sign implied in the above expression for $H_1(\theta)$ and $H_2(\theta)$ will apply. The phase difference between the AC voltage applied on the transmitter antenna and the voltage measured on the receiver antenna is the phase of the transfer function. If we rotate the antennas precisely one turn, i.e. 360°, we will measure exactly the same transfer function prior to and after the rotation, therefor it is obvious that a periodical angular dependencyr exits. But besides functions experiencing two periods per rotation dependencies of $\theta$ with higher periodicity are often examined, and a dependency corresponding to one period per rotation.

As part of the present invention it has been discovered that the angular dependencyr of the voltage transfer function between two entirely or partly linear polarized antennas emitting and receiving electromagnetic fields or waves, respectively, propagating down into the ground and entirely or partly reflected from objects in or on the ground may with a good approximation be described by means of a Fourier series, and that this may be used for substantially improved detection of elongated objects compared to other known methods. Such a Fourier series may be expressed mathematically as follows:

$$H(\theta) = \sum_{n=-N/2}^{N/2} C_n \exp(jn\Omega\theta) \tag{6}$$

where: $n=0, \pm 1, \pm 2 \ldots, \pm N/2$
which is a Fourier series with N+1 elements. $C_0$ represents a mean value which is constant during rotation.

The Fourier constants $C_n$ in the equation (6) are complex and may be calculated in the form of integrals by means of the following equation $$C_n = \frac{1}{2\pi} \int_{-\pi}^{\pi} H(\theta) \exp(-jn\Omega\theta) d\theta \tag{7}$$

where: $n=0, \pm 1, \pm 2 \ldots, \pm N/2$
$\theta$ is the rotation of the antenna system based on an arbitrary starting position $\Omega$ is a variable designated the angular harmonic variabel $j^2=-1$, j is the imaginary operator in complex numbers (6) describes the variation of the voltage transfer function during rotation of the antenna system as a function of the rotation angle $\theta$.

The variable $\Omega$ now introduced is analogous to the frequency variable $\omega$, which is often used for representing (angle)frequency by Fourier transformation of time harmonic functions. Please note that in (6) a final number of elements exists—practice has revealed that only a smal number of harmonics are necessary for a useful representation of $H(\theta)$. $H(\theta)$ is complex and contains amplitude as well as phase information about the transfer function. The mathematical way of writing of complex numbers employed in this connection is in accordance with the way of writing employed by electrical engineers and others for representation of periodical alternating quantity and is described in many textbooks such as [3] og [4].

Comments Concerning Fourier Constants:

$C_0$ in the above equation (6) describes a mean value which typically originates from reflections in the ground which are independent of the polarization rotation. $C_2$ and $C_{-2}$ are two constants corresponding to two periods of a rotation of the antenna system.

By linear polarized antennas $C_2$ and $C_{-2}$ are under ideal conditions conjugated in a mutually complex manner, i.e.:

$C^*_2 = C_{-2}$ (*means complex conjugation)

By circular polarized antennas either $C_2$ or $C\_2$ is under ideal conditions zero.

$H(\theta)$ is in its nature a continous function of the angle $(\theta)$ and has so far been regarded as such, but it will often be of great practical value to measure $H(\theta)$ only at a smaller number of finite values of $\theta$, for instance 8 or 16 values during one rotation corresponding to a rotation of the antenna system of 45° or 22.5°, respectively, between each measurement.

If $H(\theta)$ is measured as described at some discrete values of $\theta$, exclusively, the angle may be written mathematically as:

$\theta = n\Delta\theta$, where $n=0 \ldots N-1$ and $\Delta\theta$ is the smallest angle rotation, for instance 45° or 22.5°.

Based on such measurements of $H(\theta)$ complex Fourier components may be calculated by means of the formula:

$$C_k = \sum_{n=0}^{N-1} H(n\Delta\theta)\exp(j(2\pi/N)nk)$$

$C_k$ is periodical in k. $C_k$ constitutes a discrete function the independent variable of which may be considered a quantified copy of the above mentioned angular harmonic variable $\Omega$, but for practical use by detection of objects it is useful to consider it a function in the index k.

Therefore we define:

$$V_f(k) = \sum_{n=0}^{N-1} H(n\Delta\theta)\exp(j(2\pi/N)nk), k = 0, 1 \ldots N-1 \tag{8}$$

N may for instance be 8, 16, 32 or 64. The number of measurements in (8) is equal to the number of calculation points for the function $V_f(k)$. Thus the equation (8) may effectively be calculated by means of a Fast Fourier Transformation method, know as FFT, vide for instance [4].

$V_f(k)$ as defined in the equation (8) is in the present invention called an angular harmonic function as it appears in a Fourier transformation of the angle dependent transfer function and thus a solution of the angular dependencyr in harmonic components. $V_f$ is marked f, as H in (8) is a frequency dependent variable. In a step-frequency radar, where $H(n\Delta\theta)$ is measured at M frequencies for each n, $V_f$ becomes a two-dimensional function with M×N points, i.e. $V_f(n,m)$, $n=0 \ldots N-1$ and $m=0 \ldots M-1$.

k is Used as Index for the Angular Harmonic Variable in Discrete Form

If the radar system measures signals as a function of time—as in an impulse radar which is the most common in commercial ground radar systems—the angle-Fourier-transformation of the data measured will result in a function which is dependent of the angular harmonic and time. The calculation is conducted according to (8), but often the measured result will not be complex, but real. Corresponding to (8) we can define:

$$V_f(k) = \sum_{n=0}^{N-1} h_t(n\Delta\theta)\exp(j(2\pi/N)nk), k = 0, 1 \ldots N-1 \quad (8a)$$

where $h_t$ is a measured time function, most often an impulse response—again at different angles $n\Delta\theta$. If the measurements takes place at N angles and $I_t$ points in time, $V_t$ becomes a function with $I_t \times N$ points, i.e. $V_t(n,i)$, $n=0 \ldots N-1$, $i=1 \ldots I_t$ It has turned out that such a solution on the basis of equation (8), (8a) or the like with subsequent selection of suitable harmonic components is extremely effective in emphasizing electromagnetic reflections from objects as cables and pipes in the ground when these appear together with other reflections from soil etc.

The preferred embodiment of the present invention uses discrete rotation angles of the polarization (the antenna system), and the preferred values of N in (8) and (8a) is suitable for FFT calculation. Reference is made to table 10 indicating number of rotations of the antenna system at different N and at two generally existing values of $\Delta\theta$. $\Delta\theta$ is the angle distance between each measurement.

The discrete index k for the angular harmonic, as $V_f(k)$ or $V_t(k)$ is calculated according to (8), (8a) or equivalent is dependent of the applied angle increments $\Delta\theta$ and the number of measurements N, which is included in a calculation (and thus the number of physical rotations of the polarization/the antennas). There are no negative index values in (8) and (8a). The two k-values corresponding to the above mentioned $C_2$ and $C_{-2}$, corresponding to two periods per rotation, is for some typical values illustrated in table 11. Examples of k-indexes corresponding to two periods per rotation. K-values stated in pairs $(k_2, k_{-2})$, $\Delta\theta$ is the rotation angle between each measurement, N is the number of measurements.

6. ROTATING AND TRANSLATIONAL MOVEMENT

The present invention takes advantage of the fact that electromagnetic waves are emitted into the ground during rotation of the polarization of the waves. If an area of the soil is to be investigated for e.g. cables and pipes it is necessary that the antenna system is moved forwardly above the ground. Prior art georadar methods requires the antenna system to be moved according to a predetermined pattern, for instance in straight, parallel paths.

The present invention allows the antenna system to be brought forward in an arbitrary path above the ground and the method described here ensures an increased reliability for correct detection and locating of elongated objects in the ground due to the movement.

Figure 9A:
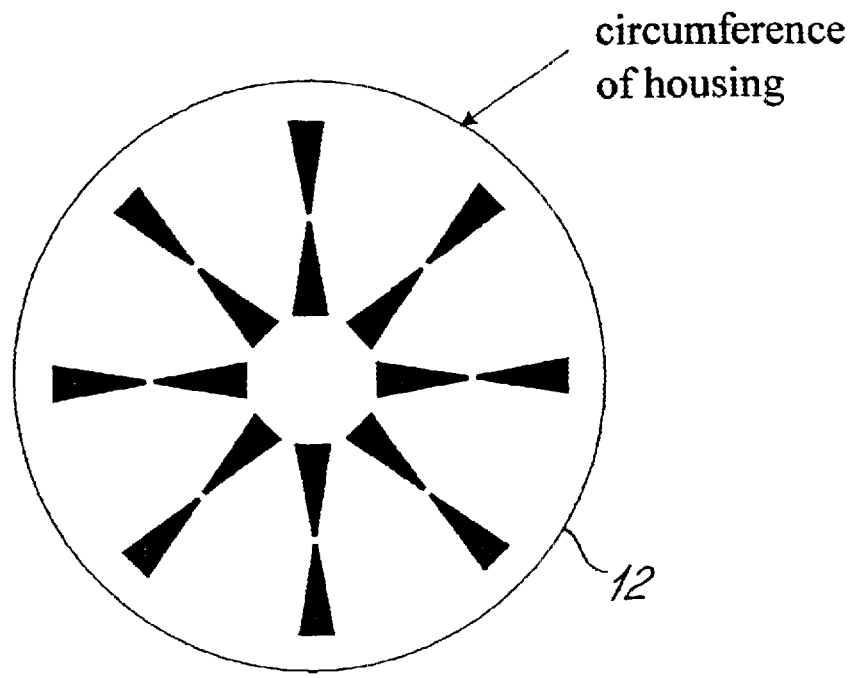
FIG. 9 illustrates configurations of dipoles in which the sides are not parallel. Such embodiment of a single dipole may be an advantage with regard to the frequency band width of the dipole.
Figure 9B:
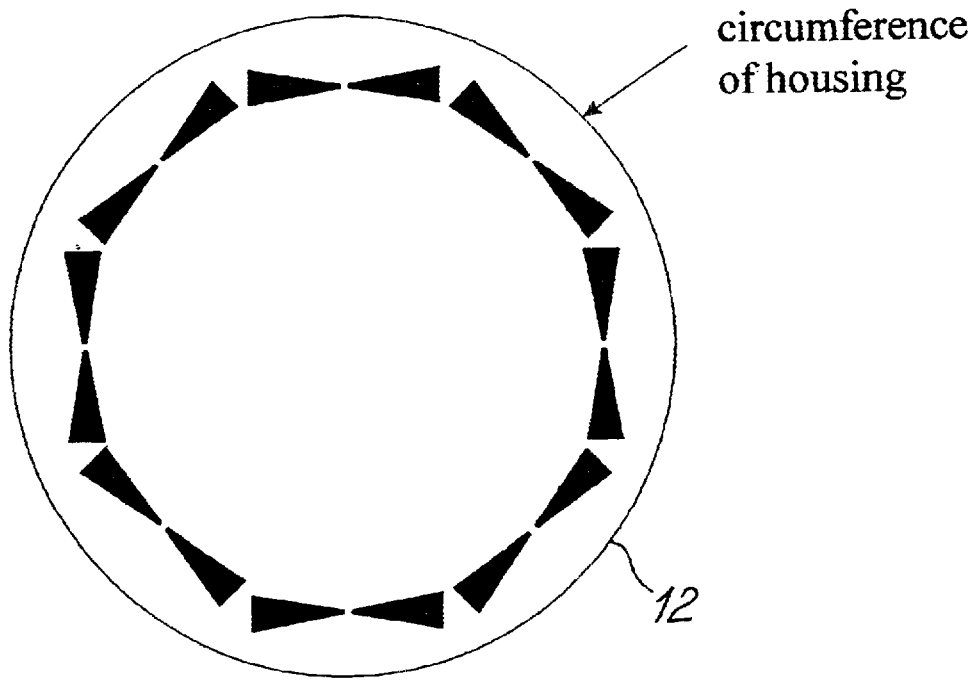

If, as illustrated in FIGS. 8 and 9, we perform two rotations of the polarization plane of the antenna system, both around centers lying near—but not necessarily exactly above—a burried, elongated object and if we measure the voltage transfer function during rotation in the two cases we often see that certain similarities between the two sets of measurements exist, and that certain differences exist. The differences may be caused by variations in the composition of the upper parts of the soil and by an uneven surface. Variations in the composition of the soil, humidity, occurence of stones, garbage, metal parts and the like may exist—often resulting in considerable variations in a movement of just a few centimeters. The similarities are often results of reflections from the burried object. The minor movement of the antenna possibly alters a bit in these reflections and in their angular dependencyr, but the periodicity is mainly maintained.

As a whole the periodic sequence of the angle dependent reflections from elongated objects will approximately be maintained during a minor movement whereas the corresponding sequence of inhomogenieties positioned above the object results in considerable changes. If a calculation of Fourier components according to the equation (8) is performed on the basis of repeated measurements during a combination of rotation and suitable movement, V(k) corresponding to these values of k will be emphasized in relation to others. Those which are emphasized will originate from elongated objects whereas those which are damped will originate from the above mentioned other reasons for reflections. This condition being favourable for detection of for instance cables and pipes arises from the fact that calculation of Fourier components in accordance with (8) basically consists of a summation of products which implies determination of mean of sizes measured. The mean determination is also important in connection with objects in the ground causing angle independent reflections. For instance horizontal soil layers will equally reflect the electromagnetic waves regardless of the horizontal polarization direction—such reflections will during calculation of (8) be summed up in the Fourier component V(0), which is conceptually analogous to the direct-current component or the DC value or the mean value by Fourier solution of an AC current.

It should be noted that variations in the measured signal caused by the near field of the antennas and which according to common language usage do not originate from real radar reflections may also be damped or emphasized, respectively, by means of rotation, conveying and Fourier solution. This is a result of the fact that the near fields of the antenna will often have a well-defined orientation.

The method described here for emphasizing elongated objects by means of rotation of the polarization of electromagnetic waves may also be applied for improving location of for instance cables by means of inductive methods employing low frequency magnetic fields generated by coils and currents.

Contrary to other methods for detection of cables and pipes in the ground as for instance described in [11] the present method does not require the antenna system to be moved crosswise in relation to these objects—a movement along such an object will lead to an increased emphasis of the reflections from this object. However, the method may in fact be used during movement along an arbitrary path—if only distance and angle in relation to the detection object is not altered too much between each measurement.

In a possible embodiment of the present invention presented by the inventors, the polarization is rotated so fast that a full rotation of the antennas is achieved for every few centimetres of movement. For each fourth rotation—corresponding to N=32 and $\Delta\theta=45°$—the 32 Fourier components are calculated. Under these circumstances, undesired reflectors and roughnesses positioned between the antenna and the elongated object are smoothed out to such an extent that a good detection is obtained.

7. MEASUREMENT IN THE FREQUENCY DOMAIN, STEP-FREKVENS CW RADAR

The present invention also relates to a method enabling the use of electromagnetic fields and waves which are sinusodial shaped and which do not per se contain information about transient wave propagations or transient reflections from objects in the ground. The method allows for application of the so-called step-frequency radar method in which sinusoidal-shaped (or almost sinusoidal-shaped) waves are generated and emitted, generating stationary waves which strength and phase are measured by a receiver antenna which may be the same as the one used for transmitting. The step-frequency radar method comprises transmission of a number of waves having different frequences, often with equally sized increments in the frequency between each transmission. The frequencies employed in a step-frequency radar may mathematically be expressed by:

$$f(m) = \Delta f m + f_o, \; m = 0, 1 \ldots M-1 \tag{9}$$

where f(m) is the applied frequency, $\Delta f$ is the frequency interval, i.e. the smallest difference in frequency, m is an integer, and $f_o$ is the smallest frequency.

For ordinary, practical purposes e.g. the following numeric values may be used: $\Delta f=5$ MHz, M=201, $f_o=100$ MHz, which means that 201 different frequencies in the interval 100 MHz to 1100 MHz, both inclusive, are used. The order in which the frequencies in (9) is emitted is of no importance.

All the frequencies are applied to the transmitting antenna until the transient period coexisting with the sinusoidal-shaped variation in time of the electromagnetic fields may be considered as insignificant compared to the total, time dependent field strength. In practice, this may take 10 microseconds or less.

Measurements with such sinusoidal-shaped fields or waves having transient variations damped result in a frequency dependent measuring of the voltage transfer function between transmitting and receiving antenna. Such a measurement in the frequency domain does not per se provide information about time delays of reflections. The ability to distinguish between different time delays is of crucial importance in a radar system for location of objects in the ground since this differentiation is a substantial means for sorting out for instance reflecting objects on or immediately below the surface of the ground.

In case the radar system is designed as a step-frequency CW system it becomes necessary to provide a measure for the time delays of the radar signal based on the measured, sinusoidal-shaped oscillations. The traditional method for obtaining such measurements is Fourier transformation, often designed as a so-called Fast Fourier Transformation or FFT algorithm. By means hereof the measured elements of the frequency domain may be transformed into a calculated estimate of the corresponding time delays.

However, the application of Fourier methods for frequency-time transformation is subject to a significant uncertainty fundamenally because all radar measurements only can be performed in a limited frequency interval according to physics. Radar waves in the ground are in practice frequency limited downwardly since the antennas for low frequencies will become too bulky in order to obtain sufficient sensitivity when receiving and sufficient emission when transmitting.

Applicable frequencies of electromagnetic waves in soil are furthermore in practice limited upwardly since these waves are dampered during propagation. The dampering is often in practice increasing at a high rate with frequency at frequencies which according to a total estimation are practically applicable. Therefore, radar waves in soil may often be chosen by consideration of conflicting demands concerning limited size of antennas on the one hand and a failing penetrating power of emission on the other hand.

Frequencies in the interval 100 MHz to 1.0 GHz are often used for practical reasons. The damping of propagation of radio waves between 100 MHz and 1.0 GHz is substantially increasing with the frequency. This is evident partly from measurements on which the present invention is based, and moreover from several sources, among others: [6, Hoesktra m.fl.], [5, Turner], [9, Freundhofer et al.]. In addition, the frequency dependency of the damping at practically applicable frequencies are approximately of exponential form. If the damping is illustrated in logarithmic scale in DB per meter and is illustrated as a function of the frequency in MHz then the result is often with a good approximation a linear function. The damping measured in dB/m is thus fairly linearly dependent on the frequency which means that the damping may be expressed mathematically as an exponential function of the frequency. This empirical relation is used in the present invention to obtain a resolution which has not previously been realized at calculation of time delays in step frequency CW signals.

8. MATHEMATIC MODEL FOR ELECTROMAGNETIC REFLECTIONS FROM OBJECTS IN THE GROUND AND OTHER SUPPRESSING MATERIALS

When the response of the receiver antenna during transmission of EM waves having sinusoidal-shaped variation in time is measured by means of electronic equipment a value for relative amplitude and phase of the received signal are obtained for each emitted frequency.

For every frequency applied a sinusoidal-shaped response is measured which may mathematically be described as follows:

$$h_m(t) = A_m \cos(\omega_m t + \phi_m), \tag{10}$$

where $h_m(t)$ is the sinusoidal-shaped voltage with the amplitude $A_m$, the angle frequency $\omega_m = 2\pi f_m$ and the initial phase $\phi_m$; t is time. Each measurement results in a complex number $H_m = A_m \exp(j\phi_m)$.

The receiver antenna is influenced by an incoming EM-wave which may with a good approximation be construed as a total of waves which are all a time delayed and dampened response to the emitted wave. In a step-frequency CW radar those responses have of course the same frequency as the AC voltage of the transmitter antenna. The time delayed parts originate from a number of reflectors. Consequently, mathematically the received response may be expressed as follows:

$$H_m = A_m \exp(j\varphi_m) = \sum_{k=1}^{L} a_{k,m} \exp(j\tau_{k,m} 2\pi f_m) \tag{11}$$

here the measured is $H_m$ with the amplitude $A_m$ and the phase $\phi_m$ expressed as a total of L components each with the amplitude $a_{k,m}$ and a phase which is proportional to the measurement frequency $f_m$ and a time delay $\tau_{k,m}$ applying for the single reflector. Due to the exponential frequency dependency of the damping $a_{k,m}$ may be expressed as follows:

$$a_{k,m} = c^*_k \exp(-r_k 2\pi f_m) \tag{12}$$

, and therefore we obtain:

$$H_m = A_m\exp(j\varphi_m) = \sum_{k=1}^{L} c_k^* \exp\{(-r_k + j\tau_k)2\pi f_m\} \quad (13)$$

$c_k^*$ are complex factors representing the frequency independent damping as well as a phase rotation which may among others originate from the effective reflection coefficient for the single reflector. In (13) we have removed index m as in the mathematical model we suppose that $c_k^*$ and $r_k$, $\tau_k$ are independent of the frequency. If we measure at a number of frequencies which are equidistantly positioned in an interval as expressed in (9) it is advantageous to rewrite (13) into:

$$H_m = A_m\exp(j\varphi_m) = \sum_{k=1}^{L} c_k \exp\{(r_k + j\tau_k)2\pi(f_o + \Delta fm)\} \quad (14)$$

or:

$$H_m = A_m\exp(j\varphi_m) = \sum_{k=1}^{L} c_k \exp\{(r_k + j\tau_k)2\pi\Delta fm\} \quad (15)$$

in (15) $c_k = c_k^* \exp[(r_k + j\tau_k)2\pi f_o]$, and now we have obtained an equation in which the complex exponents are proportional with m since $\Delta f$ is constant.

Based on these equations and as a result of a frequency characteristic of the transfer function measured at a number of discrete frequencies as stated in (9) a set of equations of the following form are listed:

$$H_m = A_m\exp(j\varphi_m) = \sum_{k=1}^{L} C_k (P_k)^m \quad (16a)$$

or:

$$H_m = C_1(P_1)^m + C_2(P_2)^m + \ldots C_L(P_L)^m, \; m=1 \ldots M \quad (16b)$$

i.e.:

$H_1 = C_1 P_1 + C_2 P_2 + \ldots C_L P_L$ $H_2 = C_1(P_1)^2 + C_2(P_2)^2 + \ldots C_L(P_L)^2$ (16c)

. . .

. . .

$H_M = C_1(P_1)^M + C_2(P_2)^M + \ldots C_L(P_L)^M$

This set consists of M equations with 2L unknown complex components. Normally we will provide more measurements than unknown components, i.e. M>2L, and thus the equation system becomes in excess solable. Such an in excess solvable equation system is to be solved by means of a method of least squares. The equation system in (16) based on M measurements may advantageously be solved by means of a modified so-called Prony-method employing either Singular Value Decomposition (SVD) and/or so-called QR-decomposition. Good results are obtained by means of a modified Prony method and by means of Shanks method in combination with QR eller SVD.

The solution of the above mentioned equation system by a least squares method leads to 2L complex numbers:

$C_k = B_k \exp(j\phi_k)$ og $P_k = \exp\{(-r_k + j\tau_k)\Delta f\}$, $k=1 \ldots L$ (17)

where:
$B_k$ is the amplitude
$\phi f_k$ is the phase
$r_k$ is the damping factor
$\tau_k$ is time delay
for the k' reflector, $\Delta f$ is the applied sampling interval in the frequency domain.

The mathematic model described here for the measured radar signals is formulated according to the fact that the damping of the soil shows (approximate) exponential frequency dependency. The model enables an improved solution of time delays compared to a Fourier method having identical physical conditions.

To solve the equations comprised in the model practically different approximations and re-writings may be applied some of which are evident from the possible embodiments, including attached computer programs. A practical problem in solving the form of (17) is that the time delay of the reflectors will be different at different rotation angles which is a result of electrical noise and the above mentioned inevitable variations in the soil etc. This is a practical problem because we want to be able to perform angle Fourier anaysis at some time delays chosen by us. For this reason and for other calculation reasons an alternative mathematical formulation of the equations (15) to (17) may be used.

P1 . . . $P_L$ i (16) and (17) may be construed as the roots in a so-called characteristic polynomial originating from a homogenous difference equation describing the context between the values of $H_m$ for different m.

Equation (16) may be formulated as a so-called rational polynomial model of the form:

$$H(z) = \frac{b_o + b_1 z^{-1} + \ldots + b_q z^{-q}}{1 + a_1 z^{-1} + \ldots + a_L z^{-L}} = \frac{B(z)}{A(z)} \quad (18)$$

H(Z) is a rational function with the nominator polynomial B(z) and the denominator polynomial A(z) in the variable z representing a frequency shift operator with the frequency shift $\Delta f$. It should be noted that $H_m$ as expressed in (16) may be considered a series development above the roots in the polymonial A(z).

The form in (18) is also called an ARMA function or Auto Regressiv-Moving Average function. The coefficients in (18) and thus indirectly the coefficients in (16) may be approximated by means of a number of methods.

A possible embodiment of the invention applies a socalled Prony method in modified form for determination of the denominator polynominal and Shanks method for determination of the nominator polynominal—these are realized in the attached computer programs and are used for calculation of curves enclosed in this description.

The enclosed computer programmes illustrate possible embodiments of algorithms which have turned out to give good results and additionally are possible to perform by means of generally available electronic integrated circuits performing calculation functions—and even having such a small time consumption that it is possible to use the present invention in an apparatus which is moved in a fairly high speed across the ground.

When H(z) described by (18) is determined in the form of the coefficients $b_0 \ldots b_q$ og $a_1 \ldots a_L$, and thus a functional equation for an approximation to the frequency dependent transfer function (one per angle at which the measuring is made) is obtained an associated time function may easily be calculated. The associated time function is calculated by substituting z in (18) by:

$$Z=\exp(j2\pi t\Delta f),\ 0\leq t\leq 1/(2\Delta f) \quad (19)$$

, and therefore:

$$h(t)=H[\exp(j2\pi r\Delta f)],\ 0\leq t\leq 1/(2\Delta f)tm \quad (20)$$

It must be emphasized that the time function here is not identical to the time function in the equations (2) and (3). The time dependent function h(t), obtained from (19) and (20) is claimed not to exist physically, but it has turned out to be useful for detection of objects in the ground. h(t) is continuous (and periodical in t), but is often in practice calculated for a number of discrete values in the time t.

The mathematical model presented here is based on a number of assumptions about the measured frequency data and thus about the physical realities concerning the surroundings, including:

that the damping of the electromagnetic waves during propagation has an exponential frequency dependency.

that time delays are frequency independent.

that the number of reflectors is final, here determined as L.

In reality none of these preconditions are fully present. It is a substantial advantage of the present invention that it enables a safe determination of the strength and time delay of substantial reflectors even though the ideal circumstances mentioned are not present.

Please notice: The discussed $H_m$ modelled here is constructed as the measured frequency response in a step frequency CW radar—and is therefore normally complex with both a phase and an amplitude value. Alternatively $H_m$ may be represented by a real and an imaginary part. Apart from noise and other inaccuracies the real part as well as the imaginary part of $H_m$ contain the same information, and both are sufficient to perform a calculation of the coefficients in (18) or in (16).

The above mentioned model may very well be used to model of real sequences. (16a) may therefore be modified into:

$$\mathrm{Re}(H_m) = \sum_{k=1}^{L} C_k(P_k)^m \text{ or } \mathrm{Im}(H_m) = \sum_{k=1}^{L} C_k(P_k)^m$$

The $P_k$'s in the above will—in order for the summation to be real—exist in complex conjugated pairs. The corresponding relations apply for the roots in A(z) in (18).

There may be certain practical advantages by only using the real or imaginary part of $H_m$. In an embodiment of the method presented by the inventors $\mathrm{Re}(H_m)$ is used. The advantage is mainly to be found in connection with measuring of $H_m$, which in the embodiment presented takes place in a system using both analogous and digital technique.

9. SIGNAL ANALYSIS IN TWO DIMENSIONS

When CW radar signals are used the above described Fourier solution of the dependency of the measured matter of the rotation angle of the antenna system based on an arbitrary angular position will often not per se be sufficient to obtain a reliable detection of elongated objects in the ground. In many cases the total measured signal will be dominated by reflections undesired in this connection and originating from the surface of the ground and from inhomogenieties in the ground. Therefore, the CW signal will often only to a small extent demonstrate an angular periodicity even though it contains the reflection from e.g. a cable in the ground. In order to obtain best possible emphasis of the angular dependencyr in the polarization conditioned reflections of objects it is useful to resolve the measured signal into both angle and time. If the signal is measured in time and is a result of an impulse or another transient electrical voltage applied to the transmitter antenna then it will be sufficient to perform the angle-Fourier solution for different parts of the signal corresponding to different time delays. But if the signal is a stepped frequency CW signal a combination of the above mentioned two described analysis methods may advantageously be used for angle Fourier resolution and time analysis based on exponential modelling, respectively.

The function H(θ) introduced in chapter 3 and 4 representing the complex transfer function is measured at different angles of rotation θ and at different frequences anti may therefore be considered a function of two variables: the angle θ and the frequency f, i.e.: H(θ,f). Since the measuring is performed at discrete angles and at discrete frequencies in practice and if we use:

$$f(m)=\Delta fm+f_o,\ m=0,1\ldots M-1 \text{ and } \theta=\Delta\theta n,\ n=0,1\ldots N-1$$

then we get H in the form:

$$H(\Delta\theta n,\Delta fm) \text{ or just } H(n,m),\ m=0,1\ldots M-1,\ n=0,1\ldots N-1 \quad (21)$$

The latter compact form in (21) is appli when Δθ and Δf have been determined. H(n,m) is a set of numbers with N×M complex elements.

If a transformation of the frequency variable into time is performed, for instance during application of the method described in chapter 8, for each of the θ-values, i.e. for each n, we get N time dependent functions in total to be considered a discrete function in two dimensions: θ and the time t: h(θ,t). In practice also h(θ,t) will be calculated in discrete points and take the form:

$$h(\Delta\theta n,\Delta ti) \text{ or just } h(n,i),\ i=0,1\ldots I_t-1,\ n=0,1\ldots N-1 \quad (22)$$

$V_f(k)$ as defined in equation (8) in chapter 4 is the Fourier transformed of H and does consequently not give direct information about the time dependency of the measured matter. Therefore, it is in practice a great advantage to Fourier transform h(θ,t) or h(n,i) in the angle or in n, respectively, in order to emphasize the angular harmonic content of the signal at different time delays (and thus depths). Consequently, a very useful alternative to (8) is used in practice:

$$V_t^i(k) = \sum_{n=0}^{N-1} h(n,i)\exp(j(2\pi/N)nk),\ k=0\ldots N-1 \quad (23)$$

where i is the constant during summation in (23) and represent a fixed value of the time delay. If (23) is calculated for a number of values of i then a two-dimensional set of numbers in k,i is obtained, where k corresponds to the angular harmonic and i corresponds to the time delay quantified, i.e.:

$$V_t(k,i) = \sum_{n=0}^{N-1} h(n,i)\exp(j(2\pi/N)nk),\ k=0\ldots N-1,\ i=i_1\ldots i_2 \quad (24)$$

The number of points in time: $I_t=i_2-i_1+1$. The time index runs from $i_1$ to $i_2$, both included, corresponding to an appropriate time interval.

$V_t(k,i)$ is produced by Fourier transform $I_t$ functions with each N points. Real two-dimensional functions are not involved, but rather combinations of functions (series of numbers) being in one dimension. In (24) a frequency to time transformation has been performed having $h(n,i)$ as result before calculation of the angular harmonic. An alternative method for calculation of a function corresponding to $V_t(k,i)$ is: firstly Fourier transformation of the measured frequency data in the angle, thereafter frequency to time transformation. No functional equation for the Prony based method described in chapter 8 for frequency-time transformation is given. For the sake of convenience the following notation is used here: $x(t)=\text{Prony}[X(f)]$ for the total procedure. Hereafter the alternative calculation of $V_t(k,i)$ may be written in a short form:

$V_t(k,i)=\text{Prony}[V_f(k,m)]$ where:

$$V_f(k,m) = \sum_{n=0}^{N-1} H(n,m)\exp(j(2\pi/N)nk), k = 0 \ldots N-1 \quad (25)$$

$$m = 0, 1 \ldots M-1$$

Please notice: m, n, k and i are indexes for frequency, angle, angular harmonic and time, respectively.

10. DETECTION CURVES

The angular dependencyr in different depths in the ground corresponding to different time based distances will most often vary—similarly this applies to the surroundings of the antennas as a whole. For instance, an elongated reflecting object will demonstrate a periodicity approximately similar to the ones described in the equations (4) and (5) whereas the material above the object will often demonstrate another, possibly minor degree of periodicity. By calculating the strength of the angular harmonic corresponding to two periods per rotation at different time delays a useful detection curve is obtained which has a function of the time (depth) and which concentrates the result of the measurements and the associated calculations in a clear way.

Detection curves are calculated by summing the relevant harmonic in $V_t(k,i)$: Examples of formulas for detection curves are:

$$D_1(i)=|V_t(k_1,i)|+|V_t(k_2,i)|, i=i_1 \ldots i_2 \quad (26)$$

where $k_1$ and $k_2$ correspond to a selected angular harmonic, for instance the one corresponding to two periods per rotation.

A value of $D_1$ is calculated for each selected value of i corresponding to each time delay to be investigated.

PLEASE NOTE: Two values of k are employed because the calculation of the Fourier coefficient in accordance with the formulas (24) or (25) results in calculation of what corresponds to a positive and a negative frequency for each of the harmonic which is a mathematically based consequence of the applied definition of the Fourier coefficients and the fundamental sizes. If the Fourier-resolved sequence fulfills certain requirements one of the two associated coefficients may be disregarded, but generally this is not the case. Under ideal conditions an angular dependency corresponding to the equations in (5a1) or (5a2) will be obtained by use of a circular polarization. These angular dependencies only give rise to a certain value of k when resolving the angular harmonics by Fourier.

Other examples of detection curves that may be used are:

$$D_2(i)=|V_t(k_1,i)+V_t^*(k_2,i)|, i=i_1 \ldots i_2 \quad (27)$$

where * means complex conjugation and:

$$D_3(i)=|V_t(k_1,i)-V_t^*(k_2,i)|, i=i_1 \ldots i_2 \quad (28)$$

Generally these detection curves are expressed by:

$$D(i)=|\Sigma_{k \in A} W_k\{V(k,i)\}| \quad (29)$$

where $W_k\{\}$ represents a suitable function of the selected harmonic. Examples are given in (26), (27) and (28).

A is a set containing the selected harmonics.

Example: We want to detect elongated objects that are supposed to have a relatively large content of harmonics corresponding to two periods per rotation of the antennas which are linearly polarized, i.e. of Type-1. The measuring is performed at angular separations 22.5°, and we consider 4 rotations at a time, i.e.: $\Delta\theta=2\pi/16$ (radian) and N=64. In this case the relevant k-values are: $k_1=8$ and $k_2=56$. With reference to the equations (24) and (25).

Since local inhomogeneities near the antennas give rise to propagation of the energy of the signal over a larger number of angular harmonics it makes good sense to weigh the equation in (29) against the energy in the harmonics falling outside the set A which may be implemented as follows:

$$D(i)=|\Sigma_{k \in A} W_k\{V(k,i)\}|/|\Sigma_{k \in A} V(k,i)^2|$$

Which is a measurement for the relative strength of the selected harmonics at a time delay given.

Detection curves may generally be produced from functions of $V_t(k,i)$ which is the polarization angular harmonic time response from objects. Variations of the time related location of an object in the measured signals may be countered by average determining detection curves over a minor time interval corresponding to more values of index i. Detection curves concentrate an (often) large number of measurements into one single curve expressing a measurement of whether objects having a given periodic or constant angular dependencyr exist in the angle scanned areas of (often) the ground.

In the calculations of D(i) only two harmonics (2 k-values) are typically included which means that the necessary frequency to time transformation by use of the step frequency CW radar method need only to be performed for the two relevant harmonics if the Fourier resolution in angular harmonics is performed before the frequency-time transformation. This corresponds to use of the equation (25) symbolizing a procedure comprising a Prony-method. Prony methods are rather demanding with respect to calculation. Therefore, the method starting by Fourier resolving in angular harmonics followed by Prony calculation of typically two selected harmonics and finally calculation of a detection curve is the most effective method.

Such a method is demonstrated by the inventors by way of the enclosed examples.

In the above description elongated objects are emphasized, but similar detection curves may also be produced for other types of objects. Rotation symmetrical (with respect to the line of direction from the antennas) objects for example demonstrate a relatively large content of the mean value in the Fourier series corresponding to k=0 in the formulas (24) and (25). Therefore A in (29) might in this case be limited to: A={0}.

11. DETERMINATION OF THE DIRECTION OF ELONGATED OBJECTS

The present invention enables determination of the direction of elongated objects without using reference measurements. The direction determination is performed in relation to the known, physical embodiment and orientation of the antennas. The determination of direction takes place by considering the set of curves representing the strength of the reflections measured at associated values of rotation angles and time delays, for example obtained by means of the methods described above in the present specification. The mathematical notation introduced above is employed, but coherent values of angle and time delays obtained by other methods than described here additionally may be employed as a starting point for the determination of the direction. The set of numbers symbolized by $h_r(n,i)$ in equation (24) or (25) when containing reflections from an elongated object will show an angular periodicity in a certain time interval where the object is positioned relative to the time—vide for example figure Eks.1A showing at about 31 ns a periodic sequence is seen along a perpendicular cross-section and similarly for figure Eks.3A at about 22.5 ns. Index i in $h_r(n,i)$ corresponds to the time, and if $|h_r(n,i)|$ is plotted as function of n along a fixed value of $i=i_a$ close to the time related position of the object a partly periodic sequence is obtained in n, corresponding to the angle. The plotted function may be symbolized mathematically by:

$$A_v(n,i_a)=|h_r(n,i_a)|, \ i=i_a, \ n=0 \ldots N-1 \quad (30a)$$

Alternatively the following may be used:

$$A_v(n,i_a)=h_r(n,i_a)h_r^*(n,i_a), \ i=i_a, \ n=0 \ldots N-1 (*\text{: compl. conjug.}) \quad (30b)$$

During the radar measurements the antenna system has been rotated in relation to the elongated object in the ground starting with an unknown starting angle $\theta_0$. If the applied antenna system is copolar or parallel (type 1) local maxima $A_v(n,i_a)$ will exist for k-values corresponding to $\theta_0+0°$, $180°$ . . . etc. If the antenna system is crosspolar (type 2) a maxima in the angles $\theta_0+45°,90°,135°$ . . . etc will exist. Please note that the frequency of $A_v(n,i_a)$ in the angle is doubled for the type-2 antenna compared to the corresponding type-1. The curves in fig. Eks1A . . . Eks1E correspond to a type-1 antenna system.

In practice the angular dependencyr of $h_r(n,i_a)$ in (30) will not correspond to simple equations as in the equations (4) and (5). Consequently angular determination is not performed based on $A_v(n,i_a)$ directly, but based on the Fourier transformation of $A_v(n,i_a)$. The scanned maxima for $A_v(n,i_a)$ are coincident with maxima in the sinusodial-formed curve corresponding to a definite harmonic in the Fourier series of $A_v(n,i_a)$. The relevant harmonic is the one corresponding to two maxima per rotation at type 1 antennas and 4 maxima per rotation at type 2 antenna. The term rotation is defined as rotation of the polarization, possibly by rotating the antenna system. The phase of the relevant complex Fourier component is directly proportional with the displacement of the maxima mentioned in relation to a position in which the first maximum falls in n=0. Therefore, the value of index n corresponding to the displacement is calculated from the phase for the relevant harmonic.

Harmonic index $k_2$ corresponding to two maxima per rotation is obtained by:

$$k_2=N\Delta\theta/180 (\Delta\theta \text{ in degrees}) \quad (31a)$$

and corresponding to 4 maxima per rotation:

$$k_4 32 \ 2N\Delta\theta/180 (\Delta\theta \text{ in degrees}) \quad (31b)$$

The relevant Fourier composant is calculated by:

$$X_v(i_a) = \sum_{n=0}^{N-1} |A_v(n,i_a)|\exp(j(2\pi/N)nk_2), \quad (31c)$$

when $k=k_2$ and correspondingly when $k=k_4$ $X_v(i_a)$ is a complex number from the phase of which the starting angle of the antenna in relation to the elongated object is easily determined by:

Type-1 Antennas:

The displacement of the relevant maxima in relation to n=0 is obtained by:

$$n_o=\phi_a/(2\Delta\theta) \text{ (all angles in degrees)}, \phi_a=\angle X_v(i_a)=\text{phase of } k_2. \text{ harmonics.} \quad (32a)$$

$n_o$ is not an integer. Consequently, the angle of the object in relation to the linear polarization of the type-1 antenna system type-1 is:

$$\theta_o=\phi_a/2 \text{ (all angles in degrees)}, \phi_a=\angle X_v(i_a)=\text{the phase of } k_2. \text{ harmonics.} \quad (32b)$$

It should be noted that the starting angle of the antenna system in relation to the object calculated as $\theta_o$ in (32) may be provided with a better resolution than corresponding to the angle increment $\Delta\theta$ between every measurement. The ability of the Fourier resolution to interpole is utilized and $\theta_o$ may in principle be determined with arbitrary resolution, only limited by noise, inaccuracies of the measurement etc. The meaning of $\theta_o$ is seen in relation to FIG. 7b.

Type-2 Antennas:

Here the number of periods in $X_v(i_a)$ per rotation are doubled in relation to type-1 antennas. The meaning of $\theta_o$ is seen in relation to FIG. 7a as it is to be noted that 45° must be added in relation to this figure.

Other types of Antennas

Circularly or elliptically polarized antennas may be considered linear combinations of type-2 antennas and the orientation of objects may be determined by a procedure corresponding to the one described here.

12. POSSIBLE METHODS FOR LOCATING/DETECTING CABLES AND PIPES IN SOIL

The above described mathematical methods for analysis of a signal in the angular/angular harmonic and frequency/time domains, respectively, may advantageously be combined in various ways. In the following some combinations which have been shown to be applicable in practice will be described:

In the following two-dimensional sets of numbers are described with since most often discrete values are relevant. These sets of numbers may also be construed as elements in a matrix and each of the rows or columns in it may be construed series. Curves or functions and function values are synomymously described. The preferred embodiments presented by the inventors are based on discrete frequencies, angulars, angular harmonics and times which are motivated by the application of digital storing and calculating units—even though the demonstrated examples-appear as continuous functions.

The principles of the invention also applies for continuous frequences, angle rotation, angular harmonics and times.

Procedure No. 1

Comprises the following steps:
1.1 An antenna arrangement of type 1 or 2 as described in chapter 3 and 4 is positioned on or above the ground with arbitrary, but approximate horizontal, orientation.
1.2 The voltage transfer function between the transmitter and receiver antenna is measured at a number of frequencies. The measured values are stored.
1.3 The antenna arrangement is rotated mechanically or electrically an integer multiple of an angle $\Delta\theta$. Typical values of $\Delta\theta$ may be 22.5° or 45° corresponding to $\frac{1}{16}$ or $\frac{1}{8}$ rotation. Simultaneously to rotating the antenna may be moved a bit translatorily which will be the case if the antenna is moved during rotation above the ground.
1.4 The voltage transfer function between transmitter and receiver antennas is measured at a number of frequencies. The measured values are stored.
1.5 Step 1.3 and 1.4 are repeated until an appropriate number of measurements are performed at a corresponding amount of angular positions. The amount depends on the circumstances. Practical amounts of useful angles may for example be: 8, 16, 32 or 64. The result is a set of complex numbers representing measured values of the voltage transfer function for coherent values of angular rotation and frequency. The result may be reduced into a real set of numbers corresponding to the real part of the complex set of numbers just mentioned.
1.6 The measuring results from the latter item are transformed from frequency to time. For this purpose the exponential based mathematical method described in item 8 or the like is applied. The result is a number of estimated reflections, their strength, phase and time delay. Frequency-to-time transformation is performed one by one on the frequency dependent transfer functions (series) associated with each angle. Thus for each angle a time dependent, continuous-in-time and periodic function is obtained which is calculated at a suitable number of discrete times. The same calculation time is used for all the angles. The result so far is a set of complex numbers in two dimensions. The series corresponds to a mathematic function having a discretizied rotation angle and the time discretisized as independent variable.

Comment: Examples of the result of the procedure 1.1 to 1.6 are illustrated in Figs. eks.1a, eks.2a, eks.3a, eks.4a and eks.5a. In many cases angle periodic objects may be identified by inspection. Eks.1a illustrates at the time delay of about 31 ns an object known as a 160 mm pipe made of a plastics material and containing water in a depth of 135 cm in soil.

Procedure No. 2

Consists of No. 1 or followed by additional calculations
2.1 Step 1.1 to 1.6 as in procedure No.1 or correspondingly
2.2 For each of the points in time used in step 2.1 a Fourier transformation is performed with the angle as independent variable. The result so far is a set of complex numbers in two dimensions. The set of numbers corresponds to a mathematical function having the angular harmonic and the time as independent variables.
2.3 Based on the two-dimensional set of numbers which is the result af step 2.2 a one-dimensional function in time is calculated, called D(t) by means of one of the methods described above in chapter 10 or correspondingly.
2.4 The discrete time function produced in step 2.3 is scanned for local and globale maxima that demonstrate a significant strength compared to the mean value. Such maxima represent angle periodic reflections from elongated objects. The value of time corresponding to the individual maximum states the time delay of the reflections from the corresponding object. Scanning for maxima may be performed mechanically or by inspection of the curve.

Comment: The time delays thus calculated may together with a knowledge of the speed of propagation of the radar waves in the ground be used for calculating the depth of objects. Examples of the result of procedure 2 step 2.1 to 2.2 are illustrated in figs. eks.1C, eks.2C, eks.3C, eks.4C and eks.5C.

Examples of the result of procedure 2 step 2.1 to 2.3 are illustrated in figs. eks.1E, eks.2E, eks.3E, eks.4E and eks.5E, where the detection curve is calculated in accordance with (28).

Procedure No. 3

Consists of procedure No. 1 or corresponding chapters followed by additional calculations.
3.1 Step 1.1 to 1.6 as procedure No. 1 or correspondingly
3.2 Based on the result of step 3.1 the angular position in relation to the antenna system is calculated by means of the method described above in item 11. The angular position is calculated for one or more angle periodic objects that may be detected or time determined by visual inspection of the result of step 1.1 to 1.6 under procedure 1 or by use of detection curves as described in procedure 2 above.

Comment: If the antenna system comprises mechanical rotation the angular position in the starting position in relation to the elongated object(s) is hereby determined. If rotation is produced by shifting between the antenna elements with fixed angular position the angular position is determined by the polarization direction corresponding to the first measuring position—and thus the angular position of the total antenna arrangement in relation to the elongated object(s).

Examples of result of this procedure are illustrated in Fig. Eks.3F.

Procedure No. 4

Comprises the following steps:
4.1 An antenna of the type 1 or 2 as described in chapter 3 and 4 is positioned on or above the ground with arbitrary, however approximately horizontal orientation.
4.2 The voltage transfer function between transmitter and receiver antenna is measured at a number of frequencies. The measured values are stored.
4.3 The antenna arrangement is mechanically or electrically rotated an integer multiple of an angle $\Delta\theta$. Typical values of $\Delta\theta$ may be 22.5° or 45°, corresponding to $\frac{1}{16}$ or $\frac{1}{8}$ rotation. Simultaneously to rotating the antenna may be moved a bit translatorily which will be the case if the antenna is moved during rotation above the ground.
4.4 The voltage transfer function between transmitter and receiver antennas is measured at a number of frequencies. The measured values are stored.
4.5 Step 4.3 and 4.4 are repeated until an appropriate number of measurements are performed at a corresponding amount of angular positions. The amount depends on the circumstances. Practical amounts of useful angles may for example be: 8, 16, 32 or 64. The result is a set of complex numbers representing measured values of the voltage transfer function for coherent values of the angular rotation and frequency. The result may be reduced into a real set of numbers corresponding to the real part of the complex set of numbers just mentioned.

4.6 The measuring result from step 4.5 is subject to a Fourier transformation in the angle. For each of the frequencies used in step 4.5 a Fourier transformation is performed with the angle as independent variable. The result is a set of complex numbers in two dimensions. The set of numbers corresponds to a mathematical function having the angular harmonic and the measuring frequency as independent variable.

Comment: The set of numbers thus obtained is in two dimensions which may also be construed as a number of frequency dependent curves, one for each angular harmonic or as a number of functions of the harmonic, one for each measuring frequency.

Procedure No. 5

Comprises the steps in procedure No. 4 or corresponding steps and additional calculations.

5.1 The steps 4.1 to 4.6 in procedure No. 4 or corresponding steps.

5.2 The set of numbers obtained in step 5.1 are transformed from frequency to time. The series corresponding to each of the angular harmonics are transformed by means of the exponential based mathematic method or a corresponding method described in chapter 8. The result is a number of estimated reflections, their strength, phase and time delay. Thus for each angular harmonic a time dependent, continuous-in-time and periodical function is obtained which is calculated at a suitable number of discrete times. The identical calculation points in time are used for every angular harmonics. The result is a set of complex numbers in two dimensions. The set of numbers corresponds to a matematical function having the angular harmonic discretisized and the time discretisized as independent variable.

Comment: Sets of figures in two dimensions are hereby obtained which may also be construed as a number of time dependent curves, one for each angular harmonic, or as s number of curves or functions of the harmonic, one for each point in time. This set of numbers may be illustrated and by inspection objects may be found by identifying global or local maxima for selected harmonics, typically the two harmonics corresponding to two periods per rotation of the polarization.

Procedure No. 6

Comprises the steps in procedure No. 4 or corresponding steps and additional calculations.

6.1 The steps 4.1 to 4.6 in procedure No. 4 or corresponding steps.

6.2 Parts of the set of numbers obtained in step 6.1 are transformed from frequency to time. The series corresponding to selected angular harmonics are transformed by means of the exponential based mathematic method or a corresponding method described in chapter 8. The result is a number of estimated reflections, their strength, phase and time delay. Thus a time dependent, continuous-in-time and periodical function is obtained for each angular harmonic which is calculated at a suitable number of discrete times. The same calculation points in time are used for all angular harmonics. The result is a set of complex numbers in two dimensions. The set of numbers corresponds to a mathematic function having the angular harnomic discretisized and the time discretisized as independent variable, but only for selected angular harmonics.

6.3 Based on the two-dimensional set of numbers which is the result of step 6.2 a one-dimensional function in time is calculated, called D(t), by means of the methods described above in chapter 10.

6.4 The discrete time function produced in step 6.3 is scanned for local and global maxima that demonstrates a significant strength compared to the mean value. Such maxima represent angular periodic reflections from elongated objects. The value of time corresponding to the individual maximum states the time delay of the reflections from the corresponding object. Scanning for maxima may be performed mechanically or by inspection of the curve.

Comment: As described in chapter 10, two of the angular harmonics are often selected corresponding to 2 periods per rotation. If the antenna is of the Type-1 described above the two harmonics are often used which correspond to the positive or negative, respectively, frequency corresponding to two periods per rotation. Since only time sequences need calculation for example of two harmonics—and thus only two Prony transformations are applied—then procedure is effective for calculation. The time delays calculated in this manner may together with a knowledge of the speed of propagation of the radar waves in the ground be used for calculating the depth of objects. Examples of the result of procedure 6 step 6.1 to 6.3 are seen in the figures eks.1D, eks.2D, eks.3D, eks.4D and eks.5D in which the detection curve is calculated in accordance with equation (28).

Procedure No. 7

Comprises the following steps:

7.1 An antenna arrangement of type 1 or 2 as described in chapter 3 is positioned on or above the ground with arbitrary, however approximately horizontal, orientation.

7.2 A voltage pulse which should be a short-period pulse is applied to the transmitter antenna. The voltage of the transmitter antenna is then measured at a number of time delays.

7.3 The antenna arrangement is rotated mechanically or electrically an integer multiple of an angle $\Delta\theta$. Typical values of $\Delta\theta$ may be 22.5° or 45°, corresponding to 1/16 or 1/8 rotation. Simultaneously to rotating the antenna may be moved a bit translatorily which will be the case if the antenna is moved during rotation above the ground.

7.4 A voltage pulse which should be a short-period pulse is applied to the transmitter antenna. The voltage of the receiver antenna is then measured at a number of time delays.

7.5 Chapter 7.3 and 7.4 are repeated until a suitable number of measurements have been performed at a corresponding amount of angular positions. The amount depends of the circumstances. Practical amount of usable angles may for example be: 8, 16, 32 or 64. The result is a set of numbers representing measured values of the voltage transfer function for coherent values of angle rotation and frequency. The set of numbers will often be real. If the antenna arrangement is arranged so as to measure two time functions physically which are mutually orthogonal—often called I(t) and Q(t)—the set of numbers is considered complex.

If the measured set of numbers is real a complex corresponding set may be produced—in the form of a so-called Hilbert transformation—either by means of electric filtering or by means of calculations performed on the measured, discrete values.

Procedure No. 8

Consists of procedure No. 7 or corresponding procedure followed by additional calculations.

8.1 Step 7.1 to 7.5 as under procedure No.7 or corresponding chapters.

8.2 For each of the points in time used in item 8.1 (=time delays) a Fourier transformation with the angle as independent variable is performed. The result so far is a set of complex numbers in two dimensions. The set of numbers corresponds to a mathematic function having the angular harmonic and the time as independent variable.

8.3 Based on the two-dimensional set of numbers which is the result of step 8.2 a one-dimensional function in time is calculated, called D(t), by means of the methods described above in chapter 10 or corresponding methods.

8.4 The discrete time function produced in step 8.3 is scanned for local and global maxima that demonstrates a significant strength compared to the mean value. Such maxima represent angle periodical reflections from elongated objects. The value corresponding to the individual maximum states the time delay of the reflections from the corresponding object. Scanning for maxima may be performed mechanically or by inspection of the curve.

Comment: The time delays thus calculated may together with a knowledge of the propagation speed of the radar waves in the ground be used for calculating the depth of objects.

Procedure No. 9

Consists of procedure No. 7 or corresponding procedure followed by additional calculations.

9.1 step 7.1 to 7.5 as under procedure No.7 or corresponding chapters.

9.2 Based on the result of step 9.1 the angular position is calculated in relation to the antenna system by means of the method described above in chapter 1.1. The angular position is calculated for one or more angle periodic objects which may be detected and time determined by visual inspection of the result of step 9.1 or by use of detection curves as described under procedure 8 above.

Comment: If the antenna system comprises mechanical rotation the angular position in the starting position is hereby determined in relation to the elongated object(s). If rotation takes place by shifting between antenna elements with fixed angular position the angular position is determined by the polarization direction corresponding to the first measuring position—and thus the angular position of the total antenna arrangement in relation to the elongated object(s).

Procedure No. 10

Consists of procedure No.7 or corresponding procedure followed by further calculations.

10.1 Step 7.1 to 7.5 as under procedure No.7 or corresponding procedure.

10.2 For each of the points in time used in step 10.1 (=time delays) a Fourier transformation is performed with the angle as independent variable. The result so far is a set of complex numbers in two dimensions. The set of numbers corresponds to a mathematic function having the angular harmonic and the time as independent variable.

Comment: The result of Fourier transformation of measured radar signals in the polarization angle may by means of visual inspection give valuable information about objects in the ground.

Procedures for Use of Circular or Elliptical Polarization

The present invention also comprises use of a circular or elliptical polarization. The procedures described here, i.e. procedures Nos. 1 and 4, use antennas with linear polarization rotated mechanically or electrically for example by electronic shifting between elements. If circular or elliptical polarization is applied the procedures are used in a corresponding manner. Circular or elliptical polarized waves and the associated signals of the antennas may be split into components corresponding to linear polarization.

If the circular or elliptical polarization is obtained by means of linearly polarized antenna elements and their terminals are accessable the methods described here may be applied directly on the individual linear parts—with or without subsequent combination. This applies irrespective of linearly polarized parts being activated at the same time or individually and irrespective of EM-waves with circular or elliptical polarization existing physically during the measurement, or the corresponding signals are produced in the form of linear combinations of measuring results.

The present invention also comprises the circular or elliptical polarization being obtained by means of one or more antennas per se radiating circular or elliptical polarized EM-waves—for instance spiral antennas—the electrical signals of the terminals of such antennas being divided into orthogonal parts and these parts being processed by means of the method described here. Orthogonal signal parts are often designated quadrature components or I and Q, where I and Q in total constitute a complex representation of a signal. Irrespective of the splitting of a signal in orthogonal parts being obtained by means of electrical networks or by means of algebraic manipulation in a (most often) digital computer the processing of the signals produced is comprised of the present invention by means of the methods described here.

Use of Fourier Methods for Transformation From Frequency to Time

In the procedures Nos. 1, 5 and 6 described here the exponential based method for determination of time delays in the radar signal described in chapter 8 is included. The present invention also comprises procedures corresponding to the ones described where Fourier transformation is used for frequency to time transformation—including use of Fourier solution in the angle as described above in combination with Fourier transformation of the frequency dependent measuring data.

In procedure No. 1, step 1.6, procedure No. 5, step 5.2 and in procedure No. 6, step 6.2 the exponential-based method here described may be replaced by a Fourier method including FFT or Fast Fourier Transform.

Use of Other Signal Forms Than Step-frekvens CW Radar

The present invention also comprises use of the methods described in connection with other signal forms than Step-frekvens CW radar, which is the preferred one, and impulse radar which is comprised of the procedures 7 to 10.

The methods described here in combination with rotating polarization with or without movement above the ground or the like may advantageously be applied irrespective of the signal form used.

Some possible signal forms are:

frequency-sweep or "chirp" or FM-CW, in which the frequency of the signal is altered continuously during an interval.

correlation radar in which constructed or arbitrary time frequencies are employed and in which time delays of reflections are calculated by means of correlation.

Detection of Several Objects

Detection and determination of direction are described here for individual objects. If several objects exist in the same set of radar measurements the methods described here enable individual processing of them if their associated time delays are different. Objects in different depths, including crossing cables and pipes, may be determined individually by means of the methods described. The modified Prony-methods will often be a help for separation of closely positioned objects.

Examples With Performed Calculations

The examples stated are all based on measurements made under ordinary circumstances in Denmark. Thus, the examples are thus fully realistic and correspond to ordinary existing conditions. However, they have not to be considered calculation examples which are arranged with the aim of emphasizing theoretical or principal aspects of the methods of the invention.

Table 12 illustrates a scheme of objects illustrated in the examples 1 to 5.

Figure 13A:
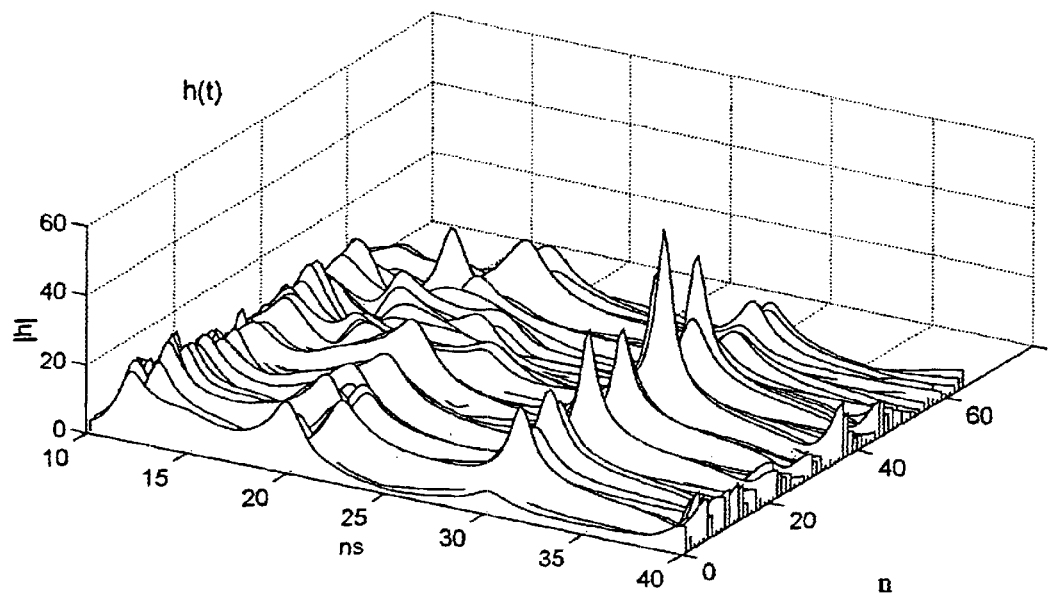
Figure 13B:
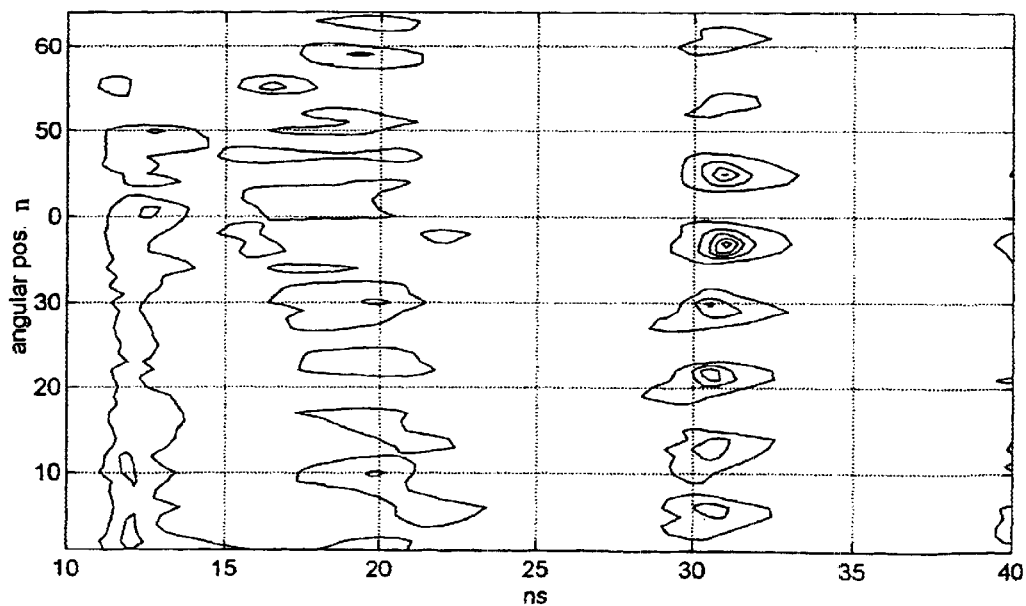

The FIGS. 13a)–13b), 14a)–14b), 15a)–15b), 16a)–16b) and 17a)–17b) are the result of calculations of the type mentioned in chapter 9 and illustrate calculated signal strength as a function of the angle index n and the time in ns. Are the result of above described procedures No. 1 through step 1.6 13a)–17a) in the form of 3D-plot, 13b)–17b) same in contour plot.

Figure 13C:
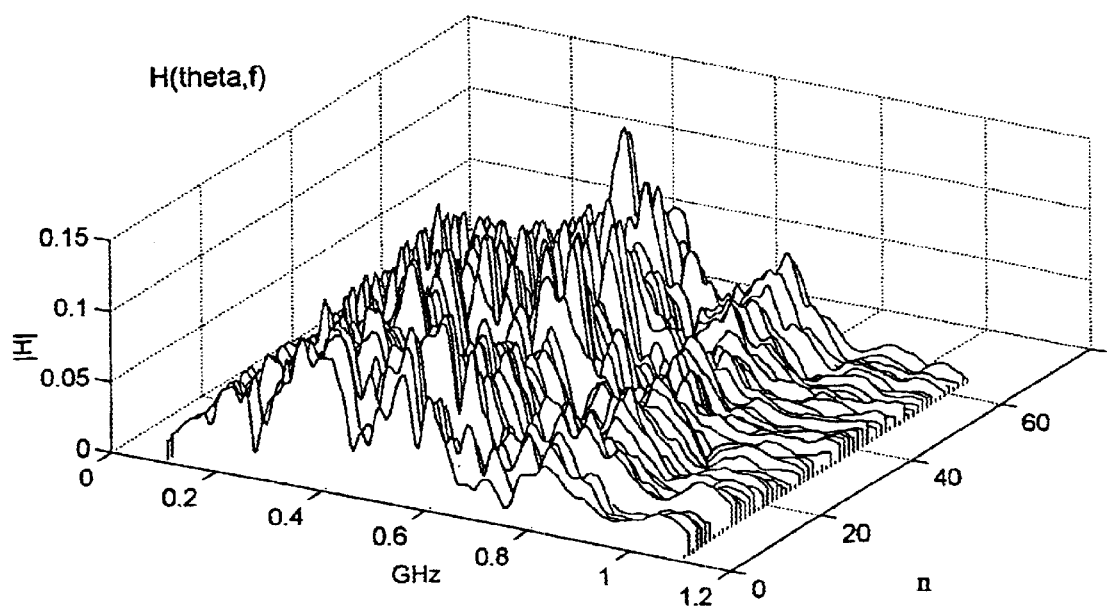
Figure 13D:
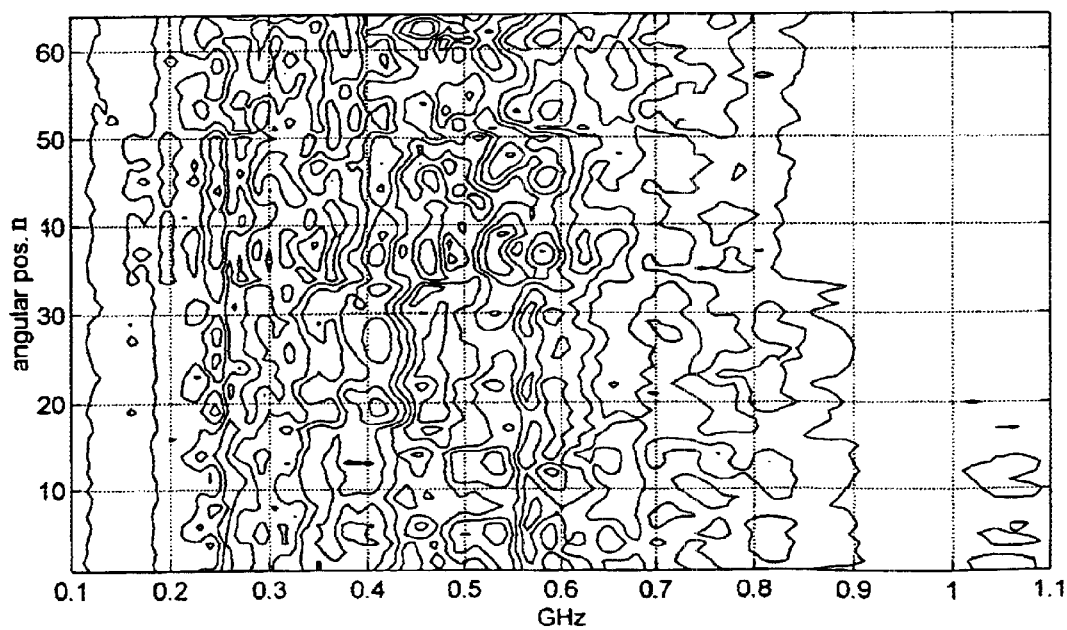

The FIGS. 13c)–13d), 14c)–14d), 15c)–15d), 16c)–16d) and 17c)–17d) measured signal strength as function of the angle index n and the frequency in GHz. Are the result of the above described procedure No. 1 through step 1.5. 13c) –17c) in the form of 3D-plot, 13c)–17c) same in contour plot.

Figure 13E:
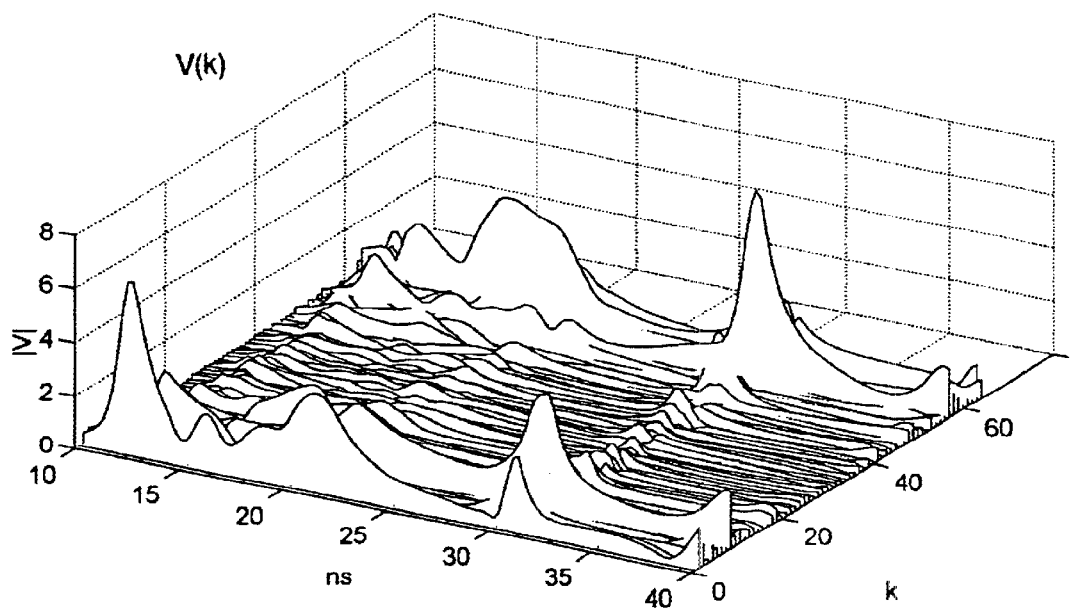
Figure 13F:
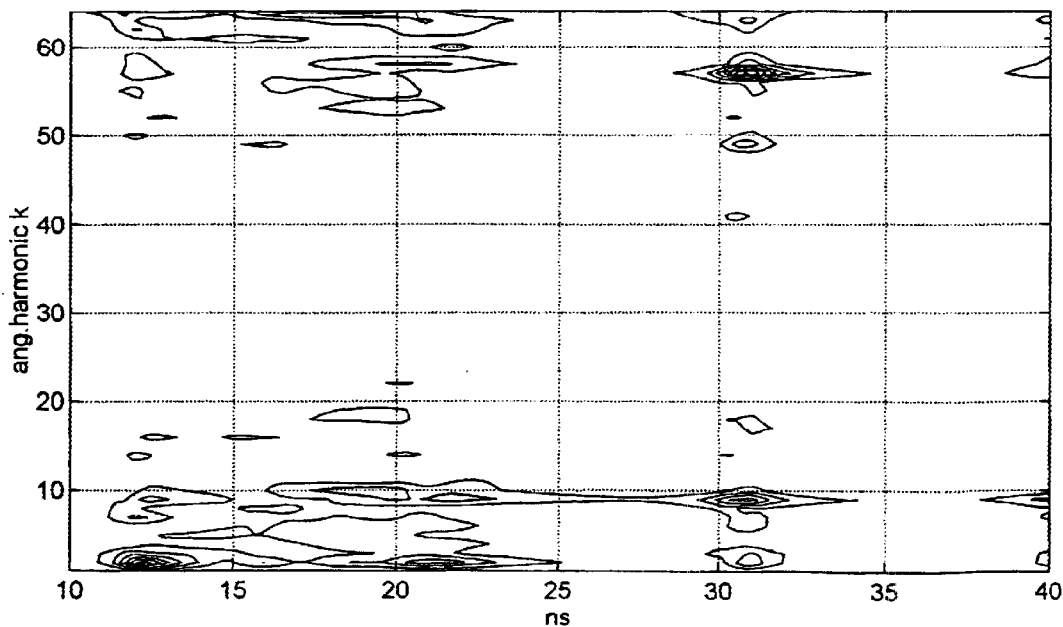

The FIGS. 13e)–13f), 14e)–14f), 15e)–15f), 16e)–16f) and 17e)–17f) are the result of calculations of the type mentioned in chapter 9 and illustrate calculated signal strength as function of angular hamomic index k and the time in ns. Are the result of above described procedure No. 2 through chapter 2.2. 13e)–17e) in the form of 3D-plot, 13f)–17f) same in contour plot.

Figure 13G:
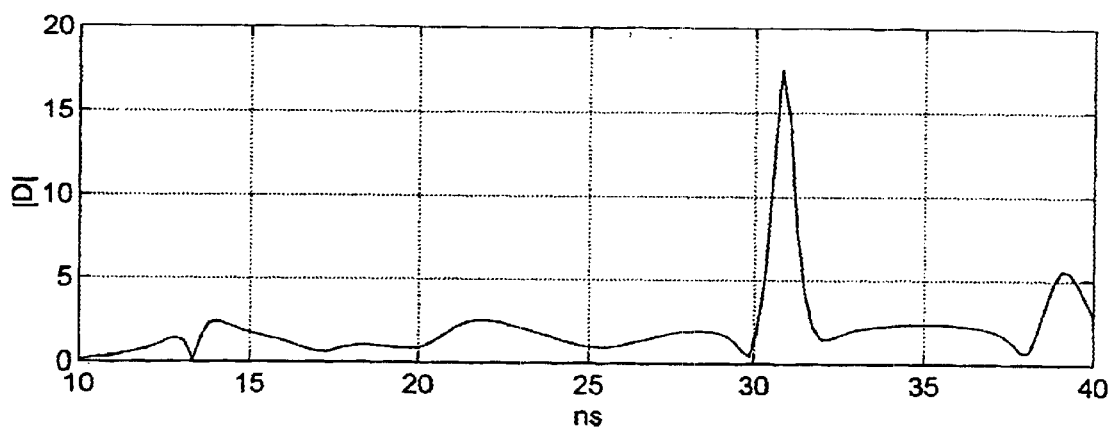

The FIGS. 13g)–13h), 14g)–14h), 15g)–15h), 16g)–16h) and 17g)–17h) are the result of calculations of the type mentioned in chapter 10 and illustrate detection curces. Are a result of the above described procedure No. 6 through step 6.3.

Figure 13H:
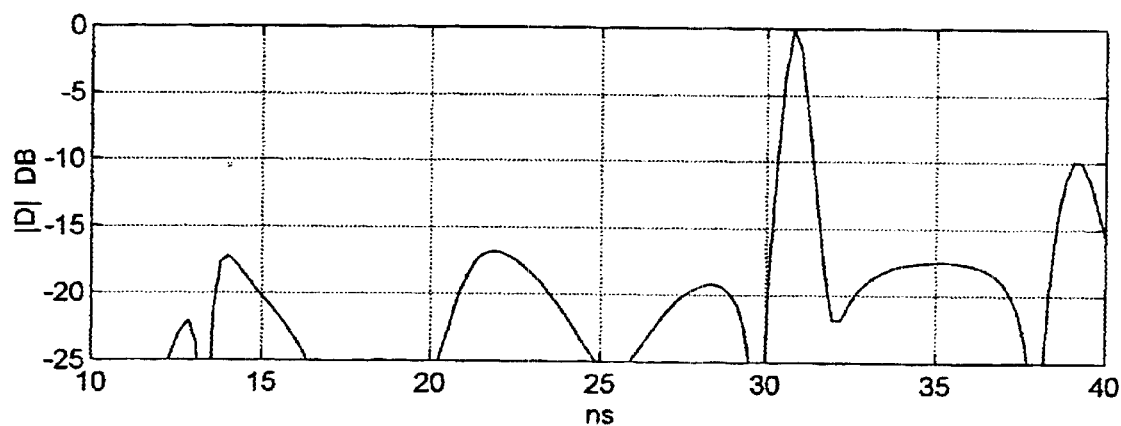
Figure 13I:
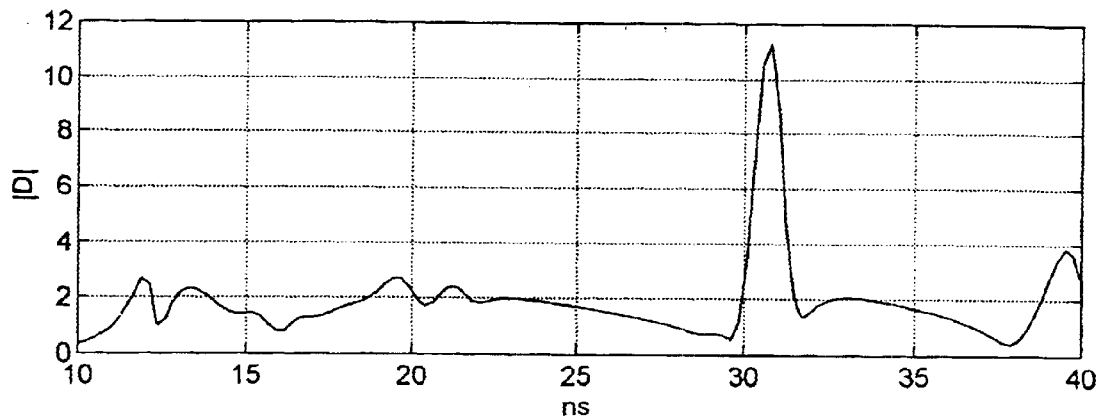
Figure 13J:
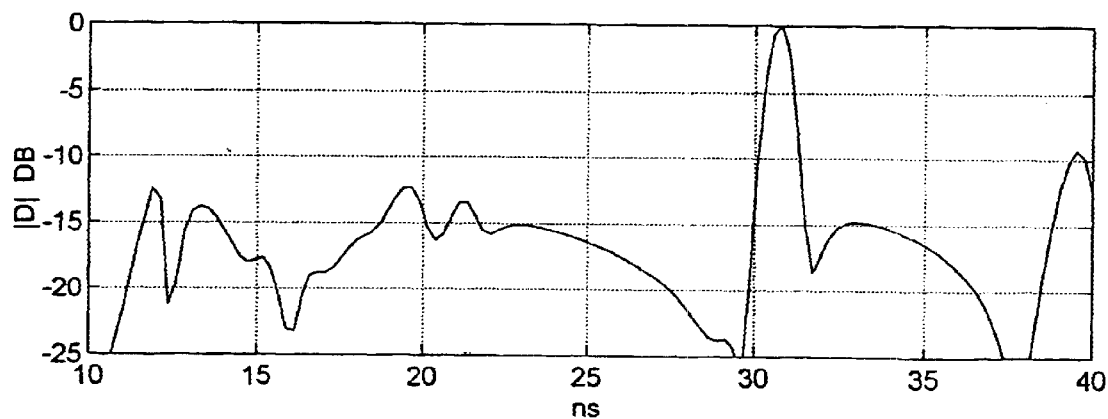
Figure 14A:
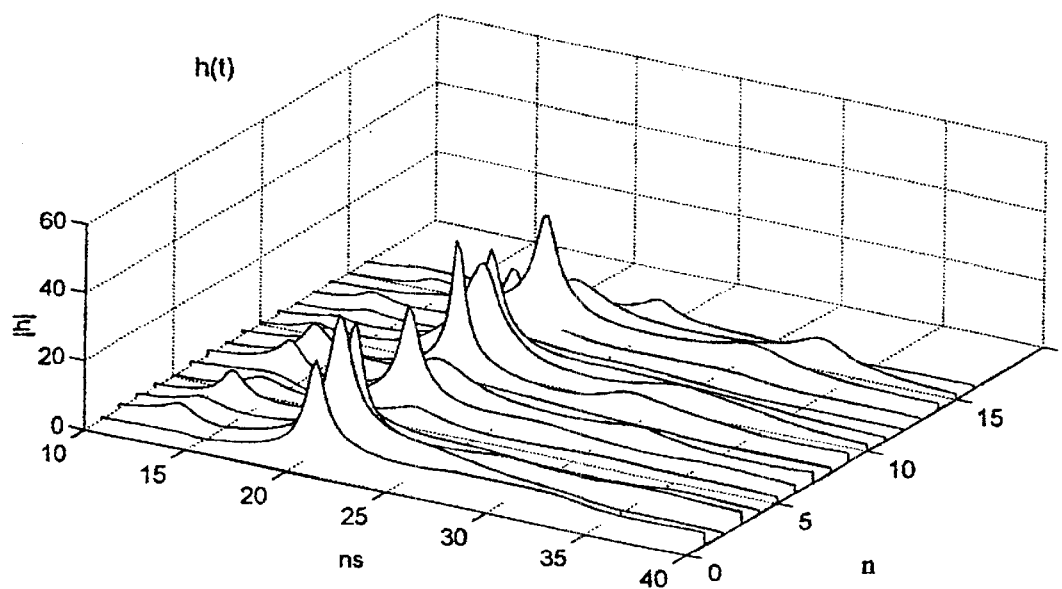
Figure 14B:
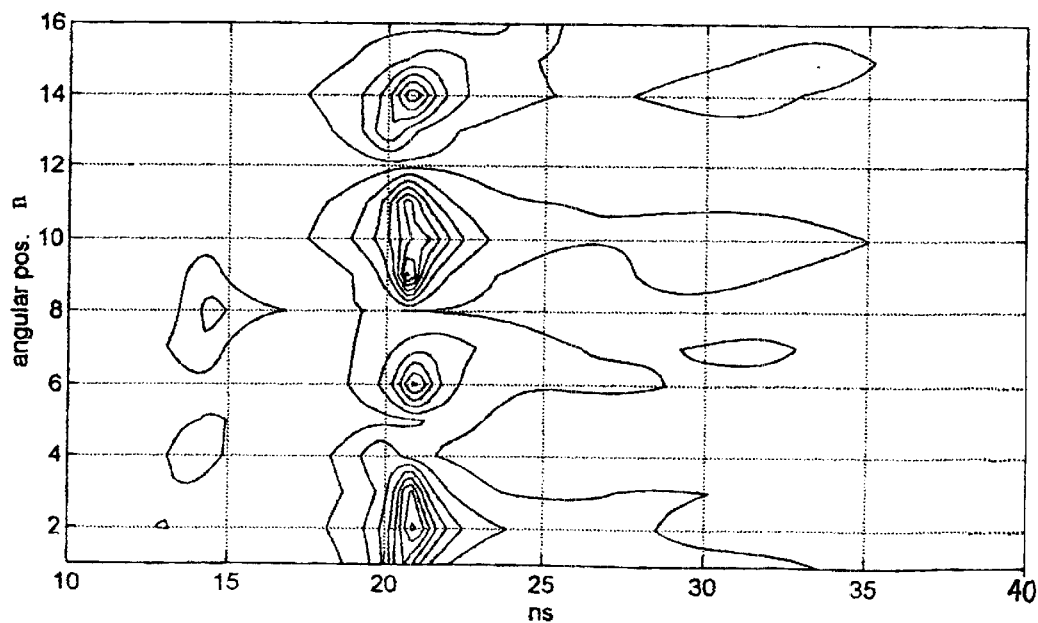
Figure 14C:
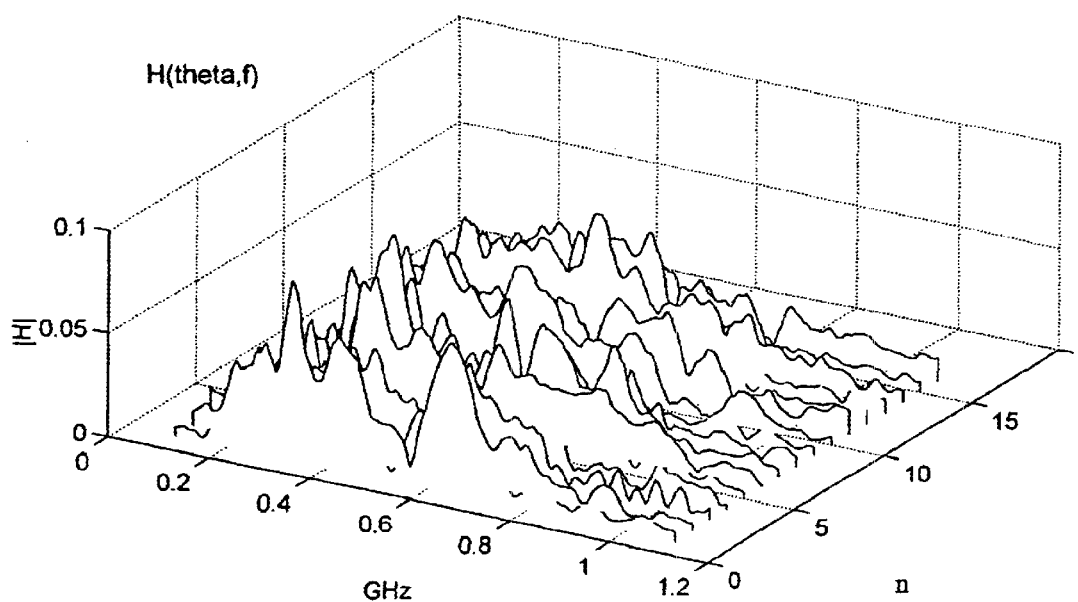
Figure 14D:
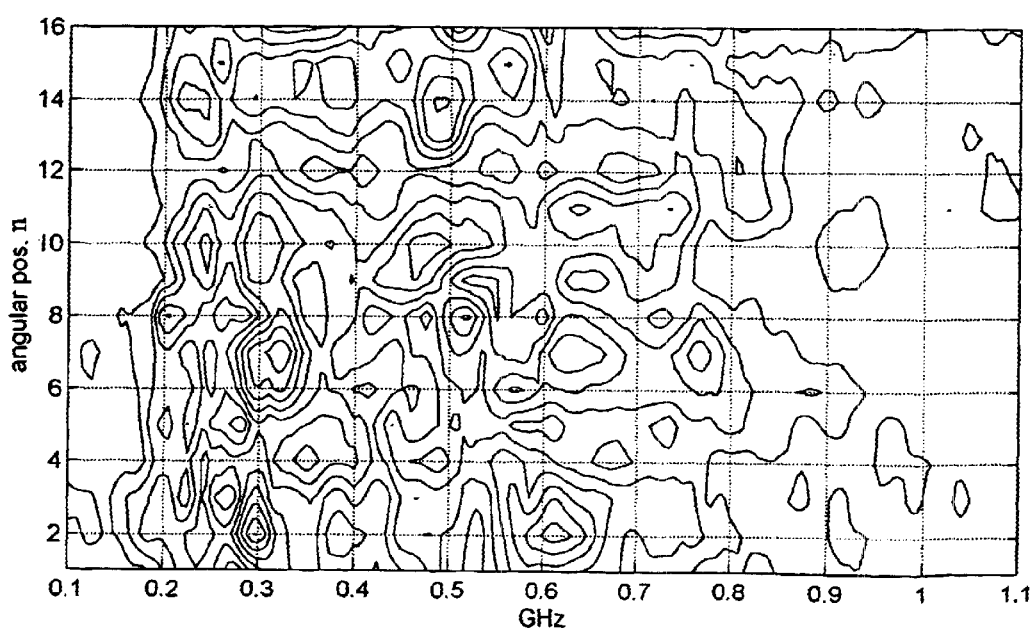
Figure 14E:
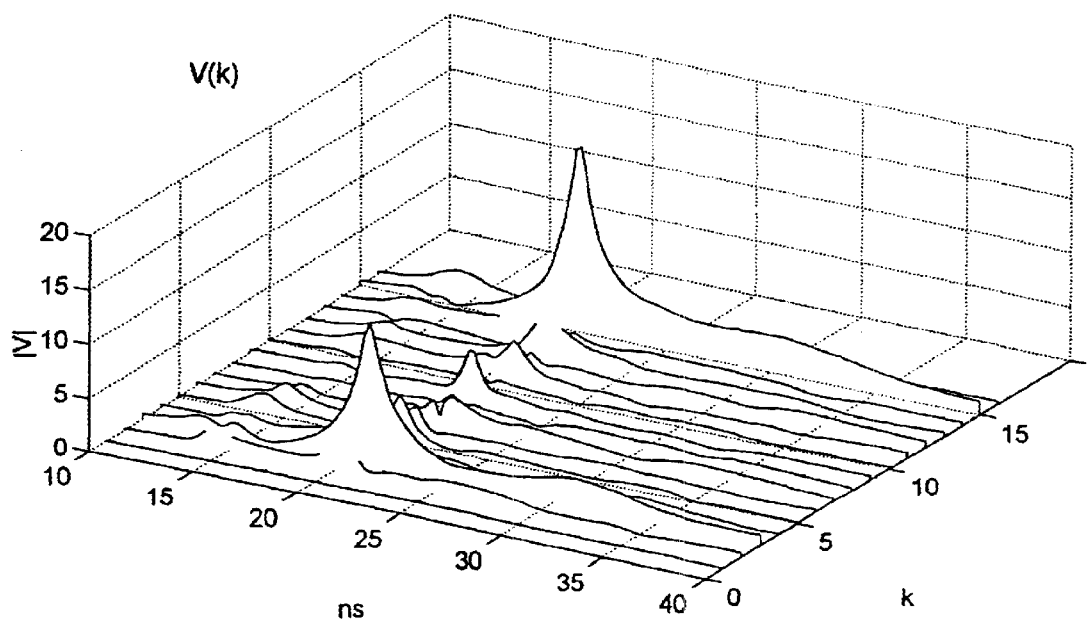
Figure 14F:
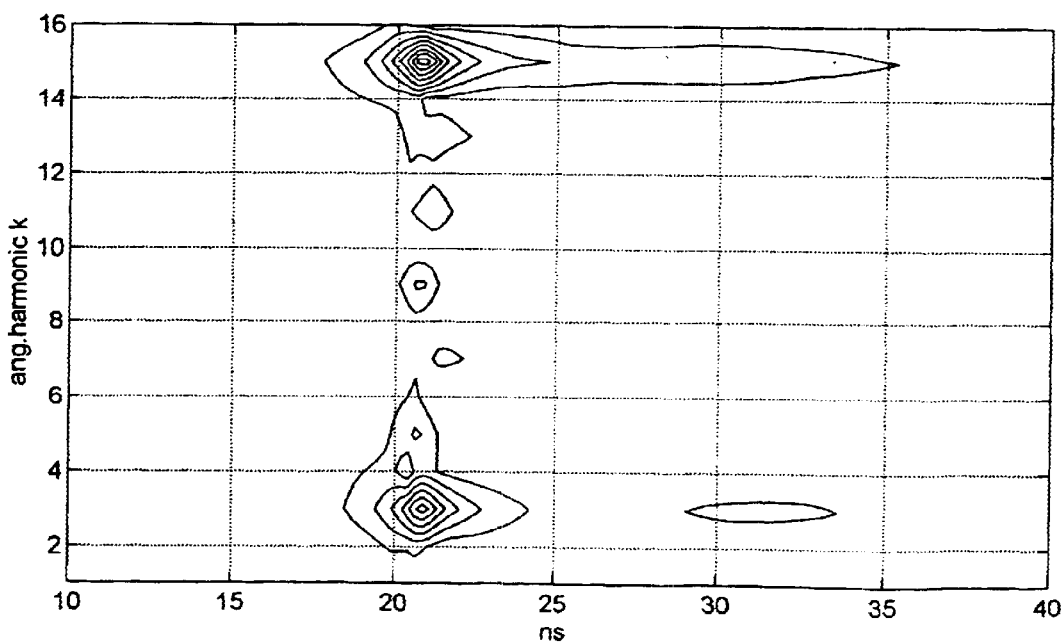
Figure 14G:
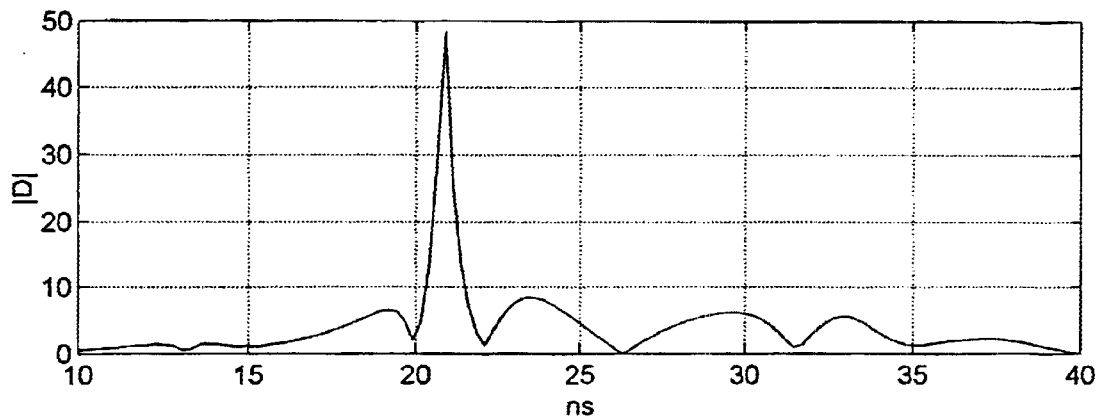
Figure 14H:
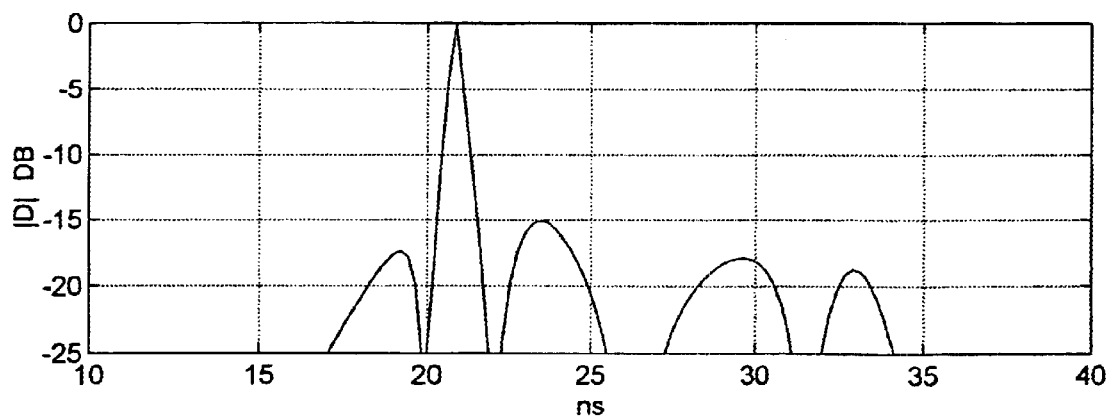
Figure 14I:
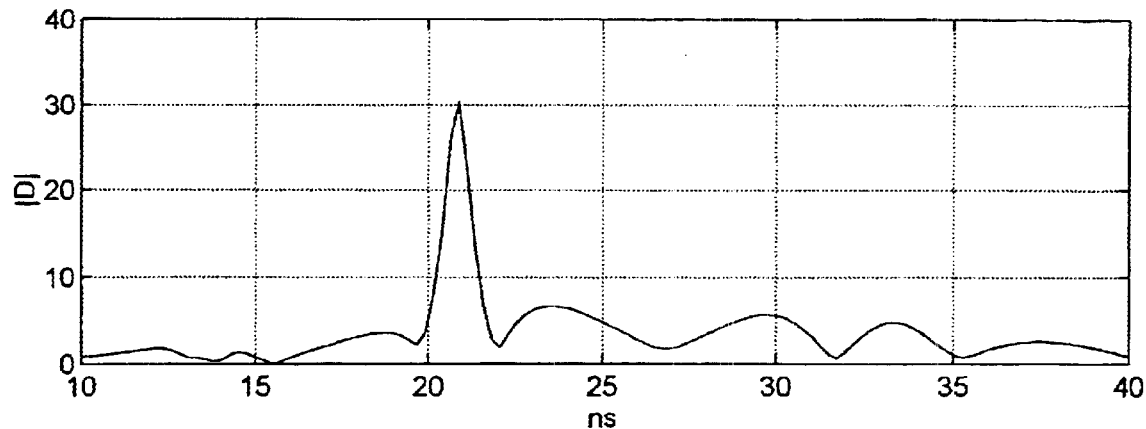
Figure 14J:
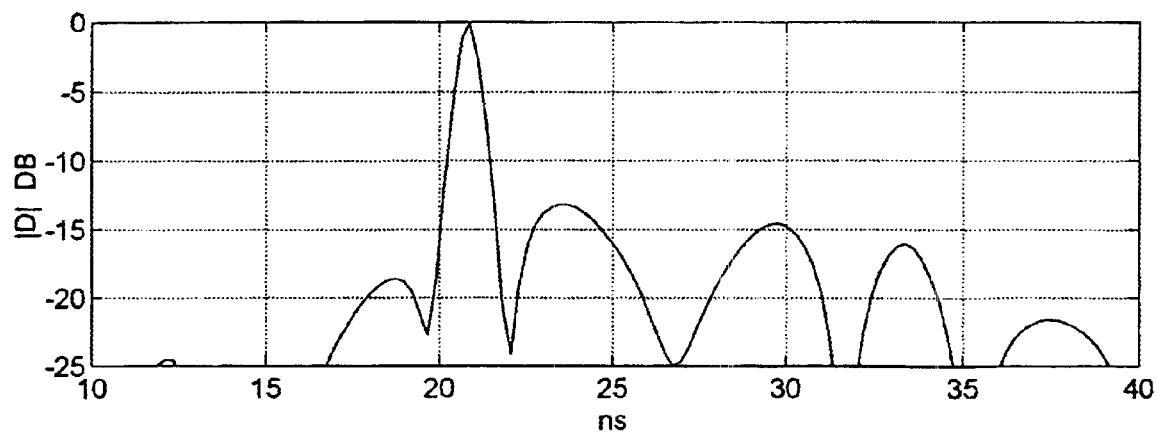

The FIGS. 13i)–13j), 14i)–14j), 15i)–15j), 16i)–16j) and 17i)–17j) are the result of calculations of the type mentioned in chapter 10 and illustrate detection curves. Are the result of above described procedure No. 2 through step 2.3.

Figure 15A:
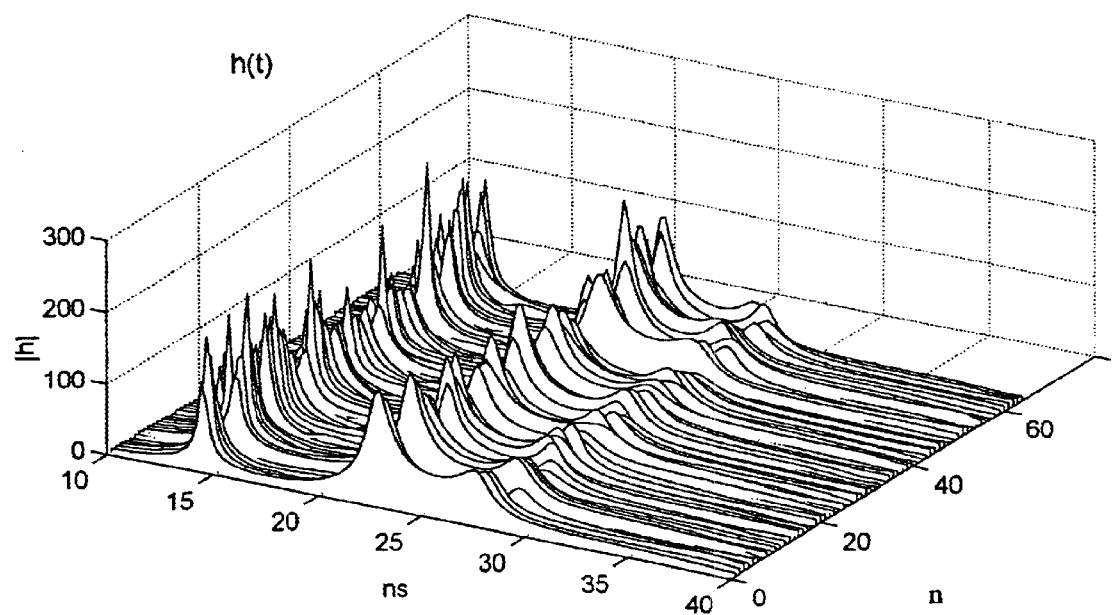
Figure 15B:
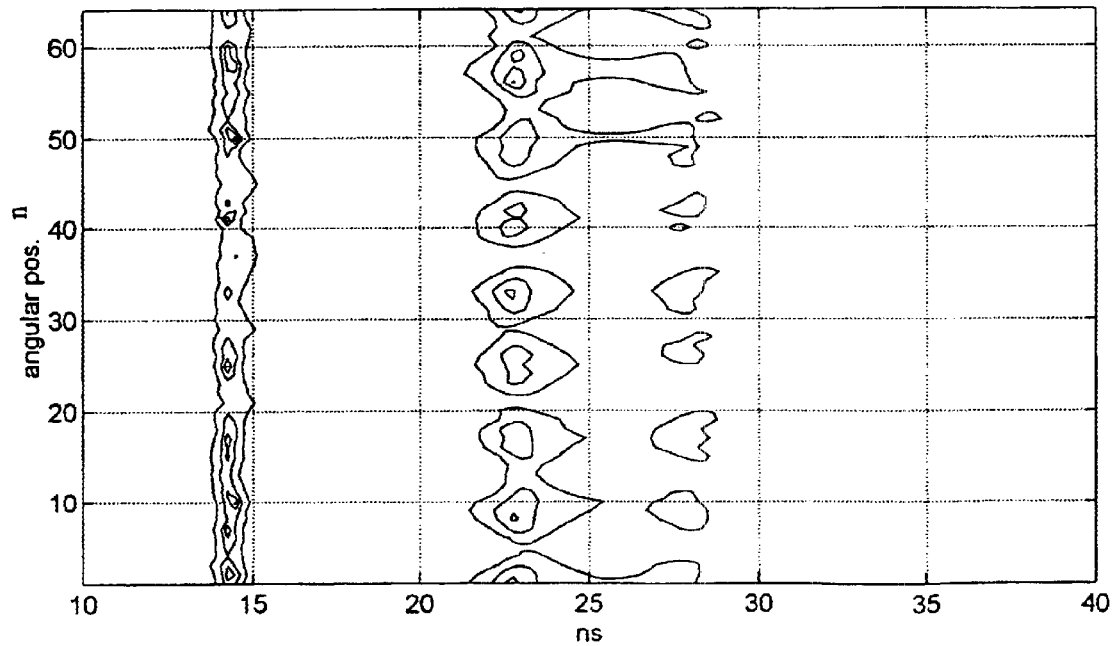
Figure 15C:
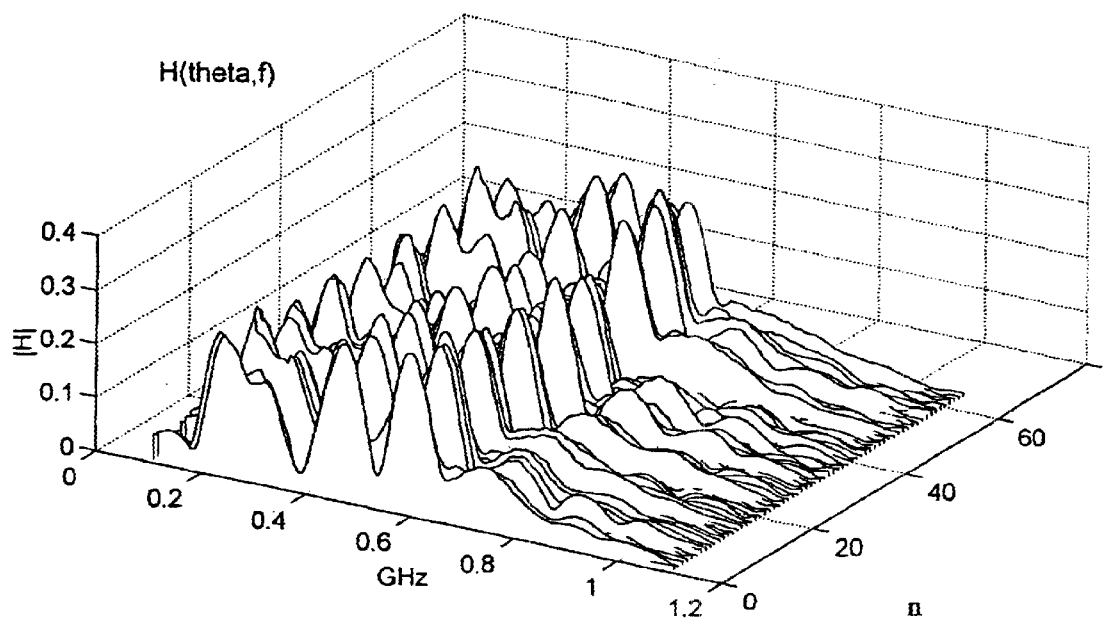
Figure 15D:
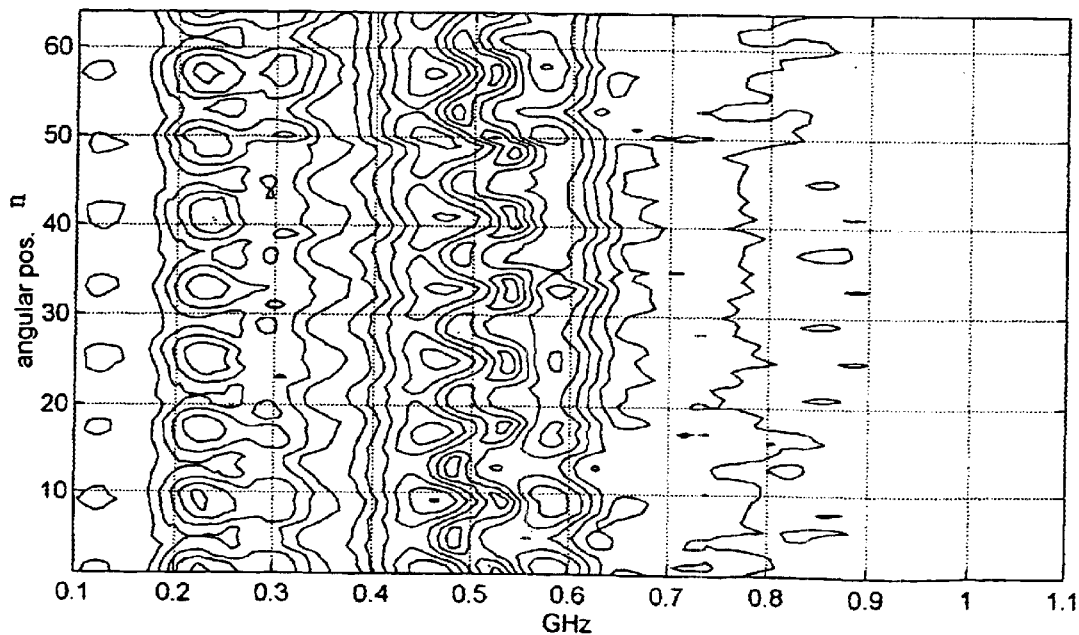
Figure 15E:
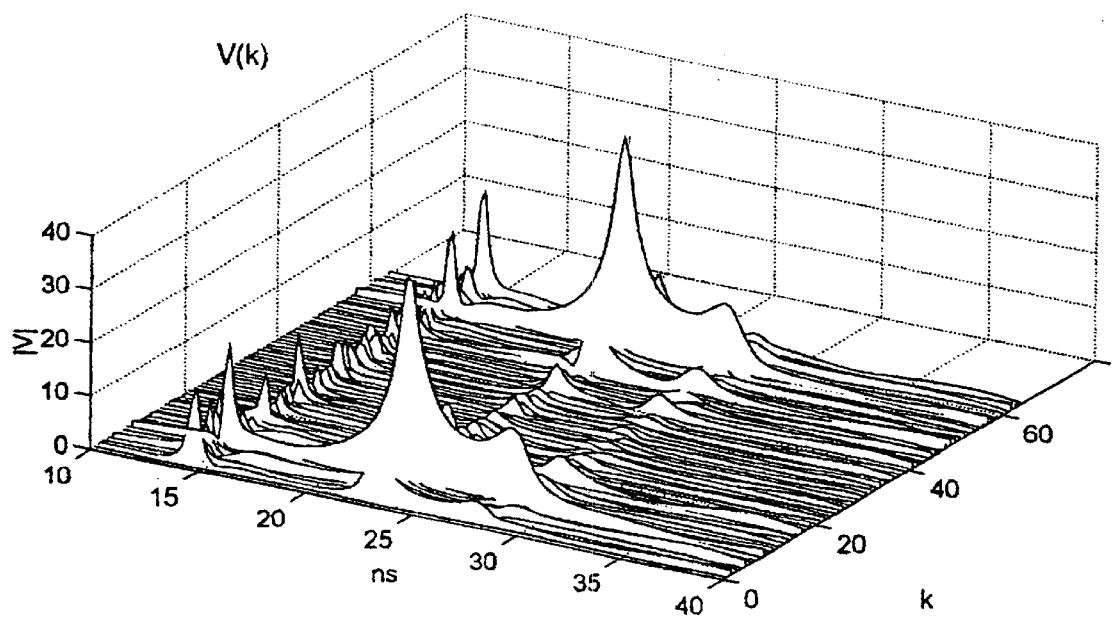
Figure 15F:
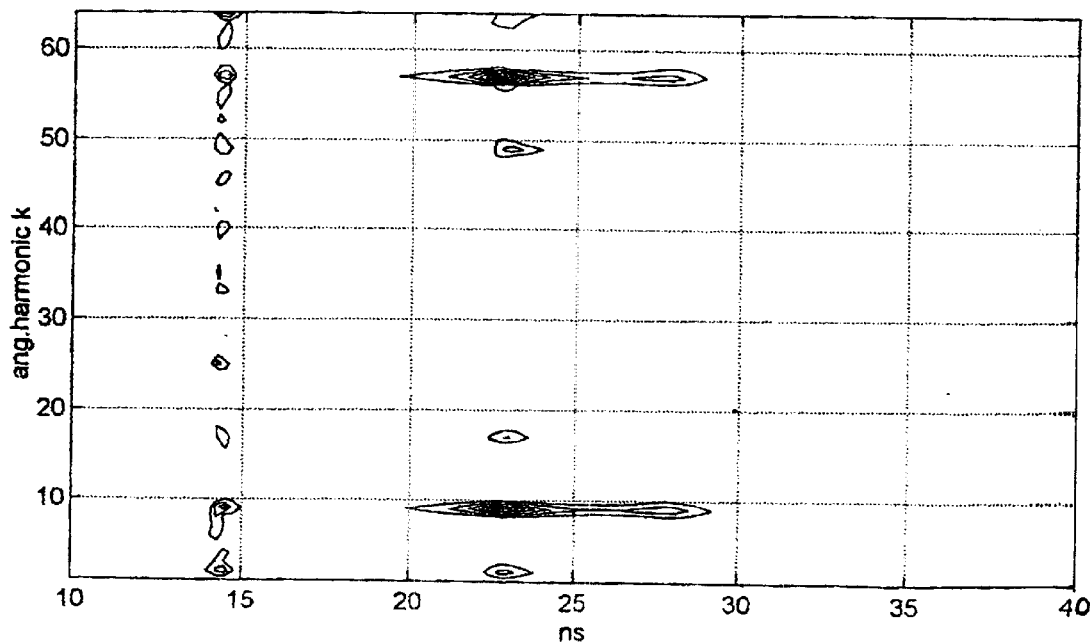
Figure 15G:
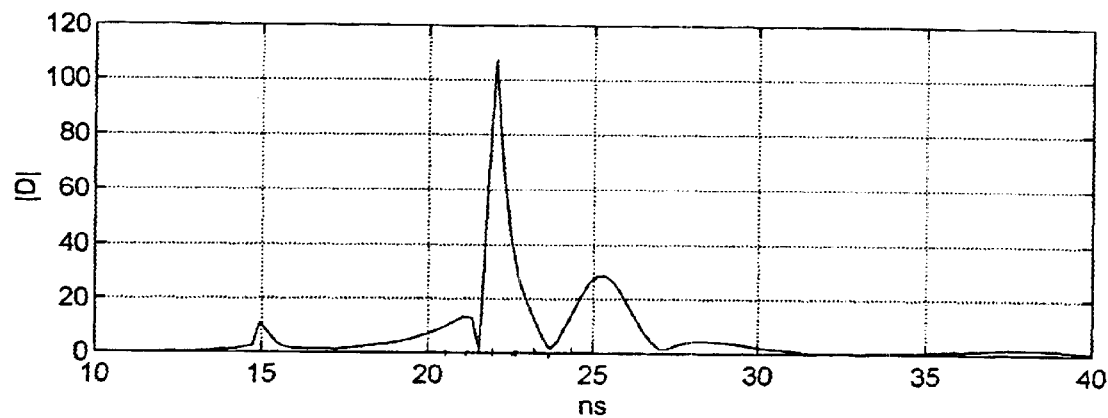
Figure 15H:
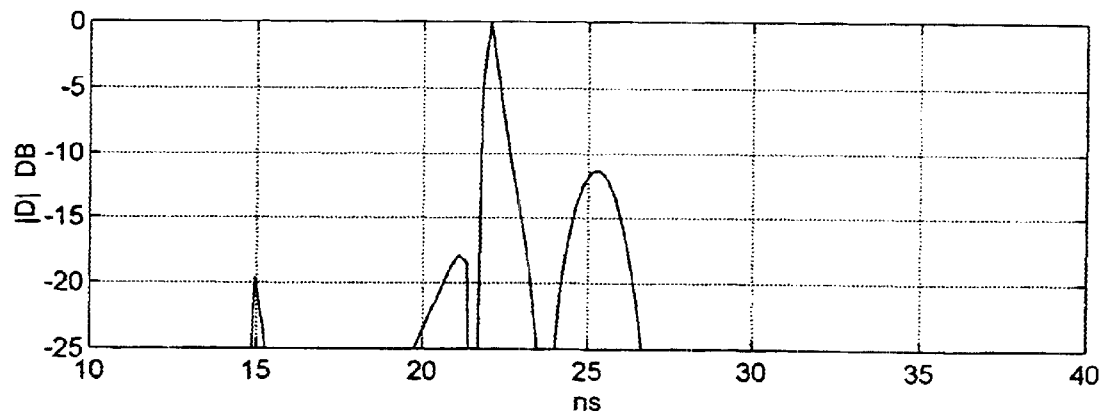
Figure 15I:
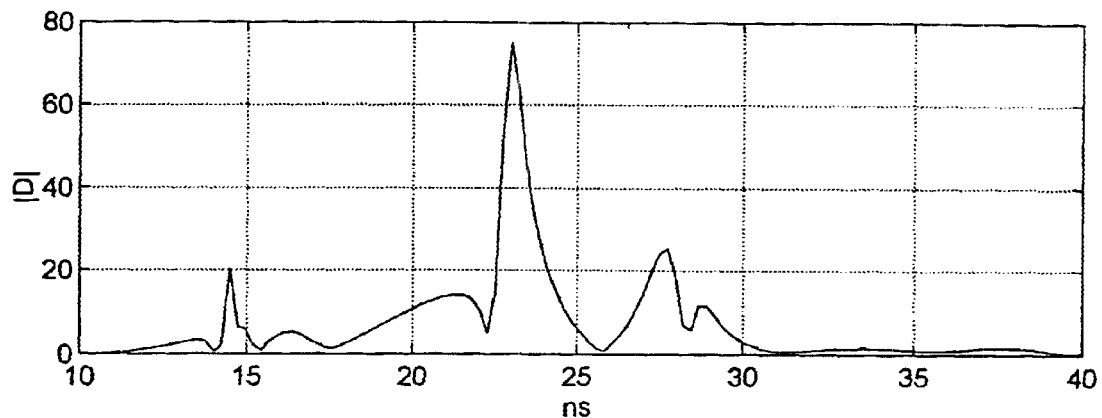
Figure 15J:
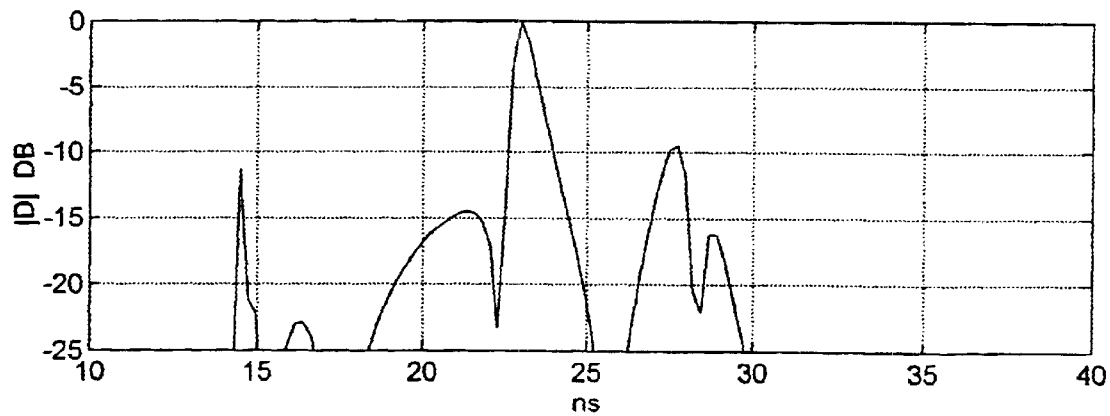
Figure 15K:
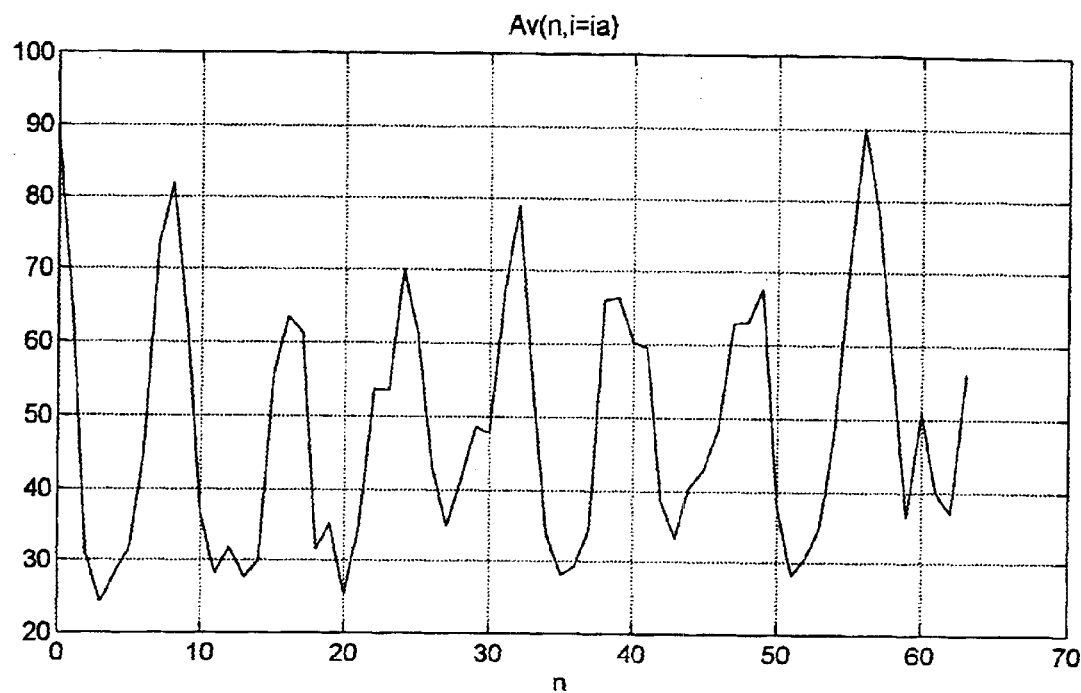
Figure 15L:
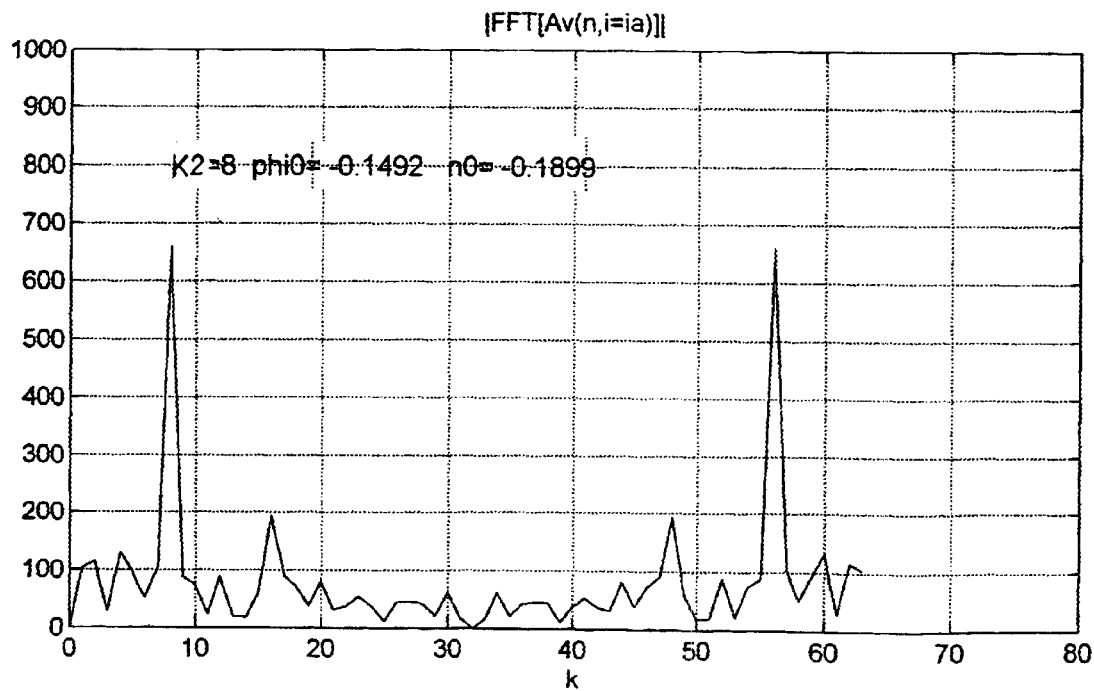
Figure 15M:
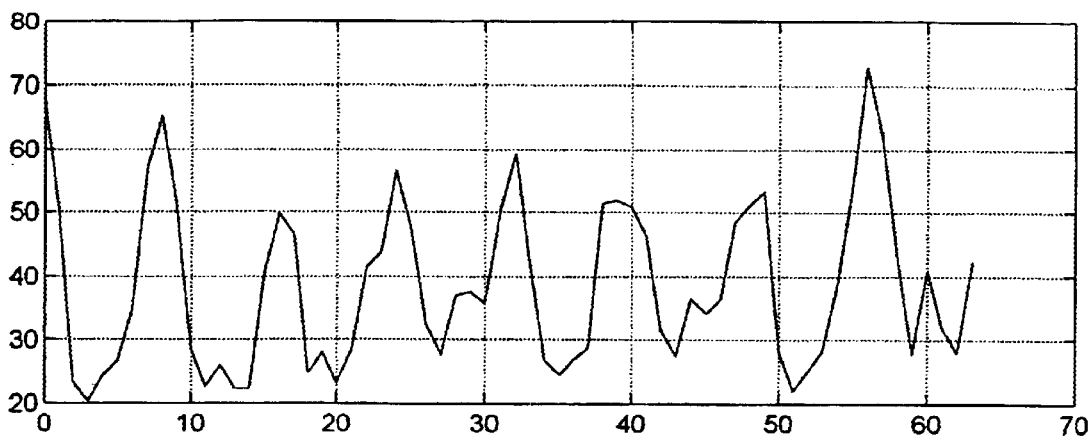
Figure 15N:
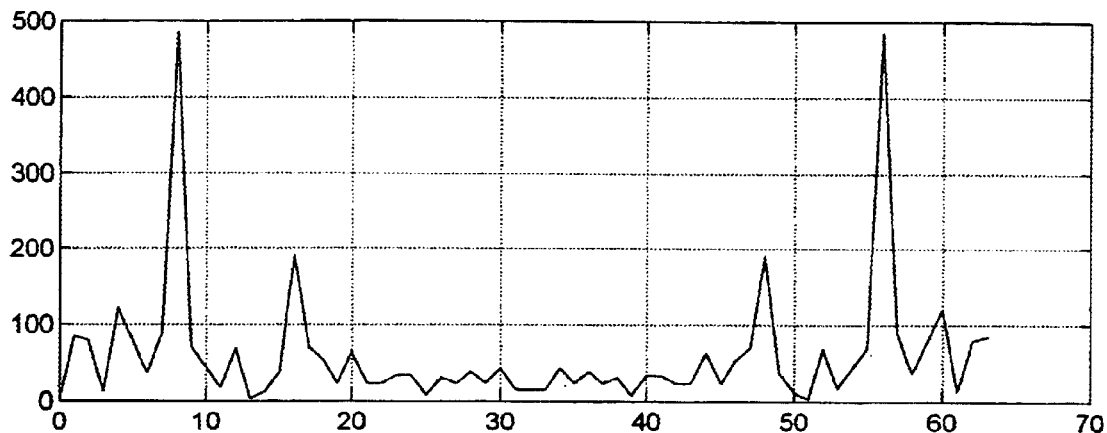

The FIGS. 15k) through 15o) illustrate an example of determination of direction by means of calculations as mentioned in paragraph 11 and illustrate calculation result included in the above described procedure No. 3.

Comments to the Examples:

Please notice: All the examples illustrated are measured by means of an antenna system in which the interior time delay and the time for direct coupling from transmitter to receiver in total constitute approx. 11 ns. This included delay is not deducted in the illustrated curves. Please notice: The illustrated curves in the examples are produced by connecting discrete values with straight lines and are, accordingly, not to be construed continuous functions or curves.

Example No. 1 illustrates in the FIGS. 13a) and 13b) a clear angular harmonic about 31 ns, appearing in the form of clear local maxima in the FIGS. 13e) and 13f)—and gives in the detection curve in FIG. 13h) a global maximum lying more than approx. 17 dB above the "noise floor". Consequently, clear detection of a pipe is seen which would by means of a ground radar without polarization rotation and analysis only have given a signal on the same level as many others, without characteristic features. In the FIGS. 13e) and 13f) the example shows that substantial periodicity exists around 15–20 ns and that these are sorted out by the total procedure. The angular harnomic corresponding to the $0^{th}$ order—i.a. a mean value—has a distinctive maximum around approx. 12 ns—this is also filtered away.

Example No. 2 is measured during normal, but advantageous circumstances. Here a safe detection is obtained by means of just a single rotation with 16 measurements. If the number of rotations is halved corresponding results are obtained. It is seen that the raw frequency measurements in the FIGS. 14c) and 14d) demonstrate a significant degree of periodicity.

Example No. 3 illustrates a measurement with substantial "clutter" in a depth corresponding to approx. 14 ns. It is seen how this clutter in the final detection curve in FIG. 15h) is dampened by 20 dB compared to the global maximun, positioned in approx. 22 ns.

The FIGS. 15k) to 15o) demonstrate an example of determination of direction. 15m) is the amplitude of the function corresponding to the function h(k,t) in the FIGS. 15a) and 15b) for t=21,8 ns, which is the position of the global maximum of the detection curve FIGS. 15g) and 15h). The periodicity is clearly seen. Angle index n is used as horizontal unit.

In the middle 15n) the absolute value of the FFT calculation is illustrated above the before mentioned curve with number of points N=64.

Figure 15O:
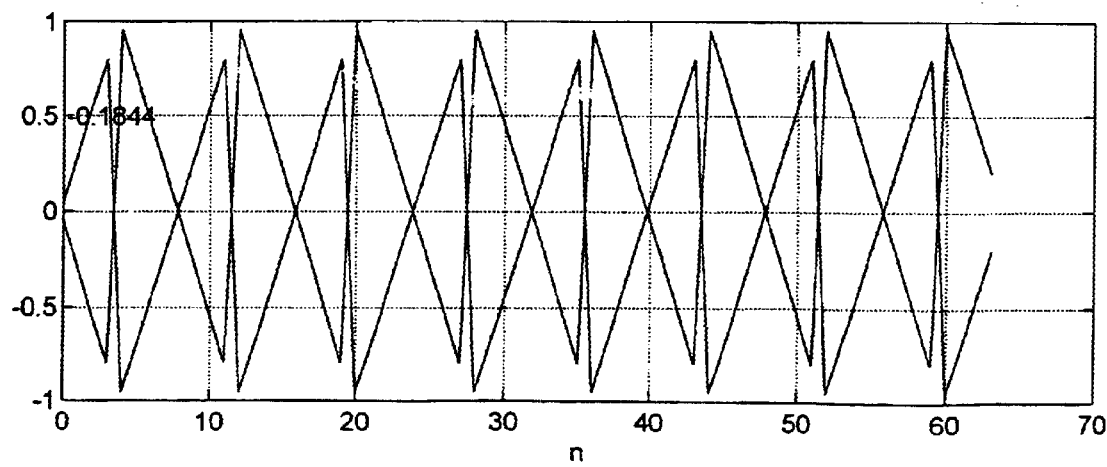
Figure 16A:
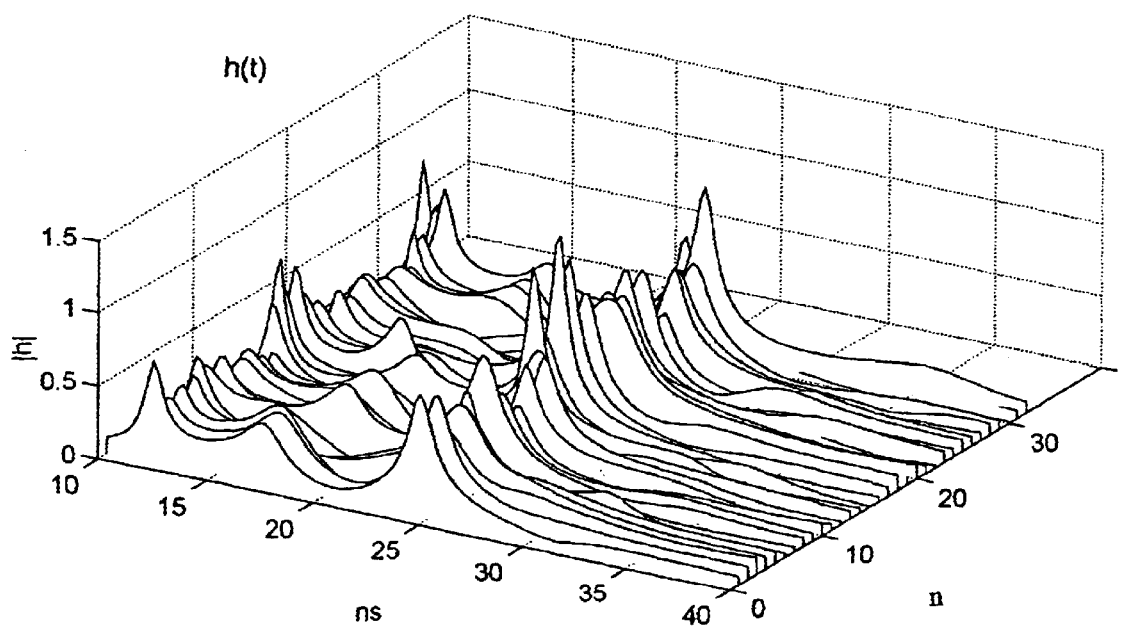
Figure 16B:
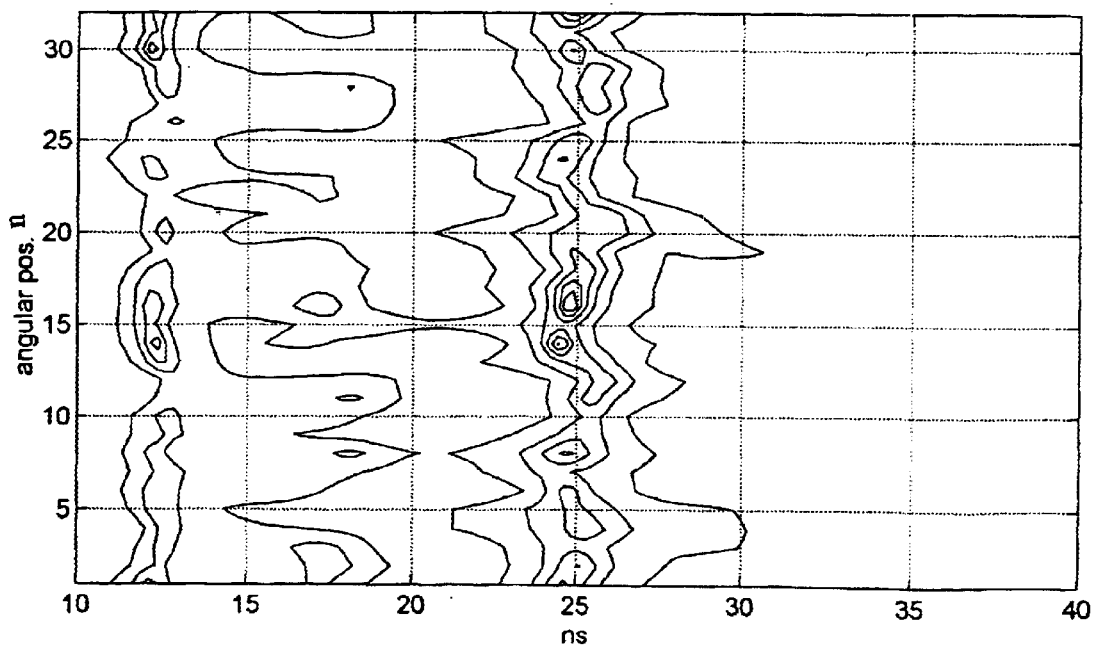
Figure 16C:
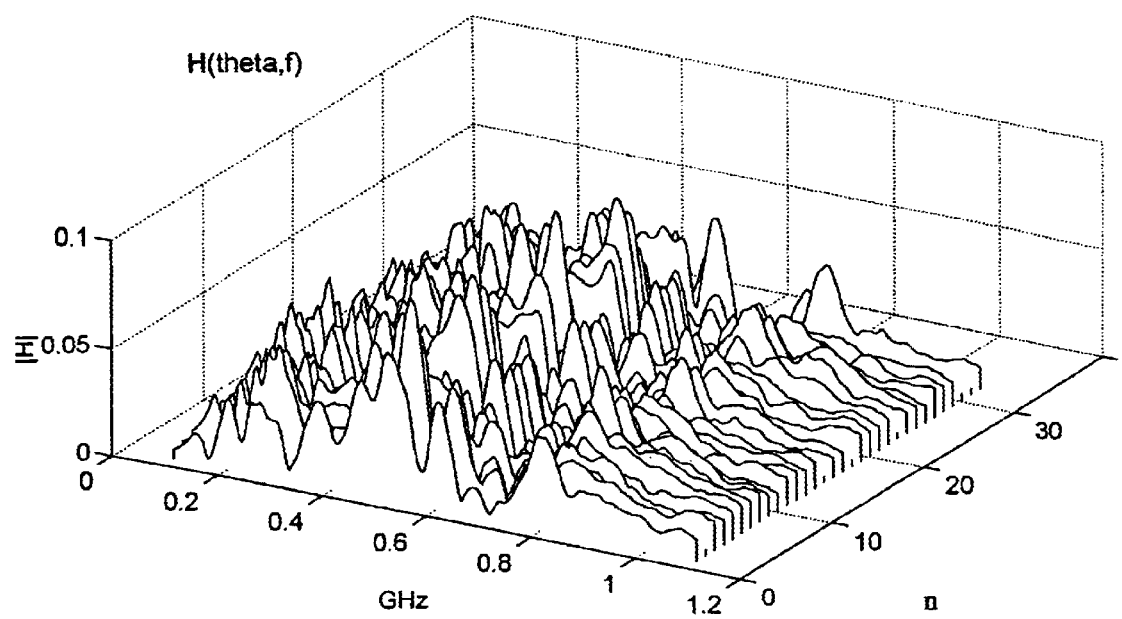
Figure 16D:
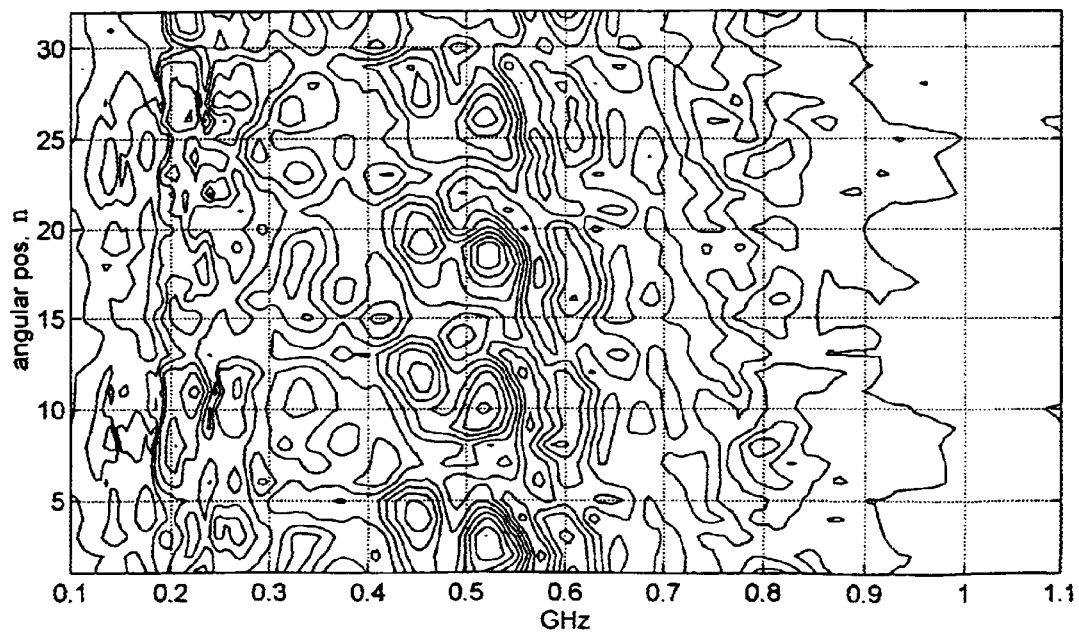
Figure 16E:
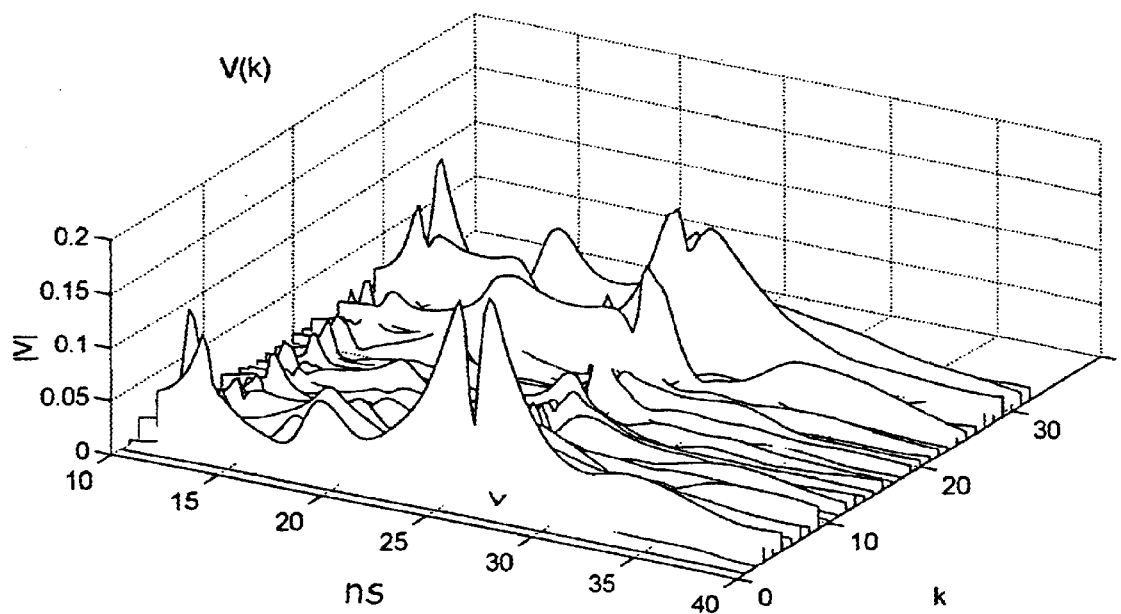
Figure 16F:
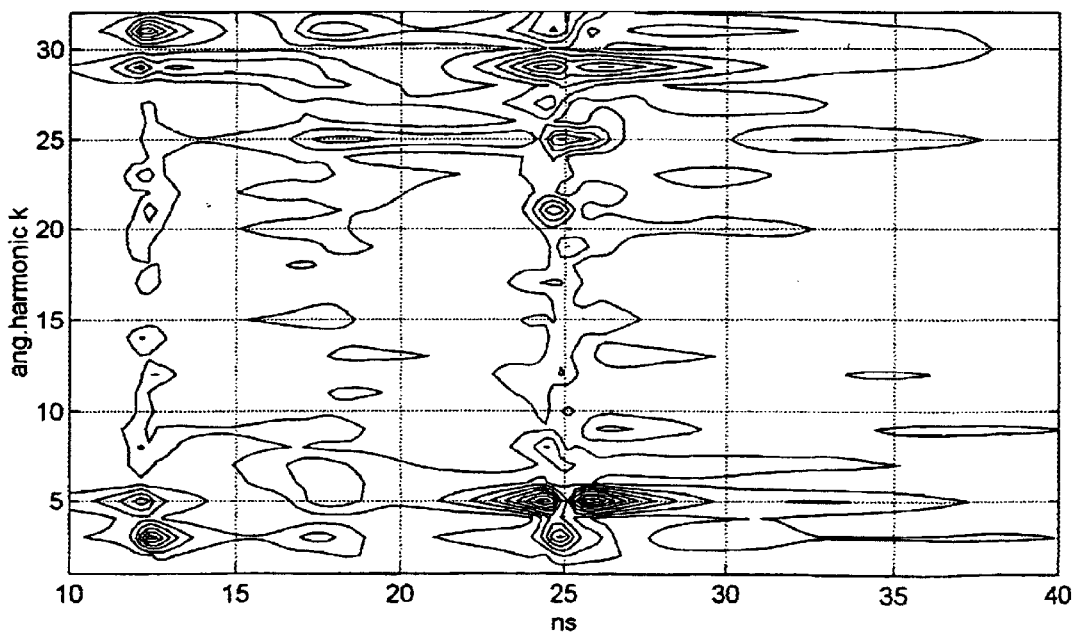
Figure 16G:
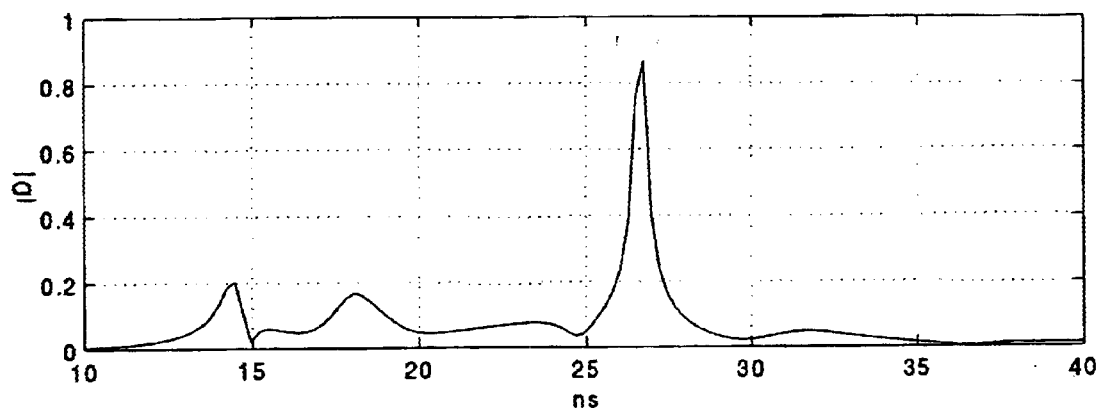
Figure 16H:
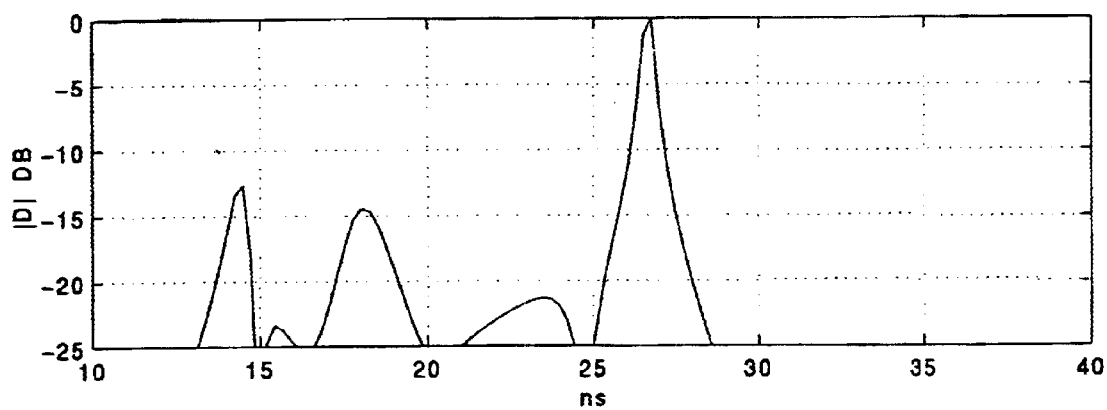
Figure 16I:
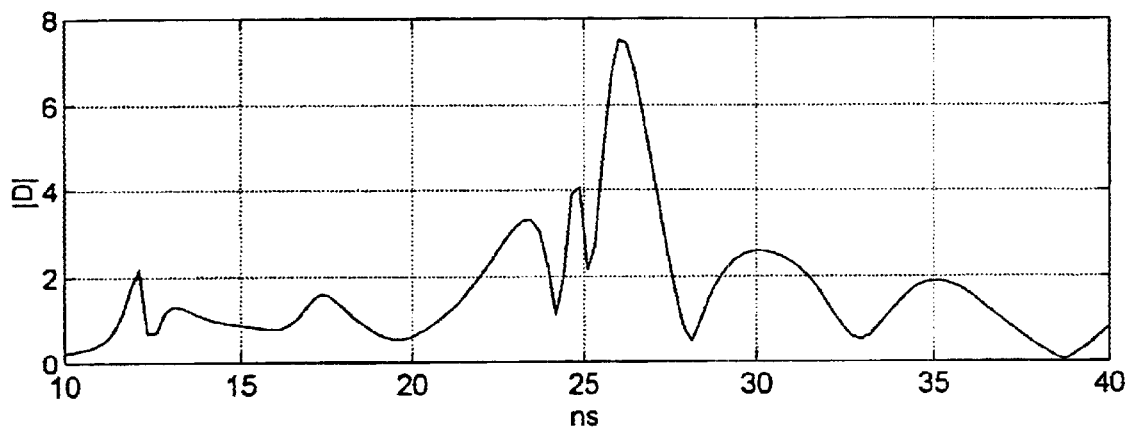
Figure 16J:
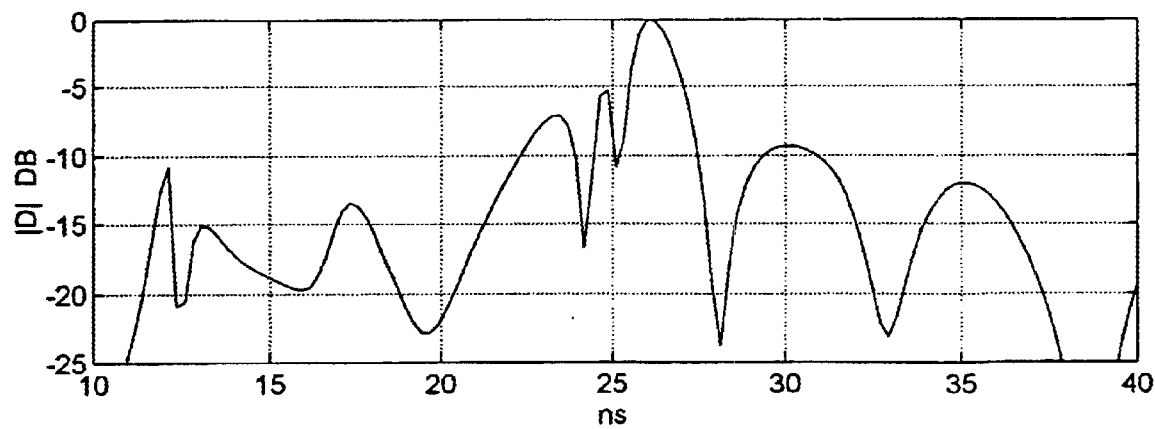

The lower part of FIG. 15o) illustrates the phase of the two angular harmonic corresponding to two periods per rotation (type-1 antenna), corresponding to $k_1=8$ and $k_1=56$ during rotation of the antennas. The figure −0.1844 is the calculated angular position calculated in number of angular steps in accordance with the above mentioned formula (32b). From the uppermost curve 15m) and when considering the FIGS. 15a) and 15b) it is seen that the calculated position of the object as being almost coincident with the position of the first measurement (n=0) is correct.

Figure 17G:
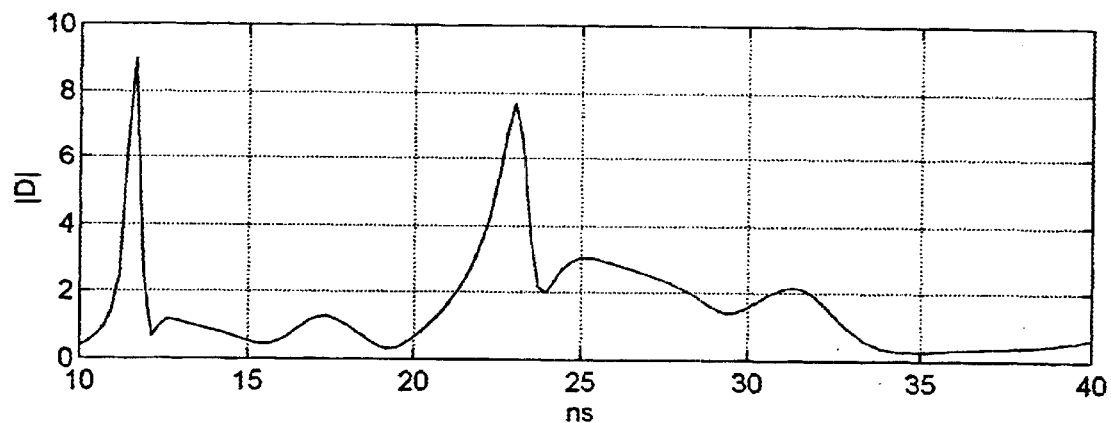
Figure 17H:
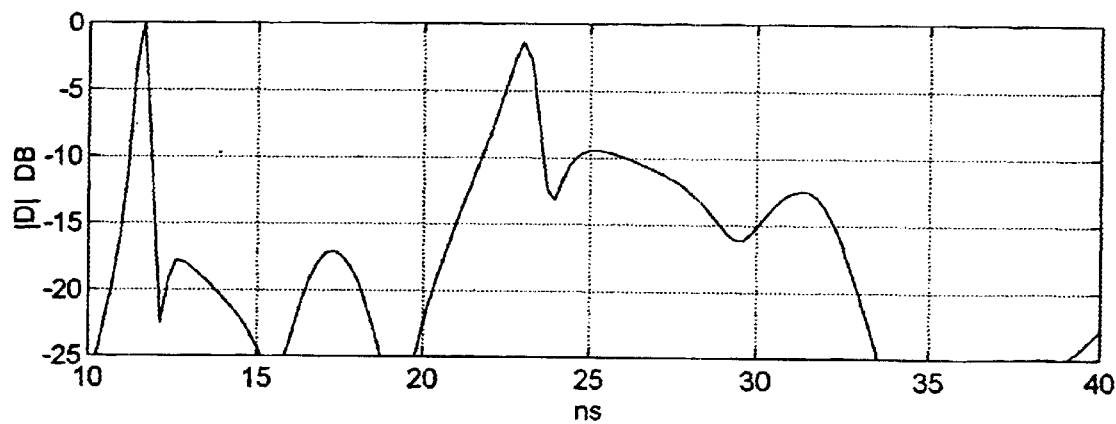
Figure 17I:
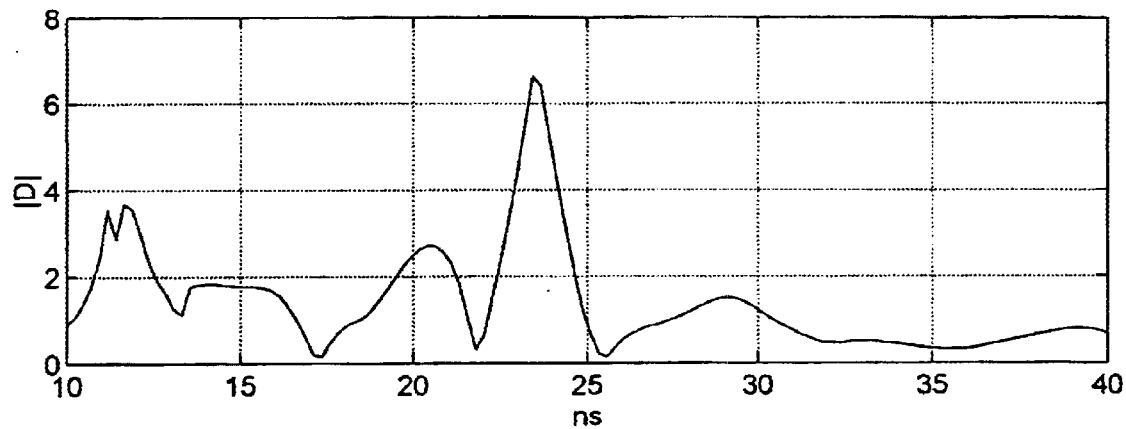
Figure 17J:
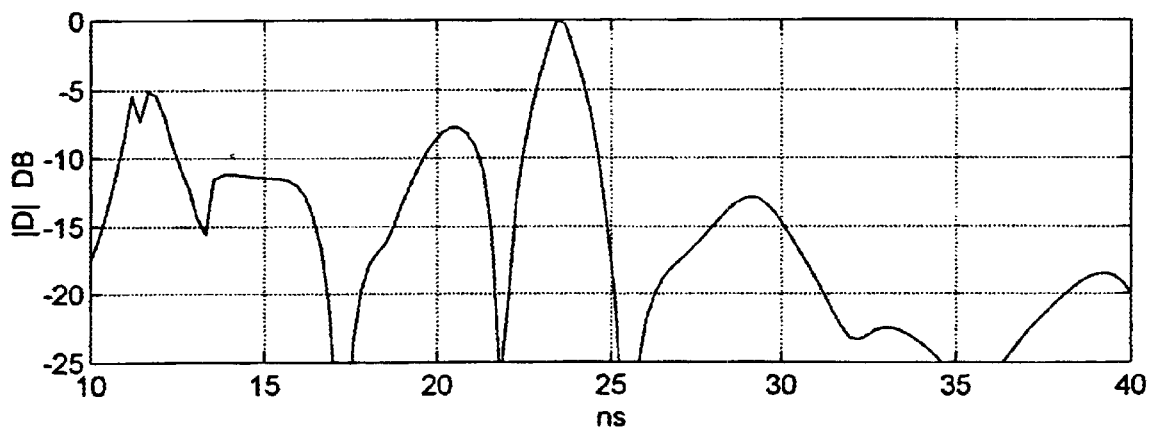

Example No. 5 illustrates how in spite of a very poor degree of periodicity in the frequency measurements (FIGS. 17c) and 17d)) and in spite of considerable clutter around approx. 12 ns (FIGS. 17a) and 17b)), a useful detection in the FIGS. 17g) and 17h) is obtained in which the global maximum in approx. 12 ns may be rejected if we do not accept an object immediately below the surface—likewise in the FIGS. 17i) and 17j).

14. POSSIBLE APPLICATIONS

The present invention will among other things be appliacable for:

- manually borne detector for locating of cables, pipes and optical fibres. Such a detector will be able to give the operator an immediate indication of presence, position and orientation of such objects. The detector may be moved above the ground in an arbitrary pattern and enable a burried object to be followed.
- corresponding detector mounted on vehicles.
- automatic detector mounted on excavators or other machinery for movement of soil with the aim of avoiding damage of objects.

mapping of cables, pipes and other underground objects. The detector may be coupled together with positioning equipment and equipment for data collecting. Typically, by means of mapping a scanning in accordance with a predetermined pattern will be performed.

Instrument for scanning of the structure and condition of materials including concrete.

instrument for location of pipes and cables in building constructions: floors, walls e.g. of concrete and other materials.

15. ANTENNA CONSTRUCTIONS

Figure 10A:
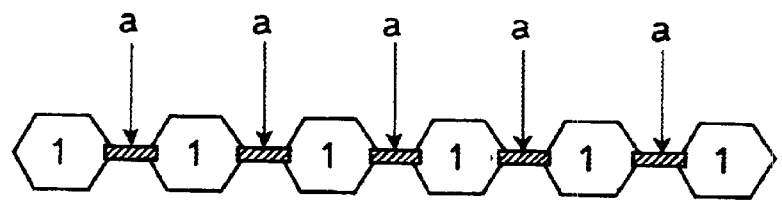
FIG. 10a illustrates the half of such a dipole. The number of elements may be varied.
Figure 10B:
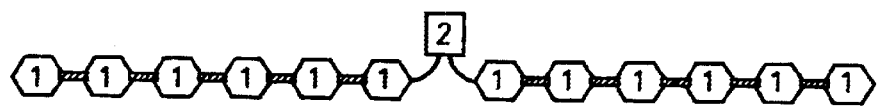
FIG. 10b illustrates two such halfs with feeding balun 2.
Figure 11A:
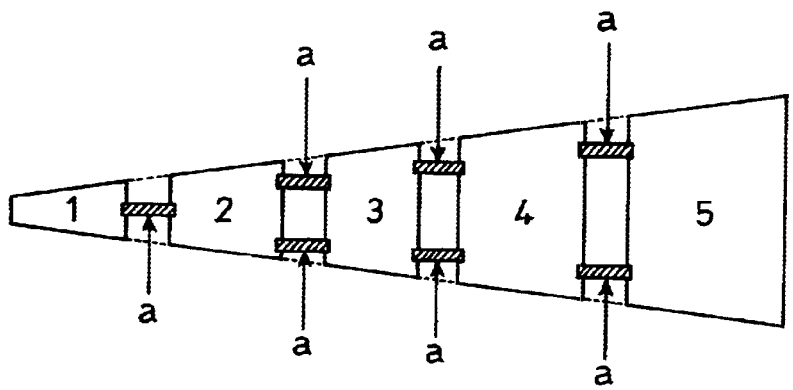
FIG. 11a corresponds to the half of such dipole. The number of elements may be varied.
Figure 11B:
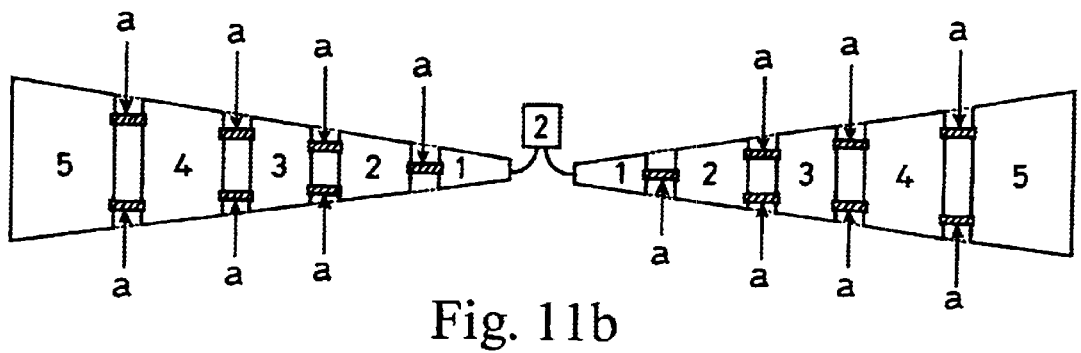
FIG. 11b illustrates two such halfs with feeding balun 2.
Figure 12:
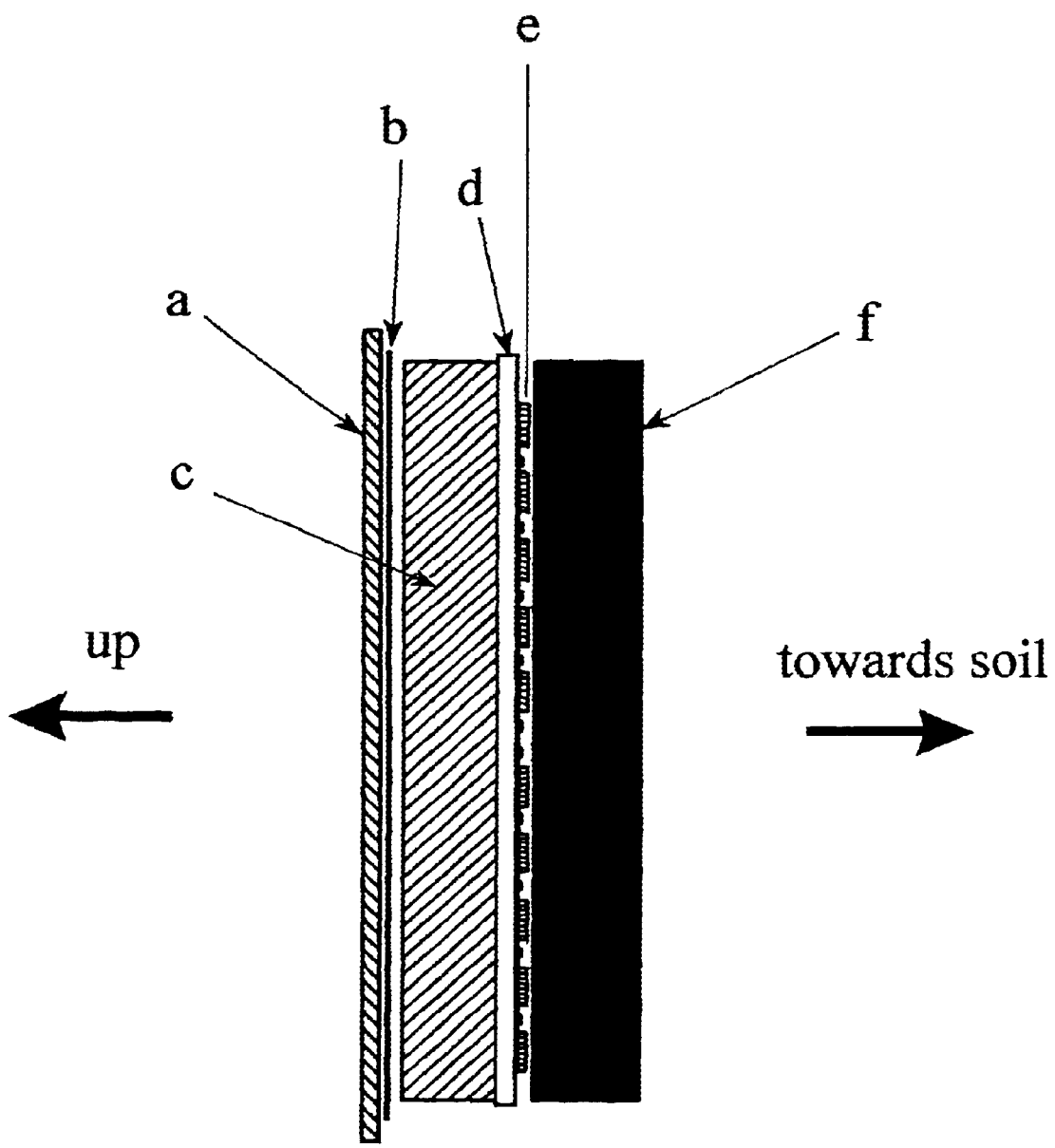
FIG. 12 illustrates the fundamental construction of the antenna in its entirety in a cross section along a line corresponding to a diameter in FIG. 9a or 9b. The antenna elements e lies on a supporting plate d of a suitable dielectric material. The entire construction is carried by an uppermost plate a which may be of any material in regard to electricity. Below the supporting plate a a shielding foil or metal plate b is situated preventing inward and outward radiation upwardly. c is a suppressing materiale, for instance of the types $$ECCOSORB 1s$$ or 1s$$ of the brand Emerson Curning or combinations thereof. Below the active elements a plate of a dielectric material exists. The antenna elements e consist of plane metal parts connected by resistive coupling elements as indicated in FIG. 10 or in FIG. 11. f is a dielectric materiale which protects the active elements mechanically as well as provides electric adjustment. The relative permittivity of such material will typically be between 3 and 10.

Stepwise rotation of the polarisation without mechanical means is made in the best manner by shifting between similarly designed antennas positioned in appropriate angles and with displaced centers as illustrated schematically in FIGS. 3, 4 and 9. In the FIGS. 3 and 4 linear thin dipoles are outlined. In order to obtain sufficient frequency band width it is an advantage to make the arms of the dipole conical as outlined in FIG. 9. In order to avoid or at least dampen reflections from the ends of the dipole arms (corresponding to standing waves along the axis of the dipole) a kind of damping is often used. Our preferred damping is a combination of damping material positioned close to the antennas above the antennas as illustrated in FIG. 12 and use of serial, resistive coupling elements as illustrated in FIGS. 10 and 11. The resistive elements mentioned may consist of a resistor in the form of an ordinary resistor for surface mounting and having a varying value so that the highest values are used farthest away from the center of the dipole. Typical values are from 10 ohm to 100 ohm. The resistive elements may also consist of a series coupling of the above mentioned resistor and a switch diode for instance of the type PIN. By applying a DC voltage between the end points of the dipole and the center a possibility of bringing the PIN diodes in conducting or cutoff mode is obtained. One of the effects of such an arrangement is that the dipole in cutoff mode will have less electromagnetic coupling to closely positioned similar dipoles than without the diodes. In this way it becomes possible to reduce the size of the total construction without disturbing coupling between the active and passive dipoles. Undesired couplings between the dipoles may cause a deteriorated linearity of the polarisation and undesired ringing in the signal. Only those antennas which are desired to be active have a DC voltage applied—often two at a time—causing the PIN diodes to conduct.

The switch arrangement outlined here having serial PIN diodes allows dipoles to overlap each other without significant mutual coupling.

A dipole with four metal surfaces and three resistive coupling elements with or without PIN diodes of a total length of 24 cm are demonstrated by the inventores and are measured to have a frequency characteristic which is fairly flat in the area 100 MHz to 900 MHz. The rest of the construction was as outlined in FIGS. 11 and 12.

The present invention comprises application of splitted antennas, coupled together with resistor links with or without switch diodes for use in ground radars.

16. REFERENCES

1. U.S. Pat. No. 4,728,897 Gunton et al.
2. U.S. Pat. No. 4,812,850, Gunton et al.
3. Balanis C. A., *Advanced Engineering Electromagnetics*, John Wiley & Sons, 1989.
4. Oppenheim A. V. & Schafer R. W., *Discrete-Time Signal Processing*, Prentice Hall, 1989.
5. Turner G. & Siggins A. F., *Constant Q attennuation of subsurface radar pulses*, Geophysics, vol 59, No 8, August 1990, p 1192–1200.
6. Hoekstra P. & Delaney A., *Dielectric Properties of Soils at UHF and Microwave Frequencies*, Journal of Geophysical Research, vol.79, no.1, April 1974 pp 1699–1708.
7. Therrien C. W., *Discrete Random Signals and Statistical Signal Processing*, Prentice Hall, 1992.
8. U.S. Pat. No. 4,062,010, Young et al.
9. Lizuka K., Freundorfer A. P. m.fl., *Step-frequency radar*, J. Appl. Phys. vol.56, No.9, November 1984.
10. U.S. Pat. No. 4,967,199 Gunton et al.
11. Chignell R. J. & Dabis H. S., *A Pipe Detection Radar With Automatic Three Dimensional Mapping*, i Proceedings of the 6th International Conference on Ground Penetrating Radar GPR'96 Sendai Japan, 1996.

17. TIME FILTERING OF FREQUENCY DATA

In order to emphasize radar signals originating from a given depth interval it is often an advantage to perform a filtering of the measured frequency signal before it is transformed to the time domain. The filtering takes place by means of a signal filter the function of which may, considered mathematically, be identical to an ordinary filter which is used for time idependent signals—however differing in the effect that what is normally construed in the frequency characteristic of the filter now becomes a time characteristic. If the basis is the frequency representation of a signal a filtering of this is performed so that parts of the signal corresponding to different time intervals are weakened or reinforced—for instance a high pass filtering of the frequency representation will suppress the early parts of the signal. Since measurements are made in the frequency domain by means of a Step Frequency CW radar it is advantageous to make a filtering before transformation of the time domain. The effect of the filtering in the frequency domain by means of an ordinary filter may the contrued mathematically so that time and frequency in the Fourier transformation are included in a product in a symmetrical manner. Furthermore, it may be construed by watching that the phase in the frequency representation is proportional with the time variable—late parts of the signal correspond to bigger phase variation per frequency unit than early parts.

Ground radar signals are very often characterized by the early parts of the signal—often originating from undesired coupling from transmitter to receiver—contain much more energy that the weaker signals from objects in the ground. By filtering the frequency dependent signal by means of a high pass filter before transformation to the time domain the above mentioned early, undesired parts may be filtered away. High pass as well as band pass filters may advantageously be applied.

Filtering as described here may in a possible embodiment be applied in connection with the procedures Nos. 5 or 6 described in paragraph 12. In this case the filtering will be inserted after chapter 5.1 or 6.1 (corresponding to procedure No. 4).

Corresponding filtering may also advantageouly be applied if inverse Fourier transformation is used for transformation from frequency to time. In this case the filtering is applied before the Fourier transformation.

A functioning prototype step-frequency ground radar has been produced allowing the user to choose between high pass filters designed as ordinary high pass filters allowing signals with time delays above a certain value to pass. The characteristic time constants which may be elected are in one embodiment: 10 ns, 15 ns, 20 ns and 25 ns. If for instance water pipes are searched for by means of the radar it will often be suitable to dampen all signals with time delays less than 20 ns.

18. OTHER ANTENNA CONFIGURATIONS

Tests have shown that antenna arrangements as illustrated in FIGS. 45, 46 and 47 may be applied with a good result.

FIG. 45 illustrates an arrangement containing 4 antenna pairs whereas FIGS. 46 and 47 illustrate two different arrangements, each of 5 pairs. The elements in these antennas are all of the type butterfly the construction of which correspond approximately to the one illustrated in FIG. 11, and the total arrangement corresponds to the construction illustrated in FIG. 12. The damping material designated c in FIG. 12 is of the brand Emerson & Cuming, the types LS20 and LS24 in combination. The used butterfly elements are produced on ordinary fibre glass print plate, layout is included in the description of the prototype. The elements are supplied with a transformer for impedance adjustment in the feeding point and termination resistors in the ends.

The dipole elements are always engaged in pairs so that two dipoles lying 180° mutually displaced around the center of the arrangement are engaged at the same time as transmitter and receiver, respectively. In FIGS. 45, 46 and 47 one pair is constituted by the elements $1a$ and $1b$, another pair of the elements $2a$ and $2b$ etc. All the elements are intended to be similar. A set of measurements following each other with all four or five pairs correspond for the configurations in FIGS. 45 and 46 to one period of the polarization variation (pipe or cable) of a linear object.—and for the configuration in FIG. 47 to two periods.

19. DETERMINATION OF THE TYPE OF CABLES AND PIPES

Through measurements with antennas of the type mentioned here it is determined that the linear model for cables and pipes in the ground functions well in connection with the described methods demonstrated by the present prototype. Furthermore it has been discovered that certain types of objects—including pipes of plactic containing water or gas—will often during rotation of the polarization demonstrate a significant periodicity with half the period length. This phenomenon corresponds to the reflection of the object, besides demonstrating maximum at a polarization which is parallel with the longitudinal orientation of the object, also demonstrating a substantial local maximum at a polarization which is perpendicular to the object. Accordingly, by Fourier transformation in the rotation angle an additional component appears corresponding to half the period length in relation to the expected one.

Thin objects, especially cables, will only to a very small extent demonstrate, this phenomenon whereas thick pipes especially produced from a plastics material will demonstrate it to a significant extent. This phenomenon may be used for distinguishing between types of cables and pipes and will easily be automatized by means of a small enlargement of the existing procedure and software.

20. FUNCTIONING PHOTOTYPE

A prototype is produced which demonstrates a possible embodiment of the invention. The prototype has been applied for detection of cables and pipes under normal circumstances—i.e. outside laboratory environment. FIG. 21 demonstrates a system diagram for the hardware of the prototype. The system consists of three main parts: The antenna arrangement (antenna array), RTVA electronics, (RTVA=Real Time Vector Analyzer) and a PC supplied with a signal processing module. The prototype is mounted on a small vehicle corresponding to a sack truck and may be pushed across the ground simultaneously with the result of the current measurements with associated calculations being shown on a PC screen.

20.1. System and System Block Diagram

Antenna array: Consists of an antenna arrangement of the type illustrated in FIGS. 45, 46 or 47 and a double electronic switch shifting transmitter as well as receiver between the antenna elements syncronically.

RTVA electronics: Consists of two main parts: a high frequency part (RF part) and a DSP part with analogous-digital converter.

High frequency part (RF part): Receiver, Transmitter and Frequency Synthesizer DSP1: Analog-digital converter and a fix-point DSP processor of the type ADSP2181 of the brand Analog Devices Inc. Constructed around a turn-key module of the same brand. Besides analog-to-digital converter a quadrature detection of the interfrequency signal from the receiver takes place. Furthermore control of antenna switch and control of frequency synthesizer.

PC and Signal Processing Module

A standard type PC provided with a turn-key plug-in unit, a so-called demo-board of the type ADSP-21062 EZ-LAB Evaluation Board from Analog Devices Inc. comprising a floating point processor of the type ADSP21062 is applied. The signal processing almost entirely takes place in the ADSP21062 processor. The PC is entirely a cabinet comprising the ADSP-21062 EZ-LAB Evaluation Board module. Furthermore the display of the PC is used for real time presentation of detection curves.

20.2. Function and Use

The prototype realizes a procedure corresponding to procesure No. 6 described in paragraph 12 and the above described time filtering inserted between the procedure chapters 6.1 and 6.2 (pkt.6.1 corresponds to procedure No. 4).

The phrase used in procedure step 4.1: "an antenna arrangement of type 1 or 2 as described" means in practice that the antenna is part of the equipment and that the positioning above the ground takes place currently by the equipment in its entirety is moved across the ground. The types of antennas applied are outlined in FIGS. 13, 14 and 15.

The total calculation procedure takes place currently so that the user sees the result of currently measured data and associated calculations.

On the screen of the PCs the latest result of a set of calculations are displayed in the form of a detection curve of the type mentioned in chapter 10, equation (26) or detection curves of the form:

$$D_4(i)=|V_t(k_1,i)||V_t(k_2,i)|, i=i_1 \ldots i_2 \tag{35}$$

Where the elements included are described in chapter 10. The equation (35) is in a product form and is the one most often applied in the prototype and is included in the attached print-out of the software of the prototype. These detection curves are currently illustrated graphically, vide the below examples.

20.3 Technical Specifications

The basic specifications of the present prototype are:

| RADAR system: | |
|---|---|
| Frequency range: | 50 to 1000 MHz |
| Frequency step size: | multiplum of 1.6 MHz, typically 6.4 MHz |
| Amount of frequency steps in a sweep: | typical 120 |
| Time consumption per frequency step: | 57 msec (equals aprx. 7 msec for 120 steps) |
| Basic dynamic range: | 70 dB |
| Dynamic range with automatic gain control: | 110 dB |
| Maximum radar signal lag: | |
| with freq. step size = 1.6 MHz: | 312 nsec corresponding to aprx. depth 13 m |
| with freq. step size = 6.4 MHz: | 78 nsec corresponding to aprx. depth 3.5 m |
| Number of Detection curves calculated pr. sec: | |
| with 4 antenna pairs: | 8.9 typically (aprx. 35.7 rotations/sec) |
| with 5 antenna pairs: | 7.1 typically (aprx. 28.5 rotations/sec) |
| Antenna size: | |
| Diameter: | 85 cm (model a), 65 cm (model b) |
| Height: | 7 cm (model a), 7 cm (model b) |

20.4. Some Results Obtained by Means of the Prototype

The above described detection curves are concurrently displayed on the display of the prototype as they are calculated. Typically around 7–8 curves per second are calculated. This makes it possible for the operator to evaluate the calculation results simultaneously with the prototype being pushed across the ground.

FIGS. 19a) and 19b) illustrate two typical detection curves from the display of the prototype. In the graph illustrated in FIG. 19a) a clear indication in a depth corresponding to the time delay approx. 31 ns is seen. In FIG. 19b) a detection curve is illustrated which does not indicate any cable or pipe. The object which is indicated in FIGS. 19a) and 19b) is known and is a PVC pipe filled with water and having a diameter of 110 mm and being burried in a depth of approx. 140 cm.

FIG. 18 illustrates a collection of detection curves each one being collected from the prototype and afterwards gathered in the figure—here it is seen how the detection curve alters when being conveyed above an object—here the same pipe as indicated in FIGS. 19a) and 19b). In FIG. 18 time delay is recalculated into estimated depth on the supposition of an estimated average value of the propagation speed of the radio waves in the ground.

EXAMPLE OF EMBODIMENT

A reproduction of the embodiment of the invention is presented by way of example in the computer program listing appendix described above and incorporated herein by reference.

```
Oversigt over programmer:
Program til PC:
go4.c.         Downloader program og normaliseringsdata til ADSP-21062
               Uploader resultater fra ADSP-21062, displayer disse på skærm.
               Styrer ADSP-21062 boardet
               On-line kontrol af normalisering, filtervalg, metodevalg, mm. i program til ADSP-21062
               Kan uploade data fra ADSP-21062 og gemme disse på harddisk
Program til ADSP-21062:
a_svd4.c       Hovedprogram til ADSP-21062.
               Modtager data serielt fra ADSP-2181
               Beregner. Foretager normalisering, filtrering samit modeldannelse
bsvd4.asm      Assembler funktioner der bruges af a_svd4 c
Program til ADSP-2181:
rot51.dsp      Programmerer synteser
               Styrer antennevalg
               Måler rådata
               Forbehandler rådata,sender forbehandlede data serielt til ADSP-21062
Andet:
def_4.h        header-fil der bruges af go4.c, a_svd4.c og bsvd4 asm
# include <asm_sprt.h>
# include "def21060.h"
# include "def_4.h"
.segment /dm seg_dmda;
.var _source[RAWDATA];
.var _rx_interrupt;
.global _source;
.global _rx_interrupt;
.endseg;
.segment/pm seg_pmco;
.global _tx_antenna:
_tx_antenna:leaf_entry;
            r0=0x000f0000;
            dm(TDIV1)=r0;
            r0=0x000070f1;
            dm(STCTL1)=r0;          /* internal TFS */
```

```
                                                dm(TX1)=r4;                  /* TFS required */
                                                                              /* Serial word length 16 */
                                                                              /* Sport enable */
                                                leaf_exit;
/* float searchmax(float *v, int n) */
/* return maximum value in vector v of length n */
/* replaces C-routine findmax */
.global _searchmax;
_searchmax:leaf_entry;
                                                f0=-1.0e99;                   /* very small */
                                                i4=r4;                        /* pointer to vector */
                                                f12=dm(i4,m6);                /* get v[0] */
                                                lcntr=r8, do do_find until lce;  /* loopcounter is n */
do_find                                         f0=MAX(f0,f12), f12=dm(i4,m6); /* find new max, get next v[k] */
                                                leaf_exit;
/* float pyth(float a, float b) */
.global _pyth;
/*    required:       f11=2.0
      input:          f0=numerator, f12=denominator
      output:         f0=result
      affected:       f7, f12 */
_pyth:          leaf_entry;
                                                f10=abs f4;                   /* abs(a) */
                                                f9=abs f8;                    /* abs(b) */
                                                f1=0.5;                       /* used in sqrtf_pn */
                                                f8=3.0;                       /* used in sqrtf_pn */
                                                comp(f10,f9);
                                                if lt jump b_big (DB);        /* if absa<absb */
                                                f11=2.0;                      /* used in div_ph */
                                                f15=1.0;                      /* used in general expression */
                                                call div_ph (DB);
                                                f12=r10;                      /* denominator is absa */
                                                f0=f9;                        /* numerator is absa */
                                                call sqrtf_ph (DB);
                                                f2=f0*f0;                     /* quotient squares */
                                                f0=f2+f15;                    /* input to sqrtf_ph */
                                                f0=f4*f10;                    /* absa*sqrt(. .) */
                                                leaf_exit;
b_big:                                          f12=pass f9;                  /* numerator is absa */
                                                call div_ph (DB);             /* r4 and r8 previously set */
                                                if eq jump iszero;            /* both arguments are zero */
                                                f0=f10;                       /* denominator is absb */
                                                call sqrtf_ph (DB);
                                                f2=f0*f0;                     /* quotient squared */
                                                f0=f2+f15;                    /* input to sqrtf_ph */
                                                f0=f4*f9;                     /* absb*sqrt(. .) */
                                                leaf_exit;
iszero:                                         f0=0.0;
                                                leaf_exit;
/* void sum_and_scale(int m, int n, int i, int l, float invh, float **a)    */
/*      for (j=1; j<n; j++)                                                  */
/*      {                                                                    */
/*          for (s=0.0, k=i; k<=m-1; k++) s+=a[k][i]*a[k][j];                */
/*          f=s*invh;                                                        */
/*          for (k=i; k<=m-1; k++) a[k][j]+=f*A[k][i];                       */
/*      }                                                                    */
/* inner loops earlier calculated using scalar and svc_3                     */
.global _sum_and_scale;
_sum_and_scale: leaf_entry
                                                r0=reads(1);                  /* i, also j */
                                                r1=r8-r0;                     /* n-1 */
                                                f2=r4-r12, lcntr=f1;          /* m-1 loopcounter in both inner loops */
                                                f15=reads(2);                 /* invh */
                                                i4=reads(3);                  /* address of vector of pointers to a */
                                                r1=r8*r12(ssi), r10=dm(i4,m5); /* n*i, point to a */
                                                r3=r1+r12, m4=r8;             /* n*i*i, modify between rows is n */
                                                r3=r3+r10;                    /* pointer value for a[k][i] */
                                                do for_j until lce;           /* do outer loop */
                                                    r5=r1+r0,i4=r3;           /* n*i+j, pointer to a[k][i] */
                                                    r5=r5+r10, f7=dm(i4,m4);  /* pointer value for a[k][j], get a[k][i] */
                                                    f6=f12-f12, i3=r5;        /* initialize sum, pointer to a[k][j] */
                                                    f14=dm(i3,m4);            /* get a[k][j] */
                                                    lcntr=r2, do inner1 until lce;
                                                        f11=f7*f14, f7=dm(i4,m4); /* a[k][i]*a[k][j], get a[k][i] */
inner1;                                             f6=f6+f11, f14=dm(i3,m4); /* update sum, get a[k][j] */
                                                    f6=f6*f15,i4=r3;          /* f=s*invh, pointer to a[k][i] */
                                                    i3=r5;                    /* pointer to a[k][j] */
                                                    f7=dm(i4,m4);             /* get A[k][i] */
```

```
                        lcntr=r2, do inner2 until lce;
                            f14=f6*f7, f13=dmi3,m5);    /* multiply by f, get A[k][j] */
                            f11=f14+f13, f7=dm(i4,m4);  /* A[k][j] + f*A[k][i], get A[k][i] */
inner2:                     dm(i3,m4)=f11;              /* store in A[k][j] */
for_j:                  r0=r0+1;                        /* increase j */
                    leaf_exit;
/* void sum2_and_scale(int m, int n, int i, int l, float invh, float **a)   */
/*      for (j=1; j<n; j++)                                                 */
/*      {                                                                   */
/*          for (s=0.0, k=1; k<=m-1; k++) s+=a[k][i]*a[k][j];                */
/*          f=s*ginvaii;                                                    */
/*          for (k=i; k<=m-1; k++) a[k][j]+=f*a[k][i];                       */
/*      }                                                                   */
/* inner looper earlier calculated using scalar and svd_3                   */
.global _sum2_and_scale;
_sum2_and_scale: leaf_entry;
                    r0=reads(1);                        /* 1, also j */
                    r1=r8-r0;                           /* n-1 */
                    r2=r4-r12, lcntr=r1;                /* m-i loopcounter in second inner loops */
                    f15=reads(2);                       /* invh */
                    i4=reads(3);                        /* address of vector of pointers to a */
                    r1=r8*r12(ssi), r10=dm(i4,m5);      /* n*i, point to a */
                    r3=r1+r12, m4=r8;                   /* n*i+i, modify between rows is n */
                    r3=r3+r10;                          /* pointer value for a[k][i] */
                    r8=r8*r0(ssi);                      /* n*1 */
                    r12=r8+r12;                         /* n*1+i */
                    r12=r12+r10;                        /* pointer to a[1][i] */
                    do for_j2 until lce;                /* do outer loop */
                        r5=r8+r0, i4=r12;               /* n*i+j, pointer to a[k][i] */
                        r5=r5+r10, f7=dm(i4,m4);        /* pointer value for a[k][j], get a[k][i] */
                        f6=f12-f12, i3=r5;              /* initialize sum, pointer to a[k][j] */
                        r2=r2-1, f14=dm(i3,m4);         /* loopcounter is m-1=m-i-1, get a[k][j] */
                        lcntr=r2, do inner12 until lce;
                            f11=f7*f14, f7=dm(i4,m4);   /* a[k][i]*a[k][j], get a[k][i] */
inner12:                    f6=f6+f11, f14=dm((i3,m4);  /* update sum, get a[k][j] */
                        f6=f6*f15, i4=r3;               /* f=s*invh, pointer to a[k][i] */
                        r5=r1+r0, f7=dm(i4,m4);         /* n*i+j, get A[k][i] */
                        f5=r5+r10;                      /* adress of a[k][j] */
                        r2=r2+1, i3=r5;                 /* loopcounter if m-i=m-1+1, pointer to a[k][j] */
                        lcntr=r2, do inner22 until lce;
                            f14=f6*f7, f13=dm(i2,m5);   /* multiply by f, get A[k][j] */
                            f11=f14+f13, f7=dm(i4,m4);  /* A[k][j] + f*A[k][i], get A[k][i] */
inner22:                    dm(i3,m4)=f11;              /* store in A[k][j] */
for_j2:                 r0=r0+1;                        /* increase j */
                    leaf_exit;
/* void sum3_and_scale(int m, int n, int i, int l, float **v, float **a)    */
/*      for (j=i; j<n; j++)                                                 */
/*      {                                                                   */
/*          for (s=0.0, k=1; k<=n-1; k++) s+=a[i][k]*v[k][j];                */
/*          for (k=1; k<=n-1; k++) v[k][j]+=s*v[k][i];                       */
/*      }                                                                   */
/* inner loops earlier calculated using svd_12 and svd_3                    */
.global _sum3_scale;
_sum_and_scale: leaf_entry;
                    r0=reads[1];                        /* 1, also j */
                    r1=r8-r0;                           /* n-1 */
                    i4=reads(3);                        /* address of vector of pointers to a */
                    i3=reads(2);                        /* address of vector of pointers to v */
                    r2=r8*r12(ssi), r10=dm(i4,m5);      /* n*i, point to a */
                    r2=r2+r0, m4=r8;                    /* n*i+1, modify between rows is n */
                    r2=r2+r10, r11=dm(i3,m5);           /* pointer value for a[i][1], point to v */
                    r8=r8*r0(ssi);                      /* n*1 */
                    r12=r8+r12;                         /* n*1+i */
                    r12=r12+r11;                        /* pointer to v[1][i] */
                    i2=r12;                             /* point to it */
                    lcntr=r1, do for_j3 until lce;      /* loopcounter is n-1, do outer loop */
                        r5=r8+r0, i4=r2;                /* n*i+j, pointer to a[i][1] */
                        r5=r5+r11, f7=dm(i4,m6);        /* pointer value for v[k][j], get a[i][1] */
                        f6=f12-f12, i3=r5;              /* initialize sum, pointer to v[1][i] */
                        f14=dm(i3,m4);                  /* get v[1][j] */
                        lcntr=r1, do inner13 until lce;
                            f9=f7+f14, f7=dm(i4,m6);    /* a[i][k]*v[k][j], get a[i][k] */
inner13:                    f6=f6+f9, f14=dm(i3,m4);    /* update sum, get v[k][j] */
                        f7=dm(i2,m4);                   /* pointer to v[1][j] */
                        i3=r5;                          /* point to v[1][j] */
                        lcntr=r1, do inner23 until lce;
                            f14=f6*f7, f13=dm(i3,m5);   /* multiply by sum, get v[k][j] */
                            f14=f14+f13, f7=dm(i2,m4);  /* v[k][j] + sum*v[k][i], get v[k][i] */
inner23:                    dm(i3,m4)=f14;              /* store in v[k][j] */
```

-continued

```
for_j3:         r0=r0+1,i2=r12;              /* increase j */
                leaf_exit;
/* void sum4_and_scale(int m, int n, int i, float *rv1, float **a)  */
/*     for (j=i; j<m;j++)                                            */
/*     {                                                             */
/*         for (s=0.0, k=1; k<=n-1; k++) s+=a[j][k]*a[i][k];          */
/*         for (k=1; k<=n-1; k++) a[j][k]+=s*rv1[k];                  */
/*     }                                                              */
/* inner loops earlier calculated using svd_8 and svd_9              */
.global _sum4_and_scale;
_sum4_and_scale: leaf_entry;
                r0=r12+1;                     /* 1 = i+1 */
                r2=r4-r0;                     /* m-1, loopcount in outer loop */
                r1=r8-r0, lcntr=r2;           /* n-1 is loopcount in inner loops, set outer loopcount */
                i4=reads(2);                  /* address of vector of pointers to a */
                r4=reads(1);                  /* address of rv1 */
                r4=r4+r0;                     /* address of rv1[1] */
                r2=r8*r12(ssi), r10=dm(i4,m5); /* n*i, point to 3 */
                r2=r2+r0;                     /* n*i+1 */
                r2=r2+r10;                    /* pointer value for a[i][1] */
                r5=r2+r8;                     /* n*1+1 = n*i+1+n is address of a[1][1] */
                do for_j4 until lce;          /* do outer loop */
                    i4=r2;                    /* pointer to a[i][1] */
                    f7=dm(i4,m6);             /* get a[i][1] */
                    f6=f12-f12, i3=r5;        /* initialize sum, pointer to a[j][1] */
                    f14=dm(i3,m6);            /* get a[j][1] */
                    lcntr=r1, do inner14 until lce;
                        f9=f7*f14, f7=dm(i4,m6); /* a[j][k]*a[i][k], get a[i][k] */
inner14:                f6=f6+f9, f14=dm(i3,m6); /* update sum, set a[j][k] */
                    i2=r4;                    /* pointer to rv1[i] */
                    i3=r5;                    /* point to a[j][i] */
                    f7=dm(i2,m6);             /* get rv1[1] */
                    lcntr=r1, do inner24 until lce;
                        f14=f6*f7, f13=dm(i3,m5); /* multiply by sum, get a[j][k] */
                        f14=f14+f13, f7=dm(i2,m6); /* a[j][k] + sum*rv1[k], get rv1[k] */
inner24:                dm(i3,m6)=f14;        /* store in a[j][k] */
for_j4:         r5=r5+r8;                     /* increase j is the same as increasing address of a[j][1] with n */
                leaf_exit;
/* void get_div(int indx, int *source, float pm *uu_r, first pm *uu_i, int in_uu); */
/* Fetch complex integer data from source. Perform complex division of measured
       signal with reference and store in vectors uu_r and uu_i */
.global _get_div;
_get_div: leaf_entry;
                r4=r4+r8, r10=reads(2);       /* source[indx], index into uu */
                r12=r12+r10, i4=r4;           /* uu_r[index], print to source */
                r2=dm(i4,m6);                 /* m_r */
                f2=float r2; r1=dm(i4,m6);    /* m_i */
                f1=float r1; r3=dm(i4,m6);    /* r_r */
                f3=float r3, r6=dm(i4,m5);    /* r_i */
                f6=float r6, i11=r12;         /* point to address of uu_r[index] */
                r4=reads(1);                  /* address of uu_i */
                r4=r4+r10;                    /* indx */
                f5=f3*f3, i12=r4;             /* r_r*r_r, point to uu_i[indx] */
                f13=f6*f6;                    /* r_i*r_i */
                f12=f5+f13;                   /* complex denominator */
                r13=0x2edbe6ff;               /* 1e-10 */
                comp (f12,f13);
                if lt jump less;              /* if smaller than 1e-10 don't divide */
                call div_ph (DB);
                f11=2.0;
                f0=1.0;                       /* numerator */
/*              r4=0x3f800000;
                r8=0x40000000;*/
                jump done_div;
less:           r0=0x501502f9;                /* set inv_den=1e10 if den was small */
done_div:       f4=f2*f3;                     /* m_r*r_r */
                f8=f1*f6;                     /* m_i*r_i */
                f4=f4+f8;                     /* add */
                f4=f4*f0;                     /* times inv_den */
                f4=f1*f3, pm(i11,m13)=f4;     /* m_i*r_r, store real part of prev result */
                f8=f2*f6;                     /* m_r*r_i */
                f4=f4-f8;                     /* subtract */
                f4=f4*f0;                     /* times inv_den */
                pm(i12,m13)=f4;               /* store imag part */
                leaf_exit;
/* void norm_div(int indx, int jj, float *n_r, float *n_i, float pm *uu_r, float pm *uu_i) */
/* Normalize complex data and store in vectors uu_r and uu_i */
.global _norm_div;
```

```
__norm__div:leaf_entry;
            r12=r12+r8;                  /* n_r[jj] */
            i4=r12;                      /* point to it */
            r12=reads(1);                /* address of n_i */
            r12=r12+r8, f3=dm(i4,m5);    /* n_i[jj], get r_r */
            i4=r12;                      /* point to it */
            f12=reads(2);                /* address of uu_r */
            r12=r12+r4, f6=dm(i4,m5);    /* uu_r[indx], get r_i */
            i11=r12;                     /* point to it */
            r12=reads(3);                /* address of uu_i */
            r12=r12+r4;                  /* uu_i[indx] */
            i12=r12;                     /* point to it */
            f5=f3*f3, f2=pm(i11,m13);    /* r_r*r_r, get m_r */
            f11=f6*f6, f1=pm(i12,m13);   /* r_i*r_i, get m_i */
            f12=f5+f11;                  /* complete denominator */
            r13=0x2edbe6ff;              /* 1e-10 */
            comp(f12,f13);
            if lt jump less_n;           /* if smaller than 1e-10 don't divide */
            call div_ph (DB);
            f11=2.0;
            f0=1.0;
/*          r4=0x3f800000;
            r8=0x40000000;*/
            jump done_norm;
less_n:     r0=0x501502f9;               /* set inv_den=1e10 if den was small */
done_norm:  f4=f2*f3;                    /* m_r*r_r */
            f8=f1*f6;                    /* m_i*r_i */
            f4=f4+f8;                    /* add */
            f4=f4*f0;                    /* tiems inv_den */
            f4=f1*f3, pm(i11,m13)=f4;    /* m_i*r_r, store real part of prev result */
            f8=f2*f6;                    /* m_r*r_i */
            f4=f4-f8;                    /* subtract */
            f4=f0-f4;                    /* times inv_den */
            pm(i12,m13)=f4;              /* store imag part */
            leaf_exit;
/* void mk_Xa(int m, int l, int indx, int row, float *x, float **Xa) */
/* implementation of "for (col=0; col<l; col++) Xa[indx][col]=x[row-col-1]" */
.global _mk_Xa;
__mk_Xa:    leaf_entry;
            r2=r4*r12(ssi), lcntr=r8;    /* startindex is m*indx, loop l times */
            i4=reads(3);                 /* address of vector of pointers to Xa */
            r0=dm(i4,m5);                /* point to the real address of Xa */
            r0=r0+r2;                    /* address of first element */
            i4=r0;                       /* point to it */
            r4=reads(2);                 /* address of x */
            r0=reads(1);                 /* row */
            r0=r0-1;                     /* start in row-1 */
            r0=r4+r0;
            i3=r0;                       /* point to it */
            do do_xa until lce;
                f4=dm(i3,m7);            /* get x[row-col-1] */
do_xa:          dm(i4,m6)=f4;            /* update Xa[indx][col] */
            leaf_exit;
/* void impuls(int ii, int l, float *ha, float *a) */
/* implementation of "for (jj=1; jj<=l; jj++) ha[ii]-=a[jj]*ha[ii-jj]" */
.global _impuls;
__impuls:   leaf_entry;
            r0=r4+r12, lcntr=r8;         /* address of ha[ii], loop l times */
            i4=r0;                       /* point to it */
            r0=reads(1);                 /* address of a */
            r0=r0+1, f2=dm(i4,m7);       /* start in jj=1, set ha[ii] and point to ha[ii-1] */
            i3=r0;                       /* point to it */
            f8=dm(i3,m6);                /* get a[jj] */
            f0=dm(i4,m7);                /* get ha[ii-jj] */
            do do_imp until lce;
                f6=f0*f8, f0=dm(i4,m7);  /* go multiply, get ha[ii-jj] */
do_imp:         f2=f2-f6, f8=dm(i3,m6);  /* update ha[ii], get a[jj] */
            r0=r4+r12;                   /* address of ha[ii] */
            i4=r0;                       /* point to it */
            dm(i4,m5)=f2;                /* really update */
            leaf_exit;
/* void mk_Ha(int m, int l, int row, float *ha, float **Ha) */
/* implementation of "for (col=0; col<l; col++) Ha[row][col]=ha[row-col]" */
.global _mk_Ha;
__mk_Ha:    leaf_entry;
            r2=r4*r12(ssi), lcntr=r8;    /* startindex is m*row, loop l times */
            i4=reads(2);                 /* address of vector of pointers to Ha */
            r0=dm(i4,m5);                /* point to the real address of Ha */
            r0=r0+r2;                    /* address of first element */
```

```
                    r4=reads(1);
                    r0=r4+r12, i4=r0;           /* address of ha */
                    i3=r0;                       /* start in ha[row], point to Ha[row][0] */
                    do do__ha until lce;         /* point to it */
                        f4=dm(i3,m7);            /* get x[row-col] */
do__ha:             dm(i4,m6)=f4;                /* update Xa[indx][cc1 ] */
                    leaf_exit;
/* float f_abs(float x) */
/* implementation of "y=fabs(x)" */
.global __f_abs;
__f_abs:            leaf_entry;
                    f0=ABS f4;
                    leaf_exit;
/* float svd_1(int m, int k, dm float **A, int l) */
/* implementation of "for(i=j;i<1;i++) scale+=fabs(A[i][k])" */
.global __svd_1;
__svd_1:            leaf_entry;
                    r1=r4*r8(ssi), i4=r12;       /* m*j, get address of vector of pointers to A */
                    r2=r8+r1, r0=dm(i4,m5);      /* startindex is j*m+k, point to the real address of A */
                    r1=r0+r2, m4=r4;             /* address of first element, modify = m */
                    f0=f12-f12, i4=r1;           /* initialize scale, point to A */
                    r4=reads(1);
                    r12=reads(2);
                    r0=r4-r12, f4=dm(i4,m4);     /*loop counter: l-j, get A [k][k] */
                    lcntr=r0, do calc until lce;
                        f8=ABS f4;               /* fabs */
calc:               f0=f0+f8, f4=dm(i4,m4);      /* update scale, get A[i][k] */
                    leaf_exit;
/* void svd_2(float invscale, int k, int m, float pm *sum, float **A, int l) */
/* implementation of "for (i=k;i<1;i++)
                        (A[i][k]*=invscale;
                         sum+=A[i][k]*A[i][k]) */
.global __svd_2:
__svd_2:            leaf_entry;
                    i4=reads(2);                 /* address of vector of pointers to A */
                    r2=reads(3);                 /* l */
                    r2=r2-r8, r0=dm(i4,m5);      /* l-k, point to the real address of A */
                    r1=r12+1, lcntr=r2;          /* m+1, loopcounter is i-k */
                    r2=r8*r1 (ssi);              /* startindex is k*(m+1) */
                    r1=r0+r2, m4=r12;            /* address of first element, modify is m */
                    i4=r1;                       /* point to it */
                    i3=r1;                       /* once again, looses line in loop */
                    i12=reads(1);                /* initialize sum */
                    f3=dm(i3,m4),f12=pm(i12,m13); /* get A[i][k] and sum */
                    f2=f3*f4, f3=dm(i3,m4);      /* A[i][k]*invscale, get next A */
                    do do__sp until lce;
                        f8=f2*f2, dm(i4,m4)=f2;  /* A[i][k]*A[i][k], store prev in A[i][k] */
do__sp:             f2=f3*f4, f12=f8+f12, f3=dm(i3,m4); /* A[i][k]*invscale, update sum, get next A */
                    pm(i12,m13)=f12;             /* store sum */
                    leaf_exit;
/* svd_3(int m, int i, int j, int l, float f, dm float **A, int st) */
/* implementation of "for(k=st;k<l;k++) A[k][j] += f*A[k][i]" */
.global __svd_3;
__svd_3:            leaf_entry;
                    r2=reads(1);                 /* l */
                    r1=reads(4);                 /* st */
                    r2=r2-r1;                    /* l-st */
                    r0=r4*r1(ssi), lcntr=r2;     /* m*st, loopcounter is l-st */
                    i4=reads(3);                 /* address of vector of pointers to A */
                    r2=r0+r8, r10=dm(i4,m5);     /* startindex is m*st+i, point to the real address of A */
                    r3=r0+r12;                   /* m*st+j */
                    r1=r10+r2, m4=r4;            /* address of A[k][i], modify is m */
                    r2=r10+r3, i4=r1;            /* address of A[k][j], point to A[k][i] */
                    i3=r2;                       /* point to A[k][j] */
                    f0=reads(2);                 /* f */
                    f4=dm(i4,m4);                /* get A[k][i] */
                    do do__3 until lce:
                        f8=f0*f4, f12=dm(i3,m5); /* multiply by f, get A[k][j] */
                        f2=f12+f8, f4=dm(i4,m4); /* A[k][j] + f*a[k][i], get A[k][i] */
do__3:              dm(i3,m4)=f2;                /* store in A[k][j] */
                    leaf_exit;
/* svd_4(int m, int i, int l, float scale, dm float **A) */
/* implementation of "for(k=i;k<l;k++) A[k][i] += scale" */
.global __svd_4;
__svd_4:            leaf_entry
                    r2=r12-r8;                   /* l-i */
                    i4=reads(2);                 /* address of vector of pointers to A */
                    r1=r4+1, r0=dm(i4,m5);       /* m+1, point to the real address of A */
                    r2=r8*r1(ssi), lcntr=r2;     /* startindex is i*(m+1), loopcounter is l-i */
```

-continued

```
                r1=r0+r2, m4=r4;            /* address of element, modify between rows = m */
                i4=r1;                       /* point to it */
                i3=r1;                       /* again, loose line in loop */
                f0=reads(1);                 /* scale */
                f4=dm(i3,m4);                /* get A[k][i] */
                do do__4 until lce;
                    f8=f0*f4, f4=dm(i3,m4);  /* multiply by f, get next A */
do__4:              dm(i4,m4)=f8;            /* store in A[k][i] */
                leaf_exit;
/* svd__5(int m, int k, int j, dm float **A) */
/* implementation of "for(i=j;i<1;i++) scale+=fabs(A[k][i])" */
.global _svd__5;
_svd__5:        leaf_entry:
                r1=r4*r8(ssi);               /* m*k */
                r2=r12+r1;                   /* startindex is k*m + j */
                i4=reads(1);                 /* address of vector of pointers to A */
                r0=dm(i4,m5);                /* point to the real address of A */
                r1=r0+r2;                    /* address of first element */
                f0=f12−f12, i4=r1;           /* initialize scale, point to A */
                r2=r4−r12, f4=dm(i4,m6);     /* loop counter = 1−j, get A[k][i] */
                lcntr=r2, do do__5 until lce;
                    f8=ABS f4;               /* fabs */
do__5:              f0=f0+f8, f4=dm(i4,m6);  /* update scale, get A[k][i] */
                leaf_exit;
/* void svd__6(float invscale, int i, int m, float pm *sum, float **A, int j) */
/* implementation of "for (k=j;k<1;k++)
                    {A(i)[k] *=invscale;
                    sum+=A[i][k]*A[i][k]} */
.global _svd__6;
_svd__6:        leaf_entry;
                i4=reads(2);                 /* address of vector of pointers to A */
                r1=reads(3);                 /* j */
                r8=r12−r1;                   /* 1−j */
                r2=r12*r0(ssi), lcntr=r0;    /* m*i, set loop counter */
                r2=r2+r1, r0=dm(i4,m5);      /* startindex is i*m+j, point to the real address of A */
                r1=r0+r2;                    /* address of first element */
                i4=r1;                       /* point to it */
                i3=r1;                       /* again, loose line in loop */
                i12=reads(1);                /* initialize sum */
                f3=dm(i3,m6), f12=pm(i12,m13);/* get A[i][k], get sum */
                f2=f3*f4, f3=dm(i3,m6);      /* A[i][k]*invscale, get next A */
                do do__6 until lce;
                    f8=f2*f2, dm(i4,m6)=f2;  /* A[i][k]*A[i][k], store A[i][k] */
do__6:              f2=f3*f4, f12=f8+f12, f3=dm(i3,m6); /* A[i][k]*invscale, update sum, get A[i][k] */
                pm(i12,m13)=f12;
                leaf_exit;
/* void svd__7(int m, int i, float invh, float *rv1, float **A, int j) */
/* implementation of "for (k=j;k<1;k++) rv1[k]=invh*A[i][k]" */
.global _svd__7;
_svd__7:        leaf_entry;
                r1=reads(3);                 /* j */
                r0=r4−r1;                    /* 1−j */
                r2=r4*r8(ssi), lcntr=r0;     /* m*1, set loopcount */
                i4=reads(2);                 /* address of vector of pointers to A */
                r2=r2+r1, r0=dm(i4,m5);      /* startindex is m*1+j, point to the real address of A */
                r0=r0+r2;                    /* address of first element */
                i4=r0;                       /* point to it */
                r4=reads(1);                 /* address of b */
                r0=r4+r1, f4=dm(i4,m6);      /* address+j, get A[i][j] */
                i3=r0;                       /* point to b[j] */
                do do__upd until lce;
                    f8=f12*f4, f4=dm(i4,m6); /* A[i][j] * invh, get A[i][j] */
do__upd:            dm(i3,m6)=f8;            /* update b[i] */
                leaf_exit;
/* float svd__8(int m, int j, int i, float **A, int st) */
/* implementation of "for (sum=0.0,k=st;k<1;k++) sum+=A[j][k]*A[i][k]" */
.global _svd__8;
_svd__8:        leaf_entry;
                r1=reads(2);                 /* st */
                r0=r4−r1;                    /* 1−st */
                r0=r4*r8(ssi), lcntr=r0;     /* m*j, set loop counter */
                i4=reads(1);                 /* address of vector of pointers to A */
                r0=r1+r0, r2=dm(i4,m5);      /* m*j+st, point to the real address of A */
                r0=r0+r2;                    /* address of first element */
                r0=r8−r12, i4=r0;            /* j−i, point to A */
                r0=r0*r4(ssi);               /* (j−i) * m */
                r1=r0+1;
                r0=r12−r8, m4=r1;            /* (i−j), modify between A[j][k] and A[i][k] */
                r0=r0*r4(ssi);               /* (i−j) * m */
```

-continued

```
                m0=r0;                              /* modify between A[i][k] and A[j][k] */
                f0=f12-f12, f4=dm(i4,m0);           /* initialize sum, get A[j][k] */
                f8=dm(i4,m4);                       /* get A[i][k] */
                do do__8 until lce;
                    f2=f4*f8, f4=dm(i4,m0);         /* A[j][k]*A[i][k], get A[i][k] */
do__8:              f0=f0+f2, f8=dm(i4,m4);         /* update sum, get A[j][k] */
                leaf_exit;
/* void svd__9(int m, int j, float s, float *rv1, float **A, int st) */
/* implementation of "for (k=st;k<1;k++) A[j][k] += s*rv1[k]" */
.global __svd__9;
__svd__9:       leaf_entry;
                r1=reads(3);                        /* st */
                r0=r4-r1;                           /* 1-st */
                r2=r4*r8(ssi), lcntr=r0;            /* m*j, set loop counter */
                i4=reads(2);                        /* address of vector of pointers to A */
                r2=r2-r1, r0=dm(i4,m5);             /* startindex is m*j+st, point to the real address of A */
                r0=r0+r2;                           /* address of first element in A */
                r2=reads(1);                        /* address of rv1 */
                r0=r2+r1, i4=r0;                    /* address + st, point to A */
                i3=r0;                              /* point to b[st] */
                f4=dm(i3,m6);                       /* get rv1[k] */
                do do__9 until lce;
                    f8=f12*f4, f0=dm(i4,m5);        /* rv1[k]*s, get A[j][k] */
                    f8=f8+f0, f4=dm(i3,m6);         /* do sum, get rv1[k] */
do__9:              dm(i4,m6)=f8;                   /* update A[j][k] */
                leaf_exit;
/* svd__10(int m, int i, float scale, dm float **A, int st) */
/* implementation of "for(k=st;k<1;k++) A[i][k] *= scale" */
.global __svd__10;
__svd__10:      leaf_entry
                r1=reads(2);                        /* st */
                r0=r4-r1;                           /* 1-st */
                r0=r4*r8(ssi), lcntr=r0;            /* m*1, set loop counter */
                i4=reads(1);                        /* address of vector of pointers to A */
                r2=r0+r1, r0=dm(i4,m5);             /* startindex is m*i*st, point to the real address of A */
                r1=r0+r2;                           /* address of element */
                i4=r1;                              /* point to it */
                i3=r1;                              /* again, loose line in loop */
                f4=dm(i3,m6);                       /* get A[i][k] */
                do do__10 until lce;
                    f8=f12*f4, f4=dm(i3,m6);        /* multiply by scale, get next A[i][k] */
do__10:             dm(i4,m6)=f8;                   /* store in A[i][k] */
                leaf_exit;
/* svd__11(int m, int i, float s, dm float **V, dm float **A, int st) */
/* implementation of "for(j=st; j<1; j++) v[j][i]=a[i][j]*s" */
.global __svd__11;
__svd__11:      leaf_entry;
                r1=reads(3);                        /* st */
                r0=r4-r1;                           /* 1-st */
                r0=r4*r8(ssi), lcntr=r0;            /* m*i, set loopcounter */
                i4=reads(2);                        /* address of vector of pointers to A */
                r2=r0+r1, r0=dm(i4,m5);             /* startindex is m*i+st in a, point to the real address
*/                                                     of A */
                r0=r0+r2;                           /* address of element */
                r0=r4*r1(ssi), i4=r0;               /* m*st, point to element */
                i3=reads(1);                        /* address of vector of pointers to v */
                r2=r0+r8, r0=dm(i3,m5);             /* startindex is m*st+i in v, point to the real address
*/                                                     of v */
                r0=r0+r2, m4=r4;                    /* address of element, modify between rows in v is m */
                i3=r0;                              /* point to it */
                f4=dm(i4,m6);                       /* get A[i][j] */
                do do__11 until lce;
                    f8=f12*f4, f4=dm(i4,m6);        /* A[i][j]*s, get next A[i][j] */
do__11:             dm(i3,m4)=f8;                   /* store in v[j][i] */
                leaf_exit;
/* float svd__12(int m, int i, int j, float **A, float **V, int st) */
/* implementation of "for (sum=0.0,k=st;k<1;k++) sum+=A[i][k]*V[k][j]" */
.global __svd__12;
__svd__12:      leaf entry;
                r1=reads(3);                        /* st */
                r0=r4-r1;                           /* 1-st */
                r0=r4*r8(ssi), lcntr=r0;            /* m*i, set loop counter */
                i4=reads(1);                        /* address of vector of pointers to A */
                r0=r1+r0, r2=dm(i4,m5);             /* start in a is m*i+st, point to the real address of A */
                r0=r0+r2;                           /* address of first element */
                r0=r4*r1(ssi), i4=r0;               /* m*st, point to A, modify is 1 */
                i3=reads(2);                        /* address of vector of pointers to V */
                r0=r12+r0, r2=dm(i3,m5);            /* start in v is m*st+j, point to the real address of V */
                r0=r0+r2, m4=r4;                    /* address of first element, modify between rows is m */
```

-continued

```
                f0=f12-f12, i3=r0;              /* point to v, initialize sum */
                f4=dm(i4,m6);                   /* get A[i][k] */
                f8=dm(i3,m4);                   /* get V[k][j] */
                do do__12 until lce;
                    f2=f4-f8, f4=dm(i4,m6);     /* A[i][k]*V[k][j], get A[i][k] */
do__12:         f0=f0+f2, f8=dm(i3,m4);         /* update sum, get V[k][j] */
                leaf_exit;
/* svd__13(int m, int i, dm float **v, int st) */
/* implementation of "for(k=st;k<1;k++), v[i][k] = v[k][i] = 0.0" */
.global __svd__13;
__svd__13:      leaf_entry;
                r1=reads(1);                    /* st */
                r0=r4-r1, i4=r12;               /* 1-st, address of vector of pointers to v */
                r0=r4*r8(ssi), lcntr=r0;        /* m*i, set loop counter */
                r2=r0+r1, r10=dm(i4,m5);        /* startindex is m*i+st in v[i][k], point to the real
of v */                                            address
                r0=r10+r2;                      /* address of element */
                r0=r4*r1(ssi), i4=r0;           /* m*st, point to v*/
                r2=r0+r8;                       /* startindex is m*st+1 in v[k][i]*/
                r1=r10+r2, m4=r4;               /* address of element, modify between rows is m */
                f12=f12-f12, i3=r1;             /* poin to v */
                do do__13 until lce;
                    dm(i4,m6)=f12;              /* v[i][k]=0.0 */
do__13:         dm(i3,m4)=f12;                  /* v[k][i]=0.0 */
                leaf_exit;
/* svd__14(int m, int l, int n, int i, float c, float s, dm float **a) */
/* implementation of "for(j=0; j<=1; j++)
                { y=a[j][n];
                  z=a[j][i];
                  a[j][nm]=y*c+z*s;
                  a[j][i]=z*c-y*s; } */
.global __svd__14;
__svd__14:      leaf_entry;
                i4=reads(4);                    /* address of vector of pointers to a[j][n] */
                r0=dm(i4,m5);                   /* point to the real address of v */
                r0=r0+r12, lcntr=r8;            /* address of element a[0][n], loop 1 times */
                i4=r0;                          /* point to it */
                r0=reads(1);                    /* i */
                i3=reads(4);                    /* address of vector of pointers to a[j][i] */
                r2=dm(i3,m5);                   /* point to the real address of v */
                r0=r0+r2, m4=r4;                /* address of element a[0][i], modify between rows is m */
                i3=r0;                          /* point to it */
                i2=r0;                          /* again, loose line in loop */
                f3=reads(2);                    /* c */
                f0=reads(3);                    /* s */
                f2=dm(i4,m5);                   /* y=a[j][n] */
                f10=f2*f3, f4=dm(i2,m4);        /* y*c, z=a[j][i] */
                do do__14 until lce;
                    f15=f0*f4;                  /* z*s */
                    f12=f3*f4, f10=f10+f15, f4=dm(i2,m4); /* z*c, y*c+z*s, get next Z */
                    f1=f2*f0, dm(i4,m4)=f10;    /* y*s, store y*c+z*s in a[j][n] */
                    f12=f12-f1, f2=dm(i4,m5);   /* z*c-y*s, get y */
do__14:         f10=f2*f3, dm(i3,m4)=f12;       /* y*c, store z*c-y*s in a[j][i] */
                leaf_exit;
/* float svd__15(int m, int j, int st, float *b, float **A, int 1) */
/* implementation of "for (sum=0.0,i=st;i<1;i++) sum+=A[i][j]*b[i]" */
.global __svd__15;
__svd__15:      leaf_entry;
                r0=reads(3);                    /* 1 */
                r0=r0-r12;                      /* 1-st */
                r0=r4*r12(ssi), lcntr=r0;       /* m*st, set loop counter */
                i4=reads(2);                    /* address of vector of pointers to A */
                r2=r0+r8, r0=dm(i4,m5)          /* startindex is m*st+j, point to the real address of A */
                r0=r0+r2, m4=r4;                /* address of first element, modify for A[i][j] = m */
                r4=reads(1);                    /* address of b */
                r0=r4+r12, i4=r0;               /* b[st], point to A */
                f0=f12-f12, i3=r0;              /* initialize sum, point to b */
                f4=dm(i4,m4);                   /* get A[i][j] */
                f8=dm(i3,m6);                   /* get b[i] */
                do do__15 until lce;
                    f2=f4*f8, f4=dm(i4,m4);     /* A[i][j]*b[i], get A[i][j] */
do__15:         f0=f0+f2, f8=dm(i3,m6);         /* update sum, get b[i] */
                leaf_exit;
/* float svd__16(int m, int j, float *b, float **A) */
/* implementation of "for (jj=0; jj<1; jj++) s+=A[j][jj]*b[jj]" */
.global __svd__16;
__svd__16:      leaf_entry;
                i4=reads(1);                    /* address of vector of pointers to A */
                r8=r4*r8(ssi), r0=dm(i4,m5);    /* (m*j), point to the real address of A */
```

-continued

```
                        r2=r0+r8, i3=r12;               /* address of first element, address of b[0] */
                        f0=f12-f12, i4=r2;              /* initialize sum, point to b */
                        f12=dm(i4,m6);                  /* get A[i][j] */
                        f8=dm(i3,m6);                   /* get b[j] */
                        lcntr=r4, do do__16 until lce;  /* loop 1 times */
                            f2=f12*f8, f12=dm(i4,m6);   /* b[j]*A[i][j], get A[i][j]]*/
do__16:                 f0=f0+f2, f8=dm(i3,m6);         /* update sum, get b[j] */
                        leaf_exit;
/* float scalar(int n, int m, int k, int j, float **A, int 1) */
/* implementation of "for (sum=0.0,i=1;i<h:1--) sum+=A[i][k]*A[i][j]" */
.global __scalar;
__scalar:       leaf_entry;
                        r0=reads(3);                    /* 1 */
                        r4=r4-r0;                       /* n-1 */
                        r1=r8*r0(ssi), lcntr=r4;        /* m*1, set loop counter = n */
                        i4=reads(2);                    /* address of vector of pointers to A */
                        r2=r1+r12, r0=dm(i4,m5);        /* m*l+k, point to the real address of A */
                        r1=r0+r2;                       /* address of first element */
                        r4=reads(1);                    /* j */
                        r4=r4-r12, i4=r1;               /* j-k, point to A */
                        r0=r8-r4, m4=r4;                /* m-(J-k), modify between A[i][k] and A[i][j] is j-k */
                        f0=f12-f12, m0=r0;              /* initialize sum, modify between A[i][j] and A[i][k] */
                        f4=dm(i4,m4);                   /* get A[i][k] */
                        f8=dm(i4,m0);                   /* get A[i][j] */
                        do do__s until lce;
                            f2=f4*f8, f4=dm(i4,m4);     /* A[i][j]*A[i][k], get A[i][k] */
do__s:                  f0=f0+f2, f8=dm(i4,m0);         /* update sum, get A[i][j] */
                        leaf_exit;
/* void evalhx(int ii, int np, float *a, complex float pm *s, complex float *ha) */
/* implementation of "for (jj=0;jj<np;jj++) ha[jj]=ha[jj]*a[jj]+a[ii]" */
.global __evalhx;
__evalhx:       leaf_entry;
                        r0=r12+r4;                      /* address of s[ii] */
                        i3=r0;
                        i12=reads(1);                   /* address of s[i] */
                        i4=reads(2);                    /* address of na[i] */
                        f15=dm(i3,m5);                  /* a[ii] */
                        lcntr=r8, do upd__ha until lce;
                            f0=dm(i4,m6), f2=pm(i12, m14);      /* ha__r, point to ha__i; s__r, point to s__i */
                            f8=f0*f2, f1=dm(i4,m7), f4=pm(i12,m14);     /* ha__r*s__r, ha__i, point to ha__r; s__i, pointo
next s__r */
                            f12=f1*f4, f8=f8+f15;       /* ha__i*s__i, ha__r*s__r + a[ii] */
                            f8=f0*f4, f3=f8-f12;        /* ha__r*s__i, ha__r*s__r-ha__i*s__i */
                            f12=f1*f2, dm(i4,m6)=f3;    /* ha__i*s__r, update real(ha[jj]) point to imag */
                            f8=f8+f12;                  /* ha__r*s__i+ha__i*z__r */
upd__ha:                dm[i4,m6]=f8;                   /* update imag(ha[jj]) point to next real */
                        leaf_exit;
/* float cal__dft(int k, int k__u, int N__s, float u, float *uu__real, float pm *uu__imag, complex
float *twid__px) */
/* implementation of "for (n=0;n<ku;n++) u[k]+=UU[k][n]*twid__px[n]" */
.global __cal__dft;
__cal__dft:     leaf_entry:
                        f9=f12-f12;                     /* u[k] */
                        r1=reads(1);                    /* address of uu__real[0] */
                        r2=r4+r1, m12=r12;              /* plus k, modify to next column in uu */
                        r1=reads(2);                    /* address of uu__imag[0] */
                        r2=r4+r1, i12=r2;               /* plus k, point to uu__real[k] */
                        i14=r2;                         /* point to uu__imag[k] */
                        i4=reads(3);                    /* point to twid__px[0] */
                        f10=f12-f12, f1=dm(i4,m6), f5=pm(i12,m12); /* init f10, twid__r, UU__r*/
                        f12=f12-f12, f4=dm(i4,m6), f2=pm(i14,m12); /* init f12, twid__i, UU__i */
                        lcntr=r8, do do__dft until lce;
                            f10=f1*f5, f15=f10-f12, f1=dm(i4,m6), f5=pm(r12,m12); /* UU__r*twid__r, calc diff, get
twid__r, UU__r */
do__dft:                f12=f2*f4, f9=f9+f15, f4=dm(i4,m6), f2=pm(i14,m12); /* UU__i*twid__i, update u[k], get
twid__i, UU__i */
                        f8=f10-f12;                     /* calculate last difference */
                        f0=f8+f9;                       /* return updated a[k] */
                        leaf_exit;
/* float dm__dft(int k__u, float dm *uu__real, float dm *uu__imag, complex float *twid__px] */
/* implementation of "for (n=0;n<ku;n++) u[k]+=UU[k][n]**twid__px[n]" */
.global __dm__dft;
__dm__dft: leaf_entry;
                        lcntr=r4;
                        f9=f12-f12;                     /* u[k]=0 */
                        i3=r8;                          /* point to uu__real[0] */
                        i4=r12;                         /* point to uu__imag[0] */
                        i2=reads(1);                    /* point to twid__px[0] */
                        f10=f12-f12, f1=dm(i2,m6);      /* init f10, twid__r */
```

-continued

```
                    f5=dm(i3,m6);                      /* UU_r */
                    f12=f12-f12, f4=dm(i2,m6);         /* init f12, twid_i */
                    f2=dm(i4,m6);                      /* UU_i */
                    do do_dmdft until lce;
                        f10=f1*f5, f15=f10-f12, f1=dm(i2,m6);   /* UU_r*twid_r, calc diff, get twid_r */
                        f5=dm(i3,m6);                  /* UU_r */
                        f12=f2*f4, f9=f9+f15, f4=dm(i2,m6);     /* UU_i*twid_i, update u[k], get twid_i */
do_dmdft:           f2=dm(i4,m6);                      /* UU_i */
                    f8=f10-f12;                        /* calculate last difference */
                    f0=f8+f9;                          /* return updated u[k] */
                    leaf_exit;
/* void fr_resp(int l, complex float *H, complex float *ha, complex float *hb, float pm *w) */
/* implementation of "for (ii=0; ii<l; ii++) H[ii]=w[ii]*hb[ii]/ha[ii];" */
.global _fr_resp;
_fr_resp: leaf_entry;
                    i4=r8;      /* pointer to H */
                    i3=r12;     /* pointer to ha */
                    i2=reads(1);    /* pointer to hb */
                    i12=reads(2);   /* pointer to w */
                    f11=2.0;
                    f2=dm(i3,m6);   /* ha_r */
                    f1=dm(i3,m6);   /* ha_i */
                    f3=dm(i2,m6);   /* hb_r */
                    f6=dm(i2,m6), f14=pm(i12,m14); /* hb_i, w */
                    lcntr=r4, do do_fr until lce;  /* loopcounter is l */
                        f10=f2*f3;                     /* ha_r*hb_r */
                        f13=f1*f6;                     /* ha_i*hb_i */
                        f9=f2*f6, f10=f10+f13;         /* ha_r*hb_i, num_real */
                        f13=f1*f3;                     /* ha_i*hb_r */
                        f9=f9-f13, f3=dm(i2,m6);       /* num_imag, get ha_r */
                        f5=f2*f2, f2=dm(i3,m6);        /* ha_r squared, get ha_r */
                        f6=f1*f1, f1=dm(i3,m6);        /* ha_i squared, get ha_i */
                        call div_ph (DB);
                        f12=f5+f6, f6=dm(i2,m6);       /* denominator, get hb_i */
                        f0=1.0;     /* numerator is 1.0 */
                        f10=f0*f10;                    /* num_real + inv_den */
                        f10=f10*f14;                   /* times w */
                        f9=f0*f9;                      /* num_imag * inv_den */
                        f9=f9*f14, dm(i4,m6)=f10, f14=pm(i12,m14); /* times w, store real part, get w */
do_fr:              dm(i4,m6)=f9;                      /* store imag part */
                    leaf_exit;
/* void cal_vdet[int l, float *vdet, complex float *h0, complex float *h1) */
/* implementation of "for (ii=0; ii<l; ii++) vdet[ii]=0.011*cabsf[h0]ii)*h1[ii];" */
.global _cal_vdet;
_cal_vdet:leaf_entry;
                    i4=r8;                      /* point to vdet */
                    i2=r12;                     /* point to h0 */
                    i3=reads(1);                /* point to h1 */
                    f1=0.5;                     /* used in sqrtf_ph */
                    f8=3.0;                     /* used in sqrtf_ph */
                    f10=0.001;                  /* scaling factor */
                    f2=dm(i2,m6);               /* h0_r */
                    f5=dm(i2,m6);               /* h0_i */
                    f3=dm(i3,m6);               /* h1_r */
                    f6=dm(i3,m6);               /* h1_i */
                    lcntr=r4, do do_vd until lce;   /* loopcounter is l */
                        f9=f2*f3;                  /* h0_r*h1_r */
                        f13=f5*f6;                 /* h0_i*h1_i */
                        f11=f2*f6, f9=f9-f13;      /* real part, h0_r*h1_i */
                        f13=f3*f5, f2=dm(i2,m6);   /* h1_r*h0_i, get h0_r */
                        f13=f11+f13, f5=dm(i2,m6); /* imag part, get h0_i */
                        f9=f9*f9, f3=dm(i3,m6);    /* real squared, get h1_r */
                        call sqrtf_ph (DB);
                        f13=f13*f13, f6=dm(i3,m6); /* imag squared, get h1_i */
                        f0=f9+f13;                 /* input to sqrt_ph */
                        f0=f4*f10;                 /* scale sqrt */
do_vd:              dm(i4,m6)=f0;                  /* store in vdet */
                    leaf_exit;
/* max_abs(int n, int m, int k, dm float **A) */
/* implementation of "for(i=k;i<n;i++) scale=FMAX(scale,fabs(A[i][k]))" */
.global _max_abs:
_max_abs:   leaf_entry;
                    m4=r8;                  /* modify = m */
                    i4=reads(1);            /* address of vector of pointers to A */
                    r0=dm(i4,m5);           /* point to the real address of A */
                    r1=r8+1;                /* m+1 */
                    r2=r12*r1(ssi);         /* startindex is [m-1] */
                    r1=r0+r2;               /* address of first element */
                    i4=r1;                  /* point to it */
```

```
                f2=f12-f12;
                r0=r4-r12;                      /* calculate loop counter */
                lcntr=r0, do calc_qr until lce;
                    f4=dm(i4,m4);               /* A[i][k] */
                    f8=ABS f4;                  /* fabs */
calc_qr:            f2=MAX(f2,f8);              /* update scale * 
                f0=f2;                          /* return value in f2 */
                leaf_exit;
/* float scale_pow2(int n, int m, int k, float invscale, float sum, float **A) */
/* implementation of "for [sum=0.0,i=k;i<n;i++]
                        {A[i][k]*=invscale;
                        sum+=POW2(A[i][k])}    */
.global _scale_pow2;
_scale_pow2: leaf_entry;
                r0=r4-r12;                      /* n-k */
                lcntr=r0;
                i4=reads(3);                    /* address of vector of pointers to A */
                r0=dm(i4,m5);                   /* point to the real address of A */
                r1=r8+1;                        /* m+1 */
                r2=r12*r1(ssi);                 /* startindex is (* m-1) */
                r1=r0+r2;                       /* address of first element */
                i4=r1;                          /* point to it */
                m4=r8;                          /* m */
                f1=reads(1);                    /* invscale */
                i12=reads(2);                   /* initialize sum * 
                f12=pm(i12,m13);
                do do_sp_qr until lce;
                    f4=dm(i4,m5);               /* get A[i][k] */
                    f2=f4*f1;                   /* times invscale * 
                    dm(i4,m4)=f2;               /* store in A[i][k] * 
                    f8=f2*f2;                   /* A[i][k]*A[i][k] * 
do_sp_qr:           f12=f12+f8;                 /* update sum */
                pm(i12,m13)=f12;
                leaf_exit;
/* tau_A(int n, int m, int k, int j, float pm tau, dm float **A) */
/* implementation of "for(i=k;i<n;i++) A[i][j] -= tau*A[i][k]" */
.global _tau_A;
_tau_A:         leaf_entry;
                r0=r4-r12;                      /* n-k */
                lcntr=r0;
                i4=reads(3);                    /* address of vector of pointers to A */
                r0=dm(i4,m5);                   /* point to the real address of A */
                r1=r8+1;                        /* m+1 */
                r2=r12*r1(ssi);                 /* startindex is k*(m+1) */
                r1=r0+r2;                       /* address of first element */
                i4=r1;                          /* point to it */
                r4=reads(1);                    /* j */
                r4=r4-r12;                      /* j-k */
                m4=r4;                          /* modify between A[i][k] and A[i][j] */
                r0=r8-r4;                       /* m-(j-k) */
                m0=r0;                          /* modify between A[i][j] and A[i][k] */
                f0=reads(2);                    /* tau */
                do do_t until lce;
                    f4=dm(i4,m4);               /* get A[i][k] */
                    f8=f0*f4;                   /* multiply by tau */
                    f4=dm(i4,m5);               /* get A[i][j] */
                    f2=f4-f8;                   /* A[i][j] - tau*A[i][k] */
do_t:               dm(i4,m0)=f2;               /* store in A[i][j] */
                leaf_exit;
/* float qr_scalar(int n, int m, int k, int j, float **A) */
/* implementation of "for (sum=0.0,i=k;i<n;i++) sum+=A[i][k]*A[i][j]" */
.global _qr_scalar;
_qr_scalar: leaf_entry;
                r0=r4-r12;                      /* n-k */
                lcntr=r0;
                i4=reads(2);                    /* address of vector of pointers to A */
                r0=dm(i4,m5);                   /* point to the real address of A */
                r1=r8+1;                        /* m+1 */
                r2=r12*r1(ssi);                 /* startindex is k*(m+1) */
                r1=r0+r2;                       /* address of first element */
                i4=r1;                          /* point to it */
                r4=reads(1);                    /* j */
                r4=r4-r12;                      /* j-k */
                m4=r4;                          /* modify between A[i][k] and A[i][j] */
                r0=r8-r4;                       /* m+(j+k) */
                m0=r0;                          /* modify between A[i][j] and A[i][k] */
                f0=f12-f12;                     /* initialize sum */
                do do_s_qr until lce;
                    f4=dm(i4,m4);               /* get A[i][k] */
```

-continued

```
                    f8=dm(i4,m0);           /* get A[i][j] */
                    f2=f4*f8;               /* A[i][j]*A[i][k] */
do_s_qr:            f0=f0+f2;               /* update sum */
                    leaf_exit;
/* float sumaib(int n, int m, int j, float *b, float **A) */
/* implementation of "for (sum=0.0,i=j;i<n;i--) sum+=A[i][j]*b[i]" */
.global _sumaib;
_sumaib:            leaf_entry;
                    r0=r4-r12;              /* n-j */
                    lcntr=r0;
                    i4=reads(2);            /* address of vector of pointers to A */
                    r0=dm(i4,m5);           /* point to the real address of A */
                    r1=r8+1;                /* m+1 */
                    r2=r12*r1(ssi);         /* startindex is k*(m+1) */
                    r1=r0+r2;               /* address of first element */
                    i4=r1;                  /* point to it */
                    m4=r8;                  /* modify for A[i][j] = m */
                    r4=reads(1);            /* address of b */
                    r0=r4+r12;
                    i3=r0;
                    f0=f12-f12;             /* initialize sum */
                    do do_sum until lce;
                    f4=dm(i4,m4);           /* get A[i][j] */
                    f8=dm(i3,m6);           /* get b[i] */
                    f2=f4*f8;               /* A[i][j]*b[i] */
do_sum:             f0=f0+f2;               /* update sum */
                    leaf_exit;
/* void btauA(int n, int m, int j, float tau, float *b, float **A) */
/* implementation of "for (i=j;i<n;i++) b[i]-=tau*A[i][j]" */
.global _btauA;
_btauA:             leaf_entry;
                    r0=r4-r12;              /* n-j */
                    lcntr=r0;
                    i4=reads(3);            /* address of vector of pointers to A */
                    r0=dm(i4,m5);           /* point to the real address of A */
                    r1=r8+1;                /* m+1 */
                    r2=r12*r1(ssi);         /* startindex is j*(m+1) */
                    r1=r0+r2;               /* address of first element */
                    i4=r1;                  /* point to it */
                    m4=r8;                  /* modify for A[i][j] = m */
                    r4=reads(2);            /* address of b */
                    r0=r4+r12;
                    i3=r0;
                    f2=reads(1);            /* tau */
                    do do_upd_qr until lce;
                    f4=dm(i4,m4);           /* get A[i][j] */
                    f8=f2*f4;               /* times tau */
                    f4=dm(i3,m5);           /* get b[i] */
                    f0=f4-f8;               /* b[i]-tau*a[i][j] */
do_upd_qr:          dm(i3,m6)=f0;           /* update b[i] */
                    leaf_exit;
/* float sumajb(int m, int i, float *b, float **A) */
/* implementation of "for (sum=0.0,j=i+1;j<m;j++) sum+=A[i][j]*b[j]" */
.global _sumajb;
_sumajb:            leaf_entry;
                    r1=r8+1;                /* i+1 */
                    r0=r4-r1;               /* m-i-1 */
                    lcntr=r0;
                    i4=reads(1);            /* address of vector of pointers to A */
                    r0=dm(i4,m5);           /* point to the real address of A */
                    r8=r4*r8(ssi);          /* (m*1) */
                    r8=r1+r8;               /* i+1+(m*i) */
                    r2=r0+r8;               /* address of first element */
                    i4=r2;                  /* point to it */
                    r0=r1+r12;              /* address of b[i+1] */
                    i3=r0;                  /* point to it */
                    f0=f12-f12;             /* initialize sum */
                    do do_ajb until lce;
                    f4=dm(i4,m6);           /* get A[i][j] */
                    f8=dm(i3,m6);           /* get b[j] */
                    f2=f4*f8;               /* b[j]*A[i][j] */
do_ajb:             f0=f0+f2;               /* update sum */
                    leaf_exit;
/* void rx_continue(void) sets up serial port receive, DMA. */
.global _rx_continue;
_rx_continue:leaf_entry;
                    r0=0;
                    dm(SRCTL1)=r0;
                    r0=_source;             /* set DMA rx index to start at source */
```

-continued

```
                dm(I11)=r0;
                r0=1;                       /* set DMA modify to 1 */
                dm(IM1)=r0;
                r0=@__source;               /* set DMA count to length of source */
                dm(C1)=r0;
                r0=0x000420f3;
/*              r0=0x000464f3;*/
                dm(SRCTL1)=r0;              /* Rx DMA enable */
                                            /* external RFS */
                                            /* RFS required */
                                            /* Serial word length 16 */
                                            /* Sport enable */
                                            /* sign extend into unusec MSB's */
                leaf_exit;
/* void set_ints(void) */
/* Sends interrupt to 2181, enables SPORT1 Rx interrupt */
.global __set_ints;
__set_ints:leaf_entry
                bit set imask SPR1I;        /* enable sport 1 rx interrupt */
                bit set mode1 IRPTEN;       /* global interrupt enable */
                bit set mode2 FLG2O;        /* set flag2 to output */
                bit set astat FLG2;         /* set flag2 =1 */
                bit clr astat FLG2;         /* send interrupt */
/*              r0=0x000f0005;
                dm(RDIV1)=r0;*/
                leaf_exit;
/* serial rx service routine */
.global __rx_svd;
__rx_svd:       leaf_entry;
                r0=1;
                dm(__rx_interrupt)=r0;
                leaf_exit;
/* ---------------------- SUBROUTINES ------------------------ */
/* floating point division, page B-39 in SHARC user's manual */
/*      required:       f11=2.0
        input:          f0=numerator, f12=denominator
        output:         f0=result
        affected:       f0, f7, f12 */
div_ph:         f0=recips f12, f7=f0;
                f12=f0*f12;
                f7=f0*f7, f0=f11-f12;
                f12=f0*f12;
                f7=f0*f7, f0=f11-f12;
                f12=f0*f12;
                rts (DB);
                f7=f0*f7, f0=f11-f12;
                f0=f0*f7;
/* inverse of float
        required:       r4=0x3f800000, r8=0x40000000
        input:          f5
        output:         f2
        affected:       f4, f12 */
inv_ph:         f2=recips f5;
                f12=f2*f5;
                f4=f2*f4, f2=f8-f12;
                f12=f2*f12;
                f4=f2*f4, f2=f8-f12;
                f12=f2*f12;
                f4=f2*f4, f2=f8-f12;
                f4=f2*f4;
                f2=f2-f12;
                rts (DB);
                f2=f2*f4;
                f2=f2+f4;                   /* inverse of denominator */
/* sqrtf_ph is taken from page B-40 in the SHARC user's manual
        required:       f1=0.5, f8=3.0
        input:          f0
        output:         f4
        affected:       f12 */
sqrtf_ph:       f4=RSQRTS f0;
                f12=f4*f4;
                f12=f12*f0;
                f4=f1*f4, f12=f8-f12;
                f4=f4-f12;
                f12=f4*f4;
                f12=f12*f0;
                f4=f1*f4, f12=f8-f12;
                f4=f4*f12;
                f12=f4*f4;
```

-continued

```
                f12=f12*f0;
                f4=f1*f4, f12=f8-f12;
                rts(DB);
                .
                .
                f4=f4*f12;
                f4=f0*f4;
.endseq;
```

/* ---------------------------- a_svd4.c -------------------------------
This program includes routines which can be used in the analysis of data
obtained from a Ground Penetrating Radar system with a rotating antenna.
The measured data is read into the program from a serial port.
The calculations involve a rotational analysis based on the Discrete Fourier
Transform with respect to angle via the function "dft", and the development
of an ARMA model in the "time" range using Shank's extension to the basic
Prony method via the functions "shank" and "prony". The sets of n linear
equations which are parts of Shank's method are solved by QR-decomposition
and back substitution via the functions "qr" and "qrsolv". The discrete frequency
response of the ARMA model is obtained by the function "freqz". A detection on
two frequency responses is carried out by the function "detect".
Functions for allocating and deallocating memory for vectors and matrices of
floats and complex floats are included.
The program runs on a SHARC ADSP-21062 processor, and is compiled by the Gnu
q21k compiler.
Written by: Peter Hazell, Ekko Dane Production A/S
Last modified: 240698 by: PH
mod from a_mean.c: svd solver implemented.
uses bsvd4.asm
-------------------------------------------------------------------- */

```c
# include <stoio.h>
# include <math.h>
# include <dspc.h>
# include <complex.h>
# include <stdef.h>
# include <stdlib.h>
# include <signal.h>
# include "def_4.h"
# include <21060.h>
static float maxarg1, maxarg2, pow2arg;
static int minarg1, minarg2;
# define FMAX[a,b] (maxarg1=(a),maxarg2=(b),(maxarg1) > maxarg2) ? (maxarg1) : (maxarg2))
# define FMIN[a,b] (maxarg1=(a),maxarg2=(b),(maxarg1) > maxarg2) ? (maxarg2) : (maxarg1))
# define SIGN(a,b) ((b)>=0.0 ? (a) : -(a))
# define IMIN(a,b) (minarg1=(a),minarg2=(b),(minarg1) > minarg2) ? (minarg2) : (minarg1))
# define SQR(a) (pow2arg=(a), powarg*pow2arg)
# define TIMEOUT 1e10
/* constants and globals */
static float pm uu_real[Nr*ku];
static float pm uu_imag[Nr*ku];                    /* vectors for data matrix download */
static float dm norm_real[Nr*NO_ANTENNAS];
static float dm norm_imag[Nr*NO_ANTENNAS];
extern int source[RAWDATA];
extern int rx_interrupt;
/*float vdet[np], ldet[np];*/            /* output */
static float dm vdet[np];                /* output */
int done=0;                              /* done flag to interface program */
int got_here=1;
int normal;
int subtract=0;
int do_filter=0;
int do_shank=1;
int do_smoothe=0;
int done_normalizing=0;
int done_detecting=0;
int no_converge=0;
int done_initialization=1;
int angle_determined=0;
float angle_pos=0.0;
float phase=90.0;
/* prototypes for functions managing memory */
float *vector_cal(int n);
complex float *c_vector_cal(int n);
float *vector(int n);
complex float *c_vector(int n);
float **matrix_cal(int row, int col);
float **matrix(int row, int col);
complex float **c_matrix(int row, int col);
void   free_vector(float *v);
void   free_c_vector(complex float *v);
void   free_matrix(float **m);
```

-continued

```
void    free_c_matrix(complex float **m);
/* prototypes for calculation functions */
void    make_index(int *index);
void    indata(int *source, float pm *uu_real, float pm *uu_imag, int *index, int*serial_check);
void    normalize(float *norm_r, float *norm_i);
void    twiddle(complex float twid_px[ku], int px);
void    dft(float *u, float pm *uu_real, float pm *uu_imag, complex float twid_px[ku]);
void    filter(float pm *b, float pm *a, float *x, int N, int 1);
void    filtfilt(float *x, float pm *b, float pm *a, float *zi, int 1);
float   pythag(float a, float b);
void    svdcmp(float **a, int m, int n, float *w, float **v);
void    svdsmoothe(float *w, int n);
float   findmax(float *v, int n);
void    svdsolve(float **u, float *w, float **v, int m, int n, float *b, float *x);
void    prony(float *x, int Q, int P, float *a);
void    prony_pade(float *x, int Q, int P, float *b, float *a);
void    shank(float *x, int Q, int P, float *b, float *a);
void    mk_s_and_w(complex float pm s[np], float pm w[np]);
void    freqz(int na, float *a, float *b, complex float *H, complex float pm s[np], float pm w[np]);
void    detect(complex float *H0, complex float *H1, float vdet[np], float ldet[np]);
void    qr(int n, int m, float **A, float *c, float *d);
void    qrsolv(int n, int m, float **A, float *c, float *c, float *b);
void    prony_qr(float *x, int Q, int P, float *a);
void    prony_pade_qr(float *x, int Q, int P, float *b, float *a);
void    shank_qr(float *x, int Q, int P, float *b, float *a);
float   determine_angle(float pm *uu_real, int position, complex float pm s[np], float pm w[np],
complex float *twid_px);
/* prototypes for assembly functions */
float   searchmax(float *v, int n);
float   pyth(float a, float b);
void    sum_and_scale(int m, int n, int i, int l, float invn, float **a);
void    sum2_and_scale(int m, int n, int i, int l, float invn, float **a);
void    sum3_and_scale(int m, int n, int i, int l, float **v, float **a);
void    sum4_and_scale(int m, int n, int i, int l, float *rv1, float **a);
void    get_div(int indx, int *source, float pm *uu_r, float pm *uu_i, int in_uu);
void    norm_div(int indx, int jj, float *n_r, float *n_i, float pm *uu_r, float pm *uu_i);
void    mk_Xa(int m, int l, int indx, int row, float *x, float **Xa);
void    mk_Ha(int m, int l, int row, float *ha, float **Ha);
void    impuls(int ii, int l, float *ha, float *a);
float   f_abs(float x);
float   svd_1(int m, int k, float **A, int 1);
void    svd_2(float invscale, int k, int m, float pm *sumpow, float **A, int 1);
void    svd_3(int m, int i, int j, int l, float f, float **A, int st);
void    svd_4(int m, int i, int l, float scale, dm float **A);
float   svd_5(int m, int k, int j, float **A);
void    svd_6(float invscale, int i, int m, float pm *sum, float **A, int j);
void    svd_7(int m, int i, float invh, float *rv1, float **A, int j);
void    svd_8(int m, int j, int i, float **A, int st);
void    svd_9(int m, int j, float s, float *rv1, float **A, int st);
void    svd_10(int m, int l, float scale, dm float **a, int st);
void    svd_11(int m, int i, float s, dm float **V, dm float **A, int st);
float   svd_12(int m, int i, int j, float **A, float **V, int st);
void    svd_13(int m, int i, dm float **v, int st);
void    svd_14(int m, int l, int n, int i, float c, float s, dm float **a);
float   svd_15(int m, int j, int st, float *b, float **A, int l);
float   svd_16(int m, int j, float *b, float **A);
float   scalar(int n, int m, int k, int j, float **A, int l);
void    evalhx(int ii, int n, float *a, complex float pm *s, complex float *ha);
/*float cal_dft(int k, int k_u, int N_s, float u, float pm *uu_real, float pm *uu_imag, complex
float   *twid_px);*/
float   cal_dft(int k, int k_u, int N_s, float pm *uu_real, float pm *uu_imag, complex float
*twid_px);
float   dm_dft(int k_u, float *uu_real, float *uu_imag, complex float *twid_px);
void    rx_continue(void);
void    rx_svd(void);
void    set_ints(void);
void    tx_antenna(int pos);
float   max_abs(int n, int m, int k, float **A);
void    scale_pow2(int n, int m, int k, float invscale, float pm *sumpow, float **A);
void    tau_A(int n, int m, int k, int j, float tau, float **A);
float   qr_scalar(int n, int m, int k, int j, float **A);
float   sumaib(int n, int m, int j, float *b, float **A);
void    btauA(int n, int m, int j, float tau, float *b, float **A);
float   sumajb(int m, int i, float *b, float **A);
void    fr_resp(int l, complex float *H, complex float *ha, complex float, *hb, float pm *w);
void    cal_vdet(int l, float *vdet, complex float *h0, complex float *h1);
main( )
{
    int counter=0;
```

-continued

```
        int ii, jj;                                   /* counters */
        static int index[Ns], serial_check[1]=[1];
        complex float *H0, *H1, twid_p2[ku], twid_p8[ku];
        float *a, *b, *ut0, *ut1;
/*      static float pm b_hp1[4]={0.8174824, -2.4527472, 2.4527472, -0.8175824};
        static float pm a_hp1[4]={1.0, -2.5985328, 2.2736861, -0.6684403}; */   /*5ns*/
        static float pm b_hp1[4]={0.6670312, -2.0010937, 2.0010937, -0.6670312};
        static float pm a_hp1[4]={1.0, -2.2006360, 1.6907151, -0.4448988};      /*10ns*/
        static float pm b_hp2[4]={0.5417665, -1.6253000, 1.6253000, -0.5417665};
        static float pm a_hp2[4]={1.0, -1.8085834, 1.2323036, -0.2932450};      /*15ns*/
        static float pm b_hp3[4]={0.436202, -1.308606, 1.308606, -0.436202};
        static float pm a_hp3[4]={1.0, -1.420727, 0.879754, -0.189134};         /*20ns*/
        static float pm b_f1[3]={0.7520041, -1.5040082, 0.7520041};
        static float pm a_f1[3]={1.0, -1.4415303, 0.5664860};
        float zi_1[2]={0.1230402, 0.1855181};
        static float pm b_f2[3]={0.6507412, -1.3014824, 0.6507412};
        static float pm a_f2[3]={1.0, -1.1755349, 0.4274298};
        float zi_2[2]={0.0973640, 0.2233114};
        static float pm b_f3[3]={0.5610593, -1.1221186, 0.5610593};
        static float pm a_f3[3]={1.0, -0.9191507, 0.3250865};
        float zi_3[2]={0.0330048, 0.2359728);
        static complex float pm s[np];
        static float pm w[np];
        void *svd_ptr;                                /* pointer to IRQ service routine */
/* ------------------- INITIAL ROUTINES -------------------*/
        svd_ptr=(int*)rx_svd;
        interrupts(SIG_SPR1I, svd_ptr):               /* set up service routine for SPORT1 Rx interrupt */
/*      interrupts(SIG_TMZ, svd_ptr);*/               /* set up timer interrupt */
        for (ii=0; ii<10; ii++) asm("nop;");
        tx_antenna[ku];
        for (ii=0; ii<np; ii++)
        {
            vdet[ii]=0.0;
/*          ldet[ii]=0.0;*/
        }
        for (ii=0; ii<RAWDATA; ii++) source[ii]=1;
/*      timer_set(0,TIMEOUT);*/
        /* calculate twiddle factors for tracks p2 and p8 */
        twiddle(twid_p2, p2);
        twiddle(twid_p8, p8);
        /* calculate time vectors for freqz */
        mk_s_and w(s, w);
        /* make vector of indices into received data */
        make_index(index);
        /* send 'ready' interrupt to 2181, setup SPORT1 for Rx of first 4 words */
        set_ints( );
        rx_interrupt=0;
        rx_continue( );
        asm("bit clr astat 0x00200000;");             /* send interrupt to IRQL0 */
        for (ii=0;ii<10;ii++) asm("nop;");
        asm("bit set astat 0x00200000;");             /* reset interrupt to IRQL0 */
        tx_antenna(ku);
/* ------------ MAIN CALCULATION PROGRAM -------------- */
        while(1)                                      /* forever */
        {
            while(got_here==1);                       /* wait for interface to set got_here=0 */
            got_here=1;                               /* ready for next time . . . */
            done=0;
            done_normalizing=0;
            /* read measured data into uu_real and uu_imag */
            indata(source, uu_real, uu_imag, index, serial_check);
            if (norm==1) normalize(norm_real, norm_imag);
            done_normalizing=1;
            angle_determined=0;
            if [angle_pos!=0.0]
            {
                phase=determine_angle(uu_real, angle_pos, s, w, twid_p2);
                angle_determined=1;
                angle_pos=0.0;
                counter=0;
            }
            /* calculate DFT-coefficients of tracks p8 and p2 *
/*          ut0*vector_cal(Nr);
            ut1=vector_cal(Nr);*/                     /* DFT vectors *
            ut0=vector(Nr);
            ut1=vector(Nr);                           /* DFT vectors */
            dft(ut0, uu_real, uu_imag, twid_p2);
            dft(ut1, uu_real, uu_imag, twid_p8);
            if (do_filter==1)
```

-continued

```
            {
                filtfilt(ut0,b_f1,a_f1,zi_1,Nr);
                filtfilt(ut1,b_f1,a_f1,zi_1,Nr);
            }
            if (do_filter==2);
            {
                filtfilt(ut0,b_f2,a_f2,zi_2,Nr);
                filtfilt(ut1,b_f2,a_f2,zi_2,Nr);
            }
            if (do_filter==3)
            {
                filtfilt(ut0,b_f3,a_f3,zi_3,Nr);
                filtfilt(ut1,b_f3,a_f3,zi_3,Nr);
            }
            /* estimate poles and zeros from DFT-coeffs. */
            a=vector(ma+1);                         /* estimated denominator coeffs */
            b=vector_cal(mb+1);                     /* estimated numerator coeffs */
            if (counter==1)
            {
                if (do_shank==0) prony_pade(ut0, mb, ma, b, a);
                else shank(ut0, mb, ma, b, a);
            }
            else
            {
                if (do_shank== 0) prony_pade_qr(ut0, mb, ma, b, a);
                else shank_qr(ut0, mb, ma, b, a);
            }
            free_vector(ut0);
            /* calculate frequency response of estimated filter * 
            H0=c_vector(np);                        /* frequency response of estimated filter */
            freqz(ma+1, a, b, H0, s, w);
            /* estimate poles and zeros from DFT-coeffs. */
            if (counter==1)
            {
                if (do_shank==0) prony_pade(ut1, mb, ma, b, a);
                else shank(ut1, mb, ma, b, a);
            }
            else
            {
                if (do_shank==0) prony_pade_qr(ut1, mb, ma, b, a);
                else shank_qr(ut1, mb, ma, b, a);
            }
            free_vector(ut1);
            /* calculate frequency response of estimated filter */
            H1=c_vector(np);                        /* frequency response of estimated filter */
            freqz(ma+1, a, b, H1, s, w);
            /* carry out detection */
            done_detecting=0;
/*          detect(H0, H1, vdet, 1det];*/
            cal_vdet(np,vdet,H0,H1);
            done_detecting=1;
            free_vector(a);                         /* clean up mess */
            free_vector(b);
            free_c_vector(H0);
            free_c_vector(H1);
            if (no_converge==1)
            {
                serial_check(0)=123;
                no_converge=0;
            }
            counter=1;                              /* looping done, program is running properly */
            done = serial_check[0];                 /* return flag to interface program */
        }
        return(0);
}
/* --------------------------- make_index ------------------------
Make vector of indices corresponding to the measurement series in the 2181.
The index of index [1] is the measurement number. The value at that point is
the frequency placement of the measurement, e.g index[1]=60 means the second
measurement is the 61st frequency.
------------------------------------------------------------------------- */
void
make_index(int *index)
{
    int ii;
    for (ii=0; ii<(Ns/2); ii++)
    {
        index[2*ii]=ii;
        index[2*ii+1]=ii+(Ns/2);
```

-continued

```
    }
}
/* ---------------------------------- indata -------------------------------
Indata reads measured data from files predata.re and predata.im containing
real and imaginary parts of data from one rotation. Data is stored in
complex form in matrix UU. Each column of UU contains data from one frequency sweep for one
antenna position.
The file handling functions require the DSP host program inllk.exe
This function can be interchanged with an interrupt service routine, which
reads data from a serial port.
------------------------------------------------------------------------- */
void
indata(int *source, float pm *uu_real, float pm *uu_imag, int *index, int *serial_check)
{
    int ii, jj;                              /* counters */
    int indx, indx_ii;                       /* temp index variable */
    float den, inv_den, m_r, m_i, r_r, r_i;
    while (rx_interrupt==0);
    rx_continue( );
    asm("bit clr astat 0x00200000;");
    for (ii=0;ii<10;ii++) asm("nop;");
    asm("bit set astat 0x00200000;");
    rx_interrupt=0;
    for (ii=0; ii<ku; ii++)
    {
        indx_ii=4*Ns*ii;
        for (jj=0; jj<Ns; jj++)
        {
            if ((index[jj]<Nr+STARTPOINT)&&(index[jj]>=STARTPOINT))
            {
                indx=4*jj+indx_ii;
                get_div[4*jj+indx_ii,source,uu_real,uu_imag,ii*Nr+index[jj]-STARTPOINT);
/*          indx=4*jj+4*Ns*ii;*/              /* index into source */
/*              indx=4*jj*indx_ii;
                m_r=(float)(source[indx]);
                m_i=(float)(source[indx+1]);
                r_r=(float)(source[indx+2]);
                r_i=(float)(source[indx+3]);
                den=r_r*r_r+r_i*r_i;
                if (den>=1.0e-10) inv_den=1.0/den;
                else inv_den=1.0e10;
                indx=ii*Nr+index[jj]-STARTPOINT;
                uu_real[indx]=(m_r*r_r+m_i*r_i)*inv_den;
                uu_imag[indx]=(m_i*r_r-m_r*r_i)*inv_den; */
            }
        }
    }
    /* check serial transmission and MAC overflow in 2181 */
    if (source[RAWDATA-1]==0x1234) serial_check[0]=1;      /* transfer OK, no overflow */
    if (source[RAWDATA-1]==0x4321) serial_check[0]=2;      /* MAC overflow */
    if (source[RAWDATA-1]==0x9876) serial_check[0]=3;      /* ADC OTR */
    if ((source[RAWDATA-1]!=0x9876)&&(source[RAWDATA-1]!=0x4321)&&(source(RAWDATA-1]!=0x1234))
serial_check[0]=4;
}
/* ---------------------------- normalize ----------------------------------
Normalize complex data with normalization vectors.
------------------------------------------------------------------------- */
void
normalize(float *norm_r, float *norm_i)
{
    int ii, jj, indx, indx_ii;
    float den, inv_den, num_r, num_i, den_r, den i;
    for (ii=0; ii<NO_ROT; ii++)
    {
        indx_ii=ii*Nr*NO_ANTENNAS;
        for (jj=0; jj<Nr*NO_ANTENNAS; jj++)
        {
            norm_div(indx_ii+jj,jj,norm_r.norm_i.uu_real.uu_imag);
/*          num_r=uu_real[indx];
            num_i=uu_imag[indx];
            den_r=norm_r[jj];
            den_i=norm_i[jj];
            den=den r*den r+den i*den_i;
            if (den>=le-10) inv_den=1.0/den;
            else inv_den=1.0e10;*/                          /* 1 over denominator of complex division */
/*          uu_real[indx]=(num_r*den_r+num_i*den_i)*inv_den;*/ /* real part of result */
/*          uu_imag[indx]=(num_i*den_r-num_r*den_i)*inv_den;*/ /* imaginary part of result */
        }
    }
```

```
}
/* ---------------------------- twiddle --------------------------------
Function twiddle calculates the twiddle factors for DFT calculation. The
factors are calculated for column no. px and returned in the vector twid_px.
------------------------------------------------------------------- */
void
twiddle(complex float twid_px[ku], int px)
{
    int ii;
    for (ii=0; ii<ku; ii++) twid_px[ii]=cexpf(-1.0)*2*pi*px*ii/ku);
}
/* -------------------------------- dft --------------------------------
Function dft calculates the DFT-coefficient specified by k on each row in
data-matrix UU. The function overwrites vector vdft with the DFT-coeffs.
corresponding to k. The size of the DFT's is specified by ku.
------------------------------------------------------------------- */
void
dft(float *u, float pm *uu_real, float pm *uu_imag, complex float twid_px[ku],
{
    int k;                                      /* indices */
    for (k=0; k<Nr; k++)
    {
/*      cal_dft(k,Ku,Nr,u,uu_real,uu_imag,twid_px);*/
/*      u[k]=cal_dft(k,ku,Nr,u[k],uu_real,uu_imag,twid_px);*/
        u[k]=cal_dft(k,ku,Nr,uu_real,uu_imag,twid_px);
    }
}
/* ------------------------------ filter -------------------------------
Filter the data in ut with the filter specified in pre_filt
------------------------------------------------------------------- */
void
filter(float pm *b, float pm *a, float *x, int N, int 1)
{
    int n,k,ii;
    float *y;
    float *xx;
    y=vector_cal(1+N);
    xx=vector_cal(1+N);
    for (ii=N; ii<1+N; ii++) xx[ii]=x[ii-N];
    for (n=N; n<N+1; n++)
    {
        for (k=0; k<=N; k++) y[n]+=b[k]*xx[n-k];
        for (k=1; k<=N; k++) y[n]-=a[k]*y[n-k];
    }
    for [ii=0; ii<1; ii++) x[ii]=y[ii+N];
    free_vector[xx];
    free_vector[y];
}
/* ---------------------------- filtfilt -------------------------------
Filter the data in ut with the filter specified in pre_filt
------------------------------------------------------------------- */
void
filtfilt(float *x, float pm *b, float pm *a, float *zi, int 1]
{
    int ii, indx;
    float *y, *xx;
    y=vector(1+12);
    xx=vector(1+12);
    for (ii=6; ii>0; ii--) y[-ii+6]=2*x[0]-x[ii];
    for (ii=6; ii<1+6; ii++) y[ii]=x[ii-6];
    /* filter in the forward direction */
    xx[0]=[zi[0]+b[0]*y[0];
    xx[1]=zi[1]*y[0]+b[0]*y[1]+b[1]*y[0]-a[1]xx[ ];
    for (ii=2; ii<1+6; ii++) xx[ii]=b[0]*y[ii]+b[1]*y[ii-1]+b[2]*y[ii-2]
                                            -a[1]*xx[ii-1]-a[2]*xx[ii-2];
    for [ii=1+6, indx=1+4; ii<1+12;ii++) xx[ii]=2*xx[1+5]-xx[indx--];
    /* filter in the backward direction */
    y[1+11]=(zi[0]+b[0])*xx[1+11];
    y[1+10]=zi[1]*xx[1+11]+b[0]*xx[1+10]+b[1]*xx[1+11]-a[1]*y[1+11];
    for (ii=i+9; ii>=0; ii--]
y[ii]=b[0]*xx[ii]+b[1]*xx[ii+1]+b[2]*xx[ii+2]-a[1]*y[ii+1]-a[2]*y[ii+2];
    /* loose the ends. . */
    for (ii=0; ii<1; ii++) x[ii]=y[ii+6];
    free_vector[y];
    free_vector[xx];
}
void
svdcmp(float **a, int m, int n, (float *w, float **v)
/* a: m x n
```

```
      U read out in a
      V not transposed */
{
    int flag, i, its, j, jj, k, l, nm;
    float anorm, c, f, g, h, s, scale, x, y, z, *rv1;
    static float pm s2[1];
    float invscale, invh, invqinvai1, invz, ginvaii;
    rv1=vector_cal[n];
    g=scale=anorm=0.0;
    for (i=0; i<=n-1; i++)
    {
        l=i+1;
        rv1[i]=scale*g;
        q=s=scale=0.0;
        if (i<m)
        {
            scale=svd_1(n,i,a,m);
            if (scale)
            {
                invscale=1.0/scale;              /* reduce divisions*/
                s2[0]=s;
                svd_2(invscale,i,n,s2,a,m);
                s=s2[0];
                f=a[i][i];
                  q=-SIGN(sqrt(s),f);
                h=f*q-s;
                  invh=1.0/h;
                a[i][i]=f-g;
                if (n>1) sum_and_scale(m,n,i,l,invh,a);
                svd_4(n,i,m,scale,a);
            }
        }
        w[i]=scale*g;
        g=s=scale=0.0;
        if (i<m && i!=n-1)
        {
            scale=svd_5(n,i,l,a);
            if (scale)
            {
                invscale=1.0/scale;              /* reduce divisions*/
                s2[0]=s;
                svd_6(invscale,i,n,s2,a,l);
                s=s2[0];
                f=a[i][l];
                g=-SIGN(sqrt(s),f);
                h=f*g-s;
                  invh=1.0/h;                    /* reduce divisions */
                a[i][l]=f-g;
                  svd_7(n,i,invh,rv1,a,l);
                  if (m>1) sum4_and_scale(m,n,i,rv1,a);
                svd_10(n,i,scale,a,l);
            }
        }
        anorm=FMAX(anorm, (f_abs(w[i])+f_abs(rv1[i]j]));
    }
    for (i=n-1; i>=0; i--)
        if (i<n-1)
        {
            if (g)
            {
                invginvail=1.0/(g*a[i][l]);       /* reduce divisions*/
                svd_11(n,i,invginvail,v,a,l);
                if (n>1) sum3_and_scale(m,n,i,l,v,a);
                    s=svd_12(n,i,j,a,v,l);
            }
            svd_13(n,i,v,l);
        }
        v[i][i]=1.0;
        g=rv1[i];
        l=i;
    }
    for [i=IMIN(m,n)-1; i>=0; i--;
    {
        l=i+1;
        g=w[i];
        for (j=l; j<n; j++) a[i][j]=0.0;
        if (g)
        {
            g=1.0/g;
```

```
            ginvali=g/a[i][i];
            if (n>1) sum2_and_scale(m,n,i,l,ginvail,a);
            svd_4(n,i,m,g,a);
        }
        else for (j=i; j<m; j++) a[j][i]=0.0;
        ++a[i][i];
    }
    for (k=n-1; k>=0; k--)
    {
        for (its=0; its<30; its++)
        {
            flag=1;
            for (l=k; l>=0; l--)
            {
                nm=l-1;
                if ((float)(f_abs(rv1[l])+anorm) == anorm)
                {
                    flag=0;
                    break;
                }
                if ((float)(f_abs(w[nm])+anorm) == anorm) break;
            }
            if (flag)
            {
                c=0.0;
                s=1.0;
                for (i=1; i<=k; i++)
                {
                    f=s*rv1[i];
                    rv1[i]=c*rv1[i];
                    if ((float)(f_abs(f)+anorm) == anorm) break;
                    g=w[i];
                    h=pyth(f,g);
                    w[1]=h;
                    h=1.0/h;
                    c=g*h;
                    s=-f*h;
                    svd_14(n,m,nm,i,c,s,a);
                }
            }
            z=w[k];
            if (l==k)
            {
                if (z<0.0)
                {
                    w[k]=-z;
                    for (j=0; j<=n-1; j++) v[j][k]*=-1.0; /*reduce pointer op*/
                }
                break;
            }
            if (its==29) no_converge=1;
            x=w[l];
            nm=k-1;
            y=w[nm];
            g=rv1[nm];
            h=rv1[k];
            f=((y-z)*(y+z)+(g-h)*(g+h))/12.0*h*y);
            g=pyth(f,1.0);
            f=((x-z)*(x+z)+h*((y/(f+SIGN[g,f])[1-n1])/x;
            c=s=1.0;
            for (j=1; j<=nm; j++)
            {
                i=j+1;
                g=rv1[i];
                y=w[i];
                h=s*g;
                g=c*g;
                z=pyth(f,h);
                rv1[j]=z;
                invz=1.0/z;
                c=f*invz;
                s=h*invz;
                f=x*c+g*s;
                g=g*c-x*s;
                h=y*s;
                y*=c;
                svd_14(n,n,j,i,c,s,v);
                z=pyth(f,h);
                w[j]=z;
```

```
            if [z]
            {
                z=1.0/z;
                c=f*z;
                s=h*z;
            }
          }
          f=c*g+s*y;
          x=c*y-s*g;
          svd_14(n,m,j,i,c,s,a);
        }
        rv1[l]=0.0;
        rv1[k]=f;
        w[k]=x;
      }
    }
    free_vector(rv1);
}
float
pythag(float a, float b)
{
    float absa, absb;
/*      absa=fabs[a];*/
/*      absb=fabs[b];*/
    absa=f_abs[a];
    absb=f_abs[b];
    if (absa>absb) return absa*sqrt(1.0+SQR(absb/absa));
    else return (absb==0.0 ? 0.0 : absb*sqrt(1.0+SQR(absa/absb)));
}
void
svdsmoothe(float *w, int n)
{
    int ii;
    float w_max;
    for (ii=0; ii<n; ii++) if (w[ii]<1e-10) w[ii]=1e10;
/*      w_max=findmax(w,n);    */           /* find largest singular value */
    w_max=searchmax(w,n);
    w_max*=0.075;                           /* scale with appropriate factor */
    for (ii=0; ii<n; ii++) w[ii]+=w_max;    /* add smoothing constant to SV's */
}
float
findmax(float *v, int n)
{
    int ii;
    float fmax=-1e99;                       /* very small */
    for (ii=0; ii<n; ii++) fmax=FMAX(fmax,v[ii]);
    return fmax;
}
void
svdsolve(float **u, float *w, float **v, int m, int n, float *b, float *x)
{
    int jj, j, i, hlp=0;
    float s, *tmp;
    tmp=vector(n);
    for (j=0; j<=n-1; j++)
    {
        s=0.0;
        if (w[j])
        {
/*          for (i=0; i<=m-1; i-+) s+=u[i][j]*b[i];*/
            s=svd_15(n,j,hip,b,u,m);
            s/=w[j];
        }
        tmp[j]=s;
    }
    for (j=0; j<=n-1; j++)
    {
        s=0.0;
/*          for (jj=0; jj<=n-1; jj++) s+=v[j][jj]*tmp[jj];*/
/*          s=svd_16(n,j,n,tmp,v);*/
        s=svd_16(n,j,tmp,v);
        x[j]=s;
    }
    free_vector(tmp);
}
/* --------------------------- prony --------------------------- */
Function prony estimates the denominator A(z) of the system underlying the
data given in the vector x, and returns the polynomial coefficients in vector a.
The order of A[z] is P, and the order of the numerator is Q.
Therrien pp 550–553
```

```
-continued

---------------------------------------------------------------------- */
void
prony(float *x, int Q, int P, float *a)
{
    int row, col, indx;                    /* indices */
    float **Xa, *a1, *w, **v, *sol;
    Xa=matrix(Nr-Q-1,P);                   /* matrix and vector for normal equations */
    a1=vector(Nr-Q-1);
    v=matrix(P,P);                         /* storage vectors for QR-solver */
    w=vector(P);
    sol=vector(P);
    /* form Xa matrix, and al vector */
    for (row=Q+1, indx=0; row<Nr; indx++, row++)
    {
        a1[indx]= -x[row];
/*        for (col=0; col<P; col++) Xa[indx][col]=x[row-col-1];*/
        mk_Xa(P,P,indx,row,x,Xa);
    }
    /* solve (Xa*a = a1) by QR-decomposition */
/*    qr[Nr-Q-1, P, Xa, c, d);*/           /* perform QR-decomposition on Ha */
/*    qrsolv(Nr-Q-1, P, Xa, c, d, a1);*/   /* solve */
    svdcmp(Xa, Nr-Q-1, P, w, v);
    if (do_smoothe==1) svdsmoothe(w,P);
    svdsolve(Xa, w, v, Nr-Q-1, P, a1, sol);
    /* extract polynomial coefficients from a1 */
    a[0]=1.0;                              /* by definition */
    for (row=1; row<=P; row++) a[row]=sol[row-1];
    free_matrix(Xa);
    free_vector(a1);
    free_vector(sol);
    free_vector(w);
    free_matrix(v);
}
/* --------------------------- prony_pade ------------------------------
The function prony_pade establishes and solves a least squares problem, in order
to estimate an ARMA model of the system by which the data in vector x was obtained.
The system is characterized by the numerator polynomial coefficients given in
vector b, and the denominator polynomial coefficients given in vector 3. The
orders of these polynomials are given by Q and P resp.
Prony_pade uses the function prony to estimate denominator coeffs.
------------------------------------------------------------------------- /*
void
prony_pade(float *x, int Q, int P, float *b, float *a)
{
    int row, col, strt=0, indx;            /* indices */
    float **Xb;
    /* estimate denominator using Prony's method */
    prony(x, Q, P, a);
    Xb=matrix_cal(Q+1,P+1);                /* X-matrix, all zeros */
    /* form matrix Xb, make multiplication of dot product */
    for (col=0; col<=P; col++)
    {
        indx=0;
        for (row=strt++; row<=Q; row++) Xb[row][col]=x[indx++]*a[col];
    }
    for (row=0; row<=Q; row++)
    {
        for (col=0; col<=P; col++) b[row]+=Xb[row][col];
    }
/* alternativ formulering */
/*    for (col=0; col<=P; col++)
    {
        indx=0;
        for (row=strt++; row<=Q; row++) b[row]+=x[indx++]*a[col];
    }
*/
    free_matrix(Xb);
}
/* --------------------------- shank ----------------------------------
The function shank establishes and solves a least squares problem in order to
estimate an ARMA model of the system by which the data in vector x was obtained.
The system is characterized by the numerator polynomial coefficients given in
vector b, and the denominator polynomial coefficients given in vector 3. The
order of these polynomials are given by Q and P resp.
Shank uses the function prony to estimate denominator coeffs., and the
functions qr and qrsolv to solve a set of normal equations by QR-decomposition.
Therrieh pp 558–559
---------------------------------------------------------------------- */
void
shank(float *x, int Q, int P, float *b, float *a)
```

```
{
    int row, col;                                    /* indices */
    int ii, jj;                                      /* counters */
    float **Ha, *ha, *w, **v;
    /* estimate denominator using Prony's method */
    prony(x, Q, P, a);
    ha=vector_cal[Nr];
    /* calculate ha, the impulse response of 1/A(z), Nr long */
    ha[0]=a[0];
    for [ii=1; ii<Nr; ii++]
    {
/*      for (jj=1; (jj<=ii)&&(jj<=P); jj++) ha[ii!-=a[jj]*ha[ii-jj];*/
        impuls(ii,IMIN(ii,P),ha,a);
/*      {
            if (jj<=P) ha[ii]-=a[jj]*ha[ii-jj];
        }*/
    }
    Ha=matrix_cal(Nr,Q+1);                           /* matrix for normal equations */
    /* form matrix Ha */
    for (row=0; row<Nr; row++)
    {
/*      for (col=0; icol<=row)&&(col<=Q1; col++)
        {
            if (row>=col) Ha[row][col]=ha[row-col];
            else Ha[row][col]=0.0;
        }*/
/*      for (col=0; col<=Q; col++) Ha[row][col]=ha[row-col];*/
        mk_H(Q+1,IMIN(Q, row)+1, row,ha,Ha);
    }
    free_vector(ha);
    v=matrix(Nr,Q+1);
    w=vector(Q+1);
/*      al=vector(Q+1);*/
    /* solve (Ha*b = x) by QR-decomposition */
/*      qr(Nr, Q+1, Ha, c, d);*/                    /* perform QR-decomposition on Ha */
/*      qrsolv(Nr, Q+1, Ha, c, d, x);*/             /* solve */
    svdcmp(Ha, Nr, Q+1, w, v);
/*      svdsolve(Ha, w, v, Nr, Q+1, x, al);*/
    if (do_smoothe==1) svdsmoothe(w,Q+1);
    svdsolve(Ha, w, v, Nr, Q+1, x, b);
    free_matrix(Ha);
    free_matrix(v);
    free_vector(w);
    /* extract polynomial coefficients from al */
/*      for (ii=0; ii<=Q; ii++) b[ii]=al[ii];*/
/*      free_vector(al);   */
}
/* ---------------------------- mk_s_and_w --------------------------
Make s and w vectors for the function freqs.
----------------------------------------------------------------------- */
void
mk_s_and_w(complex float pm s[np], float pm w[np])
{
    int ii;
    /* generate "time" vector s at n points equally spaced around
       the upper half of the unit circle.   */
    for (ii=0; ii<np; ii++)
    {
        w[ii]=[t1+ii*(t2-t1)/(np-1));
        creal(s[ii])=cosf(pi001*w[ii]);
        cimag(s[ii])=sinf(pi001*w[ii]);
    }
}
/* ---------------------------- freqz ----------------------------------
Function freqz calculates the n-point complex frequency response vector H of
the filter B/A:
```

$$H(e)^{hw} = \frac{B(z)}{A(z)} = \frac{b(1) + b(2)z^{-1} + \ldots + b(nb+1)z^{-nb}}{1 + a(2)z^{-1} + \ldots + a(na+1)z^{-na}}$$

```
given numerator and denominator coefficients in vectors b and a. The orders of
A(z) and B(z) is assumed to be na. The frequency response is evaluated at
n points equally spaced around the upper half of the unit circle.
----------------------------------------------------------------------- */
void
freqz(int na, float *a, float *b, complex float *H, complex float pm s[np], float pm w[np])
{
    int ii, jj, kk;                                  /* counters */
```

```
    complex float *ha, *hb;
    ha=c_vector_cal(np);              /* n-point frequency response of a and b */
    hb=c_vector_cal(np);
    /* evaluate polynomials at values specified by vector s, using Horner's method */
    for (ii=0; ii<na; ii++)
    {
       evalhx(ii,np,a,s,ha);
       evalhx(ii,np,b,s,hb);
    }
    /* calculate frequency response and weight with time*/
/*     for (ii=0; ii<np; ii++) H[ii]=w[ii]*hb[ii]/ha[ii];*/
    fr_resp(np,H,ha,hb,w);
    free_c_vector(ha);
    free_c_vector(hb);
}
/* --------------------------- detect ----------------------------------
This function performs detection on the two freq. responses H0 and H1. The
result is vdet=abs(H0=conj(H1)) and ldet which is vdet expressed in dB. The
calculation of complex absolute value is written out due to a bug in the g21k
compiler (new compiler works now, ph 150897).
------------------------------------------------------------------------ */
void
detect(complex float *H0, complex float *H1, float vdet[np], float ldet[np])
{
    int ii;                            /* counter */
    float ldet_max=-1000000.0;         /* very small */
/*     for (ii=0; ii<np; ii++) vdet[ii]=0.001*cabsf(H0[ii]*H1[ii]);*/
    cal_vdet(np,vdet,H0,H1);
/*        for(ii=0; ii<np; ii++) vdet[ii]*=0.001;*/
/*     {
       vdet[ii]=cabsf(H0[ii])+cabsf(H1[ii]);
       vdet[ii]=0.001*cabsf(H0[ii])*cabsf(H1[ii]);
       ldet[ii]=10*log10f(vdet[ii]);
       ldet_max=FMAX(ldet_max,ldet[ii]);*/ /*calculated in FC for speed */
/*     }
    for(ii=0; ii<np; ii++) ldet[ii]-=ldet_max;*/ /* scale */
}
/* --------------------------- *vector_cal ------------------------------
This function allocates memory for a vector of floatz, of size n.
------------------------------------------------------------------------ */
float
*vector_cal(int n)
{
    float *v;
    v=(float*)calloc((size_t) n, (size_t) sizeof(float));
    return v;
}
/* --------------------------- *c_vector_cal ---------------------------
This function allocates memory for a vector of complex floats, of size n.
------------------------------------------------------------------------ */
complex float
*c_vector_cal(int n)
{
    complex float *v;
    v=(complex float*)calloc(size_t) n, (size_t) sizeof(complex float));
    return v;
}
/* --------------------------- *vector ---------------------------------
This function allocates memory for a vector of floats, of size n.
------------------------------------------------------------------------ */
float
*vector(int n)
{
    float *v;
    v=(float*)malloc:(size_t) n);
    return v;
}
/* ----------------------- *c_vector ---------------------------
This function allocates memory for a vector of complex floats, of size n.
------------------------------------------------------------------------ */
complex float
*c_vector(int n)
{
    complex float *v;
    v=(complex float*imalloc((size_t) n*2);
    return v;
}
/* ----------------------- **matrix_cal ---------------------------
This function allocates memory for a matrix of floats, of size row x col.
```

```
----------------------------------------------------------------- */
float
**matrix_cal(int row, int col)
{
    int i;
    float **m;
    m=(float **) calloc (size_t) row, (size_t)(sizeof(float 1); /*pointers to rows*/
    m(0)=(float *) calloc((size_t) (row*col), (size_t)(sizeof(float)));
    for(i=1; i<=row-1; i--) m[i]=m(i-1)+col;
    return m;
}
/* --------------------------- **matrix ----------------------------
This function allocates memory for a matrix of floats, of size row x col.
----------------------------------------------------------------- */
float
**matrix(int row, int col)
{
    int i;
    float **m;
    m=(float **) malloc ((size_t) row); /*pointers to rows*/
    m[0]=(float *) malloc((size_t) (row*col));
    for(i=1; i<=row-1; i++) m[i]=m[i-1]+col;
    return m;
}
/* ----------------------- **c_matrix --------------------------
This function allocates memory for a matrix of complex floats, of size
row x col.
-------------------------------------------------------------- */
complex float
**c_matrix(int row, int col)
{
    int i;
    complex float **m;
    m=(complex float **) malloc ((size_t) row*2); /*pointers to rows*/
    m[0]=(complex float *) malloc((size_t) (row*col)*2);
    for(i=1; i<=row-1; i++) m[i]=m[i-1]+col;
    return m;
}
/* ----------------------- free_vector ---------------------------
Frees memory allocated for vector of floats v.
----------------------------------------------------------------- */
void
free_vector(float *v)
{
    free((char*) v);
}
/* --------------------- free_c_vector ------------------
Frees memory allocated for vector of complex floats c.
----------------------------------------------------------------- */
void
free_c_vector(complex float *v)
{
    free((char*) v);
}
/* ---------------------- free_matrix ---------------------------
Frees memory allocated for matrix of floats m.
----------------------------------------------------------------- */
void
free_matrix(float **m)
{
    free((char*) m[0]);
    free ((char*) m);
}
/* ------------------ free_c_matrix --------------------
Frees memory allocated for matrix of complex floats m.
----------------------------------------------------------------- */
void
free_c_matrix(complex float **m)
{
free((char*) m[ ]);
free((char*) m);
/* ------------------------------ qr ------------------------------------
This function performs QR-decomposition of the matrix A of size n x m, so that
A=Q*R where Q is orthogonal and R is upper triangular. R is stored in the
upper triangle of A except the diagonal elements of R which are stored in d.
Q is represented as a product of householder matrices Q(0) . . . Q(n-2) where
Q(j)=1 - u(j) x u(j)/c(j), where the nonzero components of u[j] are returned
in A.
----------------------------------------------------------------- */
```

-continued

```
void
qr(int n, int m, float **A, float *c, float *d)
{
    int i, j, k;
    float sum;
    static float pm scale, tau, sigma, invscale, sumpow[3];
    for (k=0; k<m; k++)
    {
        scale=max_abs(n,m,k,A);
        if (scale<1e-10) invscale=1e10;
        else invscale=1/scale;
        sumpow[0]=0.0;
        scale_pow2(n,m,k,invscale,sumpow,A);
        sigma = SIGN(sqrt(sumpow[0]), A[k][k]);
        A[k][k] += sigma;
        c[k] = 1/(sigma*A[k][k]);
        d[k] = -1/(scale*sigma);
        for (j=k+1; j<m; j++)
        {
            sum=qr_scalar(n,m,k,j,A);
            tau = sum*c[k];
            tau_A(n,m,k,j,tau,A);
        }
    }
}
/* ------------------------- qrsolv ---------------------------------
qrsolv solves the set of linear equations Ax=b where A is if size n x m,
x of length m, and b of length n. The matrix A is output from the function qr
(see above). The solution vector x overwrites the first m elements of b.
-------------------------------------------------------------------- */
void
qrsolv(int n, int m, float **A, float *c, float *d, float *e)
{
    int i, j;
    float sum;
    static float pm tau;
    /* form Q'*b */
    for (j=0;j<m;j++)
    {
        sum=sumaib(n,m,j,b,A);
        tau=sum*c[j];
        btauA(n,m,j,tau,b,A);
    }
    /* solve by back substitution */
    b[m-1] *= d[m-1];         /* b[m-1] /= d[m-1] oprindeligt */
    for (i=m-2; i>=0; i--)
    {
        sum=sumajb(mi,b,A);
        b[i] = (b[i]-sum)*d[i];    /* b[i] = (b[i]-sum)/d[i] oprindeligt */
    }
}
/* ----------------------- prony_qr -----------------------------
Function prony estimates the denominator A(z) of the system underlying the
data given in vector x, and returns the polynomial coefficients in vector a.
The order of A(z) is P, and the order of the numerator is 2.
Therrien pp 550-553
-------------------------------------------------------------------- */
void
prony_qr(float *x, int Q, int P, float *a)
{
    int row, col, indx;                           /* indices */
    float **Xa, *al, *c, *d;
    Xa=matrix(Nr-Q-1,P);                          /* matrix and vector for normal equations */
    al=vector(Nr-Q-1);
    c=vector(P);                                  /* storage vectors for QR-solver */
    d=vector(P);
    /* form Xa matrix, and al vector */
    for (row=Q+1, indx=0; row<Nr; indx++, row++)
    {
        al[indx]= -x[row];
        for (col=0; col<P; col++) Xa[indx][col]=x[row-col-1];
    }
    /* solve (Xa*a = al) by QR-decomposition */
    qr(Nr-Q-1, P, Xa, c, d);                      /* perform QR-decomposition on Ha */
    qrsolv(Nr-Q-1, P, Xa, c, d, al);              /* solve */
    /* extract polynomial coefficients from a1 */
    a[0]=1.0;                                     /* by definition */
    for (row=1; row<=P; row++) a[row]=al[row-1];
    free_matrix(Xa);
```

```
        free_vector(al);
        free_vector(c);
        free_vector(d);
}
/* -------------------- prony_pade_qr --------------------------
The function prony_pade establishes and solves a least squares problem, in order
to estimate and ARMA model of the system by which the data in vector x was obtained.
The system is characterized by the numerator polynomial coefficients given in
vector b, and the denominator polynomial coefficient given in vector a. The
orders of these polynomials are given by Q and P resp.
Prony_pade uses the function prony to estimate denominator coeffs.
------------------------------------------------------------------------ */
void
prony_pade_qr(float *x, int Q, int P, float *b, float *a)
{
        int row, col, strt=0, indx;                    /* indices */
        float **Xb;
        /* estimate denominator using Prony's method */
        prony_qr(x, Q, P, a);
        Xb=matrix_cal(Q+1,P+1);                        /* X-matrix, all zeros */
        /* form matrix Xb, make multiplication of dot product */
        for (col=0; col<=P; col++)
        {
           indx=0;
           for (row=strt++; row<=Q; row++) Xb[row][col]=x[indx++]*a[col];
        }
        for (row=0; row<=Q; row++)
        {
           for (col=0; col<=P; col++) b[row]+=Xb[row][col];
        }
/* alternativ formulering */
/*      for (col=0; col<=P; col++)
        {
           indx=0;
           for (row=strt++; row<=Q; row++) b[row]-=x[indx++]*a[col];
        }
*/
        free_matrix(Xb);
}
/* -------------------------- shank_qr -------------------------------
The function shank establishes and solves a least squares problem, in order to
estimate an ARMA model of the system by which the data in vector x was obtained.
The system is characterized by the numerator polynomial coefficients given in
vector b, and the denominator polynomial coefficients given in vector a. The
orders of these polynomials are given by Q and P resp.
Shank uses the function prony to estimate denominator coeffs., and the
functions qr and qrsolv to solve a set of normal equations by QR-decomposition.
Therrien pp 558-559
------------------------------------------------------------------------ */
void
shank_qr(float *x, int Q, int P, float *b, float *a)
{
        int row, col;                                  /* indices */
        int ii, jj;                                    /* counters */
        float **Ha, *ha, *c, *d;
        /* estimate denominator using Prony's method */
        prony_qr(x, Q, P, a);
        ha=vector_cal(Nr);
        /* calculate ha, the impulse response of 1/A(z), Nr long */
        ha[0]=a[0];
        for (ii=1; ii<Nr; ii++)
        {
           for (jj=1; jj<=ii; jj++)
           {
              if (jj<=P) ha[ii]-=a[jj]*ha[ii-jj];
           }
        }
        Ha=matrix(Nr,Q+1);                             /* matrix for normal equations */
        /* form matrix Ha */
        for (row=0; row<Nr; row++)
        {
           for (col=0; col<=Q; col++)
           {
              if (row>=col) Ha[row][col]=ha[row-col];
              else Ha[row][col]=0.0;
           }
        }
        free_vector(ha);
        c=vector(Q+1);                                 /* storage vectors for QR-solver */
```

-continued

```
        d=vector(Q+1);
        /* solve (Ha*b = x) by QR-decomposition */
        qr(Nr, Q+1, Ha, c, d);                  /* perform QR-decomposition on Ha */
        qrsolv(Nr, Q+1, Ha, c, d, x);           /* solve */
        free_matrix(Ha);
        free_vector(c);
        free_vector(d);
        /* extract polynomial coefficients from x */
        for (ii=0; ii<=Q; ii++) b[ii]=x[ii];
}
float
determine_angle(float pm *uu_real, int position, complex float pm s[np], float pm w[np], complex
float *twid_px)
{
        int ii, jj;
        float *a, *b, *tmp, u_real, u_imag, ph:
        complex float *H;
        fomplex float *valval;
        float *Hr_pos;
        float *Hr_neg;
        float *Hi;
        tmp=vector(Nr);
        H=c_vector(np);
        valval=c_vector_cal(ku);
        for (ii=0; ii<ku; ii++)
        {
                for (jj=0; jj<Nr; jj++) tmp[jj]=uu_real(jj+ii+Nr);
                a=vector(ma+1);
                b=vector_cal(mb+1);
                shank_qr(tmp, mb, ma, b, a);
                freqz(ma+1, a, b, H, s, w);
                free_vector(a);
                free_vector(b);
                valval[ii]=H[poisiton]*conj(H[position]);
        }
        free_c_vector(H);
        free_vector(tmp);
        Hr_pos=vector(ku);
        Hr_neg=vector(ku);
        Hi=vector(ku);
        for (ii=0; ii<ku; ii++)
        {
                Hr_pos[ii]=creal[valval[ii]];
                Hr_neg[ii]=-creal[valval[ii]];
                Hi[ii]=cimag[valval[ii]];
        }
        free_c_vector(valval);
        u_real=dm_dft(ku,Hr_pos,Hi,twid_px);
        u_imag=dm_dft(ku,Hi,Hr_neg,twid_px);
        if (u_real!=0.0) ph=atan(u_imag/u_real)*180/pi;
        else ph=90.0;
        free_vector(Hr_pos);
        free_vector(Hr_neg);
        free_vector(Hi);
        return(ph);
}
}
/* go4.c runs a_svd4.21k on the ADSP 21062 and displays the results. */
/* Written by Peter Hazell, modified 240698 by PH */
/* changes from go_a_dat: mean values subtracted from measured is a new option*/
/* black on white option */
# include <dos.h>
# include <math.h>
# include <conio.h>
# include <stdio.h>
# include <stdlib.h>
# include <graphics.h>
# include <string.h>
# include <"dsp21k.h"
# include <"\dsp21k\dh21k\def_4.h"
static float arg1, arg2;
# define FMAX(a,b) (arg1=(a),arg2=(b),(arg1) > (arg2) ? (arg1) : (arg2))
# define FMIN(a,b) (arg1=(a),arg2=(b),(arg1) < (arg2) ? (arg1) : (arg2))
# define N 128
# define N_REM 1
# define LOGIC int
# define BOARD_NUM 0           /* assume board number 0 */
# define ERR 10
# define FILENAME_REAL "d:\\data.re"
# define FILENAME_IMAG "d:\\data.im"
```

-continued

```c
# define FILENAME_DUMMY "d:\\dummy"
int GraphDriver:              /* The Graphics device driver  */
int GraphMode;                /* The Graphics mode value     */
int ErrorCode;                /* Reports any graphics errors */
float norm_real[NO_ANTENNAS*Nr], norm_imag[NO_ANTENNAS*Nr];
/*float sub_real[NO_ANTENNAS*Nr], sub_imag[NO_ANTENNAS*Nr];*/
int been_here_h=0;     /* HP- */
int been_here_l=-1;    /* log screen */
int been_here_m=-1;    /* subtract mean */
int been_here_n=1;     /* normalize */
int been_here_s=-1;    /* shank/prony */
int been_here_v=-1;    /* svd smoothing */
int l_craw=15;
int l_eras=1;
/*prototypes*/
void   Initialize(void);
void   in_norm(float *norm_real, float *norm_imag);
void   in_sub(float *sub_real, flaot *sub_imag);
void   get_settings(char *txtbuf,char *vmin,char *vmax,char *vfit,char *vgrid,char *lmin,char
*lmax,char *lfit,char *lgrid, char *forget_it);
void   draw_frame(int x_1, int x_r, int y_u, int y_d);
void   draw_grid(int x_1, int x_r, int y_u, int y_d, int grid_x, float grid_y);
void   draw_graph(float *ydata, int x_1, int y_u, float y_min, float y_max, LOGIC fit, float gridy,
int cursor, float xpos);
void   erase_graph(float *ydata, int x_1, int y_u, float y_min, float y_max, LOGIC fit);
void   erase_cursor(int x_1, int y_u, int cursor, float xpos);
void   erase_scale(int x_1, int y_u, float y_min, float y_max, float gridy);
int    posmax(float *v, int n);
float  findmax(float *v, int n);
float  findmin(float *v, int n);
float  *vector(int n);
void   free_vector(float *v);
void   textxy_float(int x, int y, float a);
void   show_help(void);
void   showtime(void);
void   collect_data(DSP21K *board);
void   collect_means(DSP21K *board);
void   collect_dummy(DSP21K *board);
void   save_data(float *data);
void   save_means(DSP21K *board);
void   make_sound(int counter);
void   make_3_tones(int del);
void   got_an_error(int s);
int    count_down(int cnt);
void   update_screen(int 1_draw, int 1_eras);
void   change_filter(int new, DSP21K *board);
void   change_subtract(int new, DSP21K *board);
void   change_normal(int new, DSP21K *board);
void   change_method(int new, DSP21K *board);
void   change_smoothe(int new, DSP21K *board);
main( )
{
    char txtbuf[300], input;
    char vmin[10], vmax[10], vfit[10], vgrid[10];
    char lmin[10], lmax[10], lfit[10], lgrid[10], forget_it[10];
    float fvmin, fvmax, flmin, flmax, forget;
    int do_upper=1, got_data=-16, got_means=0;
    float fvgrid, flgrid;
    LOGIC fvfit, flfit;
    int del=50;
    int ii, jj;
    int indx, found;
    int xcrsr=254, xcrsr_old;
    int serial_check=0;
    int been_here_z=1;       /* cursor reading */
    int been_here_f=-1;      /* fast cursor */
    int been_here_c=-1;      /* collect raw data */
    int been_here_r=-1;      /* record results */
    int been_here_S=-1;      /* calculate mean values */
    int been_here_h_old;
    int been_here_n_old;
    int been_here_s_old;
    int been_here_m_old;
    int been_here_v_old;
    int xinc=1;
    float *ldet, *vdet, *ldet_old, *vdet_old, *fm_r, *fm_i;
    float xpos, xpos_old, xpos_from=0.0;
    FILE *ind;
    DSP21K * board;
```

```
    int counter=-15;
    int err_count=0;
    float l_max;
    float angle;
    int position=64;
    int fig2poly[8]={0.240,0,450,640,450,640,240};
    xpos= (t1+(t2-t1)*xcrsr/508.0)/ns_to_m-xpos_from;
    vdet=vector(N);
    ldet=vector(N);
    vdet_old=vector(N);
    ldet_old=vector(N);
    Initialize( );
    setbkcolor(l_eras);
    setcolor(l_draw);
    outtextxy(220,1,"Press <q> to quit, <F1> for list of hotkeys");
    outtextxy(265,225,"x-pos:");
    outtextxy(1,455,"Method: Shank");
    outtextxy(1,470,"normalization: on");
    outtextxy(200,470,"subtraction: off");
    outtextxy(400,470,"HP-filter: off");
    textxy_float(80,225,t1/ns_to_m);
    settextjustify(2,2);
    textxy_float(80+508,225,t2/ns_to_m);
    settextjustify(0,2);
    get_settings(txtbuf,vmin,vmax,vfit,vgrid,imin,imax,lfit,lgrid,forget_it);
    fvmin=atof(vmin);
    fvmax=atof(vmax);
    flmin=atof(lmin);
    flmax=atof(lmax);
    fvgrid=atof(vgrid);
    flgrid=atof(lgrid);
    fvfit=atoi(vfit);
    flfit=atoi(lfit);
    forget=atof(forget_it);
    board=dsp21k_open(BOARD_NUM);     /* open the board */
redo:
    been_here_h_old=-1;
    been_here_n_old=0;
    been_here_s_old=0;
    been_here_m_old=0;
    been_here_v_old=0;
    dsp21k_reset_proc(board;                /* reset bord */
    dsp21k_dl_exe(board, "\\dsp21k\\dh21k\\a_svd4.21k");   /* download and start the dsp program */
    dsp21k_start(board);
    in_norm(norm_real, norm_imag);        /* get and create normalization vectors */
/*    in_sub(sub_real, sub_imag);*/           /* get and create mean vectors */
    while (dsp21k_ul_int(board, dsp21k_get_addr(board, "_done_initialization"))==0);
    dsp21k_dl_flts(board, dsp21k_get_addr(board, "_norm_real"), NO_ANTENNAS*Nr, norm_real);
    dsp21k_dl_flts(board, dsp21k_get_addr(board, "_norm_imag"), NO_ANTENNAS*Nr, norm_imag);
/*    dsp21k_dl_flts(board, dsp21k_get_addr(board, "_sub_real"), NO_ANTENNAS*Nr, sub_real);
    dsp21k_dl_flts(board, dsp21k_get_addr(board, "_sub_imag"), NO_ANTENNAS*Nr, sub_imag);*/
/*    dsp21k_dl_int(board, dsp21k_get_addr(board, "_done_downloading"), 1);*/
    dsp21k_dl_int(board, dsp21k_get_addr(board, "_got_here"), 0);
    while(1)
    {
        /* wait for done variable to be set true */
        ii=0;
        while (ii<le3)
        {
            serial_check=dsp21k_ul_int(board, dsp21k_get_addr(board, "_done"));
            if (serial_check!=0) goto go_on;
            ii++;
        }
        goto redo;
go_on: dsp21k_dl_int(board, dsp21k_get_addr(board, "_got_here"), 0);
    settextjustify(0,2);
    setcolor(l_draw);
    if (serial_check!=1)
    {
        got_an_error(serial_check);
        err_count=ERR;
        goto cont;
    }
    if (err_count>0) err_count=count_down(err_count);
    if ((input=='a')||(input=='A'))
    {
        setcolor(l_eras);
        textxy_float(450,455,angle);
        setcolor(l_draw);
```

-continued

```
      if (input=='A') position=(int) (xcrsr/4);
      else position=posmax(vdet,np);
      dsp21k_dl_flt(board, dsp21k_get_addr(board, "_angle_pos"), position);
      while (dsp21k_ul_int(board, dsp21k_get_addr(board, "_angle_determined"))==0);
      angle=dsp21k_ul_flt(board, dsp21k_get_addr(board, "_phase"));
      outtextxy(400,455,"Angle:");
      textxy_float(450,455,angle);
   }
   if (input=='c') been_here_c*=-1;
   if ((been_here_c==1)&&(got_data<100))
   {
      if (got_data>=0) collect_data(board);
      if (got_data<0) collect_dummy(board);
      got_data++;
      make_sound(got_data);
   }
   if (got_data==100)
   {
      make_3_tones(del);
      been_here_c=-1;
      got_data++;
   }
   if (input=='S') been_here_S*=-1;
   if ((been_here_S==1)&&(got_means<100))
   {
      if (got_means==0)
      {
         dsp21k_dl_int(board, dsp21k_get_addr(board, "_subtract"), 0);
         /* initialize sub_vectors */
            for (ii=0; ii<Nr*NO_ANTENNAS; ii++)
            {
               sub_real[ii]=0.0;
               sub_imag[ii]=0.0;
            }*/
      }
      if (got_means>=0) collect_means(board);
      got_means++;
      make_sound(got_means);
   }
   if (got_means==100)
   {
      if (been_here_m==1) dsp21k_dl_int(board, dsp21k_get_addr(board, "_subtract"), 1);
      save_means(board);
      make_3_tones(del);
      been_here_S=-1;
      got_means=0;
   }
   /* upload the results */
   while (dsp21k_ul_int(board, dsp21k_get_addr(board, "_none_detecting"))==0);
   dsp21k_ul_flts(board, dsp21k_get_addr(board, "_vdet"), N, vdet);
         /*   dsp21k_ul_flts(board, dsp21k_get_addr(board, "_ldet"), N, ldet);*/
   /* calculate logdata here, quicker */
   for (jj=0;jj<np;jj++)
   {
      if (vdet[jj]>0) ldet[jj]=10*log10(vdet[jj]);
      else ldet[jj]=-60.0;
   }
   l_max=findmax(ldet,np);
   for [jj=0;jj<np;jj++) ldet[jj]-=l_max;
   if (been_here_r==1) save_data(vdet);
   if (input=='f') been_here_f*=-1;
   /* if (input=='h') been_here_h*=-1;*/
   if (input=='h')
   {
      if (been_here_h==3) been_here_h=0;
      else been_here_h++;
   }
   if (input=='m') been_here_m*=-1;
   if (input=='n') been_here_n*=-1;
   if (input=='s') been_here_s*=-1;
   if (input=='r') been_here_r*=-1;
   if (input=='v') been_here_v*=-1;
   if(been_here_f==1) xinc=10;
   else xinc=1;
   if (been_here_h!=been_here_h_old) change_filter(been_here_h, board);
   been_here_h_old=been_here_h;
   if (been_here_m!=been_here_m_old) change_subtract(been_here_m, board);
   been_here_m_old=been_here_m;
   if (been_here_n!=been_here_n_old) change_normal(been_here_n, board);
```

-continued

```
been_here_n_old=been_here_n;
if (been_here_s!=been_here_s_old) change_method(been_here_s, board);
been_here_s_old=been_here_s;
if (been_here_v!=been_here_v_old) change_smoothe(been_here_v, board);
been_here_v_old=been_here_v;
xcrsr_old=xcrsr;
xpos_old=xpos;
if (input=='z')
{
   if (been_here_z==-1)
   {
      xpos_from=0.0;
      been_here_z=1;
   }
   else
   {
      xpos_from=xpos;
      been_here_z=-1;
   }
   xpos=(t1+(t2-t1)*xcrsr/508.0)/ns_to_m-xpos_from;
   erase_cursor(80,20,xcrsr_old,xpos_old);
}
if (input=='\M') /* arrow right */
{
   if ((xinc==1)&&(xcrsr!=508)) xcrsr+=xinc;      /* move cursor right, slow */
   if ((xinc==10)&&(xcrsr<499)) xcrsr+=xinc;      /* move cursor right, fast */
   xpos=(t1+(t2-t1)*xcrsr/508.0)/ns_to_m-xpos_from;
   erase_cursor(80,20,xcrsr_old,xpos_old);
   if [been_here_l==-1) erase_cursor(80,240,xcrsr_old,xpos_old);
}
if (input=='\K') /* arrow left */
{
   if ((xinc==1)&&(xcrsr!=0)) xcrsr-=xinc;        /* move cursor left, slow */
   if ((xinc==10)&&(xcrsr>9)) xcrsr-=xinc;        /* move cursor left, fast */
   xpos=(t1+(t2-t1)*xcrsr/508.0)/ns_to_m-xpos_from;
   erase_cursor(80,20,xcrsr_old,xpos_old);
   if (been_here_l==-1) erase_cursor(80,240,crsr_old,xpos_old);
}
for (ii=0; ii<N; ii++)
{
   vdet[ii]=(vdet[ii]+vdet_old[ii]*forget)/(1+forget);
   ldet[ii]=(ldet[ii]+ldet_old[ii]*forget)/(1+forget);
}
if (been_here_l==-1) erase_graph(ldet_old, 80, 240, flmin, flmax, flfit);
erase_graph(vdet_old, 80, 20, fvmin, fvmax, fvfit);
if (input=='1')
{
   been_here_l*=-1;
   setcolor(1_eras);
   fillpoly(4,fig2poly);
   setcolor(1_draw);
}
if (input=='u') do_upper=1;
if (input=='l') do_upper=0;
if (input=='\H') /* arrow up */
   if (been_here_l==-1) erase_scale(80,240,flmin, flmax, flgrid);
   erase_scale(80,20,fvmin, fvmax, fvgrid);
   if (do_upper==1)
   {
      if (fvmax<16384)
      {
         fvmax*=2.0;
         fvgrid*=2.0;
      }
      else flmin-=10.0;
   }
if (input=='\P') /* arrow down */
{
if (been_here_l==-1) erase_scale(80,240,flmin, flmax, flgrid);
erase_scale(80,20.fvmin, fvmax, fvgrid);
if (do_upper==1)
{
   fvmax/=2.0;
   fvgrid/=2.0;
}
else if (flmin<flmax-10) flmin+=10.0;
}
if (been_here_l==-1) draw_graph(ldet, 80, 240, flmin, flmax, flfit, flgrid, xcrsr, xpos);
```

```
        draw_graph(vdet, 80, 20, fvmin, fvmax, fvfit, fvgrid, xcrsr, xpos);
        counter++;
/*      if (counter==0) showtime( );
        if (counter==1000) showtime( );*/
        showtime( );
        for (ii=0; ii<N; ii++)
        {
            vdet_old[ii]=vdet[ii];
            ldet_old[ii]=ldet[ii];
        }
    cont:
        input=' ';                              /* reset input */
        while (konit( )) input=getch( );
        if ((input=='g')||(input=='Q')) goto out;
        if (input=='b')
        {
            if (l_draw==15)
            {
                l_draw=1;
                l_eras=15;
                update_screen(l_draw, l_eras);
            }
            else
            {
                l_draw=15;
                l_eras=1;
                update_screen(l_draw, l_eras);
            }
            been_here_h_old=-1;
            been_here_m_old=0;
            been_here_n_old=0;
            been_here_s_old=0;
            been_here_v_old=0;
        }
        if (input=='\;') show_help( );          /* F1 */
        serial_check=0;                         /* reset serial_check */
    }
    out:
    closegraph( );
    /* close the board */
    dsp21k_reset_proc(board);
    dsp21k_close(board);
    free_vector(ldet);
    free_vector(vdet);
    free_vector(ldet_old);
    free_vector(vdet_old);
    return[0];
}
void
Initialize(void)
{
    int ii;
/*  for (ii=0; ii<Nr*NO_ANTENNAS; ii++)
    {
        sub_real[ii]=0.0;
        sub_imag[ii]=0.0;
    }*/
    GraphDriver = DETECT;                   /* Request auto-detection    */
    initgraph( &GraphDriver, &GraphMode, " " );
    ErrorCode = graphresult( );             /* Read result of initialization*/
    if( ErrorCode != grOk )                 /* Error occured during init   */
    {
        printf(" Graphics System Error: %s\n", grapherrormsg( ErrorCode ) );
        exit( 1 );
    }
    setfillstyle(1,l_eras);                 /* black */
}
void
in_norm(float *norm_real, float *norm_imag)
{
    FILE *ind;
    float a_r(Ns), a_i(Ns);
    int ii;
    ind=fopen("\\dsp21k\\bcclib\\a_r.dat", "rb");
    fread(a_r, sizeof(float), Ns, ind);
    fclose(ind);
    ind=fopen("\\dsp21k\\bcclib\\a_i.dat", "rb");
    fread(a_i, sizeof(float), Ns, ind);
    fclose(ind);
```

-continued

```
        for (ii=STARTPOINT; ii<Nr+STARTPOINT; ii++)
        {
            norm_real[ii-STARTPOINT]=a_r[ii];
            norm_imag[ii-STARTPOINT]=a_i[ii];
        }
        ind=fopen("\\dsp21k\\bcclib\\b_r.dat", "rb");
        fread(a_r, sizeof(float), Ns, ind);
        fclose(ind);
        ind=fopen("\\dsp21k\\bcclib\\b_i.dat", "rb");
        fread(a_i, sizeof(float), Ns, ind);
        fclose(ind);
        for (ii=STARTPOINT; ii<Nr+STARTPOINT; ii++)
        {
            norm_real[ii-STARTPOINT+Nr]=a_r[ii];
            norm_imag[ii-STARTPOINT+Nr]=a_i[ii];
        }
        ind=fopen("\\dsp21k\\bcclib\\c_r.dat", "rb");
        fread(a_r, sizeof(float), Ns, ind);
        fclose(ind);
        ind=fopen("\\dsp21k\\bcclib\\c_i.dat", "rb");
        fread(a_i, sizeof(float), Ns, ind);
        fclose(ind);
        for (ii=STARTPOINT; ii<Nr+STARTPOINT; ii++)
        {
            norm_real[ii-STARTPOINT+Nr*2]=a_r[ii];
            norm_imag[ii-STARTPOINT+Nr*2]=a_i[ii];
        }
        ind=fopen("\\dsp21k\\bcclib\\d_r.dat", "rb");
        fread(a_r, sizeof(float), Ns, ind);
        fclose(ind);
        ind=fopen("\\dsp21k\\bcclib\\d_i.dat", "rb");
        fread(a_i, sizeof(float), Ns, ind);
        fclose(ind);
        for (ii=STARTPOINT; ii<Nr+STARTPOINT; ii++)
        {
            norm_real[ii-STARTPOINT+Nr*3]=a_r[ii];
            norm_imag[ii-STARTPOINT+Nr*3]=a_i[ii];
        }
}
void
in_sub(float *sub_real, float *sub_imag)
{
    FILE *ind;
/*      ind=fopen(SUBMEANS_RE, "rb");*/
        ind=fopen("c:\\dsp21k\\bcclib\\sub_mean.re", "rb");
        fread(sub_real, sizeof(float), Nr*NO_ANTENNAS, ind);
        fclose(ind);
/*      ind=fopen(SUBMEANS_IM, "rb");*/
        ind=fopen("c:\\dsp21k\\bcclib\\sub_mean.im", "rb");
        fread(sub_imag, sizeof(float), Nr*NO_ANTENNAS, ind);
        fclose(ind);
}
void
draw_frame(int x_1, int x_r, int y_u, int y_d)
{
    int ii;
    setlinestyle(0,0,1);        /* solid */
    setcolor(l_draw);           /* white */
    moveto(x_1,y_u);
    lineto(x_1,y_d);
    lineto(x_r,y_d);
    lineto(x_r,y_u);
    lineto(x_1,y_u);
}
void
draw_grid(int x_1, int x_r, int y_u, int y_d, int grid_x, float grid_y)
{
    int ii;
    setlinestyle(1,0,1);        /* dotted */
    for (ii=1; ii<grid_x; ii++) line(x_1-ii*(x_r-x_1)/grid_x, y_u, x_1+ii*(x_r-x_1)/grid_x, y_d);
    for (ii=1; ii<grid_y; ii++) line(x_1, (int)(y_d-ii*(y_d-y_u)/grid_y), x_r,
(int)(y_d=ii*(y_d-y_u)/grid_y));
}
void
draw_graph(float *ydata, int x_1, int y_u, float y_min, float y_max, LOGIC fit/ float gridy, int
cursor, float xpos)
{
    int ii;
    float y;
```

```
char txt[10];
if (fit==1)
{
    y_min=findmin(ydata,np);
    y_max=findmax(ydata,np);
}
y=y_max-y_min;            /* y-range */
if (y==0.0) y=1.0;        /* will overflow if y=0 */
if (ydata[0]>y_max) moveto(x_1,y_u);                      /* move to top left hand corner */
else if (ydata[0]<y_min) moveto(x_1,y_u+200);  /* move to bottom left hand corner */
else moveto(x_1,y_u+(int)((y_max-ydata[0])*200.0/y));  /* move to first point */
setlinestyle(0,0,1);      /* solid */
setcolor(l_draw);         /* white */
                                                        /* line to frame top*/
for (ii=1; ii<np; ii++)                                 /* line to frame bottom */
{                                                       /* line to next point */
    if (ydata[ii]>y_max) lineto[x_1+ii*(512/np),y_u)
    else if (ydata[ii]<y_min) lineto[x_1+ii*(512/np),y_u+200);
    else lineto(x_1+ii*(512/np), y_u-(int)((y_max-ydata[ii])*200,0/y));
}
moveto(x_1+cursor,y_u+200);
lineto(x_1+cursor,y_u; /* vertical line at cursor */
settextjustify(2,2);
textxy_float(x_1-5, y_u, y_max);
textxy_float(380,225,xpos);
settextjustify(2,0);
textxy_float(x_1-5, y_u+200, y_min);
draw_grid(x_1,x_1+508,y_u,y_u+200,6,y/gridy);
draw_frame(x_1,x_1+508,y_u,y_u+200);
}
void
erase_graph(float *ydata, int x_1, int y_u, float y_min, float y_max, LOGIC fit)
{
    int ii;
    float y;
    char txt[10];
    if (fit==1)
    {
        y_min=findmin(ydata,np);
        y_max=findmax(ydata,np);
    }
    y=y_max-y_min;
    if (y==0.0) y=1.0;                /* will overflow if y=0 */
    setlinestyle(0,0,1);     /* solid */
    setcolor(l_eras);        /* black */
    if (ydata[0]>y_max) moveto(x_1,y_u);
    else if (ydata[0]<y_min) moveto(x_1,y_u+200);
    else moveto(x_1,y_u+(int)((y_max-ydata[0])*200.0/y));
    for (ii=1; ii<np; ii++)
    {
        if (ydata[ii]>y_max) lineto(x_1+ii*(512/np),y_u);
        else if (ydata[ii]<y_min) lineto(x_1+ii*(512/np), y_u+200);
        else lineto(x_1+ii*(512/np), y_u+(int)((y_max-ydata(ii))*200.0/y));
    }
}
int
posmax(float *v, int n)
{
    int ii, pos;              /* very small */
    float largest;
    largest=v[0];
    pos=0;
    for (ii=1; ii<n; ii++)
    {
        if (v[ii]>largest)
        {
            largest=v[ii];
            pos=ii;
        }
    }
    return pos;
}
float
findmax(float *v, int n)
{
    int ii;
    float fmax=-1e99;         /* very small */
    for (ii=0; ii<n; ii++) fmax=FMAX(fmax,v[ii]);
    return fmax;
```

```
    }
float
findmin(float *v, int n)
{
    int -ii;
    float fmin=1e99;            /* very big */
    for (ii=0; ii<n; ii++) fmin=FMIN(fmin,v[ii]);
    return fmin;
}
/* --------------------------- *vector -----------------------------
This function allocates memory for a vector of floats, of size n.
---------------------------------------------------------------- */
float
*vector(int n)
{
    float *v;
    v=(float*)calloc((size_t) n, (size_t) sizeof(float));
    return v;
}
/* --------------------------- free vector ---------------------------
Frees memory allocated for vector of floats v.
---------------------------------------------------------------- */
void
free_vector(float *v)
{
    free((char*) v);
}
void
textxy_float(int x, int y, float a)
{
    char whole[5], dec[5], txt[20]=" ";
    int ii;
    itoa((int)(a),whole,10);
    itoa((int)(abs((a-(int)(a))*1000)),dec,10);
    if ((a<0.0)&&(a>-1.0)) strcat(txt,"—");
    strcat(txt,whole);
    strcat(txt,".");
    if (((int)(abs((a-(int)(a))*1000))<100)&&((int)(abs((a-(int)(a))*1000))>=10)) strcat(txt, "0");
    if (((int)(abs((a-(int)(a))*1000))<10)&&((int)(abs((a-(int)(a))*1000))>=1)) strcat(txt,"00");
    strcat(txt,dec);
    outtextxy(x,y,txt);
}
void
get_settings(char *txtbuf,char *vmin,char *vmax,char *vfit,char *vgrid,char *lmin,char *lmax,char
*lfit,char *lgrid,char *forget_it)
{
    FILE *ind;
    int flag=-1, indx, found, cnt=0;
    ind=fopen("\\dsp21k\\bcclib\\dat_a.txt", "rt");
    fread(txtbuf, 4, 300, ind);
    fclose(ind);
    found=0;
    indx=-1;
    while (found<2)
    {
        if (flag==1) vmin[++indx]=txtbuf[cnt];
        if (txtbuf[cnt]=='S') flag*=-1,found++;
        cnt++;
    }
    found=0;
    indx=-1;
    while (found<2)
    {
        if (flag==1) vmax[++indx]=txtbuf[cnt];
        if (txtbuf[cnt]=='S') flag*=-1,found++;
        cnt++;
    }
    found=0;
    indx=-1;
    while (found<2)
    {
        if (flag==1) vfit[++indx]=txtbuf[cnt];
        if (txtbuf[cnt]=='S') flag*=-1,found++;
        cnt++;
    }
    found=0;
    indx=-1;
    while (found<2)
    {
```

-continued

```
        if (flag==1) vgrid[++indx]=txtbuf[cnt];
        if (txtbuf[cnt]=='S') flag*=-1,found++;
        cnt++;
      }
      found=0
      indx=-1;
      while (found<2)
      {
        if (flag==1) lmin[++indx]=txtbuf[cnt];
        if (txtbuf[cnt]=='S') flag*=-1,found++;
        cnt++;
      }
      found=0
      indx=-1;
      while (found<2)
      {
        if (flag==1) lmax[++indx]=txtbuf[cnt];
        if (txtbuf[cnt]=='S') flag*=-1,found++;
        cnt++;
      }
      found=0
      indx=-1;
      while (found<2)
      {
        if (flag==1) lfit[++indx]=txtbuf[cnt];
        if (txtbuf[cnt]=='S') flag*=-1,found++;
        cnt++;
      }
      found=0
      indx=-1;
      while (found<2)
      {
        if (flag==1) lgrid[++indx]=txtbuf[cnt];
        if (txtbuf[cnt]=='S') flag*=-1,found++;
        cnt++;
      }
      found=0
      indx=-1;
      while (found<2)
      {
        if (flag==1) forget_it[++indx]=txtbuf[cnt];
        if (txtbuf[cnt]=='S') flag*=-1,found++;
        cnt++;
      }
}
void
show_help(void)
{
    int line=1, l_spc=10;
    cleardevice( );
    settextjustify(0,2);
    line++;line++;outtextxy(50,line*l_spc," Your hotkeys are:");
    line++;line++;line++;line++;outtextxy(50,line*l_spc," a   : Determine angle at maximum");
    line++;outtextxy(50,line*l_spc," A       : Determine angle at cursor");
    line++;outtextxy(50,line*l_spc," b       : Black on white or white on black");
    line++;outtextxy(50,line*l_spc," c       : Collect raw data");
    line++;outtextxy(50,line*l_spc," f       : Fast cursor movement on/off");
    line++;outtextxy(50,line*l_spc," h       : High Pass filtering off/10ns/15ns/20ns");
    line++;outtextxy(50,line*l_spc," l       : Change y-range of lower graph");
    line++;outtextxy(50,line*l_spc," m       : mean value subtraction on/off");
    line++;outtextxy(50,line*l_spc," n       : Normalization on/off");
    line++;outtextxy(50,line*l_spc," q       : Quit");
    line++;outtextxy(50,line*l_spc," r       : Record results");
    line++;outtextxy(50,line*l_spc," s       : Solution method: Shank/Prony");
    line++;outtextxy(50,line*l_spc," S       : Collect mean values for subtraction");
    line++;outtextxy(50,line*l_spc," u       : Change y-range of upper graph");
    line++;outtextxy(50,line*l_spc," v       : SVD smoothing on/off");
    line++;outtextxy(50,line*l_spc," z       : Set x-position to zero or restore");
    line++;outtextxy(50,line*l_spc," 1       : Toggle lower graph on/off");
    line++;line++;outtextxy(50,line*l_spc,"    arrows:");
    line++;line++;outtextxy(50,line*l_spc,"    left : Move cursor left");
    line++/outtextxy(50,line*l_spc," right:   Move cursor right");
    line++;outtextxy(50,line*l_spc," up   :   Increase y-range of selected graph (l or u)");
    line++;outtextxy(50,line*l_spc," down :   Decrease y-range of selected graph (l or u)");
    line++;line++;outtextxy(50,line*l_spc,"    function keys");
    line++;line++;outtextxy(50,line*l_spc,"    F1   : Return to program");
    while (getch( ) !='\;');
    cleardevice( );
    setbkcolor(l_eras);
```

```
        settextjustify(0,2);
        if (been_here_h==1); outtextxy(400,470,"HP-filter: 10 ns");
        if (been_here_h==2); outtextxy(400,470,"HP-filter: 15 ns");
        if (been_here_h==3); outtextxy(400,470,"HP-filter: 20 ns");
        if (been_here_h<1); outtextxy(400,470,"HP-filter: off");
        if (been_here_m==1); outtextxy(200,470,"subtraction: on");
        else outtextxy(200,470,"subtraction: off");
        if (been_here_n==1) outtextxy(1,470,"normalization: on");
        else outtextxy(1,470,"normalization: off");
        if (been_here_s==1) outtextxy(1,455,"Method: Prony");
        else outtextxy(1,455,"Method: Shank");
        if (been_here_v==1) outtextxy(200,455,"Smoothing: on");
        else outtextxy(200,455,"Smoothing: off");
        outtextxy(220,1,"Press <q> to quit, <F1> for list of hotkeys");
        outtextxy(265,225,"x-pos:");
/*      textxy_float(80,445,t1/ns_to_m);*/
        textxy_float(80,225,t1/ns_to_m);
        settextjustify(2,2);
/*      textxy_float(80+512,445,t2/ns_to_m);*/
        textxy_float(80+512,225,t2/ns_to_m);
        settextjustify(0,2);
}
void showtime(void)
{
        struct dostime_t t;
        char hour[2], minute[4], second[4], txt[20]=" ";
        int poly[8]={550,455,550,470,640,470,640,455};
        _dos_gettime(&t);
        itoa(t.hour,hour,10);
        itoa(t.minute,minute,10);
        itoa(t.second,second,10);
        strcat(txt,hour);
        strcat(txt,":");
        if (t.minute<10) strcat(txt,"0");
        strcat(txt,minute);
        strcat(txt,":");
        if (t.second<10) strcat(txt,"0");
        strcat(txt,second);
        setcolor(l_eras);
        fillpoly(4,poly);
        setcolor(l_draw);
        outtextxy(630,470,txt);
}
void
collect_means(DSP21K *board)
{
        float *uu_real, *uu_imag;
        int ii, jj;
        uu_real=vector(Nr*ku);
        uu_imag=vector(Nr*ku);
        while(!dsp21k_ul_int(board, dsp21k_et_addr(board, "_done_normalizing")));
        dsp21k_ul_flts(board, dsp21k_get_addr(board, "_uu_real"), Nr*ku, uu_real);
        dsp21k_ul_flts(board, dsp21k_get_addr(board, "_uu_imag"), Nr*ku, uu_imag);
        for (ii=0; ii<NO_ROT; ii++)
        {
/*              for (jj=0; jj<Nr*NO_ANTENNAS; jj++)
                {
                        sub_real[jj]+=(0.0025*uu_real[jj+ii*Nr*NO_ANTENNAS]);
                        sub_imag[jj]+=(0.0025*uu_imag[jj+ii*Nr*NO_ANTENNAS]);
                }*/
        }
        free_vector(uu_real);
        free_vector(uu_imag);
}
void
collect_3data(DSP21K *board)
{
        FILE *ind;
        float *uu_real, *uu_imag;
        uu_real=vector(Nr*ku);
        uu_imag=vector(Nr*ku);
        while(!dsp21k_ul_int(board, dsp21k_get_addr(board, "_done_normalizing")));
        dsp21k_ul_flts(board, dsp21k_get_addr(board, "_uu_real"), Nr*ku, uu_real);
        dsp21k_ul_flts(board, dsp21k_get_addr(board, "_uu_imag"), Nr*ku, uu_imag);
        ind=fopen(FILENAME_REAL, "a+b");
        fwrite(uu_real, sizeof(float), Nr*ku, ind);
        fclose(ind);
        ind=fopen(FILENAME_IMAG, "ab+b");
        fwrite(uu_imag, seizeof(float), Nr*ku, ind);
```

```
        fclose(ind);
        free_vector(uu_real);
        free_vector(uu_imag);
}
void
collect_dummy(DSP21K *board)
{
        FILE *ind;
        float *uu_real, *uu_imag;
        uu_real=vector(Nr*ku);
        uu_imag=vector(Nr*ku);
        while(!dsp21k_ul_int(board, dsp21k_get_addr(board, "_done_normalizing")));
        dsp21k_ul_flts(board, dsp21k_get_addr(board, "_uu_real"), Nr*ku, uu_real);
        dsp21k_ul_flts(board, dsp21k_get_addr(board, "_uu_imag"), Nr*ku, uu_imag);
        ind=fopen(FILENAME_DUMMY, "wb");
        fwrite(uu_real, sizeof(float), Nr*ku, ind);
        fclose(ind);
        ind=fopen(FILENAME_DUMMY, "wb");
        fwrite(uu_imag, sizeof(float), Nr*ku, ind);
        fclose(ind);
        free_vector(uu_real);
        free_vector(uu_imag);
}
void
save_data(float *data)
{
        FILE *ind;
        ind=fopen("d:\\vdet.dat", "a+b");
        fwrite(data, sizeof(float), np, ind);
        fclose(ind);
}
void
save_means(DSP21K *board)
{
        FILE *ind;
/*      ind=fopen(SUBMEANS_RE, "wb");*/
/*      ind=fopen("c:\\dsp21k\\bcclib\\sub_mean.re", "wb");
        fwrite(sub_real, sizeof(float), Nr*NO_ANTENNAS, ind);
        fclose(ind);*/
/*      ind=fopen(SUBMEANS_IM, "wb");*/
/*      ind=fopen("c:\\dsp21k\\bcclib\\sub_mean.im", "wb");
        fwrite(sub_imag, sizeof(float), Nr*NO_ANTENNAS, ind);
        fclose(ind);*/
        /* download new subtraction vectors */
/*      dsp21k_dl_flts(board, dsp21k_get_addr(board, "_sub_real"), NO_ANTENNAS*Nr, sub_real);
        dsp21k_al_flts(board, dsp21k_get_addr(board, "_sub_imag"), NO_ANTENNAS*Nr, sub_imag);*/
}
void
make_sound(int counter)
{
        int (f1=500, f2=1000, f3=2000;
        double res;
/*      delay(MEAS_DELAY);*/
        /* countdown, */
        if (counter==-10) sound (f3);
        if (counter==-8) nosound( );
        if (counter==-5) sound(f3);
        if (counter==-3) nosound( );
        /* measuring */
        if (counter>=0);
        {
          res=fmod((double) (counter),10.0);
          if (res==0.0) sound(f1);
          if (res==1.0) nosound( );
          if (res==5.0) sound(f2);
          if (res==6.0) nosound( );
        }
}
void
make_3_tones(int del)
{
        sound(500);
        delay(del);
        sound(700);
        delay(del);
        sound(900);
        delay(del);
        sound(1100);
        delay(del);
```

```
        nosound( );
}
void
got_an_error(int s)
{
        if (s==2) outtextxy(1,1,"MAC overflow");
        if (s==3) outtextxy(1,1,"ADC out of range");
        if (s==4) outtextxy(1,1,"Serial transmission error");
        if (s==123) outtextxy(1,1,"SVD did not converge");
}
int
count_down(int cnt)
{
        int poly(8)=(1,1,1,10,200,10,200,1);
        cnt--;
        if (cnt==0)
        {
          setcolor(l_eras);
          fillpoly(4,poly);
          setcolor(l_draw);
        }
        return (cnt);
}
void
update_screen(int l_draw, int l_eras)
{
        setbkcolor(l_eras);
        setcolor(l_draw);
        setfillstyle(1,l_eras);
        cleardevice( );
        settextjustify(0,2);
        outtextxy(220,1,"Press <q> to quit, <F1> for list of hotkeys");
        outtextxy(265,225,"x-pos:");
/*      textxy_float(80,445,t1/ns_to_m);*/
        textxy_float(80,225,t1/ns_to_m);
        settextjustify(2,2);
/*      textxy_float(80+512,445,t2/ns_to_m);*/
        textxy_float(80+512,225,t2/ns_to_m);
        settextjustify(0,2);
}
void
change_filter(int new, DSP21K *board)
{
        if (new==1)
        {
          dsp21k_dl_int(board, dsp21k_get_addr(board, "_do_filter"), 1);
          setcolor(l_eras);
          outtextxy(400,470,"HP-filter: off");
          setcolor(l_draw);
          outtextxy(400,470,"HP-filter: 10 ns");
        }
        if (new==2)
        {
          dsp21k_dl_int(board, dsp21k_get_addr(board, "_do_filter"), 2);
          setcolor(l_eras);
          outtextxy(400,470,"HP-filter: 10 ns");
          setcolor(l_draw);
          outtextxy(400,470,"HP-filter: 15 ns");
        }
        if (new==3)
        {
          dsp21k_dl_int(board, dsp21k_get_addr(board, "_do_filter"), 3);
          setcolor(l_eras);
          outtextxy(400,470,"HP-filter: 15 ns");
          setcolor(l_draw);
          outtextxy(400,470,"HP-filter: 20 ns");
        }
        if (new<1)
        {
          dsp21k_dl_int(board, dsp21k_get_addr(board, "_do_filter"), 0);
          setcolor(l_eras);
          outtextxy(400,470,"HP-filter: 20 ns");
          setcolor(l_draw);
          outtextxy(400,470,"HP-filter: off");
        }
}
void
change_subtract(int new, DSP21K *board)
{
```

-continued

```
        if (new==1)
        {
            dsp21k_dl_int(board, dsp21k_get_addr(board, "_subtract"), 1);
            setcolor(l_eras);
            outtextxy(200,470,"subtraction: off");
            setcolor(l_draw);
            outtextxy(200,470,"subtraction: on");
        }
        else
        {
            dsp21k_dl_int(board, dsp21k_get_addr(board, "_subtract"), 0);
            setcolor(l_eras);
            outtextxy(200,470,"subtraction: on");
            setcolor(l_draw);
            outtextxy(200,470,"subtraction: off");
        }
    }
void
change_normal(int new, DSP21K *board)
{
        if (new==1)
        {
            dsp21k_dl_int(board, dsp21k_get_addr(board, "_norm"), 1);
            setcolor(l_eras);
            outtextxy(1,470,"normalization: off");
            setcolor(l_draw);
            outtextxy(1,470,"normalization: on");
        }
        else
        {
            dsp21k_dl_int(board, dsp21k_get_addr(board, "_norm"), 0);
            setcolor(l_eras);
            outtextxy(1,470,"normalization: on");
            setcolor(l_draw);
            outtextxy(1,470,"normalization: off");
        }
    }
void
change_method(int new, DSP21K *board)
{
        if (new==1)
        {
            dsp21k_dl_int(board, dsp21k_get_addr(board, "_do_shank"), 0);
            setcolor(l_eras);
            outtextxy(1,455,"Method: Shank");
            setcolor(l_draw);
            outtextxy(1,455,"Method: Prony");
        }
        else
        {
            dsp21k_dl_int(board, dsp21k_get_addr(board, "_do_shank"), 1);
            setcolor(l_eras);
            outtextxy(1,455,"Method: Prony");
            setcolor(l_draw);
            outtextxy(1,455,"Method: Shank");
        }
    }
void
change_smoothe(int new, DSP21K *board)
{
        if (new==1)
        {
            dsp21k_dl_int(board, dsp21k_get_addr(board, "_do_smoothe"), 1);
            setcolor(l_eras);
            outtextxy(200,455,"Smoothing: off");
            setcolor(l_draw);
            outtextxy(200,455,"Smoothing: on");
        }
        else
        {
            dsp21k_dl_int(board, dsp21k_get_addr(board, "_do_smoothe"), 0);
            setcolor(l_eras);
            outtextxy(200,455,"Smoothing: on");
            setcolor(l_draw);
            outtextxy(200,455,"Smoothing: off");
        }
    }
void
erase_cursor(int x_1, int y_u, int cursor, float xpos)
```

-continued

```
{
    setlinestyle(0,0,1);    /* solid */
    setcolor(l_eras);       /* black */
    settextjustify(2,2);
    textxy_float(380,225,xpos);
    moveto(x_1+cursor,y_u+200);
    lineto(x_1+cursor,y_u);
}
void
erase_scale(int x_1, int y_u, float y_min, float y_max, float gridy)
{
    float y;
    y=y_max-y_min;
    if (y==0.0) y=1.0;                      /* will overflow if y=0 */
    setlinestyle(0,0,1);    /* solid */
    setcolor(l_eras);       /* black */
    settextjustify(2,2);
    textxy_float(x_1-5, y_u, y_max);
    settextjustify(2,0);
    textxy_float(x_1-5, y_u+200, y_min);
    draw_grid(x_1,x_1+508,y_u,y_u+200,6,y/gridy);
}
/* total routine for 2181, rotation of antenna.
 * one waitstate. count on addrx. no tx interrupts. unsigned data. synth setup.
 * Written by Peter Hazell, last modified 310398 by PH */
/* mod from rotil: 5 antennas, 20 measurements in a rotation */
.module/RAM/ABS=0 rot5;
/*================= ASSEMBLE TIME CONSTANTS =========================*/
.const wait_read        =    1;
.const IDMA=                    0x3fe0;
.const BDMA_BIAD=               0x3fe1;
.const BDMA_BEAD=               0x3fe2;
.const BDMA_BDMA_Ctrl=          0x3fe3;
.const BDMA_BWCOUNT=            0x3fe4;
.const PFDATA=                  0x3fe5;
.const PFTYPE=                  0x3fe6;
.const SPORT1_Autobuf=          0x3f3f;
.const SPORT1_RFSDIV=           0x3ff0;
.const SPORT1_SCLKDIV=          0x3ff1;
.const SPORT1_Control_Reg=      0x3ff2;
.const SPORT0_Autobuf=          0x3ff3;
.const SPORT0_RFSDIV=           0x3ff4;
.const SPORT0_SCLKDIV=          0x3ff5;
.const SPORT0_Control_Reg=      0x3ff6;
.const SPORT0_TX_Channels0=     0x3ff7;
.const SPORT0_TX_Channels1=     0x3ff8;
.const SPORT0_RX_Channels0=     0x3ff9;
.const SPORT0_RX_Channels1=     0x3ffa;
.const TSCALE=                  0x3ffb;
.const TCOUNT=                  0x3ffc;
.const TPERIOD=                 0x3ffd;
.const DM_Wait_Reg=             0x3ffe;
.const System_Control_Reg=      0x3fff;
.const MEAS=0xce;           /* IO address of measured signal, m1:0xce, m2:0xae */
.const REF=0x6e;            /* IO address of ref-signal */
.const DATA15=0xdb;         /* IO address of 19 bit data, clock, and strobe */
.const SYNTH=0xd7;          /* IO address of synthesis switch */
.const ANT=0x7b;            /* IO address of antenna switch */
.const ATT_IN=0x7d;
.const ATT_OUT=0x77;
.const GET_ANT=0x0020;      /* unmask SPORT0 Rx */
.const WAIT_SHARC=0x0080;   /* unmask IRQl0 */
.const READ=0x0200;         /* unmask IRQ2 */
/*================= DATA BUFFER DECLARATIONS =========================*/
.var/pm/ram/circ        Dcos[120];          /* declare cosine buffer */
.var/pm/ram/circ        Dsin[120];          /* declare sine buffer */
.var/pm/ram/circ        antenna[5];         /* array of antenna positions */
.var/pm/ram/circ        words[240];         /* 19 bit words for low freqs, MSW and LSW */
                                            /* and for high freqs, MSW and LSW */
.var/dm/ram/circ        rx_buf_low[80];     /* Rx buffer for low oscillator */
.var/dm/ram/circ        rx_buf_high[80];    /* Rx buffer for high oscillator */
.var/dm/ram/circ        int_result[3];      /* results for interpolation */
.var/dm/ram             control;            /* control word, overflow status */
.var/dm/ram             rx_done;            /* set to one when 40 words have been read */
.var/dm/ram             word_init_hilo[2];
.var/dm/ram             word_init_txrx[2];
.var/dm/ram             word_init_tx[2];
.var/dm/ram             word_init_rx[2];
.var/dm/ram             ku;
```

-continued

```
.var/dm/ram              got_new_ant;
.var/dm/ram              dummy;
/*=============== DATA BUFFER INITILIZATIONS =======================*/
.init Dcos:              <dcos90.txt>,<dcos110.txt>,<dcos100.txt>;
.init Dsin:              <dsin90.txt>,<dsin110,txt>,<dsin100.txt>;
.init words:             <words.txt>;
.init antenna:           0x000100, 0x000200, 0x000300, 0x000400, 0x000500;
.init control:           0x1234;
.init word_init_hilo:    0x1006, 0x6000;
.init word_init_txrx:    0x1064, 0x2000;
.init word_init_tx:      0x3a86, 0x0000;
.init word_init_rx:      0x3a86, 0x4000;
.init ku;                20;
/*=============== INTERRUPT VECTOR TABLE =========================*/
/* Each interrupt vector has 4 PM memory locations. When an interrupt occurs the
 * DSP will jump to the location of the interrupt vector providing the interrupt
 * is unmasked. */
        jump start;                     /* address = 0x00: reset interrupt vector */
          rti; rti; rti;
        jump addrx;                     /* address = 0x04: IRQ2 interrupt vector */
          rti; rti; rti;
          rti; rti; rti; rti;           /* address = 0x08: IRQL1 interrupt vector */
        jump letsgo;                    /* address = 0x0c: IRQL0 interrupt vector */
          rti; rti; rti;
          rti; rti; rti; rti;           /* address = 0x10: SPORT0 tx interrupt vector */
        jump sp0_rx;                    /* address = 0x14: SPORT0 rx interrupt vector */
          rti; rti; rti;
          rti; rti; rti; rti;           /* address = 0x18: IRQE interrupt vector. Interrupt
vector used by the interrupt switch on the board */
          rti; rti; rti; rti;           /* address = 0x1c: BDMA interrupt vector */
          rti; rti; rti; rti;           /* address = 0x20: SPORT1 tx or IRQ1 interrupt vect.
*/
          rti; rti; rti; rti;           /* address = 0x24: SPORT1 rx or IRQ0 interrupt vect.
*/
          rti; rti; rti; rti;           /* address = 0x28: timer interrupt vector*/
          rti; rti; rti; rti;           /* address = 0x2c: power down interrupt vector */
/*------------------ Data Address Generator Initialization -------------------------*/
start:  imask=0;
/*DM*/  i0 = ^rx_buf_low;               /* set i0 = start address of rx_buf*/
        10 = %rx_buf_low;               /* set 10 = length of rx_buf */
        i1 = ^word_init_hilo;
        11 = 0;
        i2 = ^rx_buf_low;               /* set i2 = start address of rx_buf */
        12 = %rx_buf_low;               /* set 12 = length of rx_buf */
        i3 = ^int_result;
        13 = %int_result;
        m0 = 0;
        m1 = 1;                         /* modify registers for dm */
        m2 = 2;
/*PM*/  i4 = ^Dcos;                     /* set i4 = start address of Dcos */
        14 = %Dcos;                     /* set 14 = length of Dcos */
        i5 = ^Dsin;                     /* set i5 = start address of Dsin */
        15 = %Dsin;                     /* set 15 = length of Dsin */
        i6 = ^words;                    /* set i6 = address of words */
        16 = %words;                    /* set 16 = length of words */
        i7 = ^antenna;                  /* set i7 = address of antenna */
        17 = %antenna;                  /* set 17 = length of antenna */
        m4 = 0;                         /* modify registers for pm */
        m5 = 1;
/*------------------ SERIAL PORT #0 STUFF -------------------------*/
        ax0 = 0x7b03;                   /* set PF0, PF1 to output */
        dm(PFTYPE)=ax0;                 /* PF0, PF1 for codec disable */
        ax0=0x0002;
        dm(PFDATA)=ax0;                 /* disable CODEC, enable normal SPORT0 */
        ax0 =0x0006;                    /* SCLK = CLKOUT / (2 (SCLKDIV + 1) */
        dm (SPORT0_SCLKDIV) = ax0;      /* using internal serial clock ( SCLK=input ) */
        ax0 = 0x6a0f;                   /* 0110 1010 0000 1111 */
        dm (SPORT0_Control_Reg) = ax0;  /* SLEN= 16 bits, right justify, zero-fill unused
MSBs,
                                         * INVRFS=0, INVTFS=0, IRFS=0, ITFS=1, ISCLK=1, MCE=0
*/
/*------------------ SYSTEM AND MEMORY STUFF -------------------------*/
        ifc = 0xff;                     /* clear pending interrupt, all */
        nop;
        mstat = 0x40;                   /* enable go mode */
        ax0 = 0x0001;
        dm (DM_Wait_Reg) = ax0;         /* one wait state for IO */
        ax0 = 0x1000;                   /* PWAIT = 0, enable SPORT0 */
        dm (System_Control_Reg) = ax0;
```

-continued

```
        icntl=b#00100;              /* disable nesting, IRQ2 edge sensitive */
        imask=0;
        se=0x01;                    /* shift reg * +1 */
        my1=0xc000;                 /* −0.5 - for calculation of mean */
        ax0=0;                      /* send out all zeros */
        IO(DATA19)=ax0;
        i1= word_init_hilo;
        ar=32;
        call i19bit;
        ar=setbit 2 of ax0;
        call wait2;
        IO(DATA19)=ar;
        ar=0;
        call wait2;
        IO(DATA19)=ar;
        i1= word_init_hilo;
        ar=16;
        call i19bit;
        ar=setbit 2 of ax0;
        call wait2;
        IO(DATA19)=ar;
        ar=0;
        call wait2;
        IO(DATA19)=ar;
        i1= word_init_txrx;
        ar=8;
        call i19bit;
        ar=setbit 2 of ax0;
        call wait2;
        IO(DATA19)=ar;
        ar=0;
        call wait2;
        IO(DATA19)=ar;
        i1= word_init_txrx;
        ar=64;
        call i19bit;
        ar=setbit 2 of ax0;
        call wait2;
        IO(DATA19)=ar;
        ar=0;
        call wait2;
        IO(DATA19)=ar;
        i1= word_init_tx;
        ar=8;
        call i19bit;
        ar=setbit 2 of ax0;
        call wait2;
        IO(DATA19)=ar;
        ar=0;
        call wait2;
        IO(DATA19)=ar;
        i1= word_init_rx;
        ar=64;
        call i19bit;
        ar=setbit 2 of ax0;
        call wait 2;
        IO(DATA19)=ar;
        ar=0;
        call wait2;
        IO(DATA19)=ar;
        ax0=700;
        call waitmicro;
/*----------------- MAIN PROGRAM ------------------------*/
        DO it_all UNTIL forever;
        ax1=0x1234;
        dm(control)=ax1;            /* reset control word */
        imask=WAIT_SHARC;
        idle;                       /* wait for IRQL0 interrupt */
        imask=GET_ANT;
        ar=32;
        CALL s19bit;
        ar=serbit 2 of ax0;
        call wait2;
        IO(DATA19)=ar;
        ar=0;
        call wait2;
        IO(DATA19)=ar;
        ax0=1;
        IO(SYNTH)=ax0;              /* switch to LO */
```

```
              cntr=1513;
              DO init1 UNTIL ce;           /* wait approx 46 microsecs */
init1:        nop;
              ar=16;
              CALL s19bit;
              ar=setbit 2 of ax0;
              call wait2;
              IO(DATA19)=ar;
              ar=0;
              call wait2;
              IO(DATA19)=ar;
              cntr=183;
              DO init2 UNTIL ce;           /* wait approx 6 microsecs */
init2:        nop;
/*            cntr=dm(ku);*/
              cntr=20;
              DO loopku UNTIL ce;
              ax0=pm(i7,m5);
              IO(ANT)=ax0;
/*            ax0=1;*/
              ax0=10;
              call waitmicro;
              ax0=0;
              dm(rx_done)=ax0;             /* reset rx_done */
              ifc=0x00ff;                  /* clear all pending interrupts */
              axl=-39;                     /* set Rx count */
              i2=˙rx_buf_low;
              imask=READ;                  /* unmask IRQ2 */
readini:      idle;                        /* wait for next read */
              ayl=dm(rx_done);
              ar=pass ayl;
              if gt jump inidone;          /* are we done reading ? */
              jump readini;
inidone:      imask=0;
              cntr=60;
              DO loop60 UNTIL ce:
              ax0=0;
              IO(SYNTH)=ax0;               /* switch to HI */
              ar=32;
              CALL s19bit;
              ar=setbit 2 of ax0;
              call wait2;
              IO(DATA19)=ar;
              ar=0;
              call wait2;
              IO(DATA19)=ar;
              /* perform detection on meas LO */
              i0= rx_buf_low;              /* point to meas, LO */
              CALL calc_cos;
              CALL calc_cos;
              ax0=0;
              dm(rx_done)=ax0;             /* reset rx_done */
              ifc=0x00ff;                  /* clear all pending interrupts */
              axl=-39;                     /* set Rx count */
              i2=˙rx_buf_high;             /* read into HI buffer */
              imask=READ;                  /* unmask IRQ2 */
              /* continue detection on meas LO */
              CALL calc_cos;
              CALL mean;                   /* calc and Tx meas_real_lo */
              CALL calc_sin; CALL calc_sin;   CALL calc_sin; /* continue detection */
              CALL mean;                   /* calc and Tx meas_imag_lo */
              /* perform detection on ref LO */
              i0=˙rx_buf_low+1;            /* point to ref, LO */
              CALL calc_cos; CALL calc_cos; CALL calc_cos;
              CALL mean;                   /* calc and Tx ref_real_lo */
              CALL calc_sin; CALL calc_sin; CALL calc_sin;
              CALL mean;                   /* calc and Tx ref_imag_lo */
readhigh:     idle:                        /* wait for next read */
              ayl=dm(rx_done);
              ar=pass ayl;
              if gt jump highdone;         /* are we done reading ? */
              jump readhigh;
highdone:     imask=0;
              ax0=1;
              IO(SYNTH)=ax0;               /* switch to LO */
              ar=16;
              CALL s19bit;
              ar=setbit 2 of ax0;
              call wait2;
```

-continued

```
              IO(DATA19)=ar;
              ar=0;
              call wait2;
              IO(DATA19)=ar;
              /* perform detection on meas HI */
              i0=^rx_buf_high;              /* point to meas, HI */
              CALL talc_cos;
              CALL talc_cos;
              ax0=1;
              dm(rx_done)=ax0;              /* reset rx_done */
              ifc=0x00ff;                   /* clear all pending interrupts */
              axl=-39;                      /* set Rx count */
              i2=^rx_buf_low;
              imask=READ;                   /* unmask IRQ2 */
              /* continue detection on meas HI */
              CALL calc_cos;
              CALL mean;                    /* calc and Tx meas_real_hi */
              CALL calc_sin; CALL calc_sin; CALL calc_sin;
              CALL mean;                    /* calc and Tx meas_imag_hi */
              /* perform detection on ref HI */
              i0=^rx_buf_high+1;            /* point to ref. HI */
              CALL calc_cos; CALL calc_cos; CALL calc_cos; /* perform detection */
              CALL mean;                    /* calc and Tx ref_real_hi */
              CALL calc_sin; CALL calc_sin; CALL calc_sin;
              CALL mean;                    /* calc and Tx ref_imag_hi */
readlow:      idle;                         /* wait for next read */
              ayl=dm(rx_done);
              ar=pass ayl;
              if gt jump lowdone;           /* are we done reading ? */
              jump readlow;
lowdone:      imask=0;
loop60:       nop:
loopku:       nop;
              cntr=100;
              do wait_tx until ce:          /* wait for last Tx to finish */
wait_tx:      nop;
              ax0=dm(control);
              tx0=ax0;                      /* send control word */
              cntr=100;
              do wait_tx2 until ce;         /* wait for last Tx to finish */
wait_tx2:     nop;
              imask=0;                      /* Don't bother with last reads */
              i6=^words;
it_all:       i2=^rx_buf_low;               /* reset pointers to original position */
              ax0=0x0001;
              dm(PFDATA)=ax0;               /* disable CODEC, enable normal SPORT0 */
/*----------------- SUBROUTINES -------------------------*/
/* subroutines s19bit shifts out 19 bits to lower oscillator */
s19bit:   call wait22;
              IO(DATA19)=ar;
              si=pm(i6,m5);                 /* load with first 16 bits */
              sr=lshift si (LO);            /* do first shift */
              si=pm(i6,m5);                 /* load with last 3 bits */
              contr=16;
              DO s16_out UNTIL ce;
                 af=pass srl;               /* goto 0 or 1 acc to next bit */
                 if ne jump sone16;
                 ar=clrbit 0 of ar;
                 nop;
                 IO(DATA19)=ar;             /* output bit, clk=0 */
                 ar=setbit 1 of ar;
                 call wait 22;
                 IO(DATA19)=ar;             /* output same bit, clk=1 */
                 jump fins16;
sone16:          ar=setbit 0 of ar:
                 nop;
                 IO(DATA19)=ar;             /* output bit, clk=0 */
                 ar=setbit 1 of ar;
                 call wait22;
                 IO(DATA19)=ar;             /* output same bit, clk=1 */
fins16:       sr=lshift sr0 (LO):
s16_out:  ar=clrbit 1 of ar;    /* shift to next bit */
              sr=lshift si (LO);            /* do first shift on last 3 */
              cntr=3;
              DO s3_out UNTIL ce;
                 af=pass srl;               /* goto 0 or 1 acc to next bit */
                 if ne jump sone3;
                 ar=clrbit 0 of ar;
                 nop;
```

```
                 IO(DATA19)=ar;              /* output bit, clk=0 */
                 ar=setbit 1 of ar;
                 call wait22;
                 IO(DATA19)=ar;              /* output same bit, clk=1 */
                 jump fins3;
sone3:           ar=setbit 0 of ar;
                 nop;
                 IO(DATA19)=ar;              /* output bit, clk=0 */
                 ar=setbit 1 of ar;
                 call wait22;
                 IO(DATA19)=ar;              /* output same bit, clk=1 */
fins3:           sr=lshift sr0 (LO);
s3_out:          ar=clrbit 1 of ar;          /* shift to next bit */
                 nop:
                 IO(DATA19)=ar;
                 ax0=ar;
                 rts;
/* subroutine i19bit shifts out 19 bits to higher oscillator */
i19bit:   call wait22;
                 IO(DATA19)=ar;
                 si=dm(i1,m1);               /* load with first 16 bits */
                 sr=lshift si (LO);          /* do first shift */
                 si=dm(i1,m1);               /* load with last 3 bits */
                 cntr=16;
                 DO i16_out UNTIL ce;
                     af=pass srl;            /* goto 0 or 1 acc to next bit */
                     if ne jump ione16;
                     ar=clrbit 0 of ar;
                     nop;
                     IO(DATA19)=ar;          /* output bit, clk=0 */
                     ar=setbit 1 of ar;
                     call wait22;
                     IO(DATA19)=ar;          /* output same bit, clk=1 */
                     jump fini16;
ione16:          ar=setbit 0 of ar;
                 nop;
                 IO(DATA19)=ar;              /* output bit, clk=0 */
                 ar=setbit 1 of ar;
                 call wait22;
                 IO(DATA19)=ar;              /* output same bit, clk=1 */
fini16:          sr=lshift sr0 (LO);
i16_out:         ar=clrbit 1 of ar;          /* shift to next bit */
                 sr=lshift si (LO):          /* do first shift on last 3 */
                 cntr=3;
                 DO i3_out UNTIL ce;
                     af=pass srl;            /* goto 0 or 1 acc to next bit */
                     if ne jump ione3;
                     ar=clrbit 0 of ar;
                     nop;
                     IO(DATA19)=ar;          /* output bit, clk=0 */
                     ar=setbit 1 of ar;
                     call wait22;
                     IO(DATA19)=ar;          /* output same bit; clk=1 */
                     jump fini3;
ione3:           ar=setbit 0 of ar;
                 nop;
                 IO(DATA19)=ar;              /* output bit, clk=0 */
                 ar=setbit 1 of ar;
                 call wait22;
                 IO(DATA19)=ar;              /* output same bit, clk=1 */
fini3:           sr=lshift sr0 (LO);
i3_out:          ar=clrbit 1 of ar;          /* shift to next bit */
                 nop;
                 IO(DATA19)=ar;
                 ax0=ar;
                 rts;
/* subroutine calc. Detection on 40 elements of rx_buf_xxxx */
calc_cos:CNTR=39;                            /* loop counter */
                 mr=0;                       /* initialize mult/acc */
                 mx0=dm(i0,m2), my0=pm(i4,m5);   /* get 1st multiply-pair */
                 DO c_cos UNTIL CE;
c_cos:           mr=mr+mx0*my0 (US), mx0=dm(i0,m2), my0=pm(i4,m5);
                 mr=mr+mx0*my0 (US);
                 sr=lshift mrl by -2 (LO);
                 sr=sr or lshift mr2 by 14 (LO):
                 dm(i3,m1)=sr0;              /* fill result */
                 af=tstbit 2 of mr2;
                 if ne jump cos_one;
                 af=tstbit 1 of mr2;
```

-continued

```
            if ne jump o_flow;
            rts;
cos_one:    af=tstbit 1 of mr2;
            if eq jump o_flow;
            rts;
calc_sin:   CNTR=39;
            mr=0;
            mx0=dm(i0,m2), my0=pm(i5,m5);       /* initialize mult/acc, point to dsin */
            DO c_sin UNTIL CE:
c_sin:      mr=mr+mx0*my0 (US), mx0=dm(i0,m2), my0=pm(i5,m5);
            mr=mr+mx0*my0 (US);
            sr=lshift mr1 by -2 (LO);
            sr=sr of lshift mr2 by 14 (LO);
            dm(i3,m1)=sr0;                      /* fill result */
            af=tstbit 2 of mr2;
            if ne jump sin_one;
            af=tstbit 1 of mr2;
            if ne jump o_flow;
            rts;
sin_one:    af=tstbit 1 of mr2;
            if eq jump o_flow;
            rts;
mean:       mr=0;
            mx0=dm(i3,m1);
            mr=mx0*my1 (SS), mx0=dm(i3,m1);     /* -0.5*det3 */
            mr=mr+mx0*my1 (SS), mx0=dm(i3,m1);  /* -0.5*det3-0.5*det5 */
            mr=mr-mx0*my1 (SS);                 /* -0.5(det3+det5) + 0.5*det4 */
            mr=mr-mx0*my1 (SS);                 /* -0.5(det3+det5) + det 4 */
            tx0=mr1;
            rts;
o_flow:     ax0=0x4321;
            dm(control)=ax0;
            rts;
wait2:      nop;
            rts;
wait22:     nop;
            nop;
            nop;
            nop;
            nop;
            nop;
            nop;
            rts;
waitmicro:  cntr=ax0;
            do waitm until ce;
            cntr=33;
            do waitmm until ce;
waitmm:     nop;
waitm:      nop;
            rts;
/*----------------- INTERRUPT SERVICE ROUTINES --------------------*/
letsgo:     rti;
addrx:      ar=IO(MEAS):                        /* read meas */
            ar=clrbit 14 of ar;                 /* bit 13 is D.C. */
            dm(i2,m1)=ar;                       /* store in rx_buf */
            ar=tstbit 15 of ar;                 /* test for ADC out of range */
            if gt jump adc_of;                  /* if ADC is out of range modify control word */
            ar=IO(REF);                         /* read ref */
            ar=clrbit 14 of ar;                 /* bit 14 is D.C. */
            dm(i2,m1)=ar;                       /* store in rx_buf */
            ar=tstbit 15 of ar;                 /* test for ADC out of range */
            if gt jump adc_of;                  /* if ADC is out of range modify control word */
            ar=axl+1;                           /* increase Rx counter */
            if gt jump rxdone;                  /* 40 measurements completed */
            axl=ar;
            rti;
adc_of:     ayl=0x9876;                         /* ADC was out of range */
            dm(control)=ayl;
            ar=axl+1;                           /* increase Rx counter */
            if gt jump rxdone;                  /* 40 measurements completed */
            axl=ar;
            rti;
rxdone:     ayl=1;
            dm(rx_done)=ayl;                    /* notify main program that Rx is complete */
            rti;
sp0_rx:     axl=rx0;                            /* get word */
            dm(ku)=axl;
            rti;
.endmod;
```

-continued

```
Def_4.h
# define pi 3.14159265358979311599796346854418516159057617187
# define DF 6400000
# define pi001 pi*DF*2*1e-9
# define NO_ANTENNAS 5
# define NO_ROT 4
# define ma 12                /* model order of denominator */
# define mb 12                /* model order of numerator */
# define np 128               /* number of points in frequency response */
# define t1 1.0               /* time start in ns */
# define t2 45.0              /* time stop in ns */
# define ku 20
# define Ns 120               /* number of frequencies per antenna position */
# define RAWDATA 4*Ns*ku+1    /* complex signal and reference, one control word */
# define p2 NO_ROT
# define p8 ku-NO_ROT
# define ns_to_m 1.0
# define Nr 120               /* Nr = nf2-nf1+1 */
# define STARTPOINT 0
# define SUBMEANS_RE "c:\\dsp21k\\bcclib\\sub_mean.re"
# define SUBMEANS_IM "c:\\dsp21k\\bcclib\\sub_mean.im"
# define MEAS_DELAY 0
```

Table 1. Receiver Circuit

Description:

The receiver circuit is divided into 5 separate printed circuit boards:

Board a: LO frequency mixing.

Board b: LO signal distribution.

Board c: Receiver reference channel down conversion.

Board d Receiver test channel down conversion.
 note: 2 pcs, one for each test channel The input signals are (See receiver block diagram in FIG. 23):

B1, B2: Receiver inputs (test channels).

C: Receiver reference input.

E: 1600–2500 MHz signal from synthesizer.

G: 1510.1 MHz signal from synthesizer.

The output signals are:

H: 100 kHz IF-signal, reference channel.

I1, I2: 100 kHz IF-signal, test channels.

The 5 boards are mounted in a metal box with 5 separate rooms. High frequency signals are routed between boards by use of coaxial cables with SMA connectors. Power supplies and low-frequency control signals are decoupled at the walls between the rooms. Power supplies are stabilized by use of ordinary voltage stabilizers.

Circuit diagrams.

Circuit diagrams for the 4 different boards are shown in FIGS. 24, 25, 26 and 27 respectively.

Part list, board a:

| | |
|---|---|
| RA5 | ERA-2 (Mini Circuits) |
| RM4 | RMS-25MH (Mini Circuits) |
| RF7 | Microstrip band-stop filter, 1510 MHz with 2 (edge coupled) resonators (Board material: Rogers RO4003). |
| RF8 | 1000 MHz "low-pass" filter, implemented as a 5-resonator microstrip band-stop filter (Board material: Rogers RO4003). |
| $L_{a1}$ | 33 nH |
| $L_{a2}$ | Permax 51 |
| $C_{a1} = C_{a2} = C_{a3}$ | 33 pF |
| $C_{a4}$ | 1 nF |

-continued

Part list, board a:

| | |
|---|---|
| $R_{a1}$ | 110 ohm |
| $R_{a2}$ | 75 ohm |
| $R_{a3}$ | 330 ohm |
| $R_{a4}$ | 16 ohm |
| $R_{a5}$ | 330 ohm |

Part list, board b:

| | |
|---|---|
| RA6 = RA7 = RA8 | ERA-1 (Mini Circuits) |
| RA9 = RA10 | INA-10386 (Hewlett-Packard) |
| RD1 | LRPS-2-4 (Mini Circuits) |
| $L_{b1} = L_{b3} = L_{b5} = L_{b7} = L_{b8}$ | 470 nH |
| $L_{b2} = L_{b4} = L_{b6} = L_{b9} = L_{b10}$ | Permax 51 |
| $C_{b1} = C_{b2} = C_{b3} = C_{b4} = C_{b5} =$ | 150 pF |
| $C_{b6} = C_{b7} = C_{b8} = C_{b9} = C_{b10}$ | |
| $C_{b11} = C_{b13} = C_{b15} = C_{b17} = C_{b18}$ | 150 pF |
| $C_{b12} = C_{b14} = C_{b16} = C_{b19} = C_{b20}$ | 1 nF |
| $R_{b1} = R_{b8}$ | 100 ohm |
| $R_{b2} = R_{b9}$ | 33 ohm |
| $R_{b6} = R_{b10} = R_{b11}$ | 130 ohm |
| $R_{b7} = R_{b12} = R_{b13}$ | 82 ohm |
| $R_{b3} = R_{b5}$ | 150 ohm |
| $R_{b4}$ | 36 ohm |
| $R_{b14} = R_{b15} = R_{b16}$ | 51 ohm |

Part list, board c:

| | |
|---|---|
| RM3 | TUF-2LHSM (Mini Circuits) |
| RF5 | 1000 MHz "low-pass" filter, implemented as a 5-resonator microstrip band-stop filter (Board material: Rogers RO4003). |
| $L_{c1}$ | 22 nH |
| $L_{c2}$ | 330 nH |
| $C_{c1}$ | 8.2 pF |
| $C_{c2} = C_{c3}$ | 470 pF |
| $R_{c1} = R_{c2}$ | 47 ohm |

Part list, board d (each of 2 boards):

| | |
|---|---|
| RA1 | MGA-82563 (Hewlett-Packard) |
| RA3 | INA-10386 (Hewlett-Packard) |
| RM1 | TUF-2LHSM (Mini Circuits) |
| RS1 = RS3 | SW-339 (M/A-COM) |
| RF1 | 1000 MHz "low-pass" filter, implemented as a 5-resonator microstrip band-stop filter (Board material: Rogers RO4003). |
| $L_{d1} = L_{d3}$ | 470 nH |
| $L_{d2} = L_{d4}$ | Permax 51 |
| $L_{d5}$ | 22 nH |
| $L_{d6}$ | 330 nH |
| $C_{d1} = C_{d2} = C_{d3} = C_{d4} =$ | 150 pF |
| $C_{d5} = C_{d7}$ | |
| $C_{d6} = C_{d8}$ | 1 nF |
| $C_{d9} = C_{d10} = C_{d11} = C_{d12} =$ | 150 pF |
| $C_{d13} = C_{d14} = C_{d15} = C_{d16}$ | |
| $C_{d17}$ | 8.2 pF |
| $C_{d18} = C_{d19}$ | 470 pF |
| $R_{d1} = R_{d2} = R_{d5} = R_{d6}$ | 100 ohm |
| $R_{d3}$ | 100 ohm |
| $R_{d4}$ | 33 ohm |
| $R_{d7} = R_{d8}$ | 47 ohm |

Table 2. Transmitter

The transmitter circuit diagram is in FIG. 28.

Input signals:

| | |
|---|---|
| F (see RTVA block diagram): | 1500 MHz signal from Synthesizer/reference |
| D (see RTVA block diagram): | 1600–2500 MHz from Synthesizer |

Output signals:

| | |
|---|---|
| A (see RTVA block diagram): | Transmitter output to antenna swich |
| C/REF (see RTVA block diagram): | Ateenuated output to REF channel in receiver unit. |

Parts list:

| | |
|---|---|
| U4A: | Microstrip band-stop filter, 1510 MHz with 2 (edge coupled) resonators (Board material: Rogers RO4003). |
| U9A | 1000 MHz "low-pass" filter, implemented as a 5-resonator microstrip band-stop filter (Board material: Rogers RO4003). |
| U5A | ERA-2 (Mini Circuits) |
| U8A, U11A | ERA-5 (Mini Circuits) |
| U3 | RMS-25H mixer (Mini Circuits) |
| U20 | Step Attenuator Digital controlled (MA-COM AT230) |
| C2, C3, C4, C6, C8, C9, C10, C22 | 150 pF SMD capacitor 603 footprint |
| C11, C13, C14, C15, C16, C17, C18: | not mounted |
| C12: | 180 pF SMD capacitor 805 footprint |
| R1 | 91 ohm |
| R2 | 27 ohm |
| R3 | 100 ohm |
| R4 | 27 ohm |
| R5 | 36 ohm |
| R6 | 560 ohm |
| R8 | 150 ohm |
| R9 | 51 ohm |
| R10 | 56 ohm |
| R11 | 51 ohm |
| R12 | 56 ohm |
| R13 | 2.2 ohm |
| R14 | |
| R15 | 680 ohm |
| R16 | 330 ohm |
| R17 | 56 ohm |
| R18, R19 | not mounted |
| R23–R28 | 680 ohm |
| R81 | 8.2 ohm |
| R61 | 8.2 ohm |
| R20 | 4.7 Kohm × 8 resistor network SMD |
| L2, L6, L5 | 470 nF inductor SMD 805 footprint |
| LCF1, LCF2, LCF3: | L/C PI-section trough coupler (TUSONIX 4101-008) |

Table 3. Synthesizer

Parts list on the following two pages
Circuit diagram in FIGS. 29 to 34.

Table 4. Detector/DSP-1

The detector consists of 3 boards.

One ADDS-21XX-EZLITE Evaluation Board from Analog Devices Inc. This board incorporates the fixed-point DSP Processor ADSP2181 as well as clock generator and other support circuits.

For description and circuit diagrams refer to the published material from Analog Devices Inc. regarding the ADDS-21XX-EZLITE Evaluation Board.

Two boards comprising of Analog-to-Digital converters and digital logic input/output lines for controlling the synthesizer and the antenna switches plus some auxiliary circuits. The digital control lines for the Antenna Switch Decoder/Level Shifter and the synthesizer are all standard TTL level.

Circuit diagram for these two boards are the same and shown in FIGS. 35*a*), 35*b*) and 36. NOTE: The lines designated AQ0...AQ13, which are the output signals from the Analog to Digital converter should be reversed in order in FIGS. 35*a*) and 35*b*).

List of components on the following pages

The analog input signals are the IF-outputs from the receiver unit. Refer to RTVA block diagram in FIG. 22.

The IF signals of 100 KHz are the REF channel and one test channel.

Software listings for the ADSP2181 DSP processor is included.

The processor performs a quadrature detection, and the resulting stream of digital data is fed to the ADSP-2106x EZ-LAB Evaluation Board via a serial interface.

Table 5. Antenna Switch

Circuit diagram in FIG. 37.

2 pcs of this board are used, one for the transmitting antennas and one for the receiving. The board is constructed using a microstrip technique on a board material material: Rogers RO4003.

Control inputs: swa0/swb0 ... swa6/swb6 are +/− 5V signals generated by the Antenna Switch Controller/Level Shifter.

RF signal ports ANT-1 ... ANT-6 are connected to antenna elements

RF signal port Rx or TX is connected to the transmitter output or the receiver input.

RF connectors are all SMA female chassis mounted.

Parts list:

| | |
|---|---|
| R1, R2, R3, R4, R11, R12 | 51 W |
| R5, R6, R7, R8, R9, R10 | 10 KW |
| C1, C2, C3 | 10 nF |
| LCFEED | 4101-008 (Tusonix). Pi-section, capacitance 5,5 nF |
| SW1, SW2, SW3, SW4, SW5, SW6, SW7, SW8, SW9, SW10, SW11, SW12 | SW-338 (Macom) |

Table 6. Antenna Switch Decoder/Level Shifter

Circuit Diagram: FIG. 38

2 pcs of this unit is used.

Input signals:Terminals no 1,2,3 and 4 on connector JP3, only 1,2 and 3 are used. These TTL level control signals are generated by the Detector/DSP-1 unit.

Output signals: Only the +/− 5V signals SWA0/SWB0 ... SWA6/SWB6 are used. These lines are connected to the Antenna Switch units.

This board converts standard TTL logic signals to +/− 5V signals.

Encoding of the signals is performed by the logic pattern stored in the EPROM U5. The pattern is trivial in the sense that for the fist six of the 16 possible logic state combinations of the inputs AX0 ... AX3, the SWA0/SWB0 ... SWA6/SWB6 are put at a voltage level, that in effect selects one out of the six RF ports on the antenna switch controlled by this unit. The logic pattern stored in the EPROM U5 is thus deductable from the included diagrams.

Table 7. Serial Interface

The serial interface is constructed in accordance with the guidelines given in the ADSP-2100 family Users Manual under Hardware Examples, published by Analog Devices Inc.

Standard differential RS-485 signaling is used.

Circuit diagrams in FIGS. 42, 43 and 44

Parts lists:

| EZLITE, (FIG. 42): | |
|---|---|
| R1, R2, R3 | 1 kohm |
| C1, C2, C5 | 100 nF |
| C3, C4 | 100 mF |
| D1 | 1N4001 |
| U1 | DS96174 |
| U2 | DS96175 |
| U3 | LM78L05 |

Table 8. Dipole Antenna Element

Circuit diagram in FIG. 39

8 or 10 pcs of this unit is used, corresponding to 4 or 5 antenna pairs.

Printed circuit layout is shown in FIGS. 40 and 41.

Parts list:

| | |
|---|---|
| R1, R2, R3, R4 | 22 ohm |
| R5, R6, R7, R8, R9, R10 | 33 ohm |
| R11, R12, R13, R14, R15, R16, R17, R18 | 47 ohm |
| R19, R20, R21, R22, R23, R24 | 220 ohm |
| TR1 | ETC4-1T-7 (Macom) |
| P1 | SMA jack for pcb mounting. |

TABLE 9

View of some possible antenna configurations.

| Basis combination | corresponding 8-set | type | comment | S-param. |
|---|---|---|---|---|
| FIG.: 3a | 3b | 1 | co-linear | $S_{21}$ |
| FIG.: 3c | 3d | 1 | parallel | $S_{21}$ |
| FIG.: 4a | 4b | 2 | symmetrical | $S_{21}$ |
| FIG.: 4c | 4d | 2 | symmetrical | $S_{21}$ |
| FIG.: 5a | 5b | 1 | coincident | $S_{11}$ |

TABLE 10

Examples of number of rotations of the antenna system. $\Delta\theta$ is angle of rotation between each measurement, N is number of measurements.

| N = | 8 | 16 | 32 | 64 | 128 |
|---|---|---|---|---|---|
| $\Delta\theta = 22,5°$ | | ½ | 1 | 2 | 4 | 8 |
| $\Delta\theta = 45°$ | | 1 | 2 | 4 | 8 | 16 |

TABLE 11

Examples of k-indexes corresponding to 2 periods per rotation. k-values stated in pairs $(k_2, k_{-2})$, $\Delta\theta$ is the angle of rotation between each measurement, N is number of measurements.

| N = | 16 | 32 | 64 | 128 | |
|---|---|---|---|---|---|
| $\Delta\theta = 22,5°$ | | (2,14) | (4,28) | (8,56) | (16,112) | $(k_2, k_{-2})$ |
| $\Delta\theta = 45°$ | | (4,129) | (8,249) | (16,48) | (32,96) | $(k_2, k_{-2})$ |

TABLE 12 view of objects seen in the examples 1 to 5.

| Designation | | Object | Depth | $\Delta\theta$ | No rot. | N |
|---|---|---|---|---|---|---|
| Eks1A . . . E | 960820a | 160 mm plastics pipe with water | 135 cm + | 22,5 gr. | 4 | 64 |
| Eks2A . . . E | 960823a | Electricity-high voltage cable | 75 cm ? | 22,5 gr. | 1 | 16 |
| Eks3A . . . F | 960916b | Telephone cable | 50 cm ? | 22,5 gr. | 4 | 64 |
| Eks4A . . . E | 960912a | Electricity-high voltage cable | 90 cm ? | 22,5 gr. | 2 | 32 |
| Eks5A . . . E | 960813a | Electricity-low voltage cable | 75 cm + | 22,5 gr. | 4 | 64 |

Note: + depth measured when digged up
Note ? depth estimated

What is claimed is:

1. Apparatus for the generation of information indicative of the depth and orientation of an object positioned below the surface of the ground, the apparatus including a transmitter for generating a transmitted signal, an antenna system for emitting the transmitted signal and for receiving a reflected electromagnetic signal reflected by the object, and a receiver for processing the reflected signal received from the antenna system, characterized in that the antenna system has a geometrical center and comprises a plurality of individual antenna elements having a polarization that is at least approximately linear and that are positioned relative to the geometrical center of the antenna system with each of the centers of the antenna elements displaced in relation to the geometrical center of the antenna system, and further characterized in that the apparatus comprises means for rotation of the antenna system and thus the polarization of an electromagnetic field established relative to the geometric center of the antenna system.

2. The apparatus of claim 1, wherein the individual antenna elements of the antenna system are positioned radially relative to the geometric center of the antenna system.

3. The apparatus of claim 1, wherein the individual antenna elements of the antenna system form oriented sets of transmitter and receiver antennas, wherein the orientation of the oriented sets is selected from the group consisting of orthogonal orientation and parallel orientation.

4. The apparatus of claim 3, wherein the transmitter and receiver antennas are co-polar.

5. The apparatus of claim 3, wherein the transmitter and receiver antennas are cross-polar.

6. The apparatus of claim 1, wherein the means for providing rotation of the antenna system rotate the system so as to polarize the electromagnetic field around the geometric center in angular increments, wherein the increments are selected from the group consisting of 22.5°, 30°, 36°; multiples of 22.5°, 30°, and 36°; and divisions of 22.5°, 30°, and 36+.

7. The apparatus of claim 1, wherein the transmitter and receiver generate and receive, respectively, electromagnetic signals at several individual frequencies within the range of about 100 Megahertz to about 1 Gigahertz, the individual frequencies being in increments of about 5 Megahertz.

8. The apparatus of claim 1, further comprising signal processing means for measuring a transfer function between the transmitted and reflected signals, wherein the transfer function is selected from the group consisting of a voltage transfer function, a current transfer function, a combination of voltage and current transfer functions, and a power transfer function.

9. The apparatus of claim 8, wherein the signal processing means measure the transfer function for associated values of angular rotation and frequency.

10. The apparatus of claim 9, wherein the signal processing means perform a transformation from frequency to time for the generation of a time-dependent function continuous in time for each angle, calculated at a predetermined number of discrete times using identical calculation times for all the angles.

11. The apparatus of claim 10, wherein the transformation is a Fourier transformation.

12. The apparatus of claim 10, wherein the transformation is done by using a mathematical exponential model with a corresponding rational transfer function on the transfer function associated with each angle.

13. The apparatus of claim 10, wherein the signal processing means perform a signal analysis by Fourier transformation for each of the times in the time-dependent function, with time as a constant and the angle as an independent variable, for generation of a representation in the angle domain.

14. The apparatus of claim 13, wherein the signal processing means perform a scanning for local and global maxima indicating angle periodical reflections from objects, in the representation in the angle domain, and wherein peak values indicate time delays of associated reflections from an object.

15. The apparatus of claim 14, wherein the signal processing means perform a calculation of angle position relative to the antenna system for the angle periodical reflections.

16. The apparatus of claim 10, wherein the signal processing means perform a signal analysis by Fourier transformation for each frequency, having frequency as a constant and the angle as an independent variable, for generation of a set of numbers having an angle harmonic and a measuring frequency as independent variables.

17. The apparatus of claim 16, wherein the signal processing means perform a transformation from frequency to time for generating a set of numbers corresponding to a mathematical function having an angle harmonic in discrete form and time in discrete form as independent variables.

18. The apparatus of claim 17, wherein the transformation is a Fourier transformation.

19. The apparatus of claim 17, wherein the transformation is done by applying a mathematical exponential model with corresponding rational transfer function deriving for each angle harmonic a time-dependent function, continuous in time, at a predetermined number of discrete times, using identical calculation times for every angle harmonic.

20. The apparatus of claim 10, wherein the signal processing means use collocated measurements for suppressing clutter during horizontal movement above the ground.

21. The apparatus of claim 1, wherein the individual antenna elements form polygonal structures around the geometric center of the antenna system.

22. A method for generation of information indicative of the depth and the orientation of an object positioned below the surface of the ground, wherein the method includes the emission from an antenna system of a transmitted signal generated by a transmitter, the reception of a reflected signal from the object by the antenna system, and the processing of the reflected signal received from the antenna system by a receiver, wherein the method is characterized by the steps of:
  using, for the emission and reception, respectively, of the transmitted signal and the reflected signal, a plurality of individual antenna elements having a polarization that is at least approximately linear in relation to the geometrical center of the antenna system, with each of the centers of the antenna elements displaced in relation to the geometrical center of the antenna system; and
  rotating the antenna system in relation to the geometric center of the antenna system.

23. The method of claim 22, wherein the individual antenna elements are positioned radially from the geometric center of the antenna system.

24. The method of claim 22, wherein the individual antenna elements of the antenna system form oriented sets of transmitter and receiver antennas, wherein the orientation of the oriented sets is selected from the group consisting of orthogonal orientation and parallel orientation.

25. The method of claim 22, wherein the transmitter and receiver antennas are co-polar.

26. The method of claim 22, wherein the transmitter and receiver antennas are cross-polar.

27. The method of claim 22, wherein the means for providing rotation of the antenna system rotate the system so as to polarize the electromagnetic field around the geometric center in angular increments, wherein the increments are selected from the group consisting of 22.5°, 30°, 36°; multiples of 22.5°, 30°, and 36°; and divisions of 22.5°, 30°, and 36°.

28. The method of claim 22, wherein the individual antenna elements form polygonal structures around the geometric center of the antenna system.

29. The method of claim 22, wherein the transmitter and receiver generate and receive, respectively, electromagnetic signals at several individual frequencies within the range of about 100 Megahertz to about 1 Gigahertz, the individual frequencies being in increments of about 5 Megahertz.

30. The method of claim 22, wherein the processing step comprises the step of measuring a transfer function between the transmitted and reflected signals, wherein the transfer function is selected from the group consisting of a voltage transfer function, a current transfer function, a combination of voltage and current transfer functions, and a power transfer function.

31. The method of claim 30, wherein the step of measuring a transfer function includes the step of measuring the transfer function for associated values of angular rotation and frequency.

32. The method of claim 31, wherein the step of measuring a transfer function includes the step of performing a transformation from frequency to time for the generation of a time-dependent function continuous in time for each angle, calculated at a predetermined number of discrete times using identical calculation times for all the angles.

33. The method of claim 32, wherein the transformation is a Fourier transformation.

34. The method of claim 32, wherein the transformation is done by using a mathematical exponential model with a corresponding rational transfer function on the transfer function associated with each angle.

35. The method of claim 32, wherein the processing step includes the step of performing a signal analysis by Fourier transformation for each of the times in the time-dependent function, with time as a constant and the angle as an independent variable, for generation of a representation in the angle domain.

36. The method of claim 35, wherein the processing step comprises the step of scanning for local and global maxima indicating angle periodical reflections from objects, in the representation in the angle domain, and wherein peak values indicate time delays of associated reflections from an object.

37. The method of claim 36, wherein the processing step comprises the step of calculating angle position relative to the antenna system for the angle periodical reflections.

38. The method of claim 32, wherein the processing step comprises the step of performing a signal analysis by Fourier transformation for each frequency, having frequency as a constant and the angle as an independent variable, for generation of a set of numbers having an angle harmonic and a measuring frequency as independent variables.

39. The method of claim 38, wherein the processing step comprises the step of performing a transformation from frequency to time for generating a set of numbers corresponding to a mathematical function having an angle harmonic in discrete form and time in discrete form as independent variables.

40. The method of claim 39, wherein the transformation is a Fourier transformation.

41. The method of claim 39, wherein the transformation is done by applying a mathematical exponential model with corresponding rational transfer function deriving for each angle harmonic a time-dependent function, continuous in time, at a predetermined number of discrete times, using identical calculation times for every angle harmonic.

42. The method of claim 32, wherein the processing step comprises the step of using collocated measurements for suppressing clutter during horizontal movement above the ground.

\* \* \* \* \*